US012741554B2

(12) United States Patent
Sasu

(10) Patent No.: US 12,741,554 B2
(45) Date of Patent: Sep. 22, 2026

(54) EFFICIENT ELECTRIC VEHICLES WITH FAST RECHARGEABLE BATTERIES (EEVs)

(71) Applicant: Ioan Sasu, Brossard (CA)

(72) Inventor: Ioan Sasu, Brossard (CA)

( * ) Notice: Subject to any disclaimer, the term of this patent is extended or adjusted under 35 U.S.C. 154(b) by 0 days.

(21) Appl. No.: 18/740,420

(22) Filed: Jun. 11, 2024

(65) Prior Publication Data

US 2025/0376060 A1 Dec. 11, 2025

(51) Int. Cl.

| | |
|---|---|
| ***B60H 1/00*** | (2006.01) |
| ***B25J 17/02*** | (2006.01) |
| ***B60L 50/64*** | (2019.01) |
| ***B60L 53/16*** | (2019.01) |
| ***B60L 53/30*** | (2019.01) |
| ***B60L 53/302*** | (2019.01) |
| ***B60L 53/37*** | (2019.01) |
| ***B60L 53/66*** | (2019.01) |
| ***H01M 10/613*** | (2014.01) |
| ***H01M 10/625*** | (2014.01) |
| ***H01M 10/6567*** | (2014.01) |
| *H01R 13/03* | (2006.01) |
| *H01R 13/533* | (2006.01) |

(52) U.S. Cl.

CPC ........... *B60L 53/37* (2019.02); *B25J 17/0283* (2013.01); *B60H 1/00278* (2013.01); *B60H 1/00285* (2013.01); *B60H 1/00392* (2013.01); *B60L 50/64* (2019.02); *B60L 53/16* (2019.02); *B60L 53/302* (2019.02); *B60L 53/66* (2019.02); *H01M 10/613* (2015.04); *H01M 10/625* (2015.04); *H01M 10/6567* (2015.04); *H01M 2220/20* (2013.01); *H01R 13/03* (2013.01); *H01R 13/533* (2013.01)

(58) Field of Classification Search

CPC ............ B60L 53/00; B60L 53/30; B60H 1/00

See application file for complete search history.

(56) References Cited

U.S. PATENT DOCUMENTS

| | | | | |
|---|---|---|---|---|
| 11,772,504 B2* | 10/2023 | Sasu | H02J 7/0063 320/109 |
| 2013/0106176 A1* | 5/2013 | Jang | B60L 58/20 307/9.1 |
| 2015/0061605 A1* | 3/2015 | Yamazaki | B60L 58/13 320/150 |

(Continued)

OTHER PUBLICATIONS

Written Opinion of the International Searching Authority (ISA) for International Application No. PCT/IB2025/055920—Findings: Claims 1-19 satisfy Novelty (Art. 33(2) PCT), Inventive Step (Art. 33(3) PCT), and Industrial Applicability (Art. 33(4) PCT), Sep. 8, 2025, 7 pages.

*Primary Examiner* — Adi Amrany

(57) ABSTRACT

The invention addresses key challenges in electric transportation by introducing novel solutions for electric vehicles (EVs) and their batteries, Recharge time is reduced to 2-5 minutes through optimized battery design and automated charging systems. Battery performance is enhanced via thermal management using a dedicated hydrogen-based heating and cooling system. Vehicle range is extended by reserving the main battery for propulsion, while cabin climate control is handled separately using a hydrogen heater and a hydrogen-powered compressor for air conditioning. An electric vehicle integrating these features is referred to as an Efficient Electric Vehicle (EEV).

14 Claims, 113 Drawing Sheets

(56) References Cited

U.S. PATENT DOCUMENTS

| | | | | |
|---|---|---|---|---|
| 2017/0259803 | A1* | 9/2017 | Khafagy | B60W 10/08 |
| 2020/0044464 | A1* | 2/2020 | Sasu | H02J 7/0044 |
| 2022/0024332 | A1* | 1/2022 | Powell | B60L 58/20 |
| 2022/0200024 | A1* | 6/2022 | Kim | B60H 1/00435 |
| 2022/0402401 | A1* | 12/2022 | Zhang | H02J 7/36 |
| 2024/0025383 | A1* | 1/2024 | Treharne | B60T 8/323 |
| 2024/0367480 | A1* | 11/2024 | Bays | B60L 1/02 |
| 2025/0108728 | A1* | 4/2025 | Surya | B60L 58/27 |

* cited by examiner

Section A-A

View G

View B

Detail D2

Detail D3

Detail D4

Detail D5

Detail D7

Detail D8

Detail D9

Detail D10

Detail D11

Detail D13

View E

View S

View J

Detail D32

Detail D33

Detail 34

Detail D35

Section Z - Z

Section T - T

Detail D36

Detail D37

Detail D38

Detail D39

EFFICIENT ELECTRIC VEHICLES WITH FAST RECHARGEABLE BATTERIES (EEVs)

TECHNICAL FIELD

The present invention relates generally to a new design of the electric vehicle (EV) battery, having as a main objective to reduce battery recharge time, equivalent with the refilling time for the tank of the internal combustion (IC) vehicles—less than 5 Min. To reach this objective this invention uses a new approach on the battery design by splitting the battery in a plurality of independent modules recharged simultaneously during the battery recharge mode, instead of increasing the power of the power supply units (using super chargers). Also, the invention is related to the more efficient electric vehicles (EEV's) equipped with hydrogen heating/cooling system for the battery separated by the hydrogen heating/cooling system of the cabin, and to the automatic recharge stations, using robots for recharge and an intelligent communication system between the driver, recharge station and financial institutions.

BACKGROUND OF THE ART

The EV battery recharge time depends on the battery size and on the type of the equipment used. The battery size to be recharged of the actual battery is the entire EV battery. The actual EV battery recharge equipment is classified on three categories: Level 1, level 2 and level 3. The difference between these, is related to the level of power used for the charger. Higher the power, faster the battery recharge. For example, for the same battery capacity of 60 Kwh, for Level 1 (low power charger), the recharge time may be about 16 Hrs, while for high power charger Level 3, (super charger) the recharge time may be about 15 to 20 Min. The actual EV's design penalises the EV autonomy by using the energy of the main battery for heating and cooling the cabin of the vehicle and by cooling the battery itself. The actual EV battery chargers are installed in not dedicated locations (parking lots, streets, etc.) and are not placed on strategic locations and not taking into considerations the entire highways network, and by this, making difficult for electric vehicles to travel long distances.

TECHNICAL ISSUES

The main issue related to the actual batteries and their chargers is the long-requested recharge time and the space taken by the recharging stations, which has a negative impact on the vehicle's autonomy. Reducing the battery recharge time by increasing the charger power has some limitations related to the cables, battery and charger heating, having negative impact on the cost of the superchargers, on the battery premature degradation and battery life on the long run, etc. These limitations don't allow to reduce the battery recharge time at the required level of (2 to 5) minutes/recharge, which is the main issue for EV acceptance and user-friendly appearance. The electric energy stoked into the main EV battery is not efficient used, having a negative impact on the EV autonomy. This energy is used to heat/cool the cabin of EV not only to move. The recharge process is long, the recharge stations are not optimized located in relation with the highways network, and don't cover rationally the entire country territory.

SUMMARY OF THE INVENTION

The present invention relates generally to an efficient electric vehicle (EEV) with a performant battery and to an automatic EV battery recharge station, equipped with a robot and an intelligent system allowing the communication between the driver with the recharge station and with financial institutions, via internet. As result, the battery recharge time drops from hours to 2-5 minutes. Using a battery temperature control and a dedicated hydrogen battery heating/cooling system, the battery better perform. The autonomy increases, by a rationally use of the main EV battery, avoiding to heat/cool the cabin with the electricity provided by the EV main battery, using a unique hydrogen heater/AC system. The battery recharge is facilitated being assisted by robots, the recharge stations are dedicated, modern EV recharge stations, placed in strategic locations, covering entire USA territory, allowing a user-friendly traveling for everybody.

DESCRIPTION OF THE DRAWINGS

In order that this invention may be readily understood, a plurality of embodiments is illustrated by way of examples, with reference to the accompanying drawings, in which:

FIG. 76 is the detail D32 of FIG. 75;

DETAILED DESCRIPTION OF PREFERRED EMBODIMENTS

Figure 1:
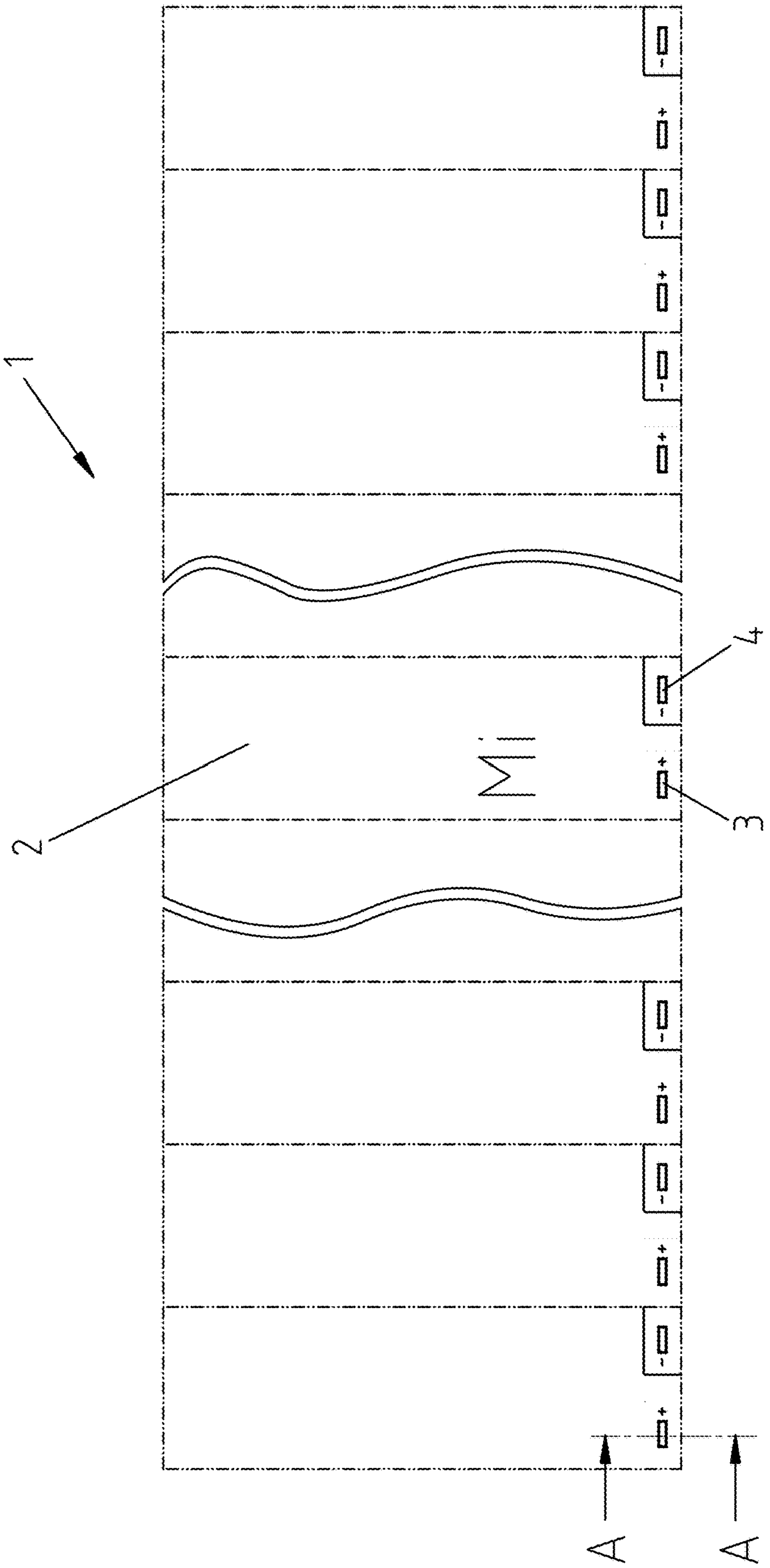
FIG. 1 is a sketch of a Electric Vehicle (EV) battery with a plurality of independent modules having independent module terminals.

The present invention is a continuation of the U.S. Pat. No. 11,772,504, "Fast rechargeable battery assembly and recharging equipment, issued on Oct. 3, 2023, inventor loan Sasu. The present invention presents a plurality of embodiments having the following objectives:

1. Practical solutions on reducing the electric vehicles (EV) battery recharge time,
2. Practical solutions on increasing the EV autonomy,
3. Practical solutions on modernisation of the EV recharge stations.

1. Practical Solutions on Reducing the Electric Vehicles (EV) Battery Recharge Time As described in the U.S. Pat. No. 11,772,504, to reduce the EV recharge time, a fast rechargeable electric vehicles battery includes a plurality of independent battery modules, each of them having an independent own positive and negative terminal. In the supply mode of the battery, all the independent battery modules are connected each other (in parallel or in series), and are connected to the battery main terminal. In the recharge mode, all the independent modules are disconnected each other and each one is connected to a power supply unit. Depending on the way the independent modules are connected in the supply mode, (in parallel or in series), to disconnect them during the recharge mode, are used switches (for parallel) or changeover switches (for series). During the battery recharge, the switches are in OFF position separating the modules each other, and during the supply mode, they are turned ON, connecting in parallel the independent modules. During the battery recharge, the changeover switches are in a position, disconnecting the modules each other, and in the supply mode, they turn on another position, connecting the independent modules in series. Therefore, each independent module of the battery is connected in recharge mode to a negative terminal of a power supply unit via the electric vehicle (EV) inlet and the charger outlet. This principle was described in the previous patent. The actual invention focusses on the practical solutions to implement this principle into automotive industry, and in this way to put the principle at work. The recharge time of a battery is a function of two main parameters:

- the power of the power supply units (KW) used for battery recharge and
- the capacity (Kwh) (size) of the battery connected to the power supply unit, (see 1.1).

$$T_{rch} = f(KW, Kwh) \qquad 1.1$$

where: $T_{rch}$—Battery Recharge Time;

KW—Power of the power supply unit used to recharge the battery;

Kwh—Battery Capacity (electric energy stored into the battery, as number of Kwh).

The relationship between the battery recharge time and the two main parameters is shown in (1.2) and (1.3).

$$T_{rch}\downarrow \longrightarrow KW\uparrow \qquad 1.2$$

$$T_{rch}\downarrow \longrightarrow Kwh\downarrow \qquad 1.3$$

The battery recharge time decreases when the power increases and the battery recharge time decreases when the battery capacity (size) decreases.

Up to now, the battery recharge time was reduced by increasing the charger power. As result, there are three levels of chargers, from level 1 ((3.8-7.5) KW with a battery recharge time up to 16 Hrs), up to level 3—the supper chargers ((250-475) KW, with the battery recharge time of 15-20 Min). There are some consequences and limitations in increasing the power because it generates high heat which can cause battery degradation, decreases battery life, reduces charging capacity in the long run and increases costs.

The actual EV battery design is for the "on board battery recharge", meaning one battery set-up, where the battery stays on the EV during the supply and the recharge mode, having a unique main terminal connected to a power supply unit via the charger, during the recharge time, and connected to the EV motor via inverter during the supply time. To increase the EV autonomy, the battery capacity has to be big enough, having negative impact on the battery recharge time. So, up to now, the battery recharge time was not reduced using the second parameter of the equation 1.1—battery capacity. Another approach to reduce the battery recharge time is to act on the second parameter of the equation 1.1—the battery capacity. Keeping the actual design of the batteries, reducing the battery capacity has negative implications on the EV autonomy, which will be reduced too. But, in fact, for the two different operating modes of an EV battery, ideally the following requirements apply:

- in supply mode a big battery is required for a long autonomy, and
- in recharge mode a small size of the battery is required for a reduce battery recharge time.

Apparently, these two requirements are opposite each other, but however, there is a solution of this: In order to keep the large autonomy in supply mode, the battery has to be the biggest possible (the size has to be limited by the battery volume and weight for each EV type), and in recharge mode, the battery connected to a power supply unit has to be the smallest possible. How to do this? By splitting the big battery in a plurality of small independent batterie modules during the recharge, each independent module being simultaneously connected to an independent power supply unit and recharged in a fraction of the recharge time required for the entire battery. Therefore, in the recharge time, each independent module has to act separately each other and during the supply mode all the independent modules have to be connected together and connected to the battery main terminal. How to do this? By using switches for parallel connection and by using changeover switches for series connection in supply mode. For the modules connected in parallel in supply mode, all positive terminals of the independent modules have to be connected together and connected to the positive terminal of the main battery terminal, but the negative terminals of the independent modules are connected each other via a switch, which in supply mode is on ON position, linking together all negative independent terminals to the negative terminal of the main negative battery terminal. Therefore, with switches on ON position, all the independent modules act exactly in the same way as in the original design in the supply mode, giving to the EV electric engine the same characteristics of the electric energy. During the recharge mode, these switches are turned OFF by a command switch mounted on the EV inlet, which is activated by the charger outlet when it engages into the EV inlet, separating all the independent modules each other. In this way, each independent module, which is a fraction of the entire battery, is connected independently to a power supply unit and all the independent modules are recharged simultaneously in a fraction of the original recharge time. For the modules connected in series in the supply mode, the positive terminal of the first independent module has to be connected to the positive terminal of the main battery terminal. Its negative terminal has to be connected to the positive terminal of the next independent battery module, using a changeover switch, which has to be in "b" position, linking the two terminals in series, and so on and so on. The negative terminal of the last but one module of the series has to be connected to the positive terminal of the last independent module of the series via a changeover switch, which is in the "b" position, linking the two last two independent modules in series. The negative terminal of the last module of the series has to be connected to the negative terminal of the main battery terminal. In the recharge mode, when the charger outlet is engaged into the EV inlet, it activates a command button switch, which activates all the changeover switches, changing the contacts from "b" position to "a" position, which disconnect the independent modules each other and in this way each independent module will be connected to a power supply unit via the EV inlet contact and the charger outlet contact, all independent modules being recharged into a fracture of the original recharge time of the entire battery. For the same EV battery, the bigger the number of independent modules, the smaller each one will be and the shorter the recharge time becomes. We defined as "reduction factor" the number showing how many times the recharge time decreases, which is equal with the number of independent modules. All these aspects are subject of the U.S. Pat. No. 11,772,504, "Fast rechargeable battery assembly and recharging equipment, issued on Oct. 3, 2023, inventor Ioan Sasu. The challenges of the practical solution, which are objects of this invention, are related to:

- complexity of the EV battery comprising a plurality of independent modules, each one having their own independent terminal;
- a plurality of switches and changeover switches disconnecting the independent modules each other and to connect each independent module to a power supply unit (in recharge mode) and to connect all independent modules together to the battery main terminal (in supply mode);
- complexity of the EV inlet and charger outlet;
- the right solution for EV inlet and charger outlet contacts, in order to ensure good contacts;
- the weight of the charger connectors;
- the manoeuvrability of the charger.

2. Practical Solutions on Increasing the EV Autonomy

One of the most important aspects related to the electric vehicles is the autonomy. For an EV user-friendly solution, the battery recharge time and the autonomy of the EV has to be similar with the tank refilling time and the autonomy of the internal combustion vehicles (IC), for which the average is 3-5 minutes for 450 Km autonomy. The autonomy is function of the battery capacity, the battery performances, the weather (temperature), performances of the EV inverter and engine, the driving style, the auxiliary consumers, etc. In this invention will be addressed the battery performances and the auxiliary consumers influence, see (2.1).

$$\text{Autonomy} = f(\text{battery performances, auxiliary consumers}) \quad (2.1)$$

The relationship between autonomy and these two factors is like in (2.2) and 2.3).

$$\text{Autonomy} \uparrow \quad \text{when battery performances} \uparrow \quad (2.2)$$

$$\text{Autonomy} \uparrow \quad \text{when the consume of the auxiliary consumers} \downarrow \quad (2.3)$$

The autonomy increases when the battery performances increase and the consume of the auxiliary consumers decrease. Therefore, to have a good autonomy is necessary to keep the battery performances the highest possible. The battery performances are influenced by weather conditions, especially by temperature. The battery best performances are when it operates at 20° C.+/−5° C. Out of this range, the battery performances are affected. Bigger the difference to this range, bigger the battery performance attenuation. So, this invention proposes practical solutions to keep the battery temperature in the optimum range.

To have a good autonomy the energy stoked into the main EV battery must be used to move the vehicle, not for auxiliary consumers like cabin heating and AC system. This invention proposes practical solutions for other energy sources for auxiliary consumers.

3. Practical Solutions on Modernisation of the EV Recharge Stations

The actual EV battery recharge stations are not adequate for the moment when the majority or all vehicles will be electric. There are EV battery chargers installed on different locations, not dedicated to this kind of activity (parking lots, streets, etc.), which will be not adequate in the future. In the future there is need for adequate, modern, effective and safe EV battery recharge stations. This invention proposes practical solutions for this kind of EV battery recharge stations.

Figure 2:
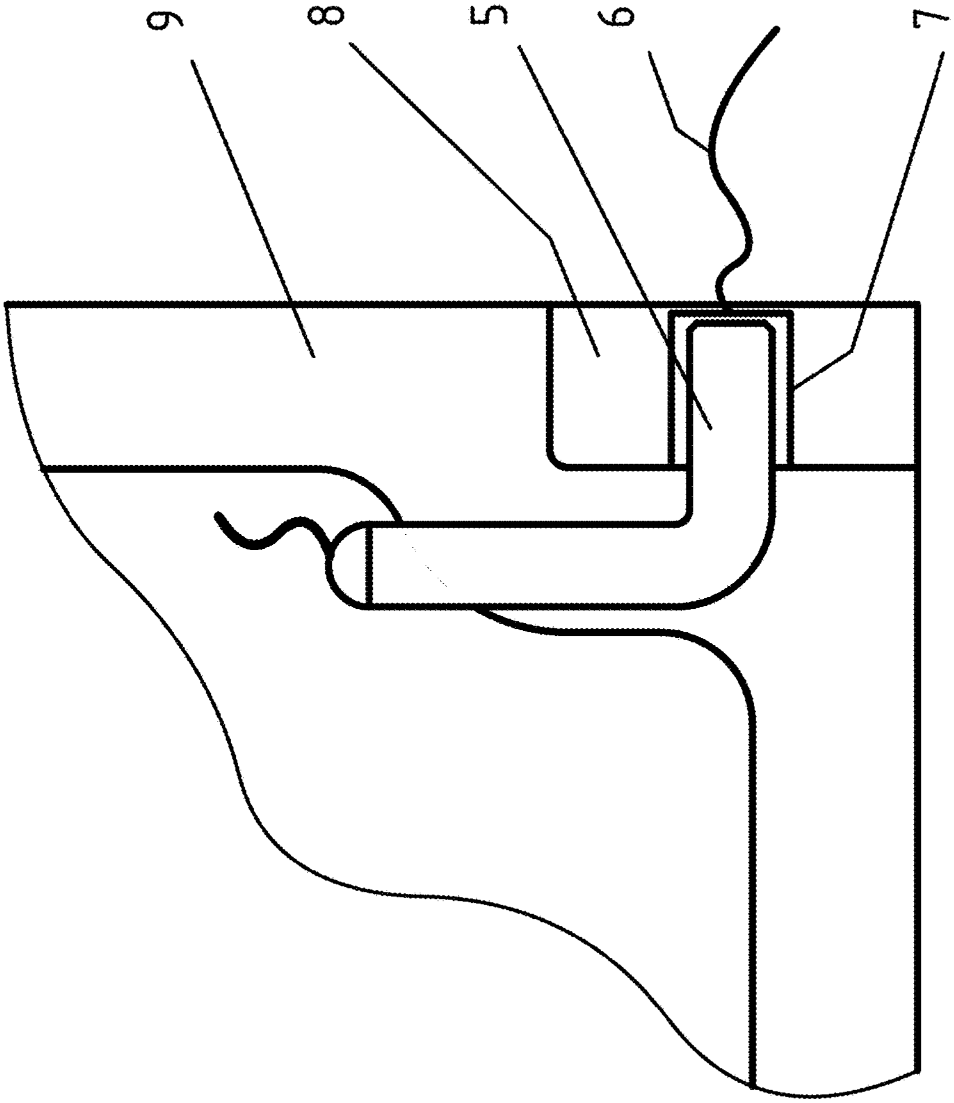
FIG. 2 is the Section A-A of FIG. 1, showing the configuration of a module independent terminal.
Figure 3:
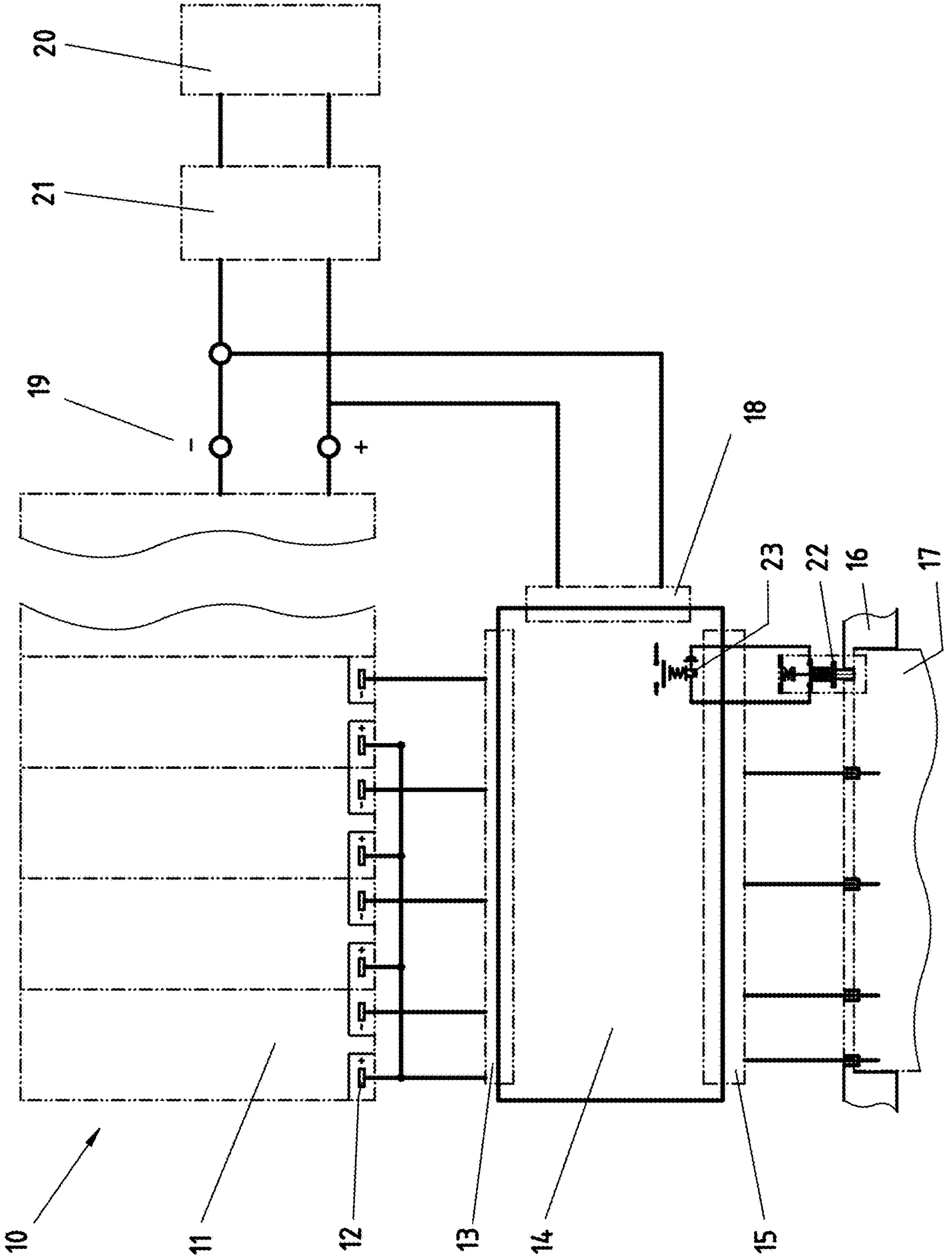
FIG. 3 is a wiring diagram showing the switches and changeover switches box connected to the EV battery independent modules terminals by "modules port", connected to EV inlet by "charge port" and to the battery main terminal by the "supply port"
Figure 4:
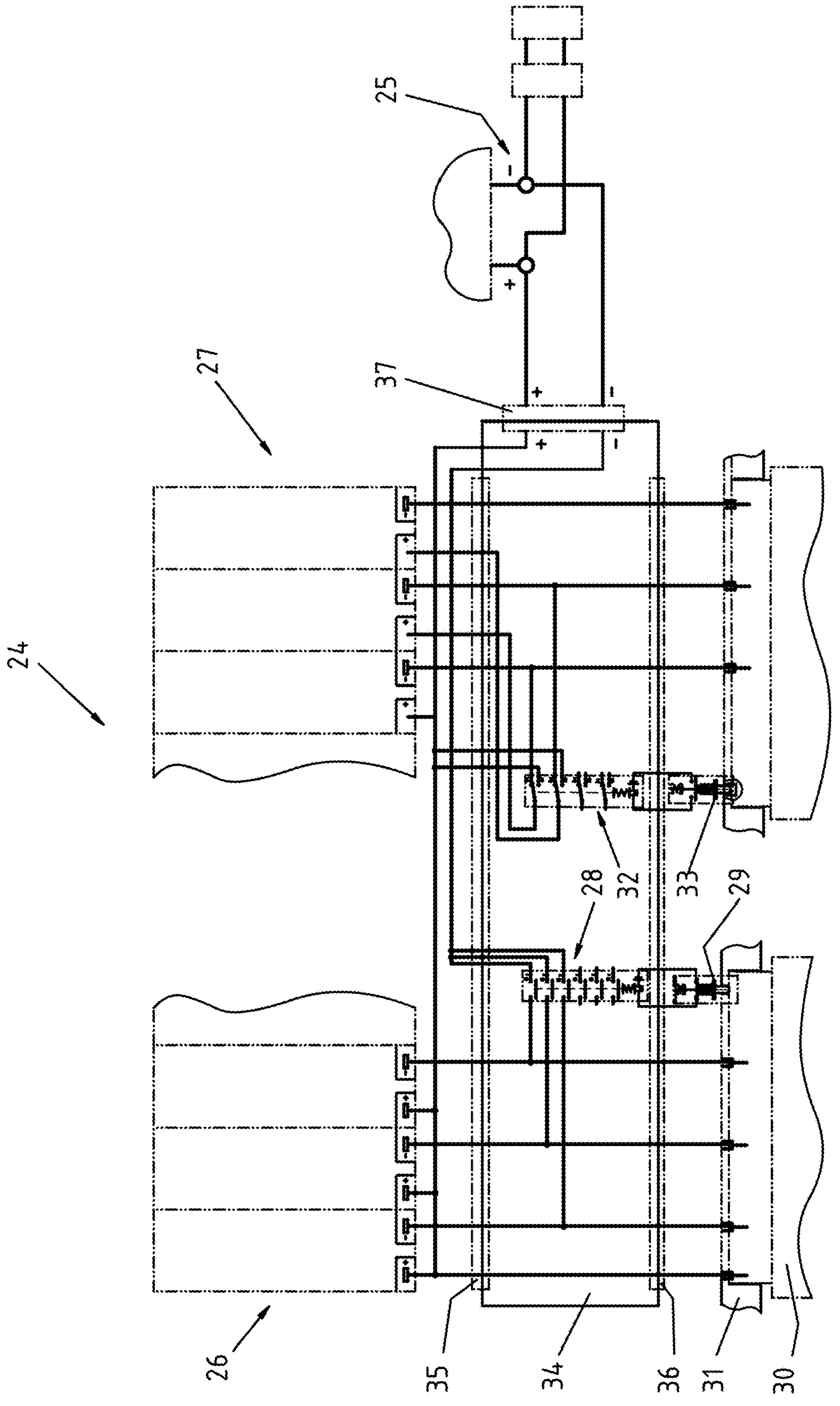
FIG. 4 shows more in detail the switches and changeover switches box and its connections.

This invention addresses the challenges related to these requirements and presents the following practical solutions:

1. Embodiments of practical solutions on reducing the electric vehicles (EV) battery recharge time The battery having a plurality of independent modules is shown in FIG. 1, where the battery 1 is split in a plurality of independent modules 2, each independent module contains an independent positive and negative terminal 3 and respective 4. These independent terminals-see the Section A-A in FIG. 2—are designed as male connectors 5, being connected to a cable 6, via a female connector 7. To protect these module terminals 5, they are located into a niche 8 made on the battery module box 9. FIG. 3 represents the battery 10 with its independent modules 11 having their independent terminals 12 connected to the "modules port" 13 of an external switches and changeover switches box 14, which has a "recharge port" 15 connected to the EV inlet 16, on which is plugged in the charger outlet 17, and a "supply port" 18 connected to the battery main terminal 19, to which is connected the EV engine 20, via the inverter 21. When the charger outlet 17 is plugged into the EV inlet 16, the command switch (button switch) 22 mounted on the EV inlet 16 is activated and it activates the electromagnet 23, which turns the module switches OFF, in this way separating all independent modules connected in parallel each other. Similarly, when the charger outlet 17 is plugged into the EV inlet 16, a command switch (button switch) is activated and it activates the electromagnet which changes the module changeover switches from "$b_i$" to "$a_i$" position, in this way separating all independent modules connected in series each other. More explicitly, in FIG. 4 is shown the battery 24, with its main terminal 25, having a group of independent modules 26 connected in parallel and a group of independent modules 27 connected in series. The group of independent modules connected in parallel 26 is connected to a plurality of switches 28 activated by the command switch (button switch) 29 (mounted on the EV inlet 31) when the charger outlet 30 is plugged into the EV inlet 31. The group of independent modules connected in series 27 is connected to a plurality of changeover switches 32 activated by the command switch (button switch) 33 (mounted on the EV inlet 31) when the charger outlet 30 is plugged into the EV inlet 31. To simplify the connections, the switches and the changeover switches box 34 has three ports: to be connected to the modules—"modules port" 35, to be connected to the charger via EV inlet—"charge port" 36 and to be connected to the battery main terminal 25 in supply mode—"supply port" 37. Inside the switches and changeover switches box 34, modules port 35, the charge port 36 and the supply port 37 are connected each other to switches (for parallel) and to changeover switches (for series) like is shown in FIG. 4.

Figure 5:
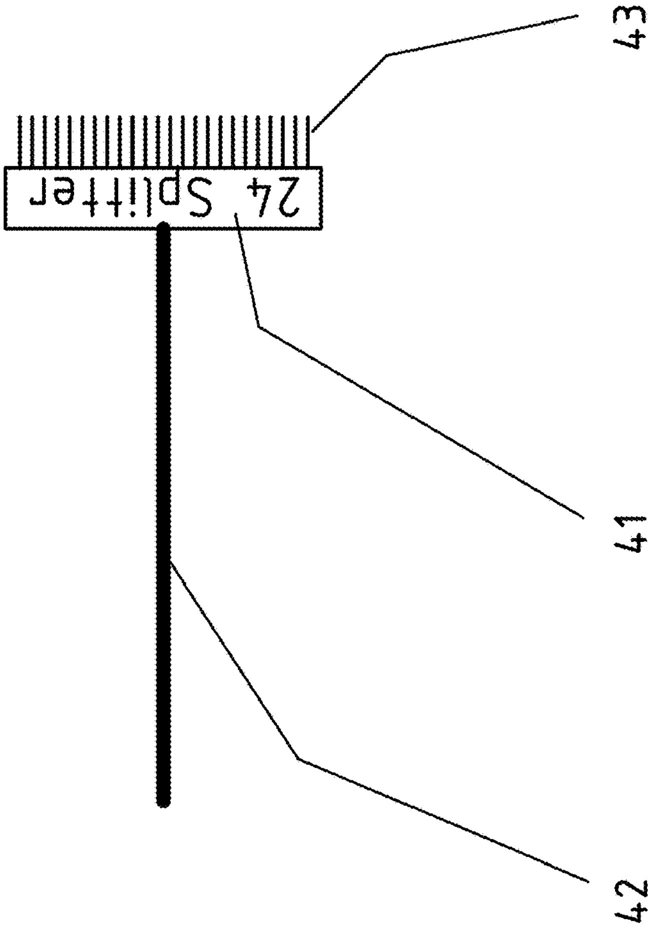
FIG. 5 is a sketch of a splitter.
Figure 6:
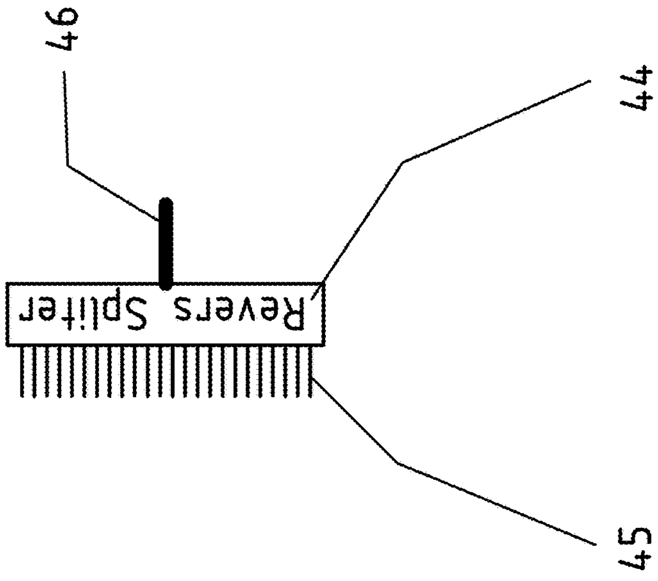
FIG. 6 is a sketch of a revers splitter.
Figure 7:
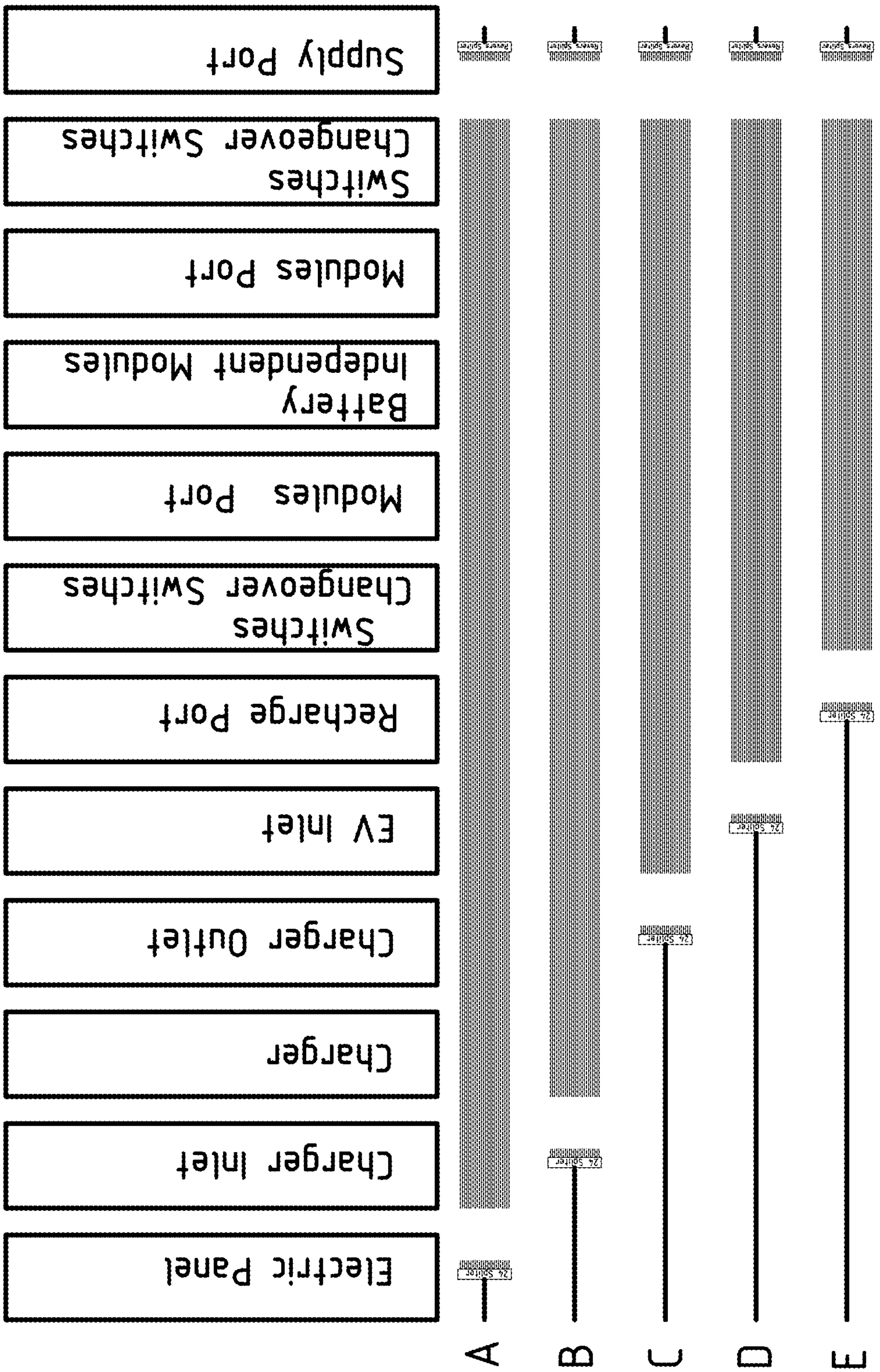
FIG. 7 is a diagram of a splitter location.

Everyone of the independent modules has to be connected to a source of electric energy having a reasonable power. This reasonable power per independent module is a fraction of the power of the city grid. Considering a three-phase electric network, having per each phase 600V and 600 A, therefore 360 Kw, to provide 15 Kw per independent module, a phase has to be split in 24, so on one phase (600V and 600 A) can be connected 24 independent modules, which means that each cable of each phase connected to the city grid has to be split into 24 cables connected to each independent module using a kind of splitters. In FIG. 5 is shown a 24 splitter 41 with one inlet cable 42 and with 24 outlet cables 43. In the supply port of the switches and changeover switches box, a revers splitter 44 is required, FIG. 6, to collect the electric energy of 24 independent modules coming by 24 cables 45 into its inlet, and merge them in one single output by a cable 46 of its outlet. Without using complex substations, the three-phase current is passing by a rectifier, to transform the AC on DC before the charger. From the charger inlet to the independent modules terminal the mentioned splitters may be installed in different locations as shown in FIG. 7. For version A, the splitter is installed on the electric panel and from there to the independent modules for one phase there are 24 cables going by the charger, EV inlet, switches and changeover switches box. For version B the splitter is installed on the charger inlet and from there, there are the 24 cables involved. For version C the splitter is installed on the charger outlet and the 24 cables start from there. For version D the splitter is installed on the EV inlet, and for version E the splitter is installed on the recharge port of the switches and changeover switches box. Depending on the splitter location there are two versions of the charger outlet and EV inlet:

- Multi-contact charger outlet and multi-contact EV inlet, when the splitter is installed before the EV inlet, including version A, B and C (see FIG. 7);
- Phase-contact charger outlet and phase-contact EV inlet, when the splitter is installed after EV inlet, including version D and E of FIG. 7. Each one of these versions has advantages and disadvantages presented in Table 1.

TABLE 1

| Version | Advantages | Disadvantages |
|---|---|---|
| Multi-contact | Cable flexibility | Large number of cables<br>Difficult to manage these large number of cables<br>Complicated charger outlet and EV inlet<br>More expansive<br>Only air cooling is allowed |
| Phase-Contact | Reduce number of cables<br>Possibility to use liquid cooling<br>Simplicity of charger outlet and EV inlet<br>Low cost | Cables Rigidity<br>Imperfect contacts due to large surface |

The objective of this invention is to reduce the recharge EV battery time and bring it like the required time to refill an IC gas tank, about 2 to 5 minutes per recharge. To accomplish this objective, and to keep the charger power into a reasonable range, avoiding excessive battery heating and battery degradation, (not super chargers), the reduction factor has to be substantially high, therefore the number of independent modules has to be substantially large as well. Therefore, in any of the two versions multi-contact or phase-contact the charger becomes very rigid and heavy, so very difficult (see impossible) to be manipulated by a human being. This challenge may be overpassed by using a robot, which represents the practical solution, which has to include:

- a robot with a minimum number of members due to the large number of contacts and cables (multi-contact version);
- flat face contacts of the charger outlet and of the EV inlet;
- one of the contacts in contact has to be stationary flat face electric contact and another one has to be a moving flat face electric contact, installed in the charger outlet or in the EV inlet using an elastic element, to compensate the contacts imperfection;
- a plurality of camera to ensure a good relative position between the charger outlet and the EV inlet;
- a plurality of targets for the cameras located on the opposite side of the cameras;
- a plurality of lights for night and fogy conditions;
- a plurality of ultrasonic sensors to control very precisely the relative position of the charger outlet against the EV inlet;
- a defrost and drying contacts system;
- an electromagnetic connection between the EV inlet and the charger outlet to ensure a firm connection, is preferred for certain embodiments;
- a contacts safety device for the charger;
- a sealing cover of the charger outlet and of EV inlet;
- an isolated robot body;
- a safety button switch configured to activate and disactivate a breaker to cut the current in the charger outlet all the time it is not engaged with the EV inlet, Potential embodiments of practical solutions for the charger outlet and for the EV inlet are shown in FIG. 8 to FIG. 30.

Figure 8:
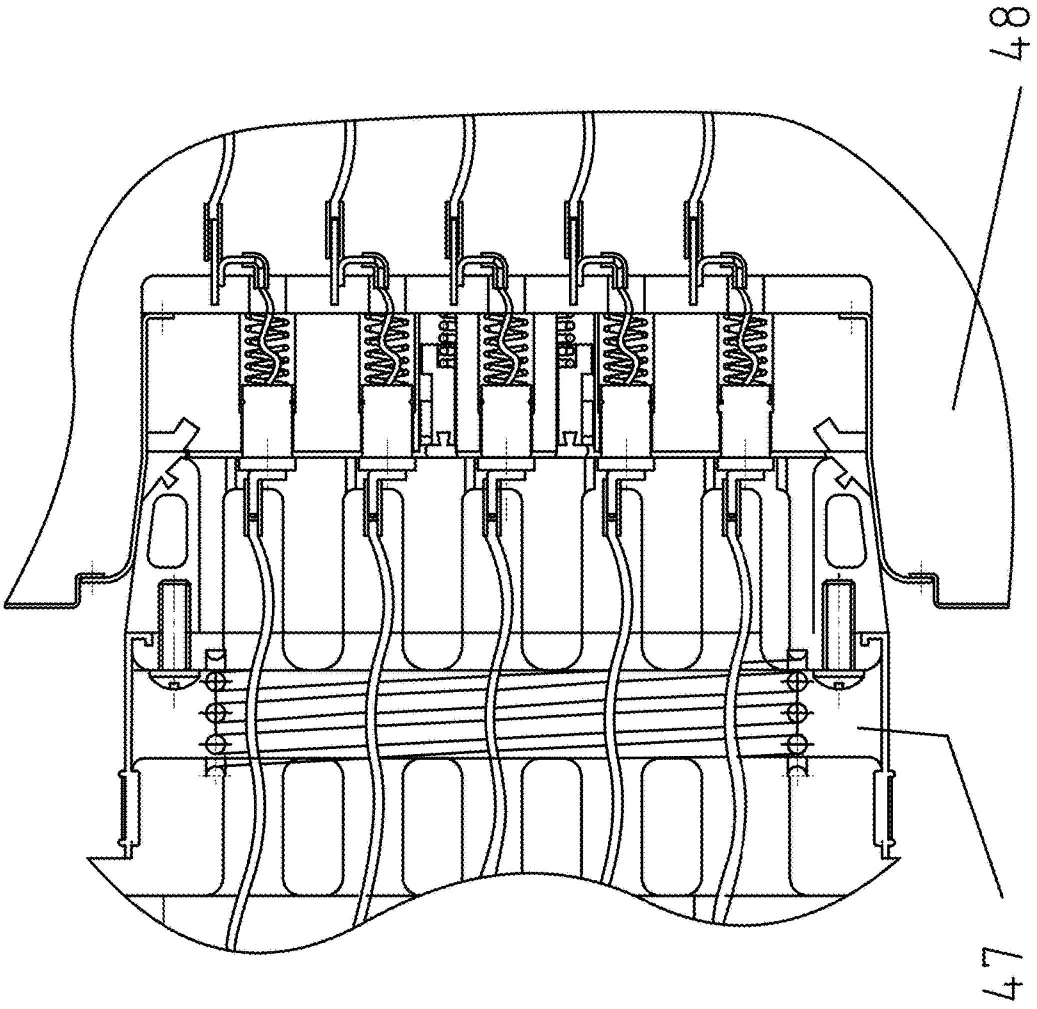
FIG. 8 is an assembly of a multi-contacts charger engaged with a multi-contacts EV inlet.
Figure 9:
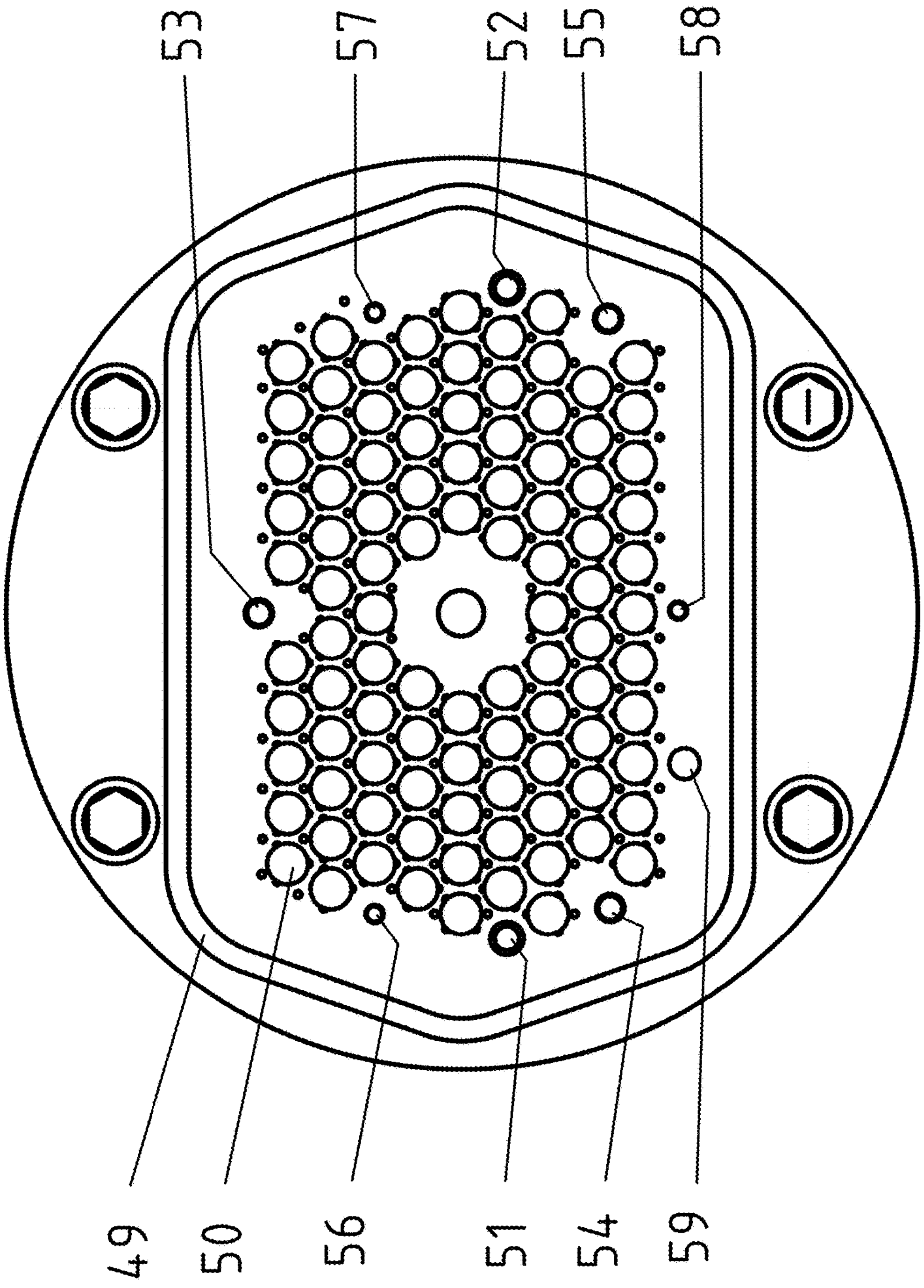
FIG. 9 is a front view of a multi-contacts EV inlet.
Figure 10:
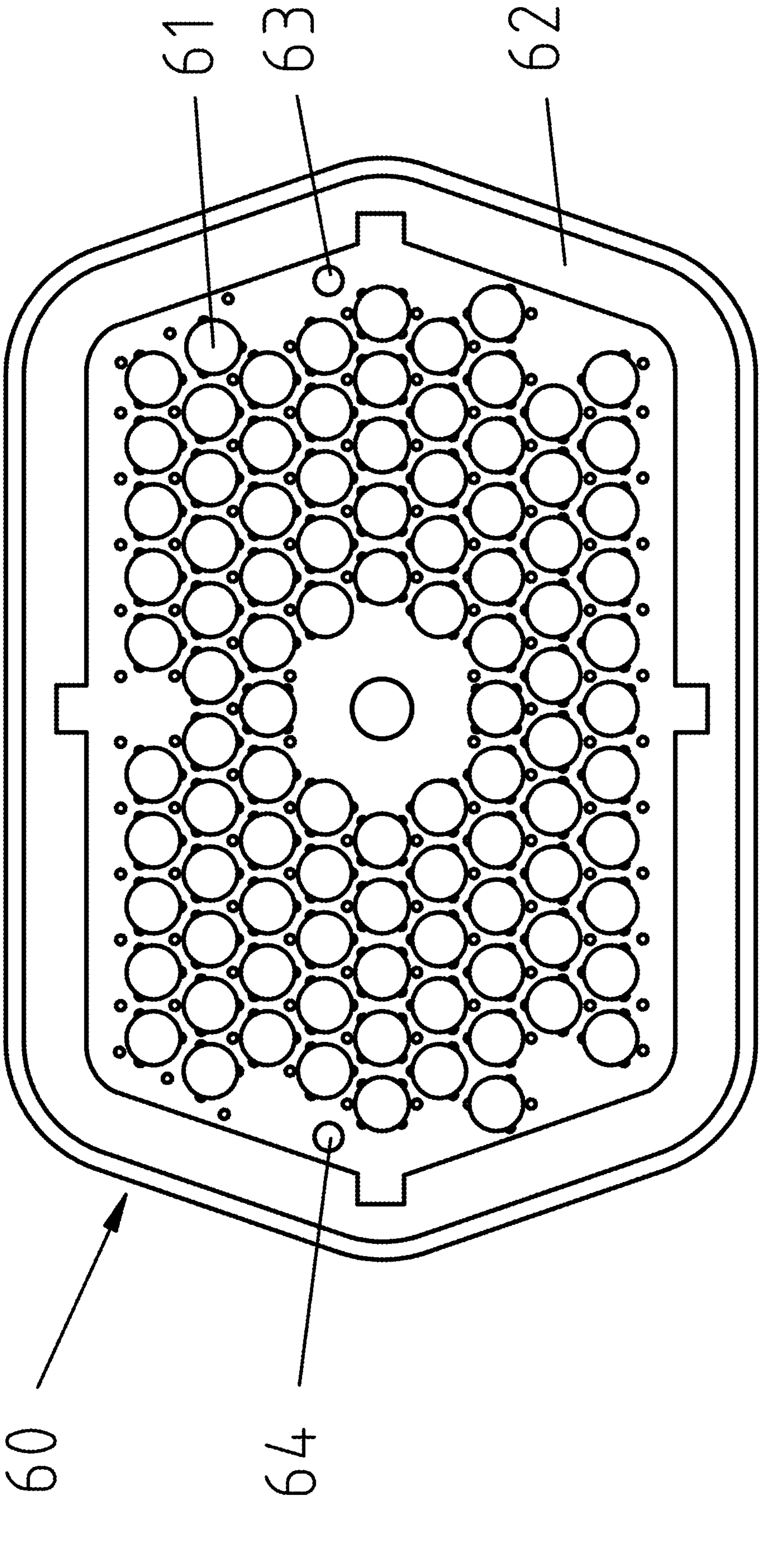
FIG. 10 is a front view of a muti-contacts charger outlet.
Figure 11:
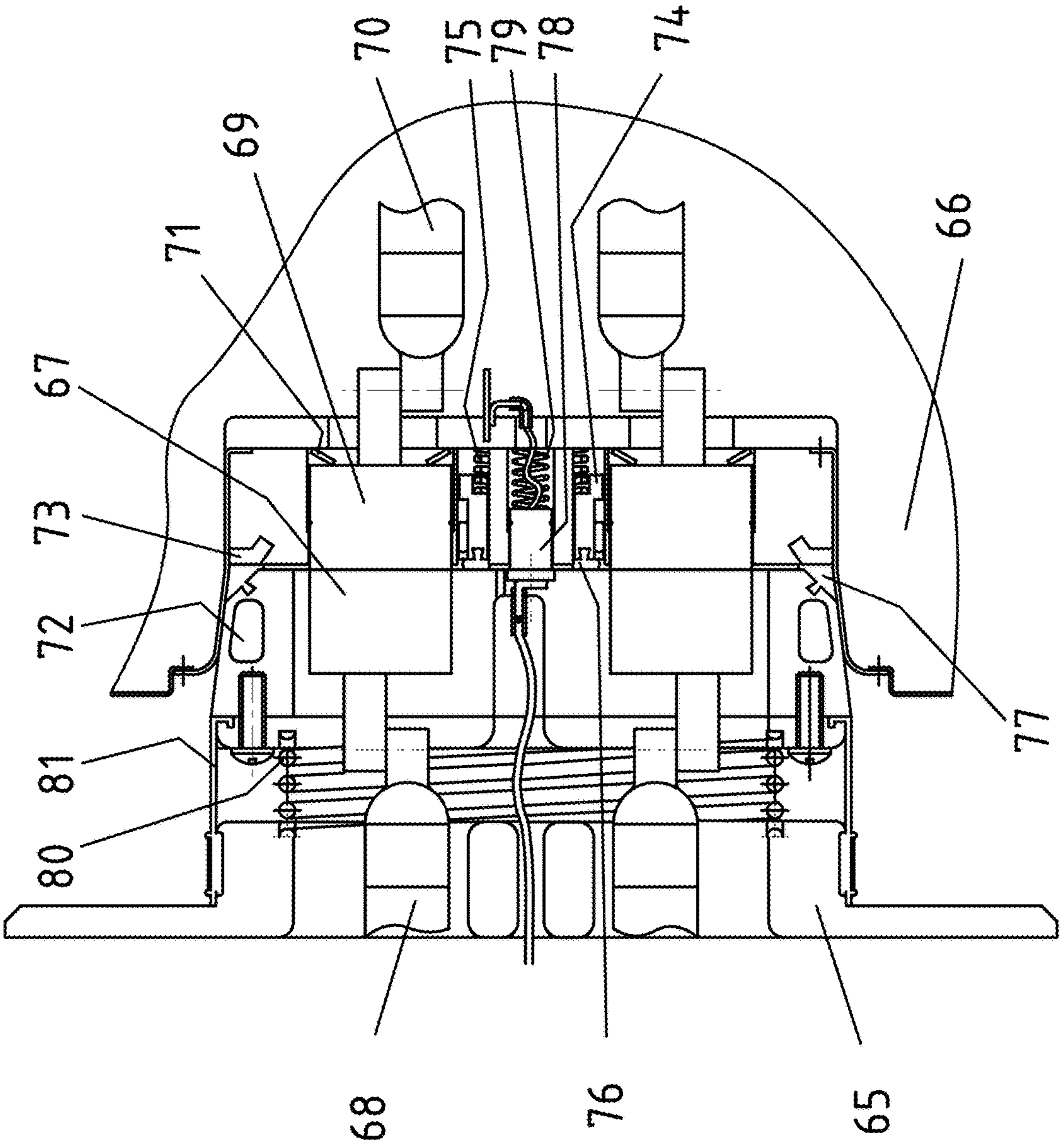
FIG. 11 is an assembly of a phase-contacts charger engaged with a phase-contacts EV inlet.
Figure 12:
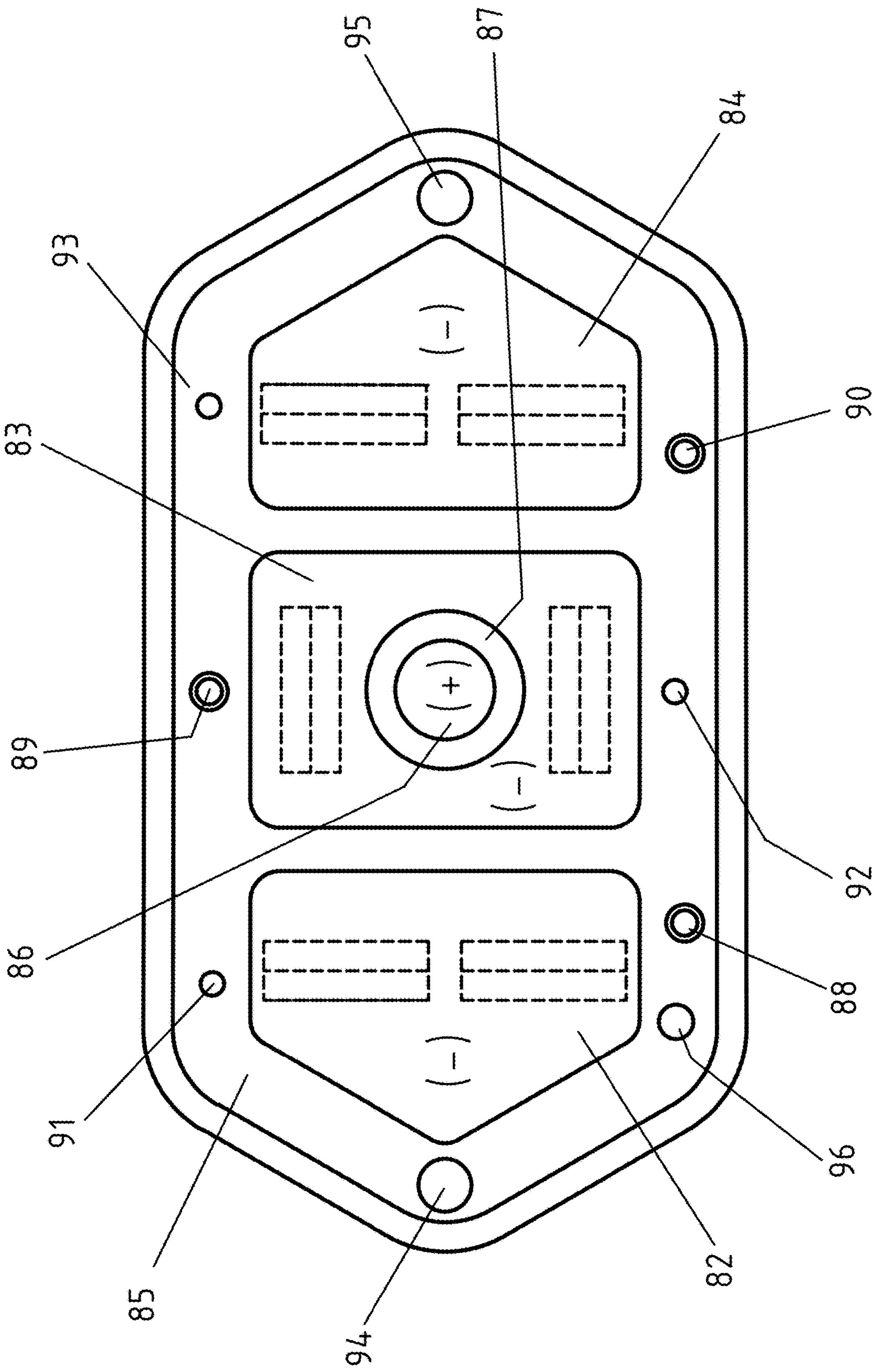
FIG. 12 is a front view of a phase-contacts charger outlet.
Figure 13:
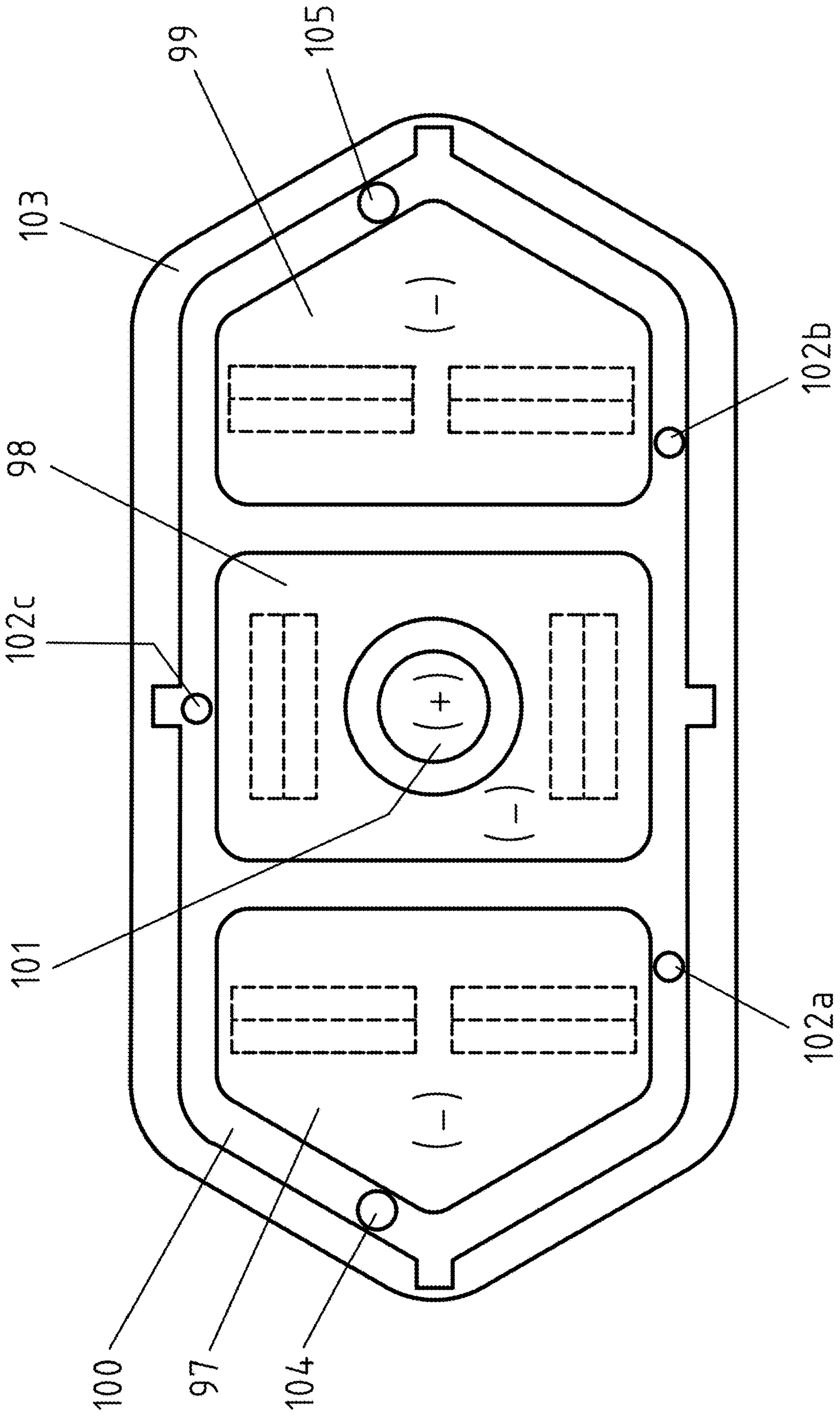
FIG. 13 is a front view of a phase-contacts Ev inlet.
Figure 14:
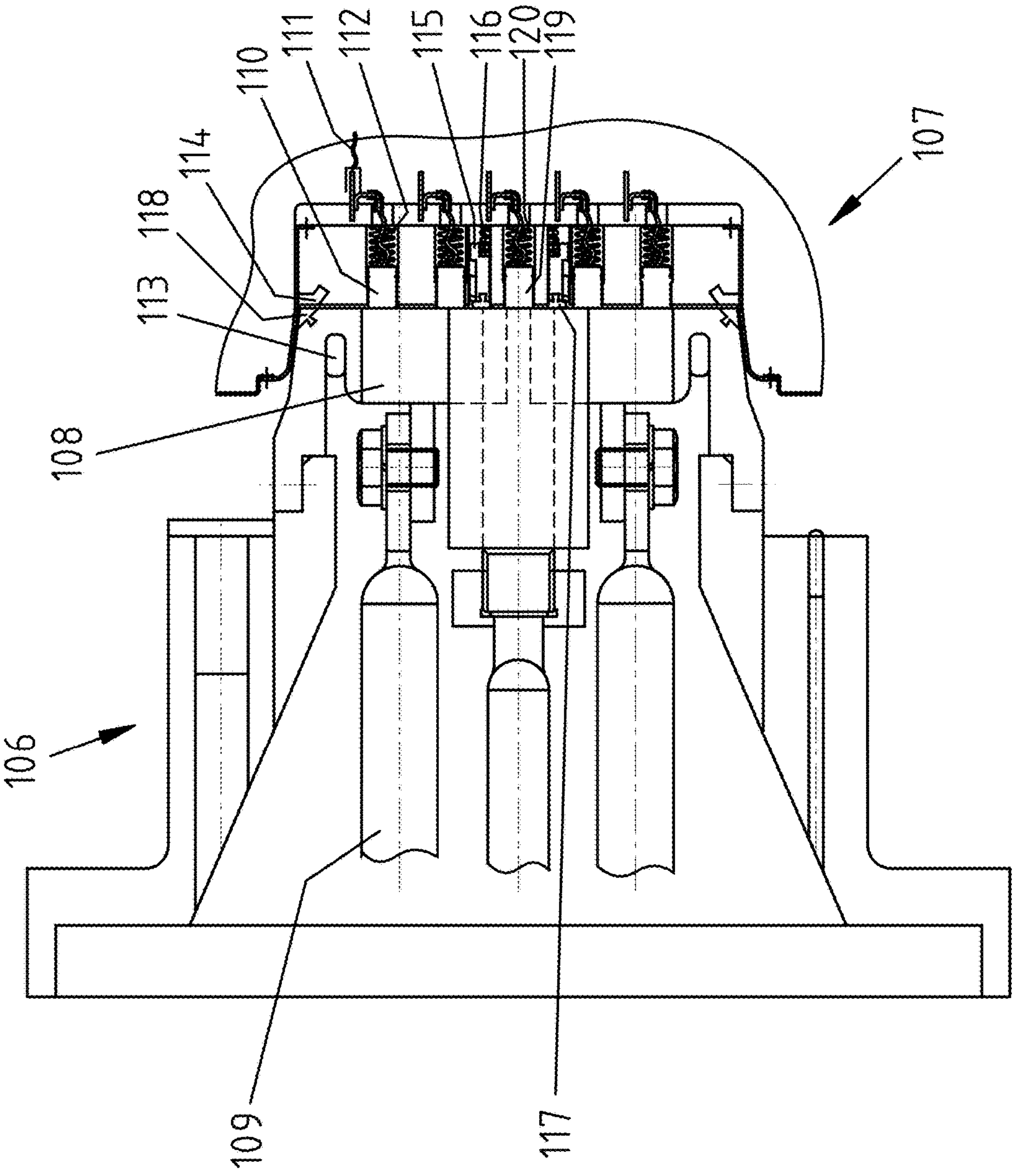
FIG. 14 is an assembly of a phase-contacts charger engaged with a multi-contacts EV inlet.
Figure 15:
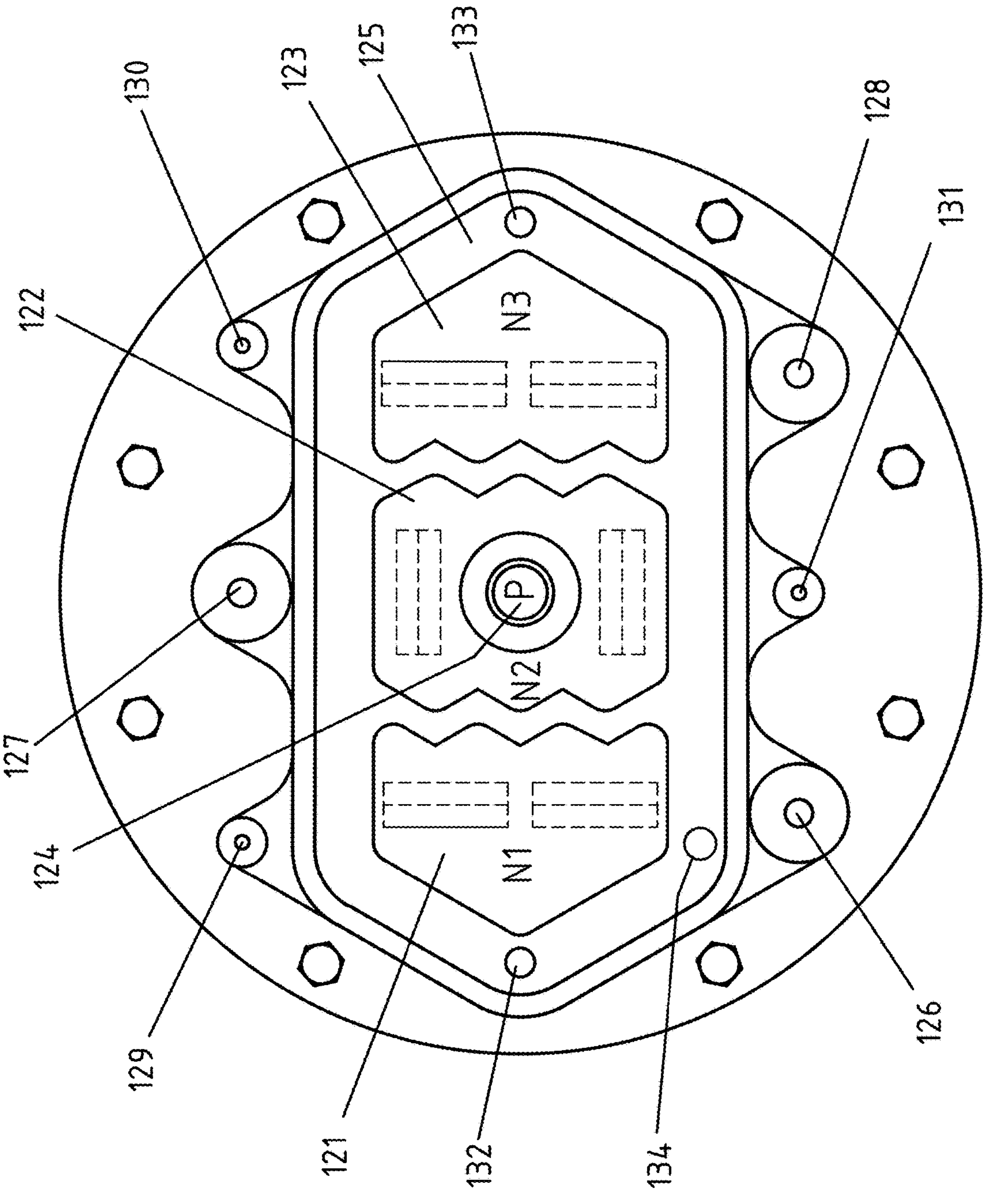
FIG. 15 is a front view of a phase-contacts charger outlet.
Figure 16:
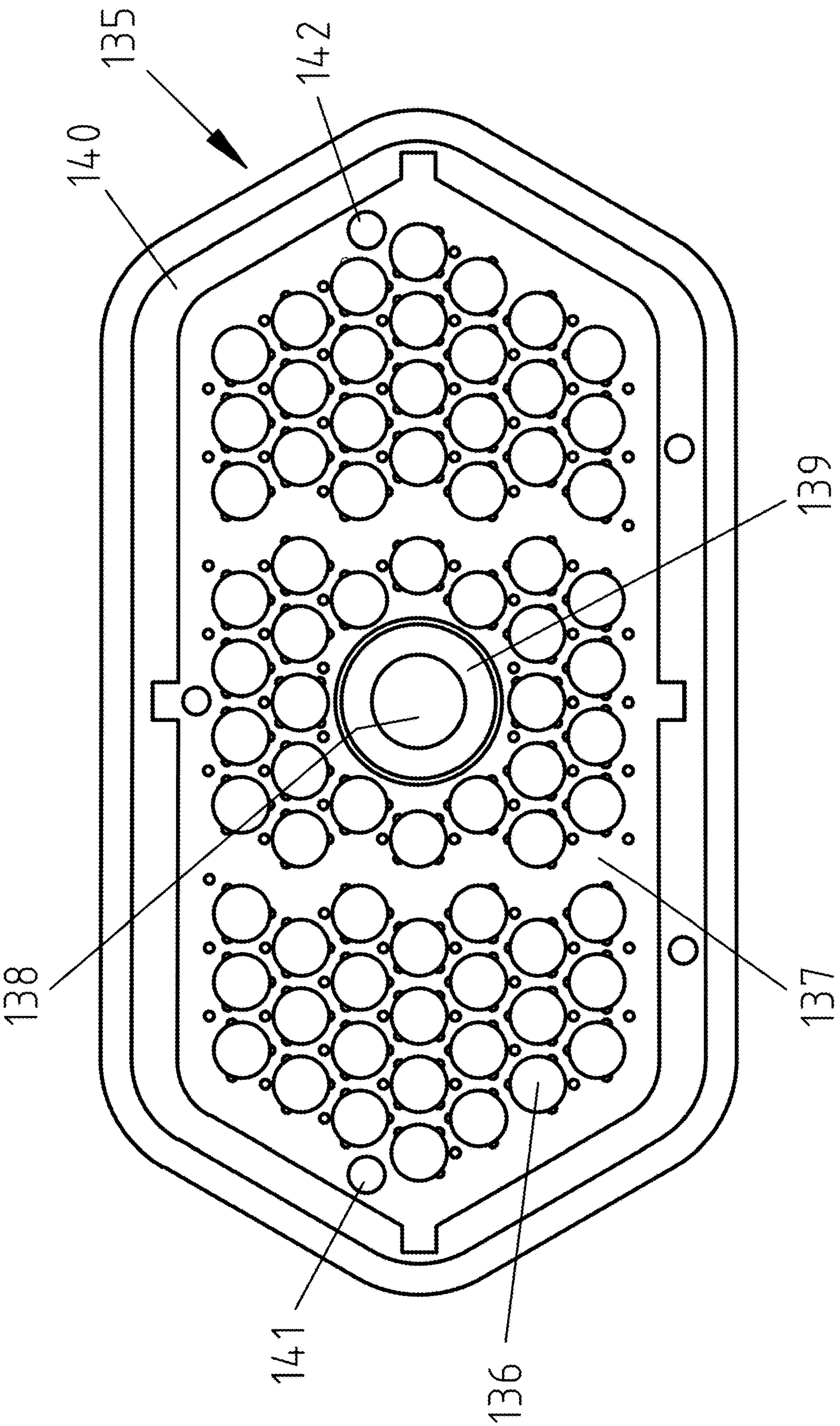
FIG. 16 is a front view of a muti-contacts EV inlet.
Figure 17:
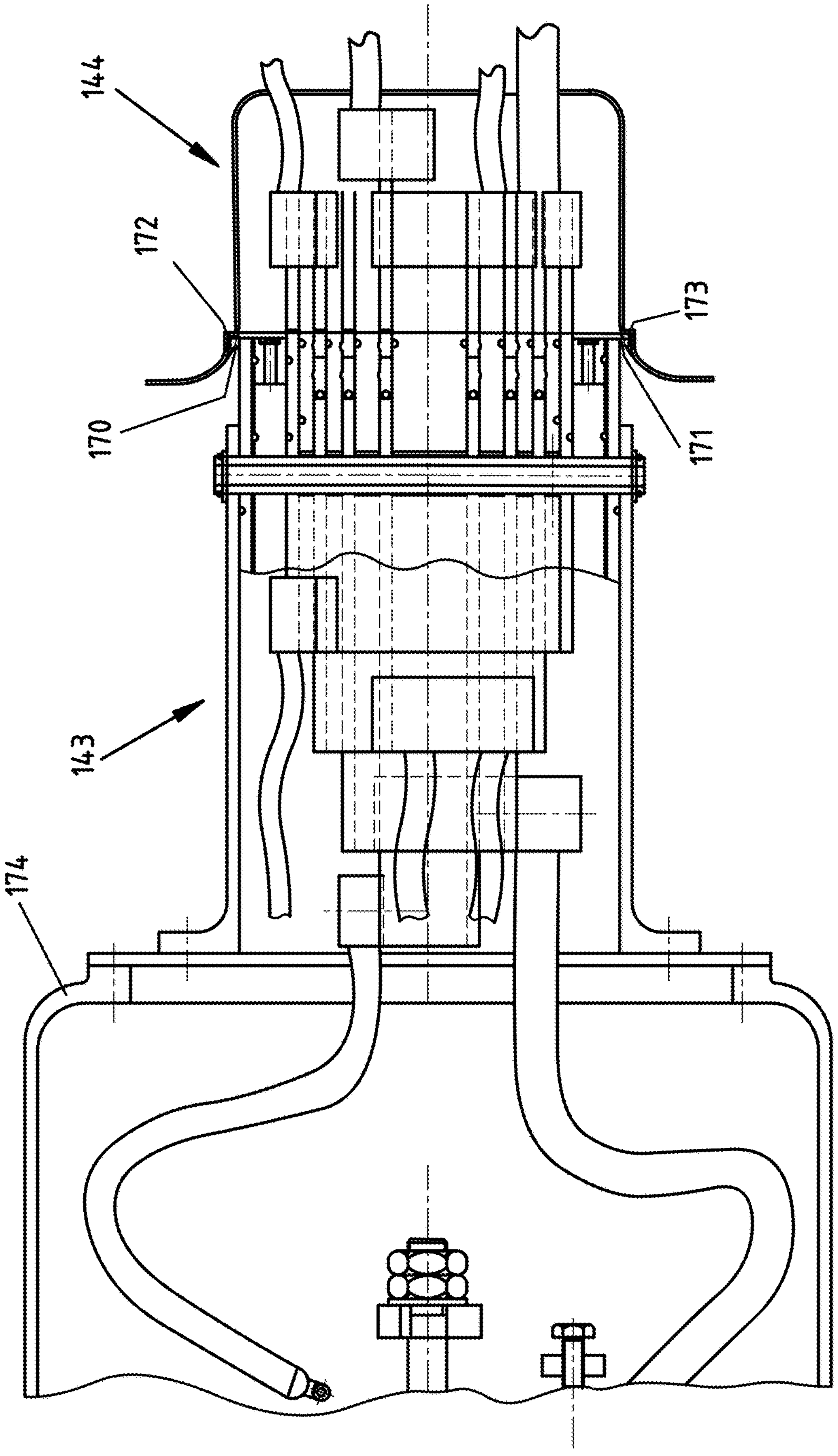
FIG. 17 is an assembly of a tubular phase-contacts charger engaged with a tubular phase-contacts EV inlet.
Figure 18:
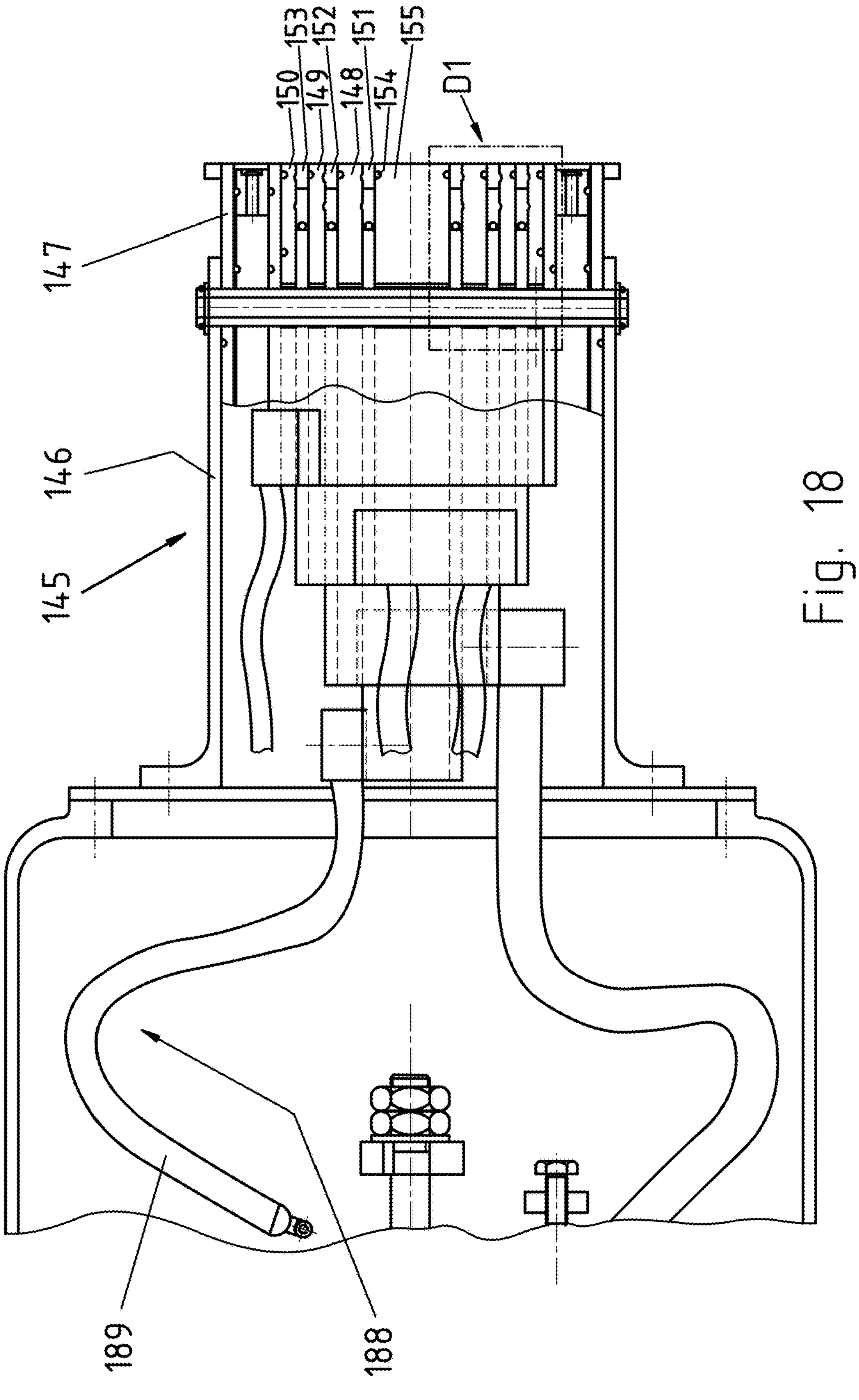
FIG. 18 is a cross section of a tubular phase-contacts charger outlet.
Figure 19:
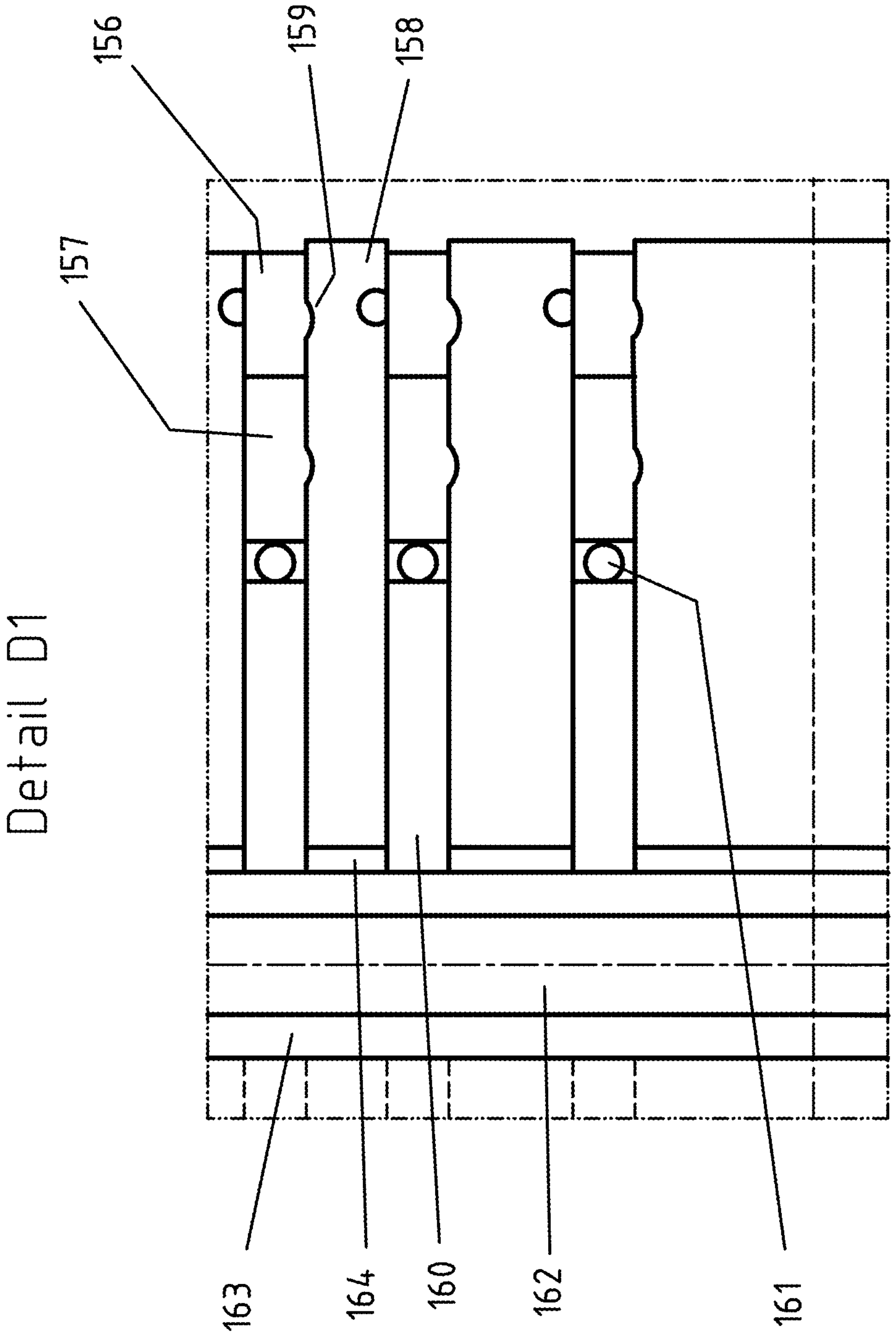
FIG. 19 is the detail D1 of FIG. 18.
Figure 20:
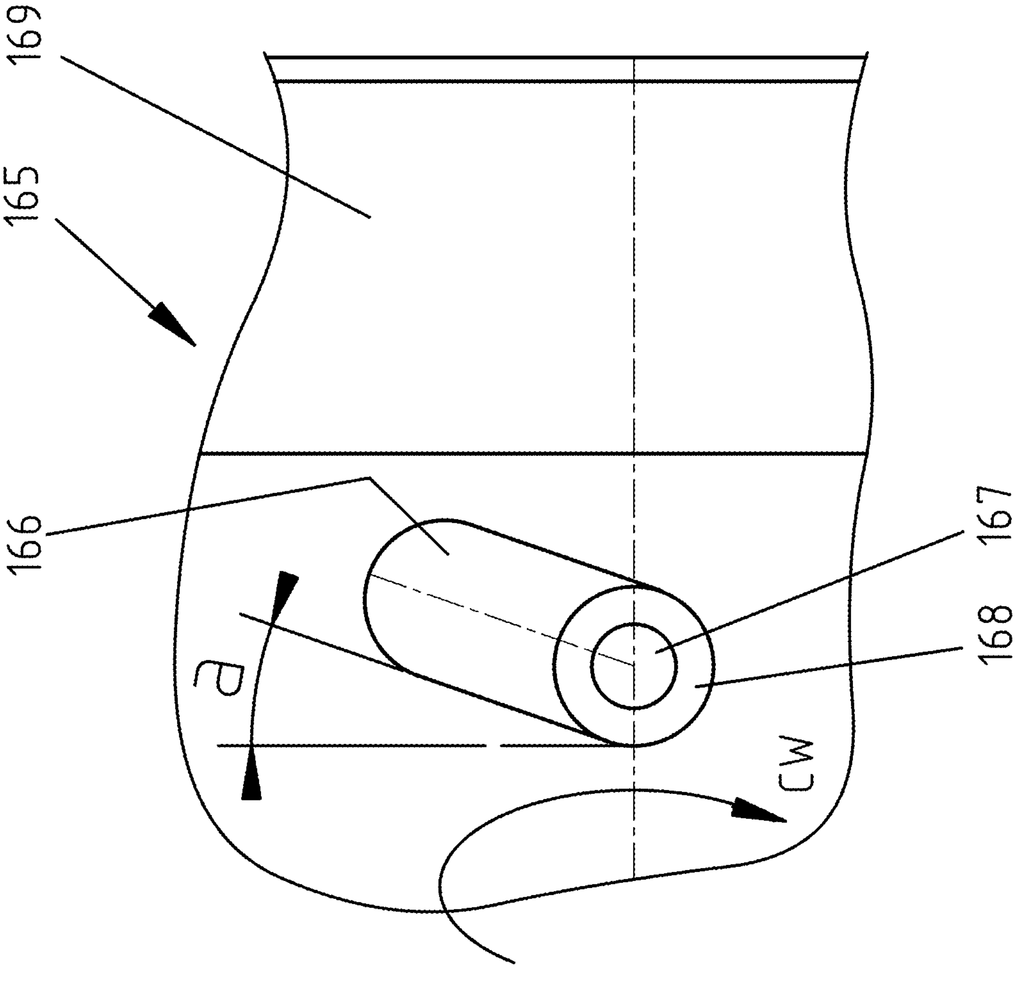
FIG. 20 is a sketch of a came mechanism.
Figure 21:
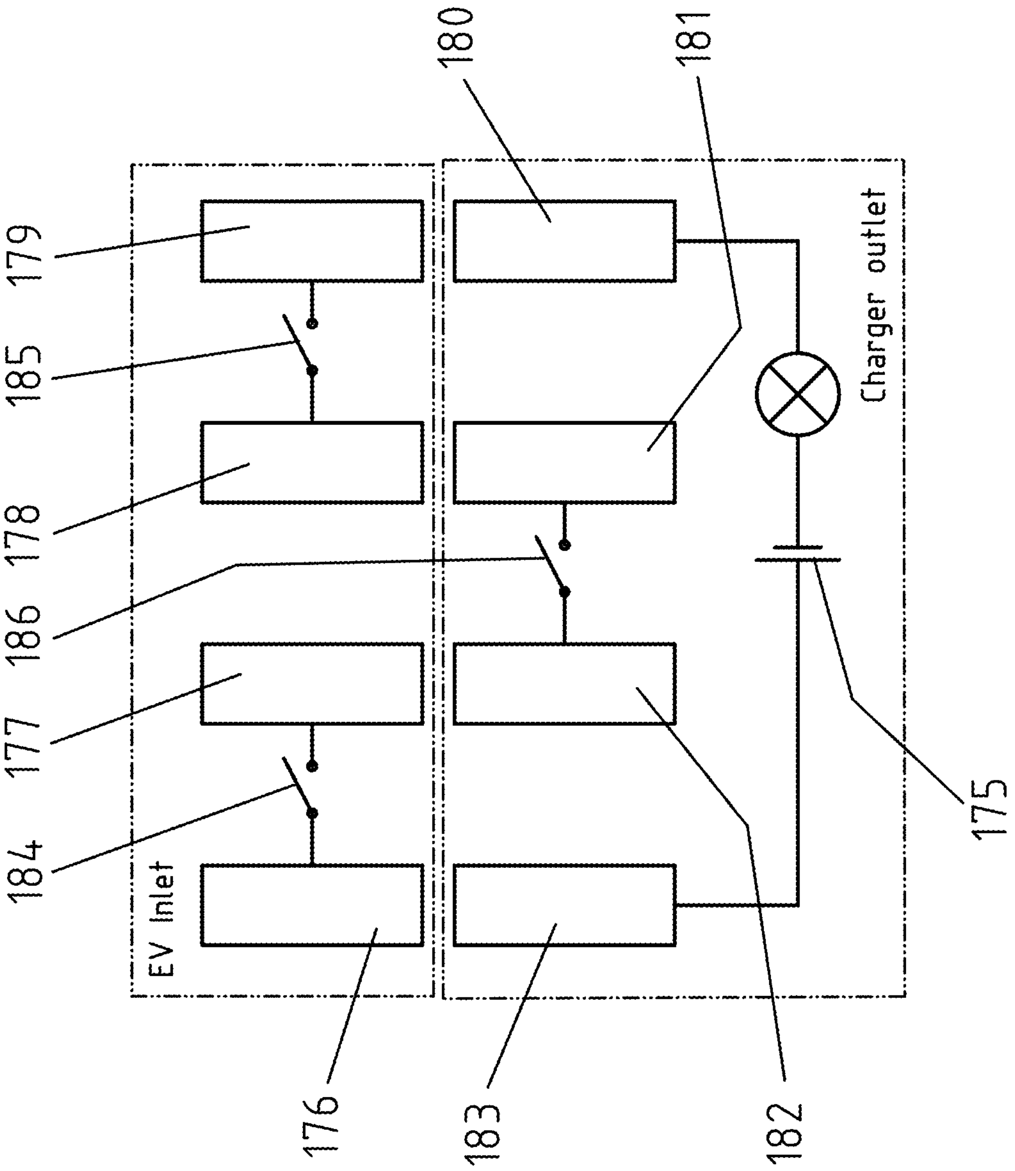
FIG. 21 is a sketch of a contacts safety device.
Figure 22:
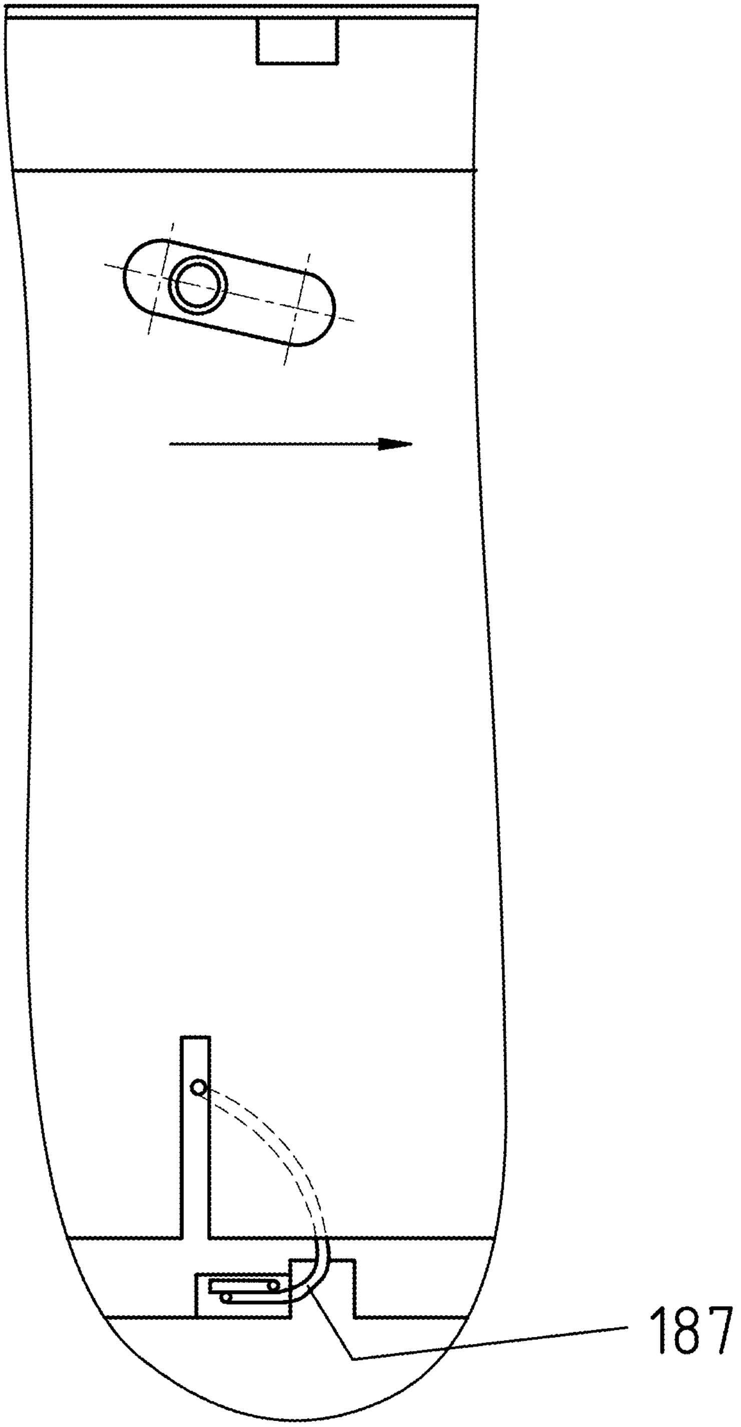
FIG. 22 is a sketch of a wire spring device.
Figure 23:
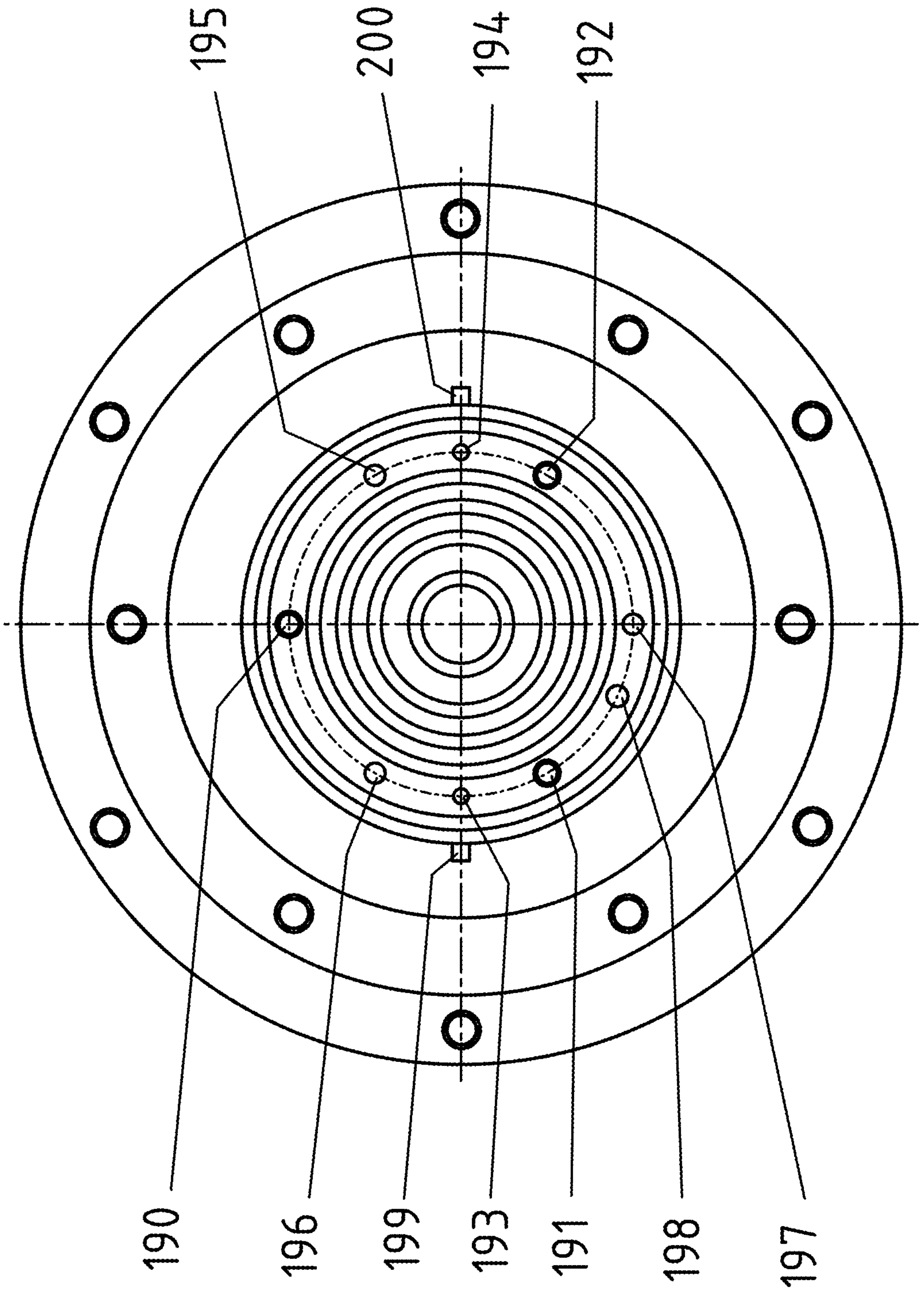
FIG. 23 is a front view of a tubular phase-contacts charger outlet.
Figure 24:
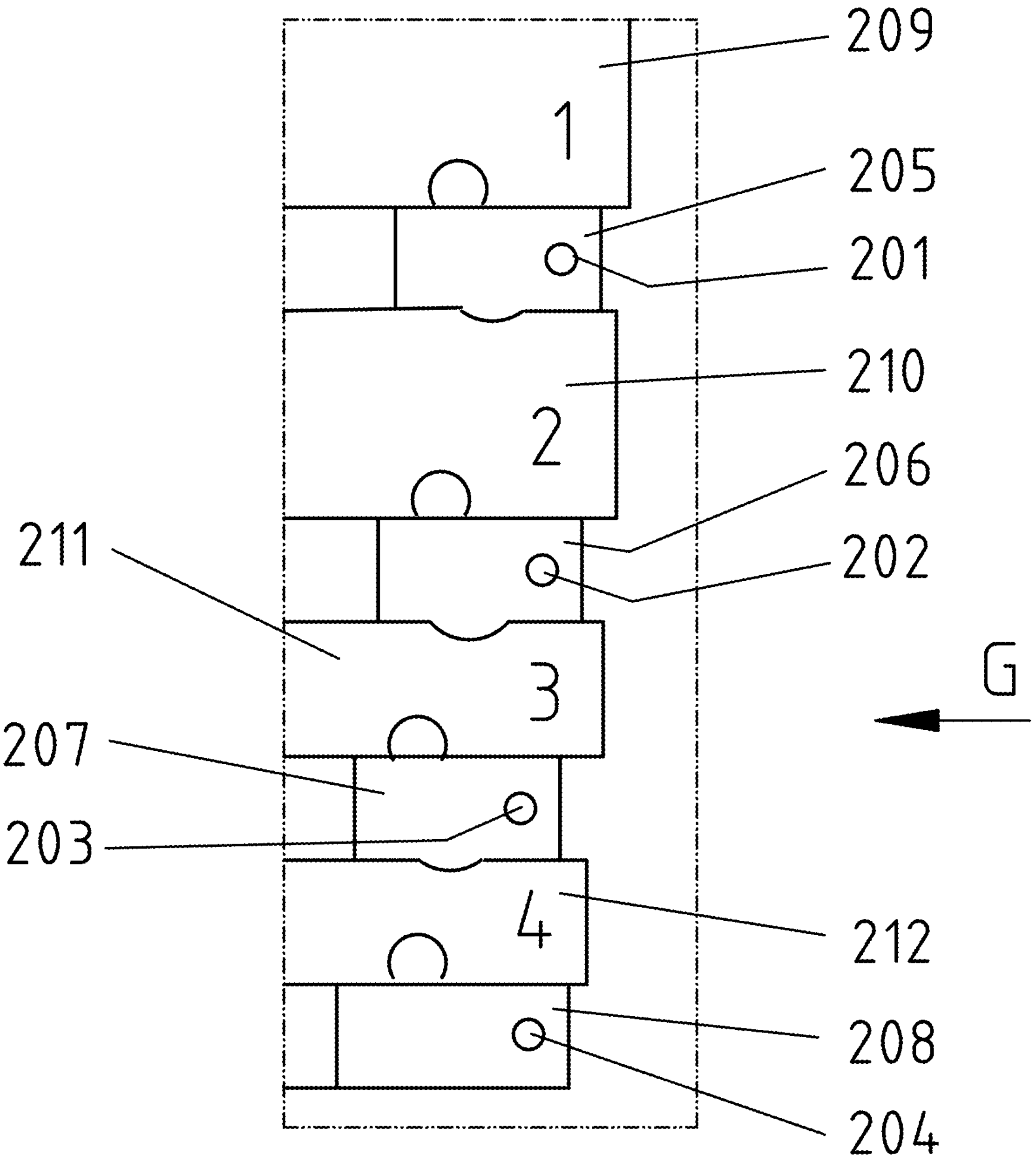
FIG. 24 is a detail of the end of a tubular phase-contacts charger outlet.
Figure 25:
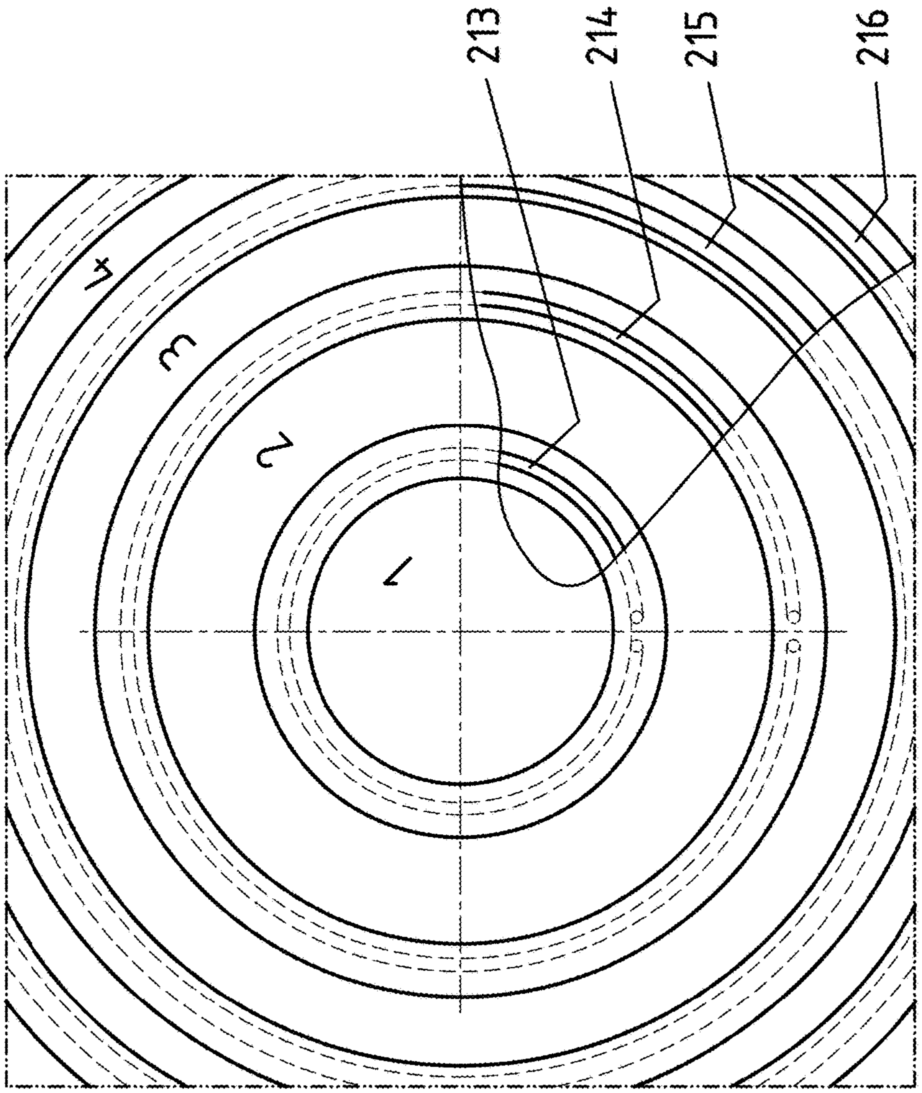
FIG. 25 is view G of the FIG. 24 showing a detail of a tubular phase-contacts defrost system.
Figure 26:
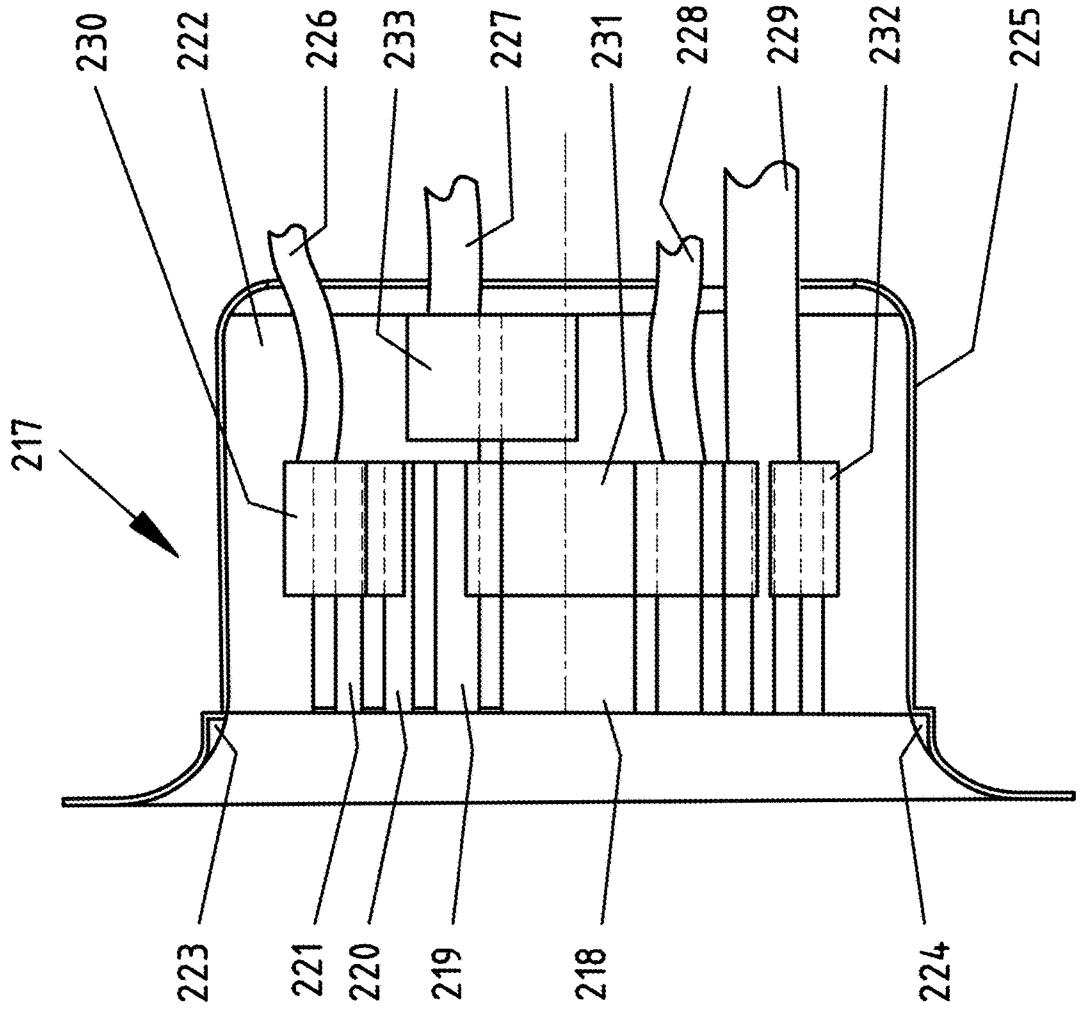
FIG. 26 is a cross section of a tubular phase-contacts EV inlet.
Figure 27:
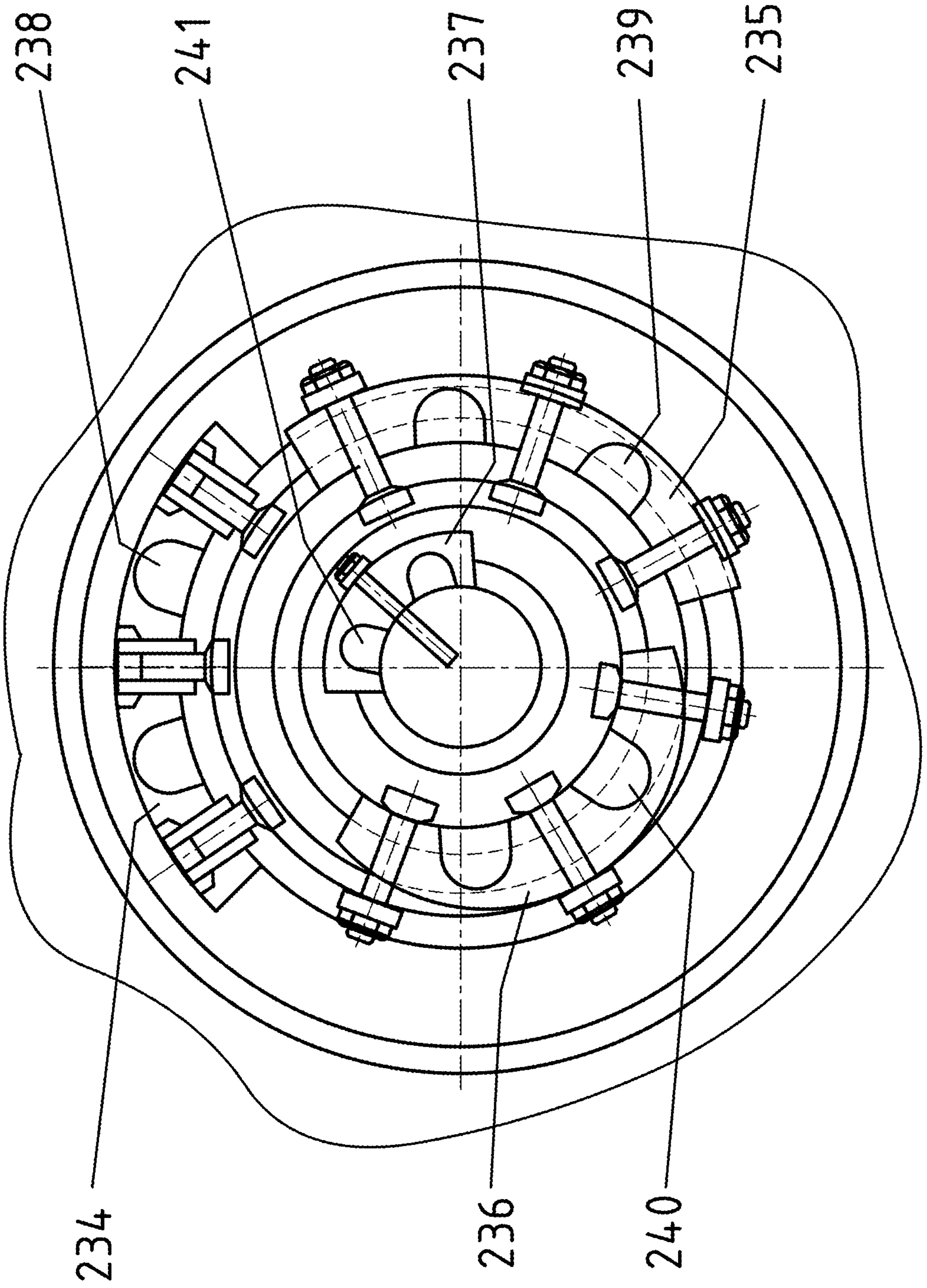
FIG. 27 is an axial view of a plurality of tubular phase-contacts and their phase-cables.
Figure 28:
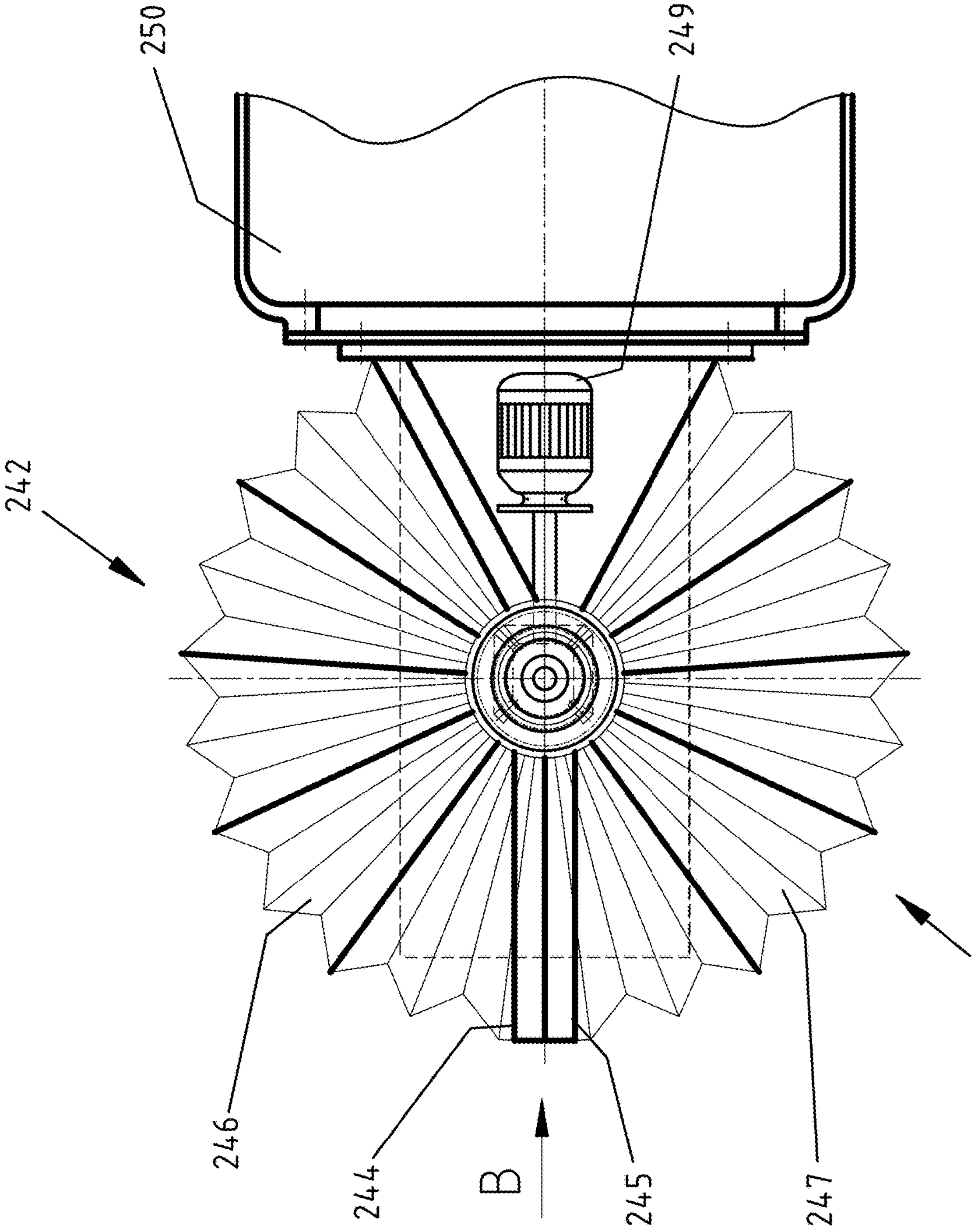
FIG. 28 is a sketch of a cover eyelid stile of a charger outlet in a closed position.
Figure 29:
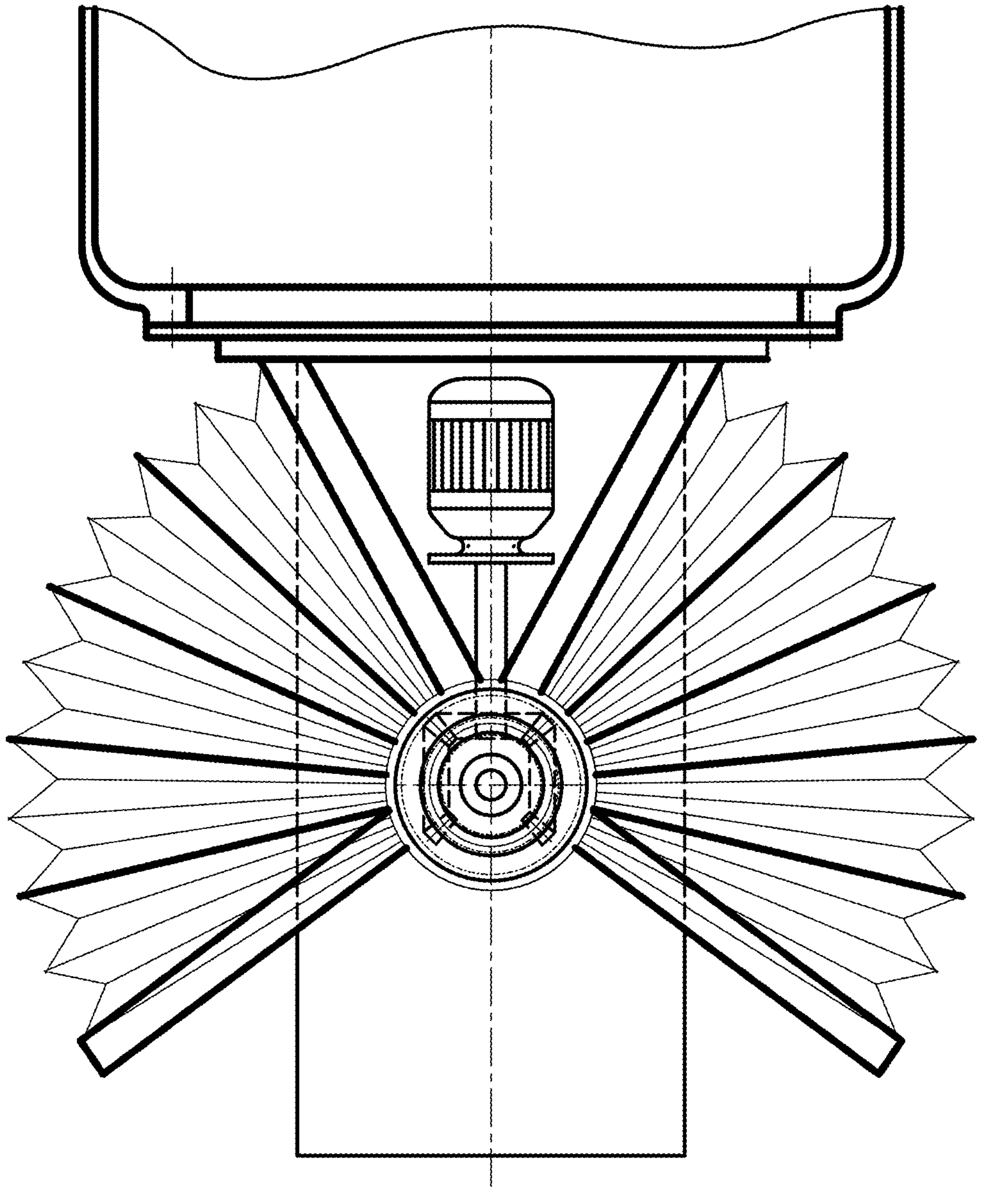
FIG. 29 is a sketch of a cover eyelid stile of a charger outlet in an open position.
Figure 30:
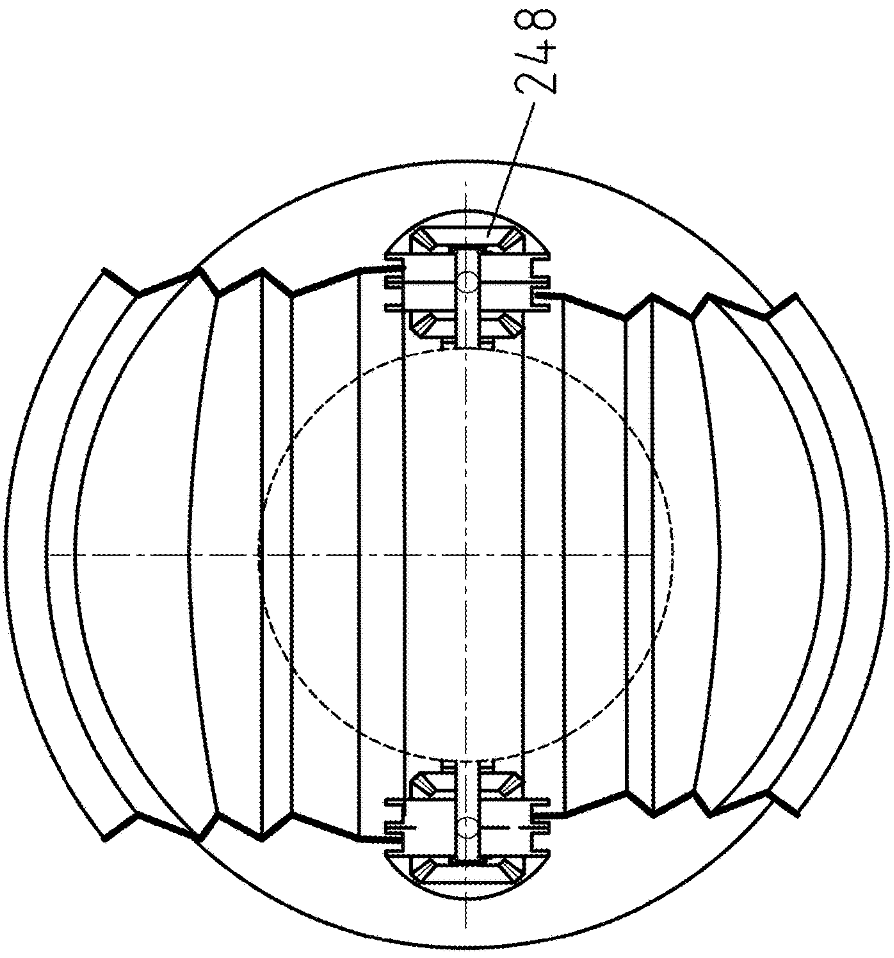
FIG. 30 is the view B of FIG. 28.

In FIG. 8 to FIG. 12 are shown some examples of different possibilities to design the charger outlet and the EV inlet contacts. In FIG. 8 is shown an example of a multi-contact charger outlet 47 engaged into a multi-contact EV inlet 48, for 108 contacts. In FIG. 9, which is a front view of the charger outlet 49, can be seen the plurality of contacts 50, the two lights 51 and 52, the three cameras 53, 54 and 55 and the three ultrasonic sensors 56, 57 and 58. For security purposes on the charger outlet 49 is installed a safety button switch 59, which is activated when the charger outlet is engaged with EV inlet, activating the general breaker installed on the electrical panel connecting the charger to power. When the charger is pooled out, the safety button switch 59 is disactivated opening the breaker and cutting the electricity on the charger. In this way, the charger is powered only when it is engaged with the EV inlet, avoiding any accident. In FIG. 10, which is a front view of the EV inlet 60, are seen the moving contacts 61, the iron magnetic plate 62, the two control switches and changeover switches (button switches) 63 and 64, which are activated by the charger outlet when it engages into the EV inlet. More details will be presented in the description of one of the embodiments discussed later here in. In FIG. 11 is an example of a charger outlet phase-contact 65 which is fitting with the EV inlet phase-contact 66. The stationary phase-contacts 67 of the charger outlet are connected to the phase-cables 68 and it is in contact with the moving phase-contacts 69 of the EV inlet 66 connected with the phase-cables 70. The phase contacts 69 of the EV inlet are moving phase-contacts and they are installed on disc springs 71, which is compressed when the electromagnet 72 of the charger outlet is activated and the charger outlet is firmly attached to the iron plate 73 of the EV inlet compressing disc springs 71. In the center position of the EV inlet is installed a dumper 74 on an elastic element 75 (in this embodiment a coil spring), having a soft material on the edge 76 which is in contact with the charger outlet during the engagement. Also, on the edge of the charger outlet is installed a soft material gasket 77 to protect the parts coming in contact during the engagement. The positive contact 78 is in the middle of the dumper made by graphite supported by an elastic element, which in this case is a coil spring 79. The charger outlet is connected to the charger by elastic elements, in this case by a coil spring 80 and an elastic collar 81. FIG. 12 is the front view of the charger outlet, showing the three negative stationary phase-contact 82, 83 and 84, all of them incorporated into a piece of insulating material, which is the charger outlet contact assemble 85, having in a central position the positive contact 86, insulated by the insulating ring 87. Also, can be seen the three cameras 88, 89 and 90, the three ultrasonic sensors 91, 92 and 93, and the two lights 94 and 95. For security purposes on the charger outlet is installed a safety button switch 96. FIG. 13 is a front view of the EV inlet showing the three negative moving phase-contact 97, 98 and 99, all of them incorporated into a piece of insulating material, which is the EV inlet contact assemble 100, having in a central position the positive contact 101, insulated by its insulating ring, the iron plate 103 incorporated into the contact assemble 100 and the two control switches (button switches) 104 and 105, which are activated when the charger outlet is plugged into the EV inlet, during the battery recharge. For the cameras located on the charger outlet shown in FIG. 12, in the opposite position are three targets 102*a*, 102*b* and 102*c* (FIG. 13). FIG. 14 is an example of a charger outlet phase-contacts 106 which is fitting with the multi-contact EV inlet 107. The stationary phase-contacts of the charger outlet 108 are connected to the phase-cables 109 and they are in contact with the moving multi-contacts 110 of the EV inlet 107 connected with the plurality of cables 111. The moving multi-contacts of the EV inlet 110 are installed on coil springs 112, which are compressed when the electromagnet 113 of the charger outlet is activated and the charger outlet is firmly attached to the iron plate 114 of the EV inlet compressing all coil springs 112. In the center position of the EV inlet is installed a dumper 115 on an elastic element 116 (in this embodiment a coil spring), having a soft material on the edge 117 which is in contact with the charger outlet during the engagement. Also, on the edge of the charger outlet is installed a soft material gasket 118 to protect the parts coming in contact during the engagement. The positive contact 119 is in the middle of the dumper made by graphite supported by an elastic element, which in this case is a coil spring 120. FIG. 15 is a face view of the charger outlet phase-contacts 106 of FIG. 14, showing the three negative stationary phase-contacts 121, 122 and 123 and the positive contact 124 incorporated into the insulation material of the contact assemble 125. Also, can be seen the three cameras 126, 127 and 128, the three ultrasonic sensors 129, 130 and 131, the two lights 132 and 133 and the safety switch 134. FIG. 16 is a face view of the multi-contacts EV inlet 135, showing the plurality of the moving negative contacts 136 installed with a sliding fit into the EV inlet contact assemble 137 made by an insulated material, the positive contact 138 in the central position, inside to the dumper 139. Incorporated into the EV inlet contact assemble 137 is the iron plate 140, the three targets for the cameras mounted on the charger outlet and the two control button switches 141 and 142, which are activate by the charger outlet when it is engaged into the EV inlet. FIG. 17 shows the charger outlet 143 engaged into the EV inlet 144 for a version where both (charger outlet and EV inlet) use cylindrical phase-contacts, consisting in a kind of concentric cylindrical copper tubes separated by cylindrical insulating tubes, being in contact on their circular surfaces. For this embodiment the challenge is related to ensure a good contact on each phase-contact of charger outlet and the homolog phase-contact of EV inlet. Because it is impossible to have perfect pieces (always there is a difference between two pieces made in the same conditions), to make sure that for each pair of contacts the contact is always made over the entire surface, one of the contacts must be moving contact or auto-adjustable, which is the best solution. How to do this? By having one stationary contact and another one moving contact. How to do this? By using a stationary contact and a moving contact activated by an elastic element, which pushes or pools it to keep it always in touch with the stationary one. In this way, the elastic element takes any dimensional difference between the pieces involved. In this case, the stationary contact is installed rigidly into the EV inlet and the moving (auto-adjustable) contact is installed on the charger outlet. Therefore, in FIG. 18 is shown the charger outlet 145 having a cylindrical shape, with moving phase-contacts, having two sections: one 146 rigidly attached to the end of the charger, and another one 147 concentric and sliding fit to the firs one. Inside of the 147 section are installed three copper cylinders 148, 149 and 150, which are the three negative phase-contacts of the charger, separated by the insulating tubes 151, 152 and 153 having between them the sealing "O" rings 154 to not allow water to enter into the robot. In the central position is the positive contact 155. Each insulating tube (see FIG. 19, which is the detail D1 of FIG. 18) has three portions. Two portions 156 and 157 are sticked on the copper tube 158, which has a groove 159 to avoid an axial sliding against the copper tube 158. This portion is capable to slide relatively to the adjacent copper tubes. The third portion 160 is a sliding insulating tube, capable to move axially relatively to each of the adjacent copper tube. To ensure a good contact, each pair of contacts (of EV inlet and of charger outlet) have to touch each other even if they are not perfect equal. In this case the elastic element is the "O" ring 161, which is compressed by the sliding insulating tube 160 which moves axially. To do this, the sliding insulating tubes 160 are all activated by a bar 162 and its insulating tube 163, which is introduced slid fit transversely into all sliding insulating tubes 160 but having an axial gap 164 inside of the copper tubes 158. By moving the bar 162 and its insulating tube 163 axially to the charger outlet, all sliding tubes move axially, and each one pushes the associated copper tube axially, up to the moment all copper tubes of the charger outlet are in contact with the homolog contact of the EV inlet. The "O" rings, which are deformed differently, take the dimensional differences between different copper tubes and in this way all contacts will be good. How to push axially the sliding tubes and the bar with its insulating tube? By a came mechanism, shown in FIG. 20. In the section rigidly attached to the end of the charger 165, (which was position 146 in FIG. 18), is made a slot 166 having an angle "a" to the normal to the charger outlet axes, on which the bar 167 and its insulating tube 168 can move. The bar 167 and its insulating tube 168 are rigidly attached to the second section 169 of the charger outlet and with the sliding insulating tube 160 (FIG. 19). When the charger outlet 143 becomes to be close to the EV inlet 144, (see FIG. 17), its two logs 170 and 171, enter the two slots 172 and 173 of the EV inlet 144 avoiding any rotation of the charger outlet around its axes. When the charger outlet contacts tubes become to be in contact with the EV inlet contact tubes, the last arm of the robot 174 (FIG. 17), starts slowly to rotate CW. By the came mechanism 165 (see FIG. 20), the bar 167 and its insulating tube 168 are pushed axially forward, involving in their movement simultaneously all the sliding insulating tubes 160 (FIG. 19) which compress the elastic element "O" ring 161, and in this way the "O" rings take the difference between each copper tube, ensuring a good contact with the EV inlet contact. When the robot is retracting, an elastic element has to return to the original position the 147 section (FIG. 18). In FIG. 22 is shown this kind of device using the wire spring 187 installed inside of the last robot arm. The variation of the charger outlet and its phase-contacts position on axial direction is absorbed by the loop 188 of the phase-cables 189 (see FIG. 18). To make sure all four phase-contacts are closed, the charger is equipped with a contacts safety device. The principle of this device is shown in FIG. 21, where there is an electric circuit powered by a battery 175 connecting in series all contacts of the charger outlet 176, 177, 178, 179 and contacts of the EV inlet 180, 181, 182 and 183. Between two phase contacts of the charger outlet and of the EV inlet are introduced the switches 184, 185 and 186 normal open. When the last arm of the robot starts to turn CW, these three switches will close. The last arm of the robot continues to turn CW up all connectors will be in touch. In this moment, the switches 184, 185 and 186 will be disactivated and opened, and a signal will be transmitted to the charger controller, which activates a timer and this timer discharge the phase-contact breakers, powering the phase-contacts, and starting the recharge. The switches 184, 185 and 186 will stay open till the new engagement. FIG. 23 is a face view of the charger outlet, showing the three cameras 190, 191 and 192, the two lights 193 and 194 and three ultrasonic sensors 195, 196 and 197 and the safety button switch 198. Also, can be seen the logs 199 and 200. Another aspect of the recharging robots is related to the wet contacts, which can provoke short circuits. To avoid this, the charger outlet and the EV inlet can be protected by using defrost wires 201, 202, 203 and 204 installed into the insulation 205, 206, 207 and 208 around the contacts 209, 210, 211 and 212, see FIG. 24, which is a detail of the end of the charger outlet. In FIG. 25, which is a detail of the front view of a charger outlet and an EV inlet, can be seen these circular wires 213, 214, 215 and 216. These wires are powered by the rear defrost button of the cabin by the driver. In FIG. 26 is illustrated the EV inlet 217 having stationary phase-contacts 218, 219, 220 and 221 incorporated into the insulation material 222. It can be seen the slots 223 and 224, located into the EV inlet box 225. The phase-cables 226, 227, 228 and 229 are connected to the connectors 230, 231, 232 and 233. In FIG. 27 may be seen in an axial view the connectors 234, 235, 236, 237 and the phase-cables 238, 239, 240 and 241. To protect the charger outlet a cover may be installed. In FIG. 28, FIG. 29 and FIG. 30 is shown a cover eyelid stile, made of two sub ensembles 242 and 243. Each of them has a metallic frame 244 and 245, on which are mounted the accordion style covers 246 and 247. Each one is open and close by the beaver gear mechanisms activated by the motor 249. The cover and two bear gear mechanisms with their motors are installed on the rigid sub ensemble 250 of the last arm of the robot. The beaver gear mechanisms 248 can be seen in FIG. 30. For safety reasons all robots must avoid external cables, all cables have to be contained inside of the robot body housing. To do this, for the rotary robots an additional ring with its collector is installed—the auxiliary ring and auxiliary collector. On this auxiliary circuit will be connected all motors, sensors, lights and mechanisms.

All presented before can be incorporated in different embodiments of the automatic recharge station. Therefore, applying these partial solutions, different practical solutions for an automatic recharge station may be imagined, as following:

a) Automatic recharge station using a linear robot.

Figure 31:
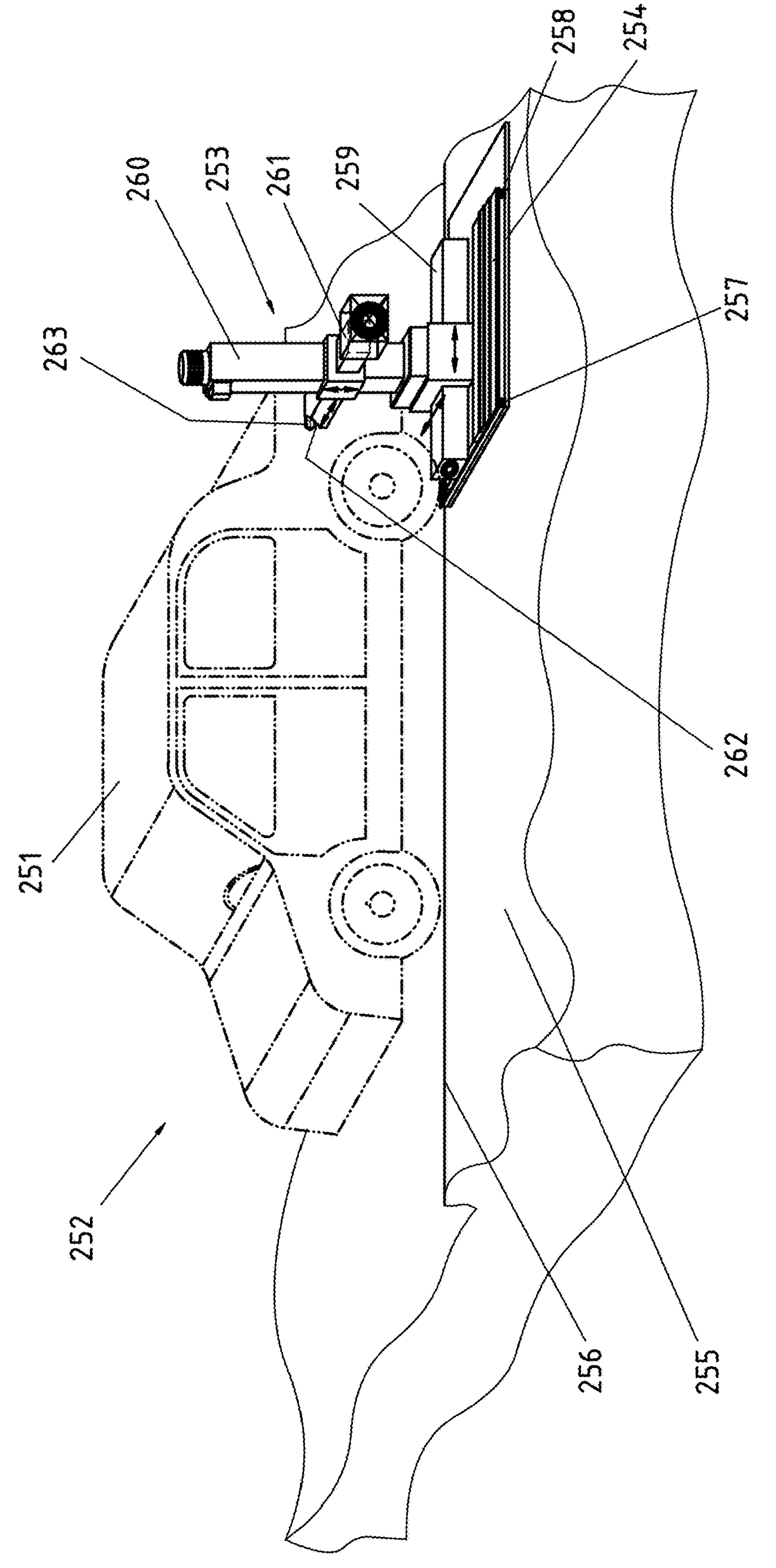
FIG. 31 is an isometric view of a linear robot during the recharge of an EV car.
Figure 32:
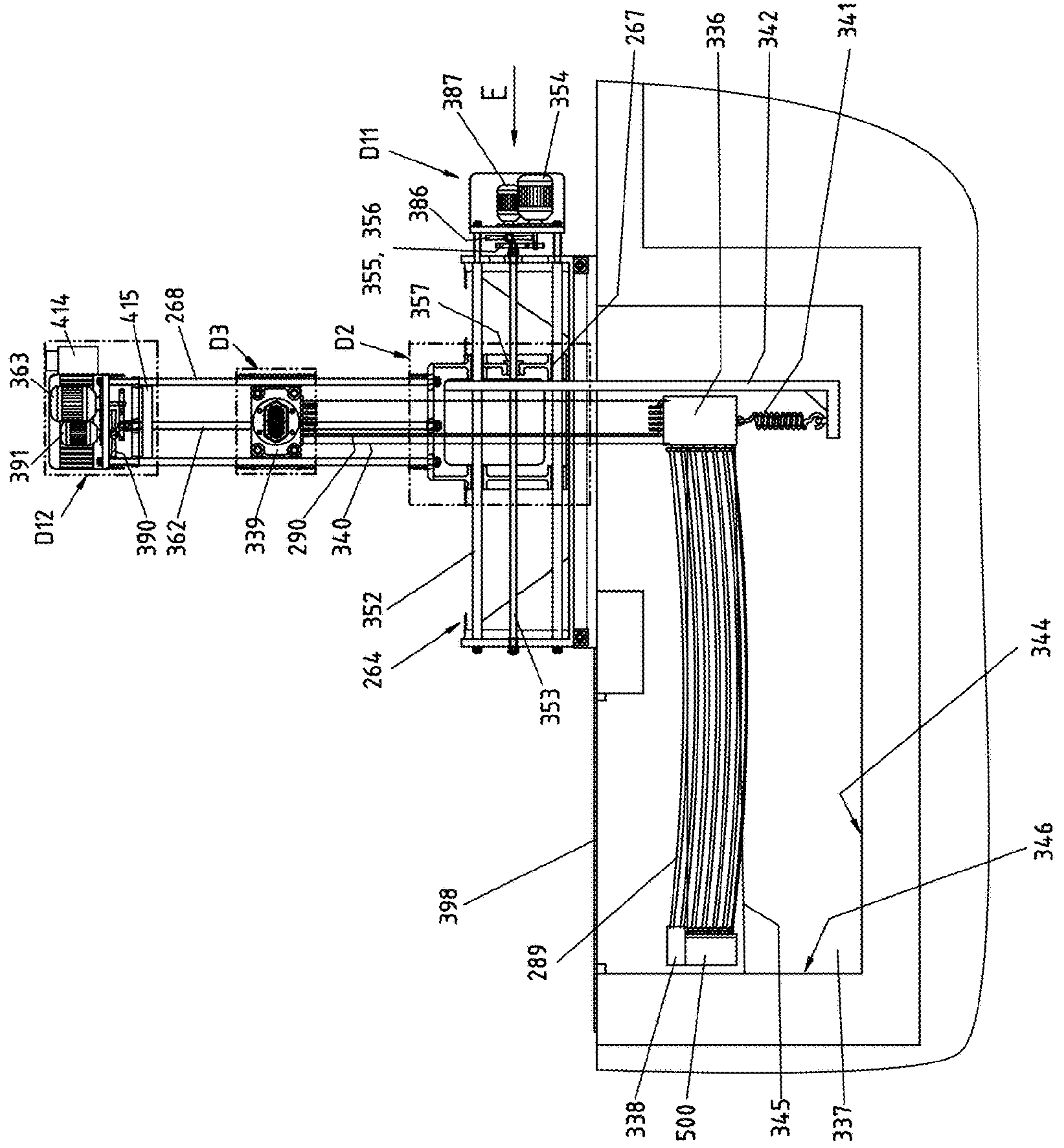
FIG. 32 is a vertical cross section of a linear robot along of the lower horizontal robot arm.
Figure 33:
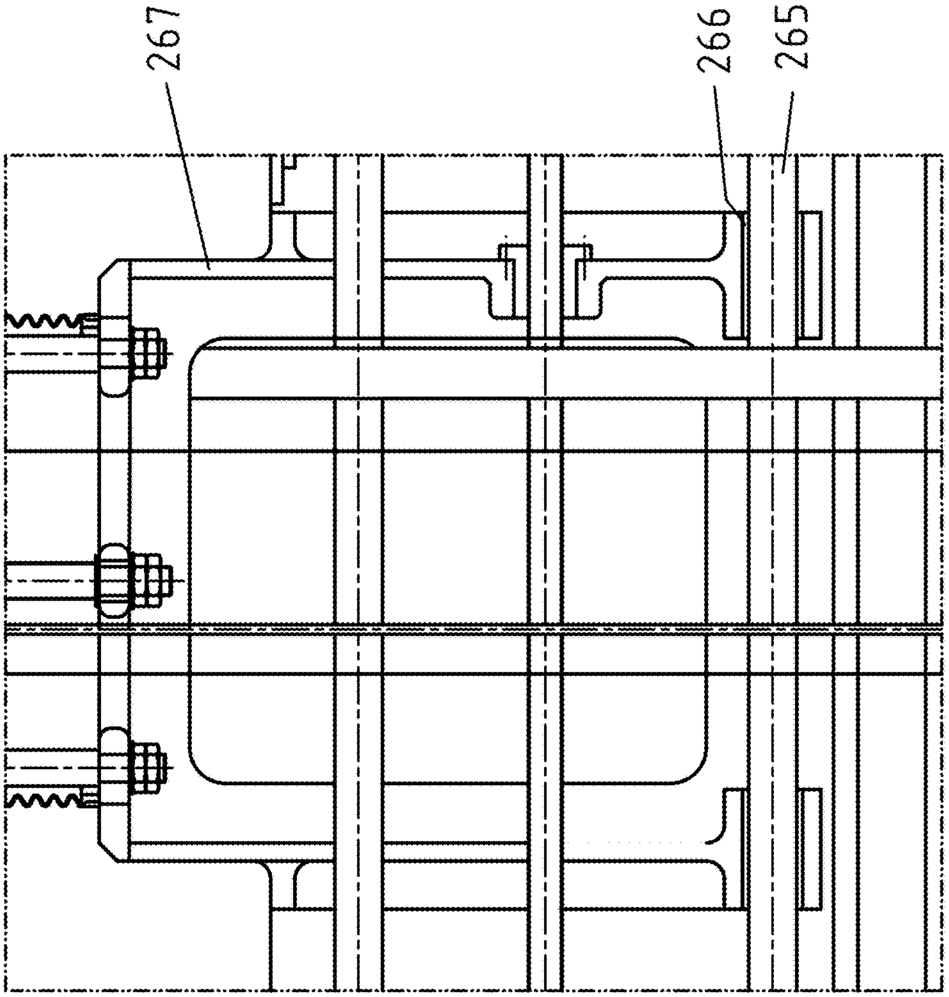
FIG. 33 is the detail D2 of the FIG. 32.
Figure 34:
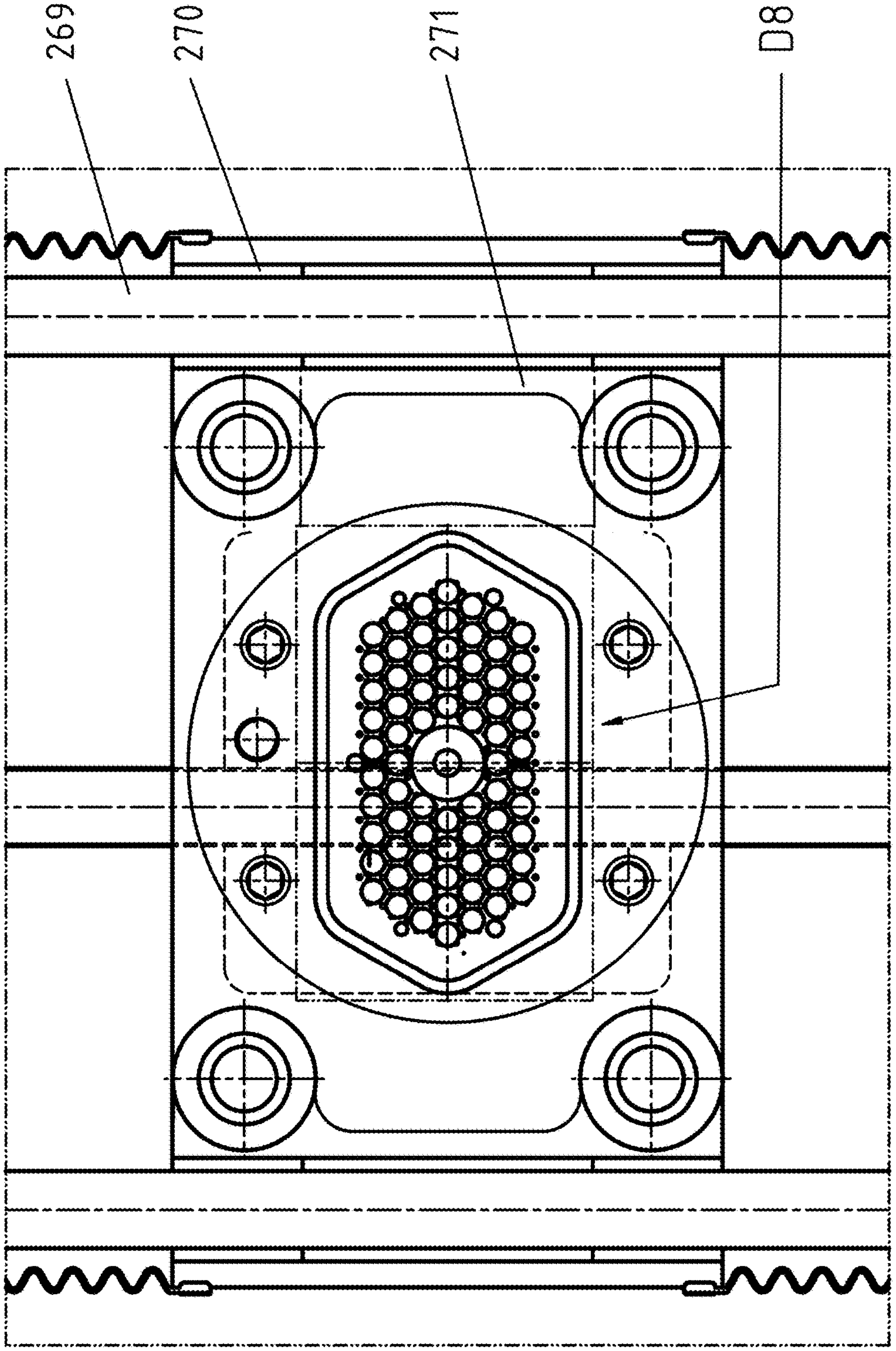
FIG. 34 is the detail D3 of the FIG. 32.
Figure 35:
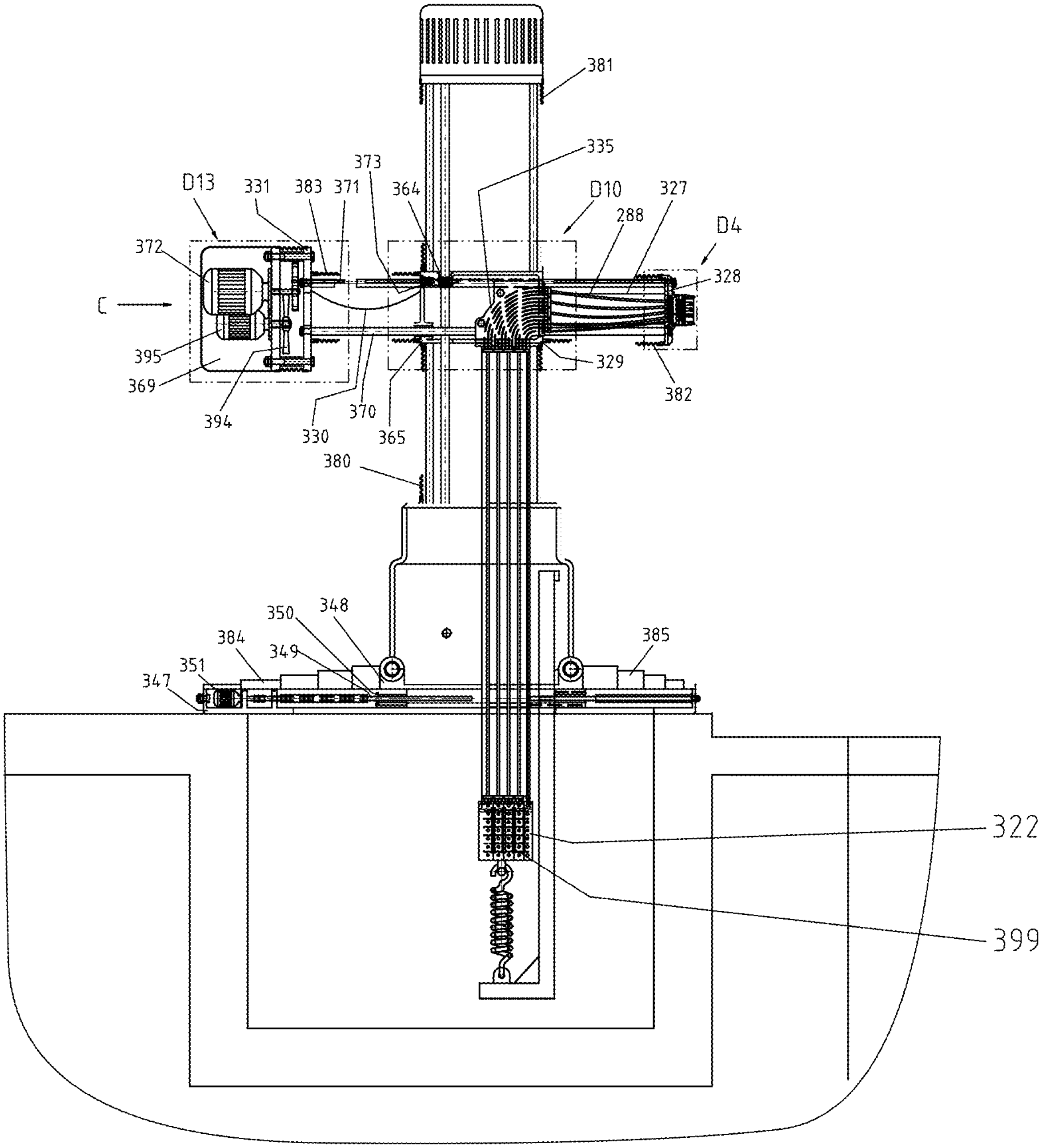
FIG. 35 is a view and a partial cross section on a vertical plan along of the upper horizontal robot arm.
Figure 36:
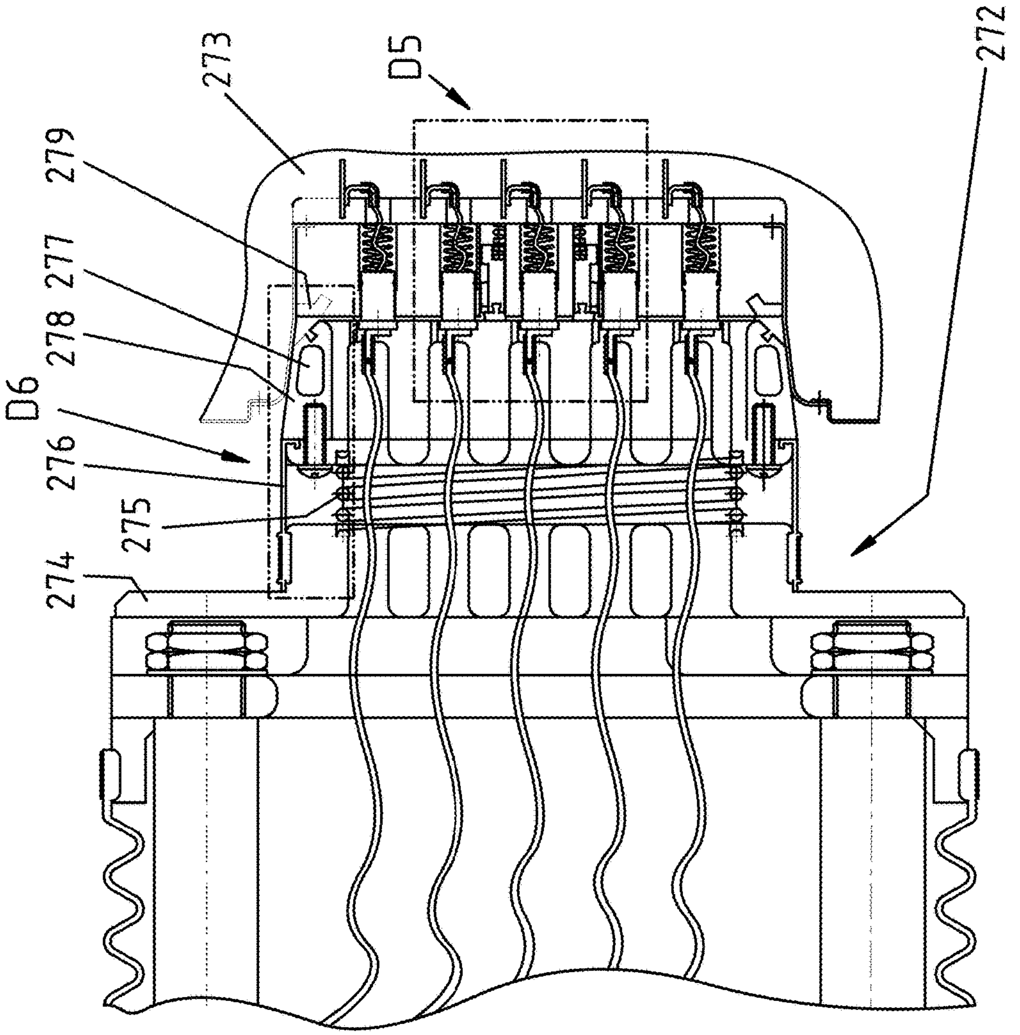
FIG. 36 is a partial cross section of the charger outlet engaged with the EV inlet of the linear robot.

An embodiment of an automatic recharge station using a linear robot is presented in FIG. 31 to FIG. 60. FIG. 31 shows an EV car 251 in the recharge station 252, having a battery recharging robot 253, which is a five linear axes robot, including a plate 254 installed on a platform 255 close to the rod border 256, on which are mounted two horizontal sliding mechanisms 257 and 258, perpendicular on the rod border 256, on which the robot base is capable to slid normal to the border. On the robot base is installed the lower horizontal arm 259 sliding normal to the rod border, on which the column 260 is sliding parallel to the rod border. On the column 260 is sliding vertically an upper horizontal arm 261, which has on the rod side extremity the charger outlet 262, which engage with the EV inlet 263 during the battery recharge. The lower horizontal arm 264 (see FIG. 32), has (see Detail D2 in FIG. 33) two horizontal rails 265, on which is sliding the bronze sleeves 266 of the column 267, which has four vertical bars 268 (see FIG. 32). On these vertical bars 269 (see Detail D3 in FIG. 34) is sliding vertically on the bronze sleeves 270 the upper horizontal arm 271, which is position 261 in FIG. 31, normal to the lower horizontal arm 264 (FIG. 32). In FIG. 36, (which is a detail of the charger outlet engaged into the EV inlet) is shown the charger outlet 272 engaged into the EV inlet 273. In order to have a perfect engagement, the charger outlet is attached elastically to the extremity of the upper horizontal arm 274 by the coil spring 275 and by the elastic collar 276 and is firm connected by an electromagnet 277 located into the extremity of the charger outlet 278, which acts on the flat iron ring 279 incorporated into the EV inlet 273, when the electromagnet is activated.

The charger outlet 280 (see FIG. 37, which is the Detail 4 of the FIG. 35), includes a plurality of copper contacts 281 all of them incorporated into a piece of insulating material, which is the charger outlet contact assemble 282. These copper contacts have a flat face 283, all these flat surfaces are aligned on a flat surface 284 of the charger outlet contact assemble 282 and each of them having a male connector 285 on the opposite side of the flat surface 283 on which will be connected the female connector 286 of the cable 287, which in FIG. 35 is the cable 288, coming from the power supply unit 500 via cable 289 and 290 (see FIG. 32).

When the charger outlet 291 is engaged into the EV inlet 292, (see FIG. 38, which is the Detail D5 of FIG. 36), the copper contacts 293 have their flat face 294 in contact with the flat face 295 of a graphite electric contact 296 which is installed into the EV inlet 292 using an elastic element 297 (in this embodiment a coil spring) in order to provide a very good electric contact. The plurality of graphite electrical contacts 296, equal in number with the plurality of the copper contacts 293, are installed into a piece of insulating material, which is the EV inlet contact assemble 298, in such a way that they can slid axially into the holes produced into the EV inlet contact assemble 298, being hold by a retaining ring 299 to don't exit completely out to the EV inlet contact assemble 298 when the charger is not engaged.

Each graphite electric contacts 296 is connected by a wire 300 and a double female connector 301 to a double male connector 302 incorporated into the EV inlet contact assemble 298. From there, using the female connector 303 and the cable 304, each graphite electric contact 296 is connected to the "charge port" 36 of the external switches and changeover switches box 34 (see FIG. 4).

Figure 39:
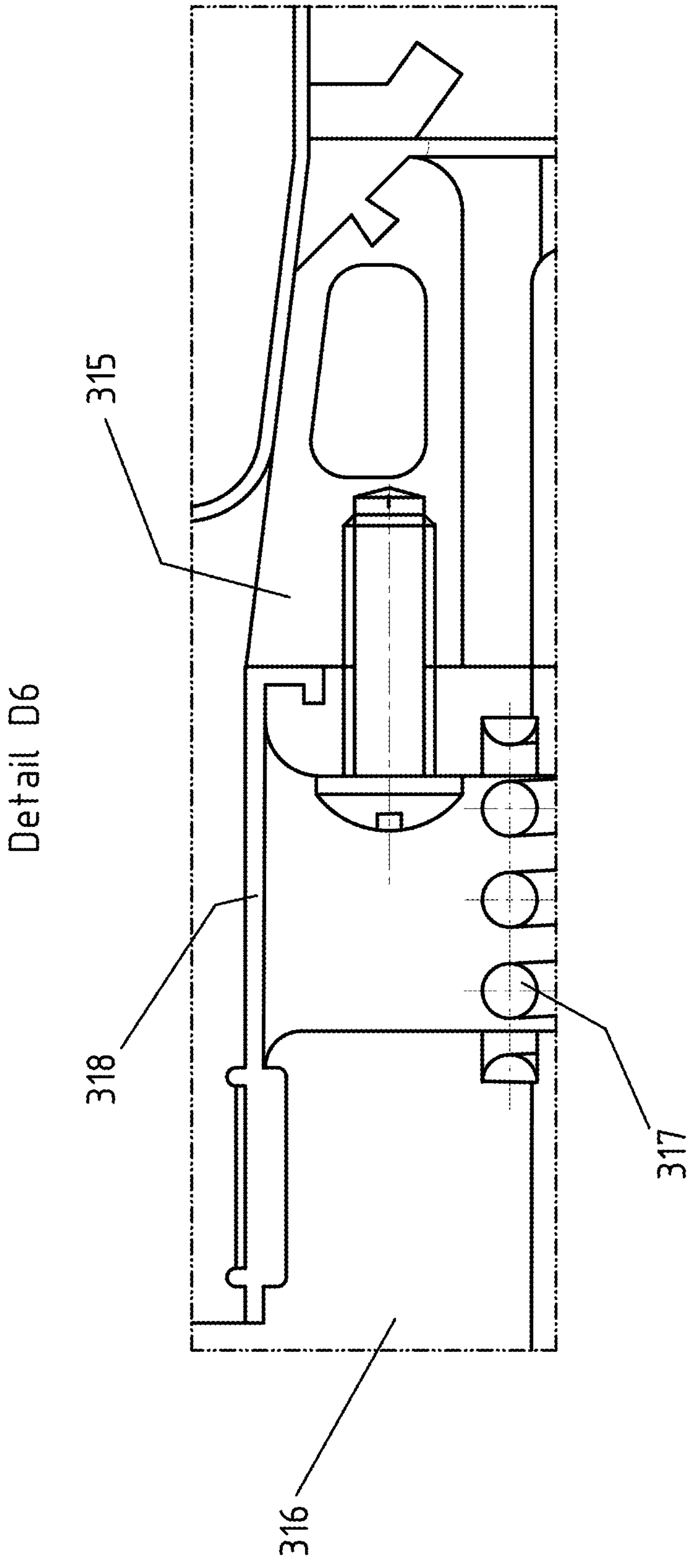
FIG. 39 is the detail D4 of the FIG. 36.
Figure 40:
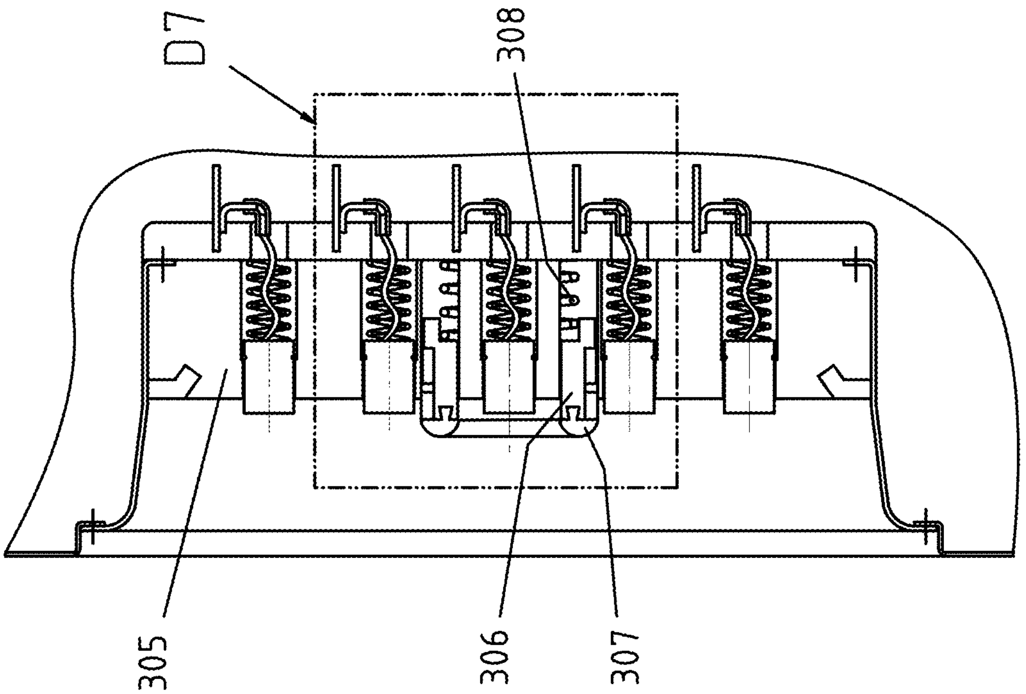
FIG. 40 is a cross section of the EV inlet of a linear robot in a waiting position for recharge.
Figure 41:
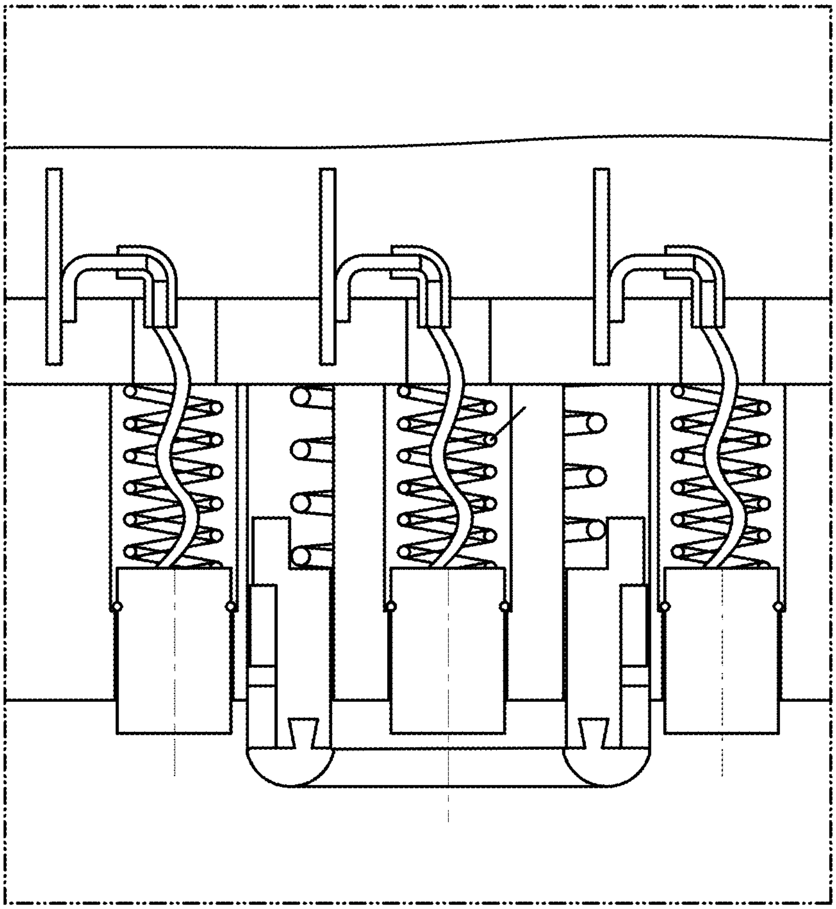
FIG. 41 is the detail D7 of the FIG. 40.
Figure 42:
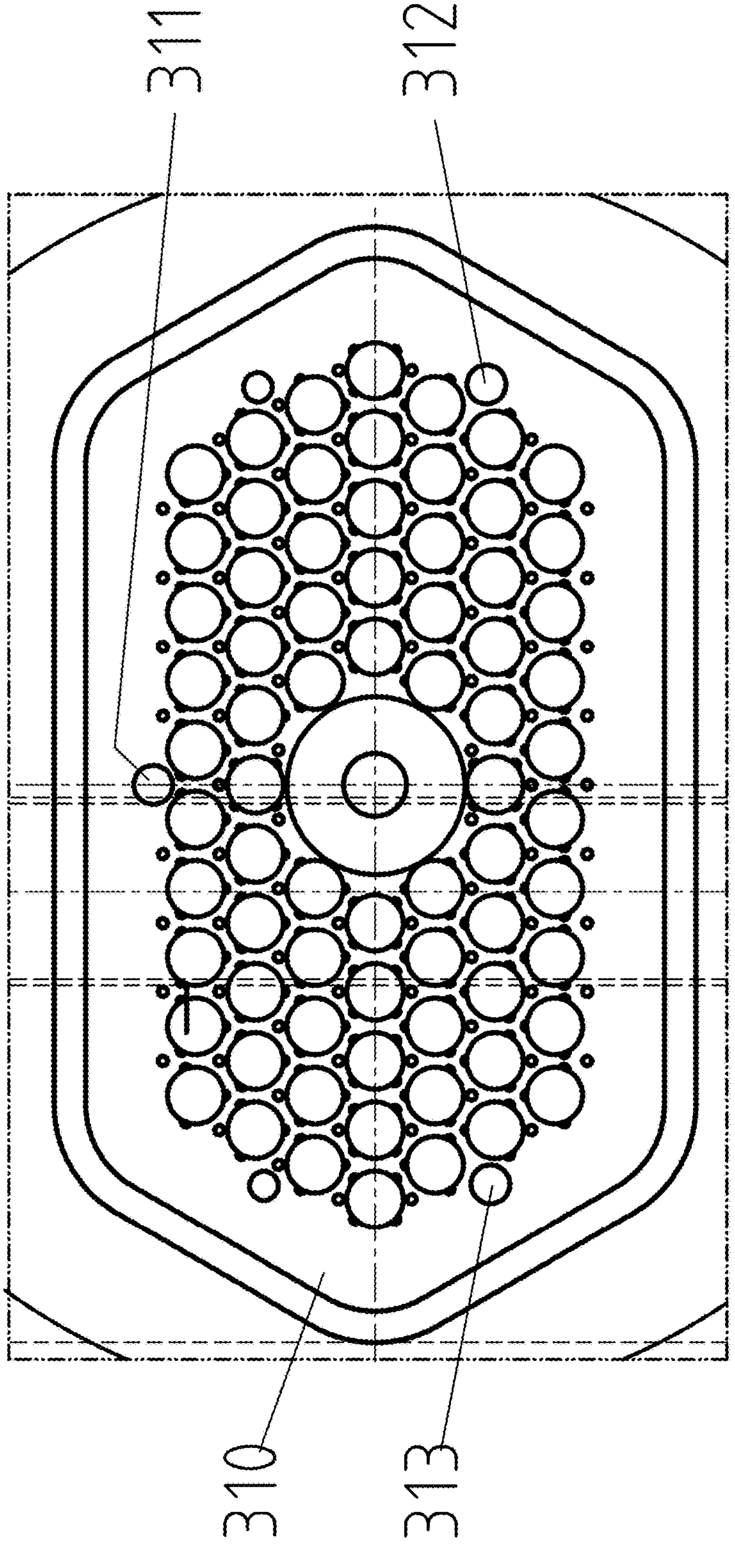
FIG. 42 is the detail D8 of the FIG. 34.
Figure 44:
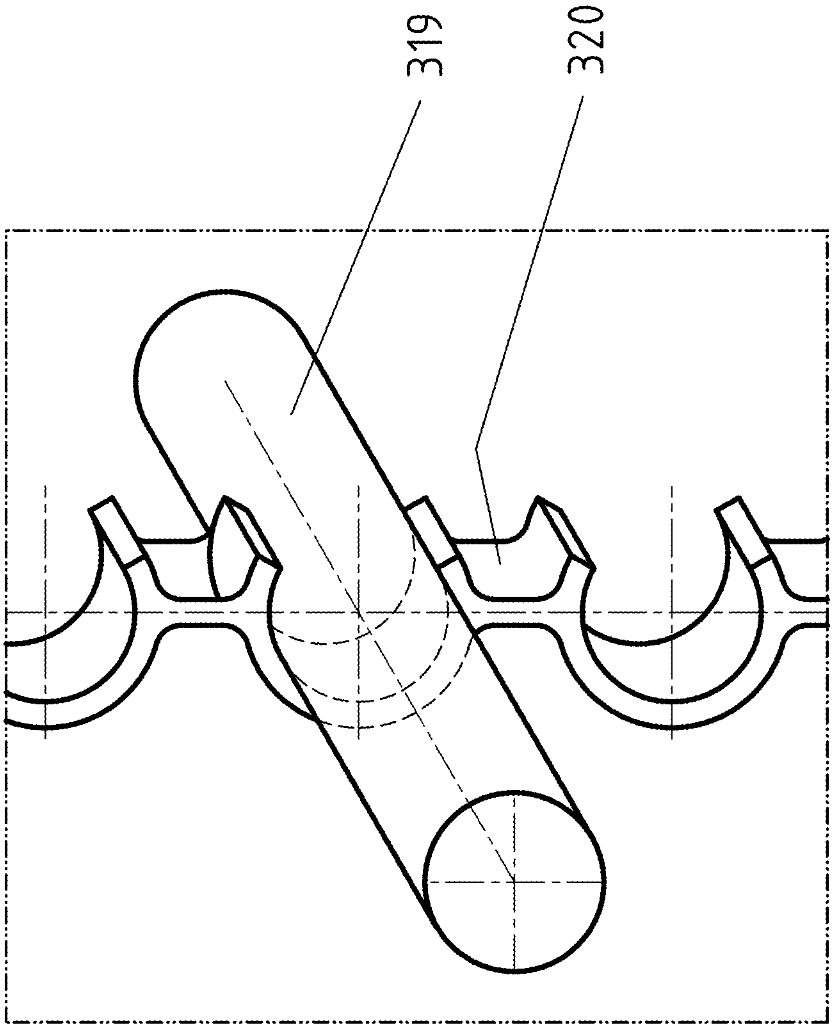
FIG. 44 is the detail D9 of the FIG. 43.
Figure 43:
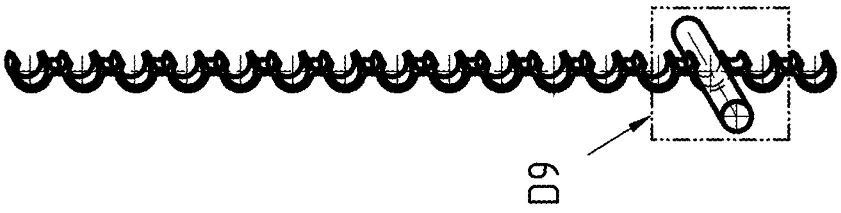
FIG. 43 is an isometric view of a guide of the cables on a linear segment.

In FIG. 40 is shown the EV inlet (no engaged with the charger outlet). In order to avoid any shock at the engagement of the charger outlet into the EV inlet, the EV inlet contact assemble 305 is designed with a dumper 306 in a central position, having on the end of it a dumping element 307 made by a soft material (which will be the first element of the EV inlet in contact with the charger outlet during the engagement), and on the opposite side an elastic element 308 (in this embodiment a coil spring), which will attenuate the hit provoked by the charger outlet electromagnet during the engagement. On the same goal, on the edge of the charger outlet contact assemble 282 is mounted another dumping element 309 (see FIG. 37), made by a soft material, which is the first element of the charger outlet entering in contact with the EV inlet during the engagement. FIG. 41 is the Detail D7 of the FIG. 40. To obtain a perfect positioning between the EV inlet and the charger outlet, on the face of the charger outlet assemble 310, (see FIG. 42, which is the Detail D8 of the FIG. 34), are incorporated three cameras 311, 312 and 313, which send information to a controller 314 (see FIG. 53), which controls the robot positions. To avoid any mismatch between the charger outlet 272 engaging into the EV inlet 273 (see FIG. 36), both have a taper shape which fit each other (concave for the EV inlet and convex for the charger outlet). As a safety measure (in case that the positioning of the charger outlet 272 and the EV inlet 273 are not absolutely aligned), as shown in FIG. 39 which is the detail D6 of FIG. 36), the charger outlet 315 is connected to the upper horizontal arm 316 of the robot by the spring 317 and by the elastic collar 318, allowing small adjustments between the two components 272 and 273 (see FIG. 36). To better control the positioning of the charger outlet when it is engaging the EV inlet, the robot movement is split in three sequences: first is a rough approach when the entire robot body 253 (see FIG. 31) moves from the waiting position on the horizontal sliding mechanisms 257 and 258, when the upper horizontal arm 261 is retracted in a standby position. The second is a fine approach when the collum 260 is stopped and is moving only the upper horizontal arm of the robot 261 till the charger outlet is completely engaged with the EV inlet. This second approach is a short approach. After the battery recharge, the robot retracts the upper horizontal arm 261 in the standby position and the entire body of the robot 253 on the waiting position simultaneously.

Figure 45:
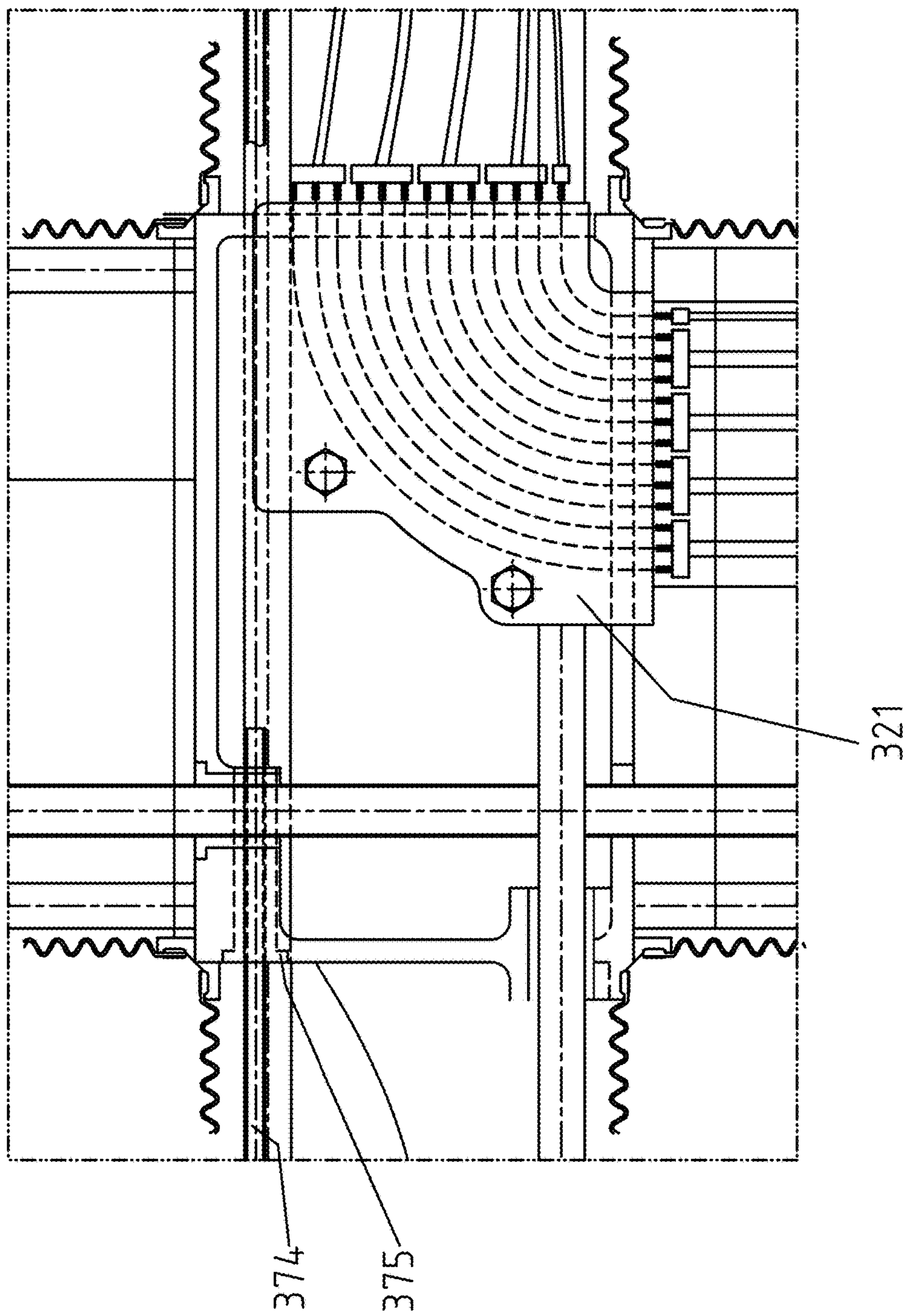
FIG. 45 is the detail D10 of the FIG. 35.

All copper connectors are connected as discussed before to the power supply units by a plurality of cables. To protect and manage the plurality of cables of the robot, the total length of each cable is split in three segments, each of these three segments being along of one of the three axes of the robot (two horizontal and one vertical). On these segments, the cables 319 are kept aligned using the guides 320 (see FIG. 44, which is the Detail D9 of FIG. 43). Where the cables change direction, special connectors can be used:

from horizontal to vertical the HV connector 321 shown in FIG. 45, which is the Detail D10 of FIG. 35;

from vertical to horizontal the VH connector 322 shown in FIG. 35.

Figure 46:
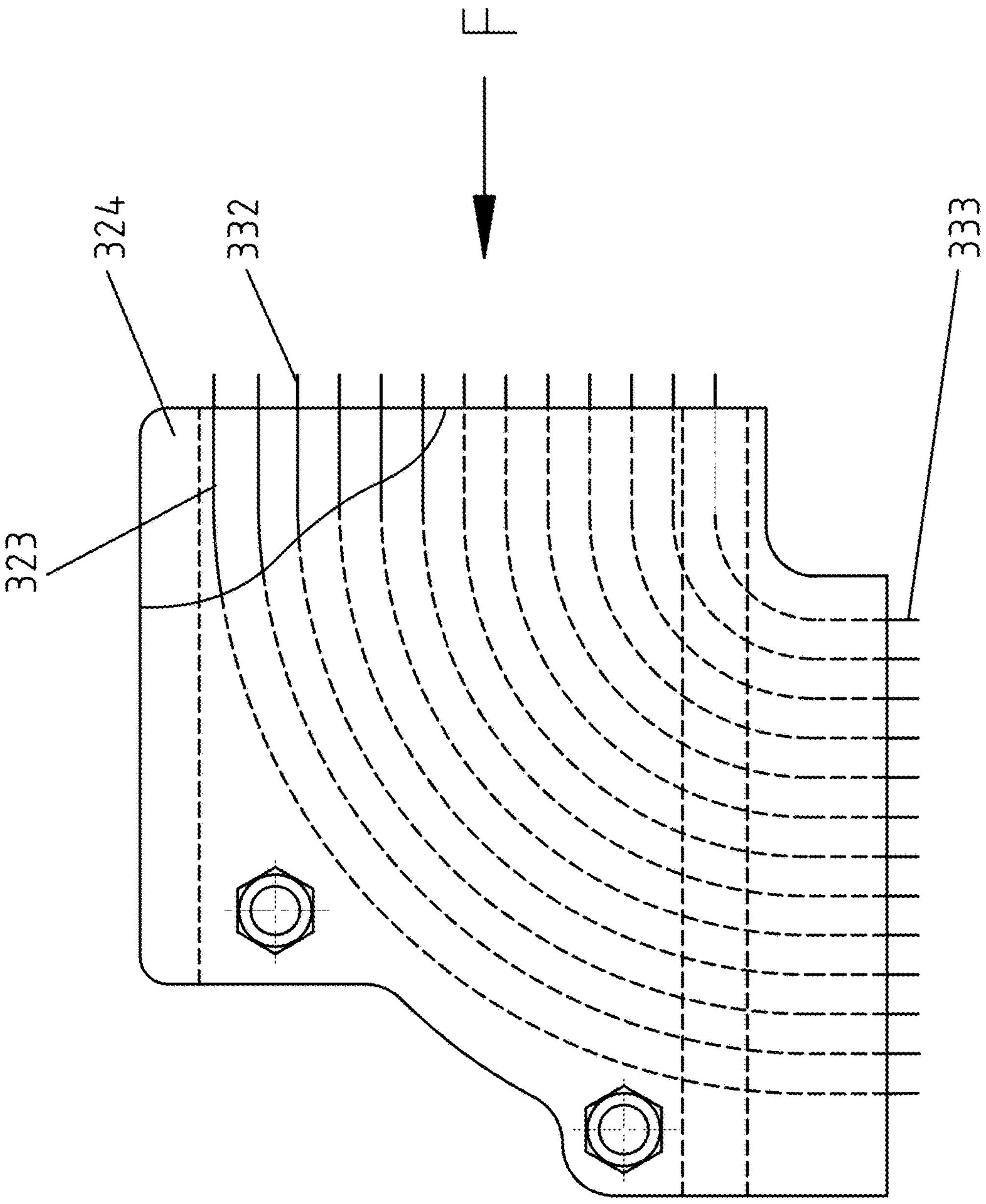
FIG. 46 shows a horizontal-vertical connector.
Figure 47:
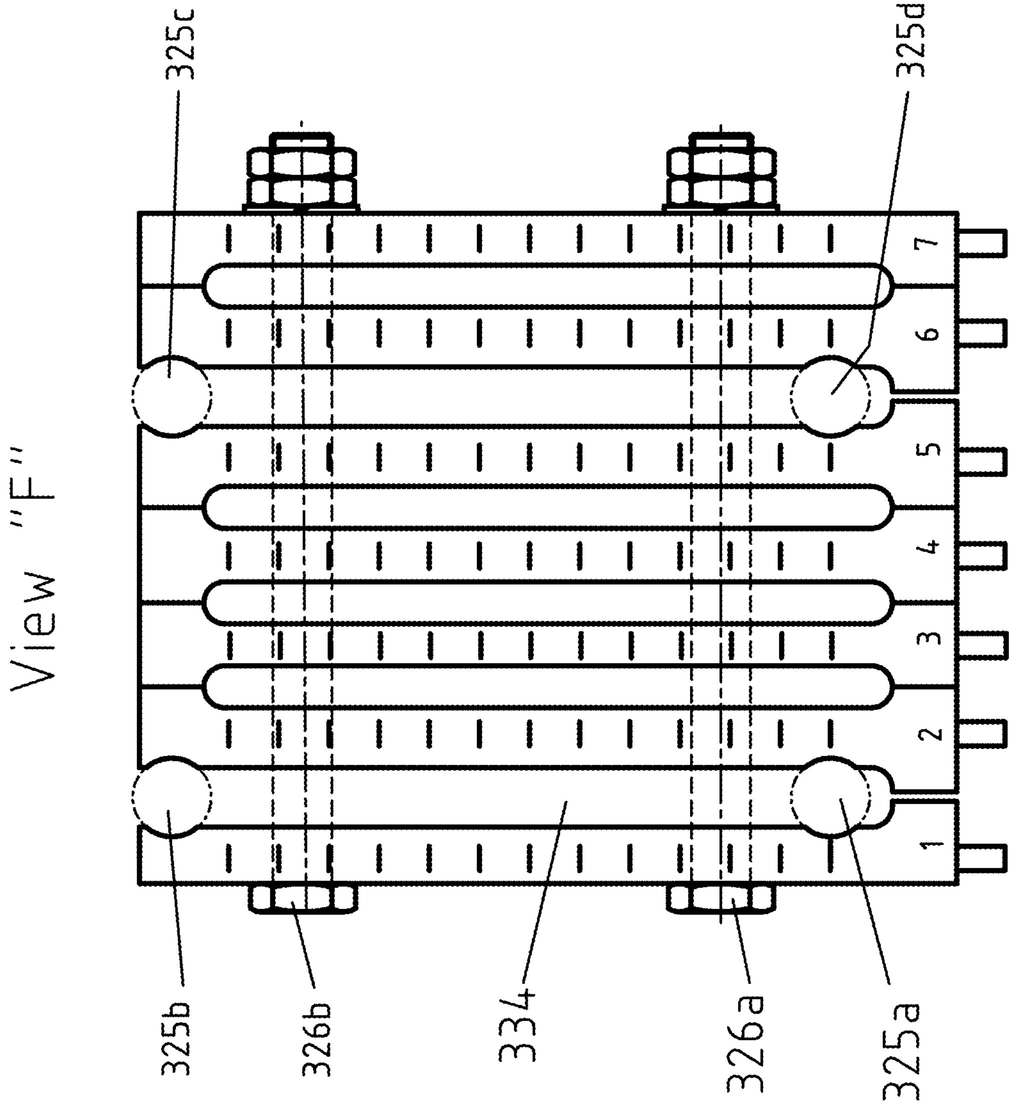
FIG. 47 is the view F of the FIG. 46.

All these connectors are characterized by the fact they have a plurality of copper bands 323 aligned and incorporated into a piece of insulating material 324, (see FIG. 46). In fact, this connector is a package of a plurality of single row connector connectors, which are solidly attached on the sliding bars 325*a*, 325*b*, 325*c* and 325*d* of the robot upper horizontal arm by a plurality of screws 326*a* and 326*b*, (see View F in FIG. 47). The single row connectors #1 and #2 take in sandwich two of the sliding bars 325*a* and 325*b*, and the numbers #5 and #6 take in sandwich another two sliding bars 325*c* and 325*d*. By tightening the screws 326*a* and 326*b*, entire package of connectors will be solidly attached on the sliding bars 325(*a, b, c, d*). In this way the cables 288 (see FIG. 35) will stay straight all the time when the upper horizontal arm of the robot will move. As a safety measure for the cables 288, a plurality of iron wire 327 are used to link the arm end 328 to the robot column 329, and the iron wire 330 to link the arm rear end 331 to the column 329. In this way are avoid any out of the limits event. The copper bands end 332 and 333 exit from the insulating material 324 acting as male connectors, engaging with a female connector of the cables connected to them, (see FIG. 46). These cables are located inside of the robot arms. The vertical cables 290 in FIG. 32, are located into the vertical column of the robot, connecting the HV connector 335 (FIG. 35) to the VH connector 322, which is a vertical-horizontal connector. There is an underground chamber 337 (FIG. 32) under the robot, where is installed the electric panel 338. To keep stretched without bending the cables 290, they are attached to the upper horizontal arm 339 via a plurality of iron support cable 340, and an elastic element 341 (in this embodiment a coil spring), which is attached to the column extension 342 and in this way the elastic element will pull the cables 290 to keep them vertically strait. The column extension 342 goes deep down into the underground chamber 337 allowing to keep the vertical cables 290 straight, without touching any chamber wall. The cables 289 are always into the underground chamber 337. They must be long enough to allow the robot to reach any required position. These are the only cables which bend. The underground chamber 337 must be deep enough to avoid any friction of the cables 289 with the chamber floor 344 for any robot position. To protect the electric cables 289 and to avoid any accident, a plurality of iron safety cables 345 are installed connecting the VH connector 336 to the underground chamber wall 346. As is shown in FIG. 47, the shape of each single row connectors connector is designed to create between each of them an opening 334. In this way the circulation of the air in the cooling system inside of each robot arm is allowed.

Figure 48:
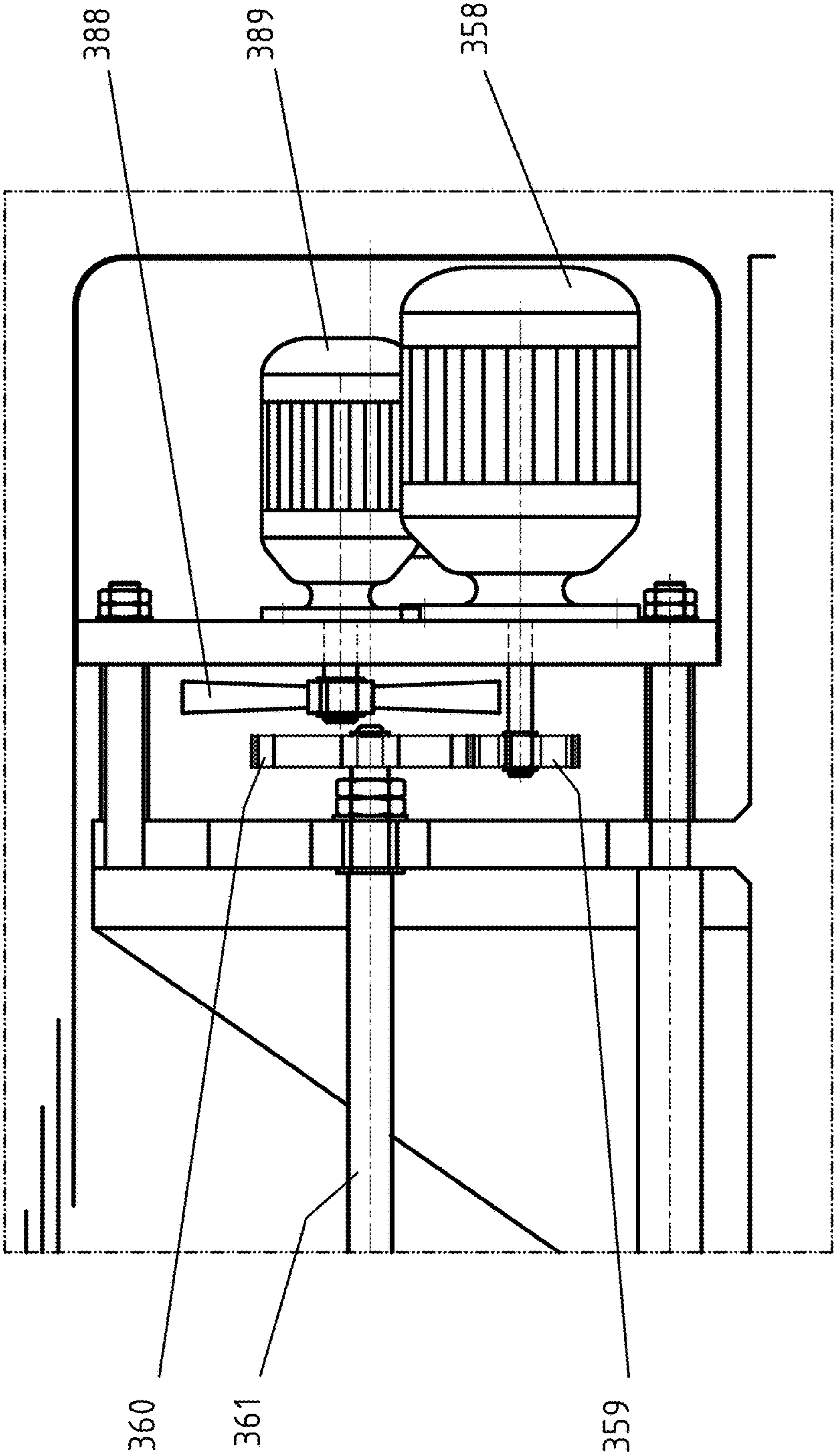
FIG. 48 is the detail D11 of the FIG. 32.
Figure 49:
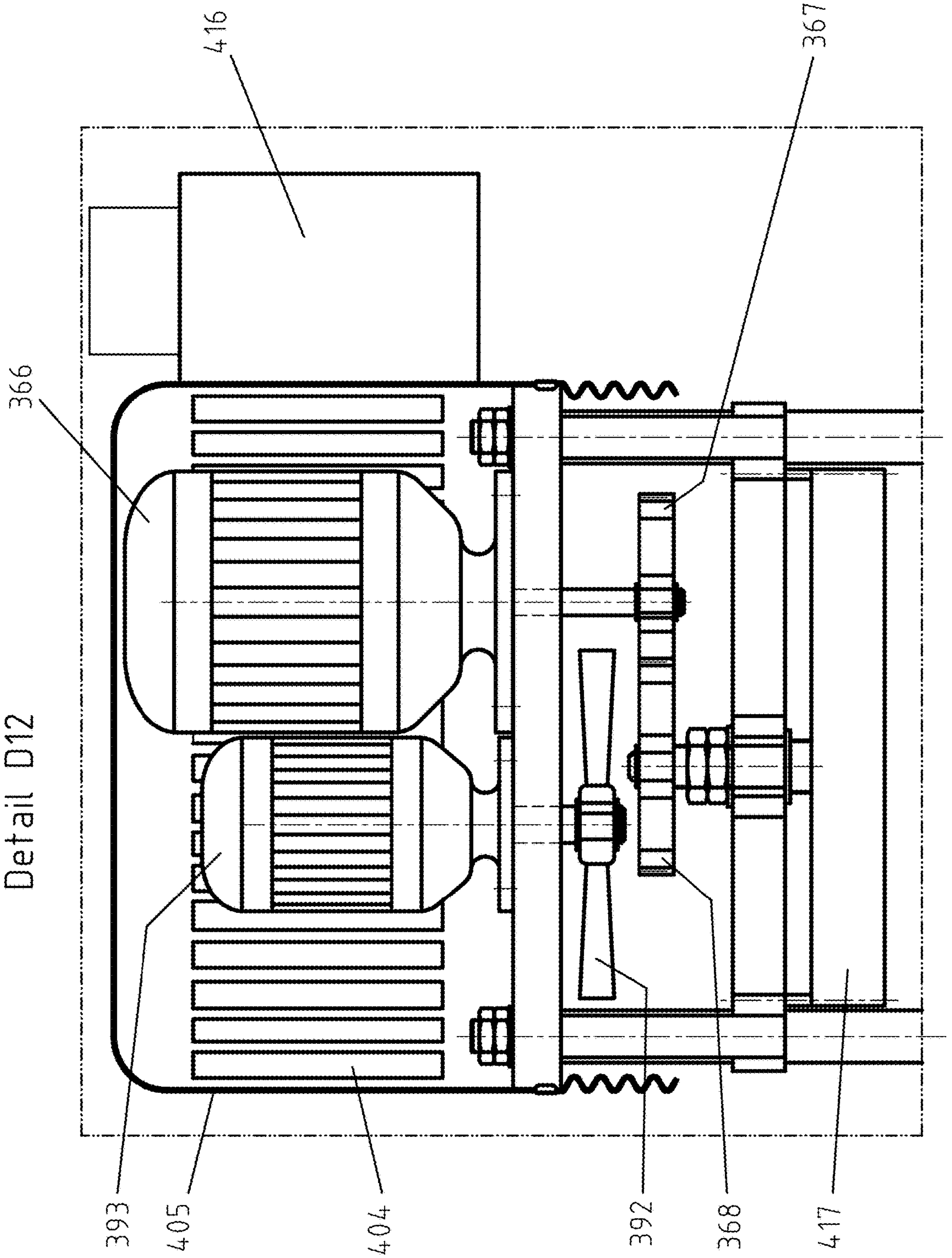
FIG. 49 is the detail D12 of the FIG. 32.
Figure 50:
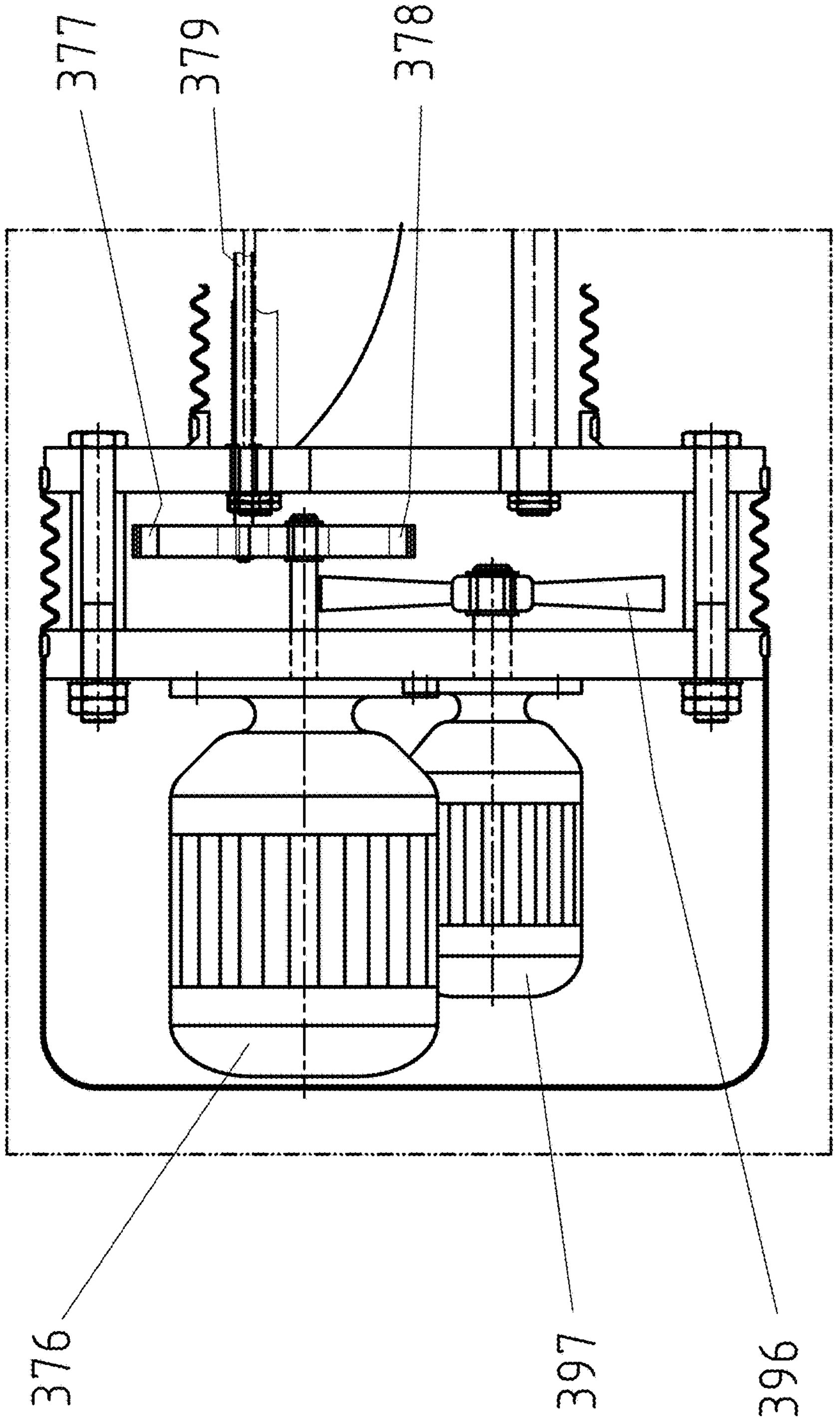
FIG. 50 is the detail D13 of the FIG. 35.
Figure 51:
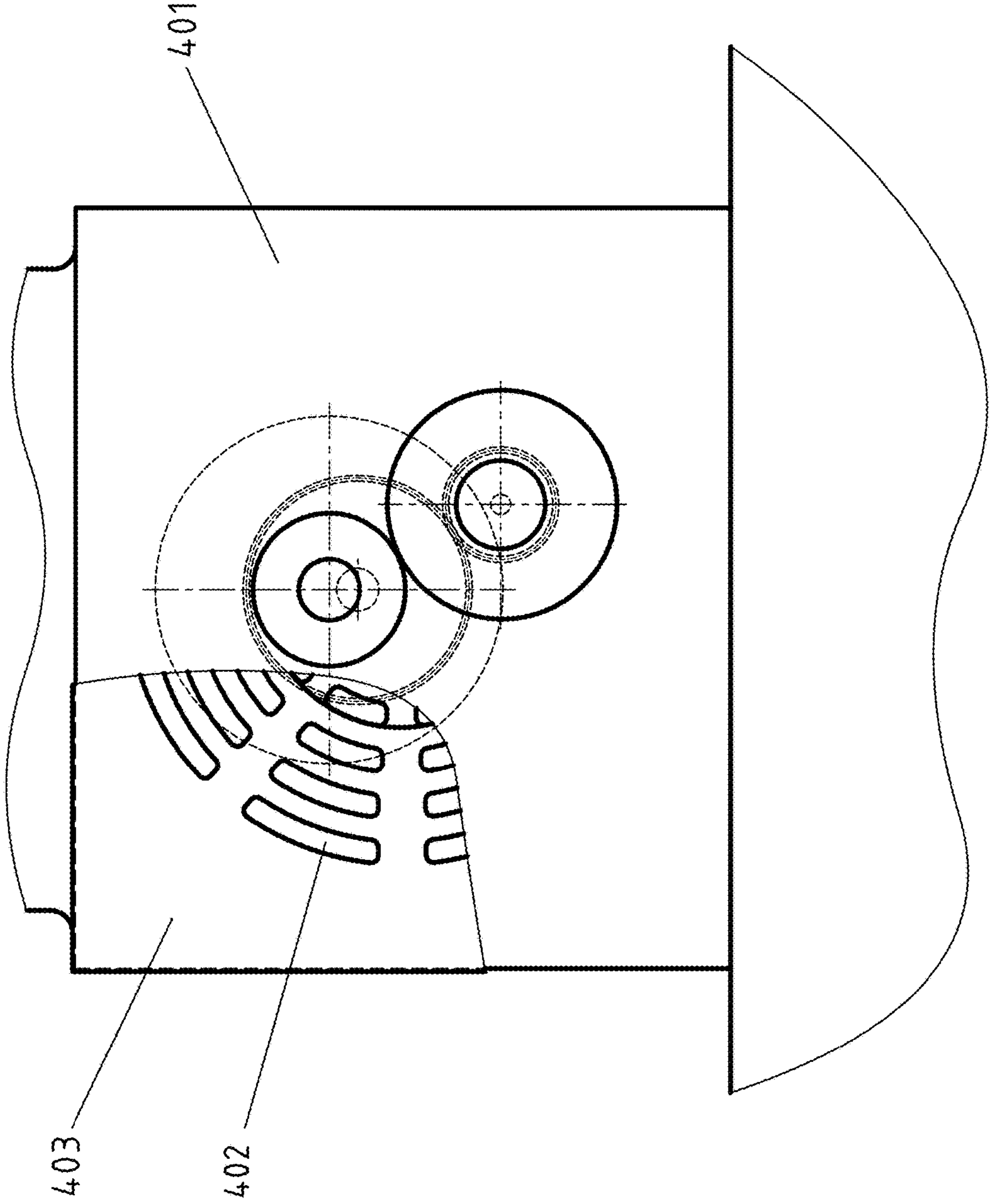
FIG. 51 is the view E of the FIG. 32.

All moving arms are provided by screw mechanisms driven by electric motors, as following:

- for the robot base 347 (see FIG. 35), the movement normal to the rod border of the robot lower horizontal arm 348, is provided by a screw mechanism having the screw 349, turning into the nut 350, activated by the electric motor 351,
- for the robot lower horizontal arm 264 see FIG. 32, the horizontal movement along the rails 352 is provided by the screw 353 activated by the electric motor 354, via a pair of spur gears 355 and 356, turning into the nut 357 mounted on the column 267. Also in FIG. 48, which is the Detail D11 of the FIG. 32 can be seen the electric motor 358 with the two spur gears 359 and 360 activating the screw 361;
- the vertical movement of the upper horizontal arm along the four vertical bars 268, (see FIG. 32) is provided by the screw 362 actuated by the electric motor 363, via a pair of spur gears, turning into the nut 364 (see FIG. 35), mounted on the robot upper horizontal arm support 365. The electric motor 366, with the two spur gears 367 and 368 are more visible in FIG. 49, which is the Detail D12 of FIG. 32;
- for the robot upper horizontal arm 369 see FIG. 35, the horizontal movement along the rails 370 is provided by the screw 371 actuated by the electric motor 372, turning into the nut 373 mounted on the robot upper horizontal arm support 365 of the robot upper horizontal arm 369. The screw 374, the nut 375 and the robot upper horizontal arm support are more visible in FIG. 45, which is the Detail D10 of FIG. 35. The electric motor 376 with the two spur gears 377 and 378 activating the screw 379 can be seen in FIG. 50, which is the Detail D13 of FIG. 35;

The cables, the screw and the slides of the lower portion of the vertical column of the robot are protected by flexible accordion collars 380 and the screw and the slides of the upper portion of the vertical column of the robot are protected by flexible accordion collars 381, see FIG. 35. The cables, the screw and slides of the front portion of the robot upper horizontal arm are protected by flexible accordion collars 382, and the screw and slides of the rear portion of the robot upper horizontal arm are protected by flexible accordion collars 383, see FIG. 35. The cables, the screw and the slides of the lower horizontal robot arm, parallel to the rod border of the robot, located on the side of the power room, are protected by solid, metallic retractable covers 384 and the screw and the slides of the lower horizontal robot arm on the opposite side, are protected by solid, metallic retractable covers 385, see FIG. 35. To eliminate the heat produced by the electric current passing on the cables, the robot comprises a ventilation system. On three robot arms, at one of the extremities is installed a fan activated by an electric engine as following:

- for the lower horizontal robot arm, the fan 386 and its electric engine 387 are installed close to the electric motor 354, see FIG. 32. In its Detail D11 in FIG. 48, is shown the fan 388 and the electric engine 389;
- for the vertical column, the fan 390 and its electric engine 391 are installed on top of the column, see FIG. 32 and its Detail D12 in FIG. 49, the fan 392 and the electric engine 393;
- for the upper horizontal robot arm, the fan 394 and its electric engine 395 are installed on the rear side of the arm, see FIG. 35 and its Detail D13 in FIG. 50, the fan 396 and the electric engine 397.

Figure 37:
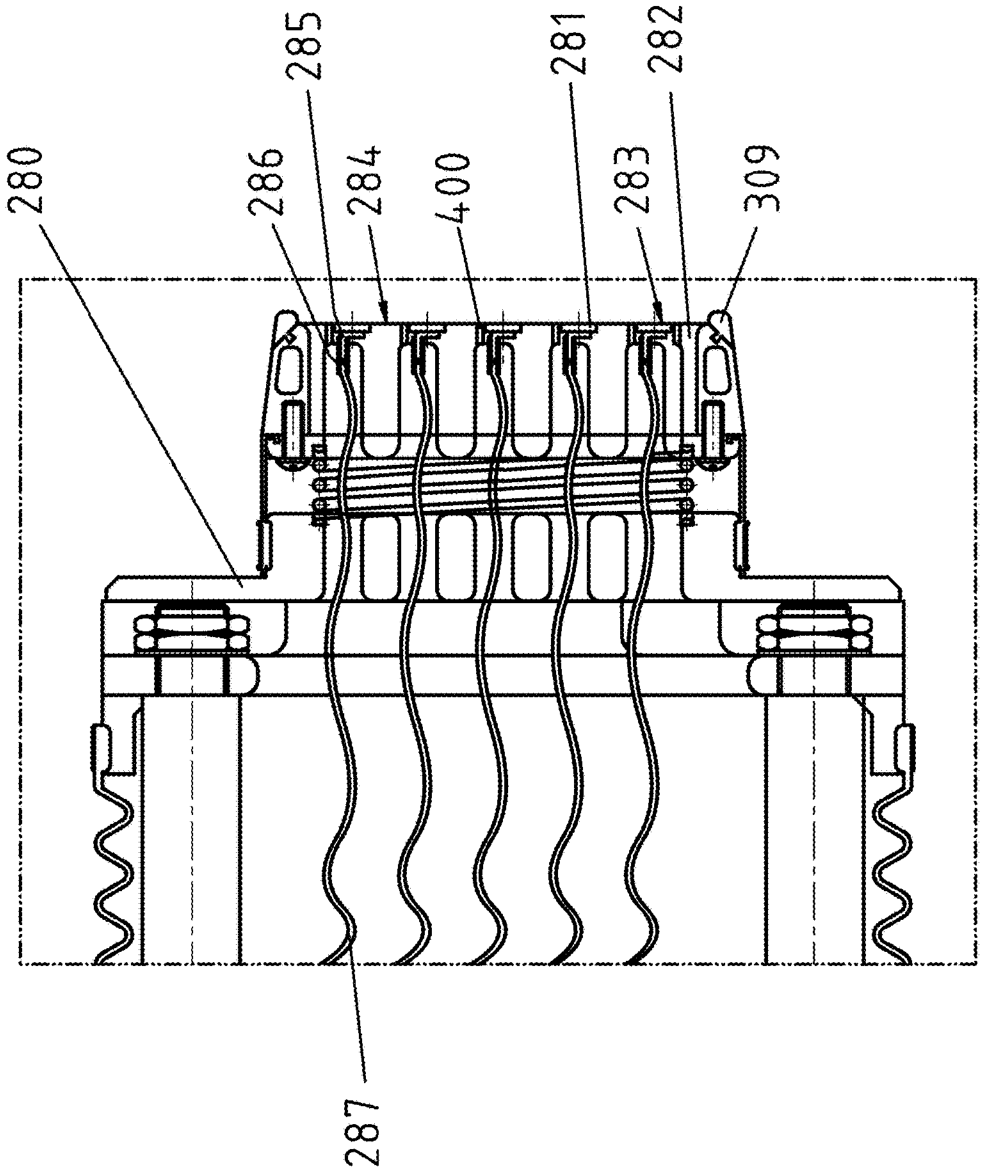
FIG. 37 is the detail D4 of the FIG. 35.
Figure 38:
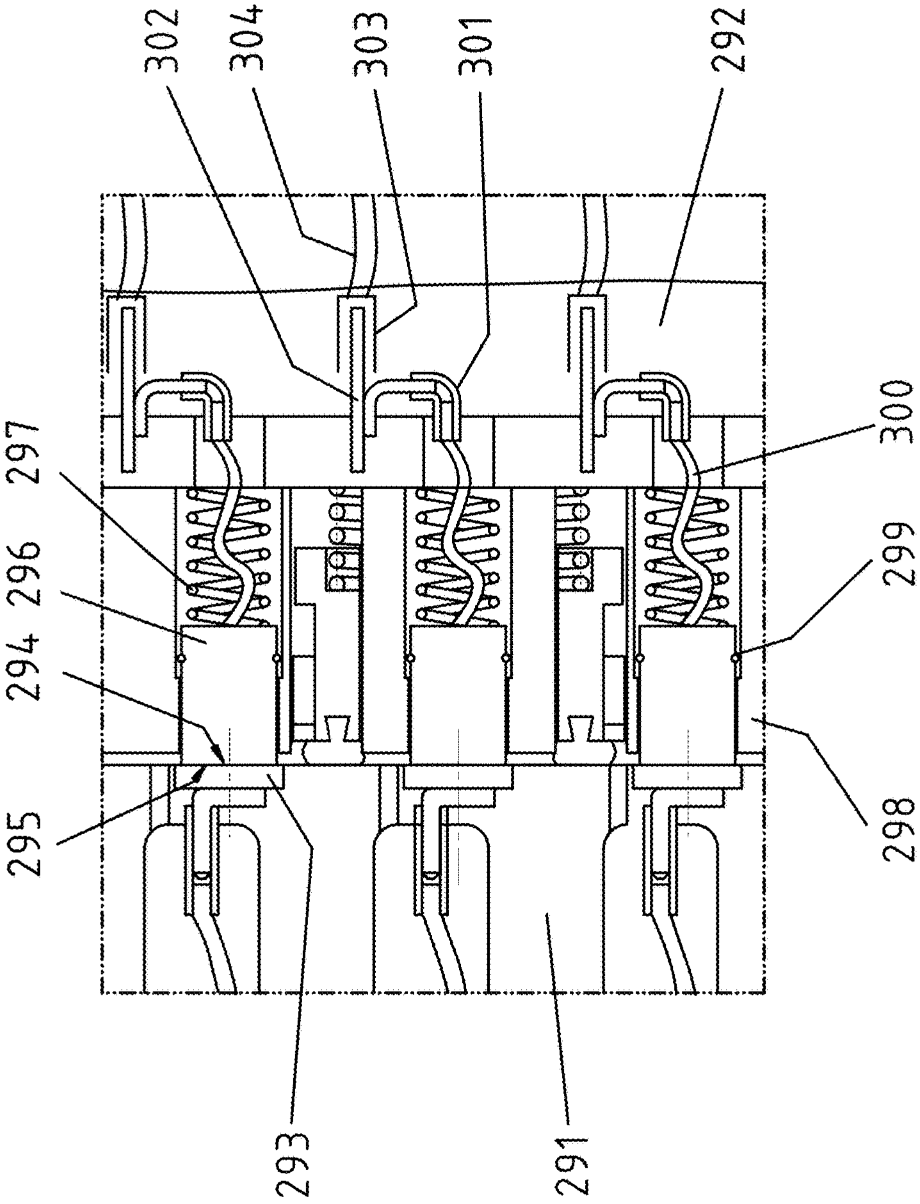
FIG. 38 is the detail D4 of the FIG. 36.
Figure 52:
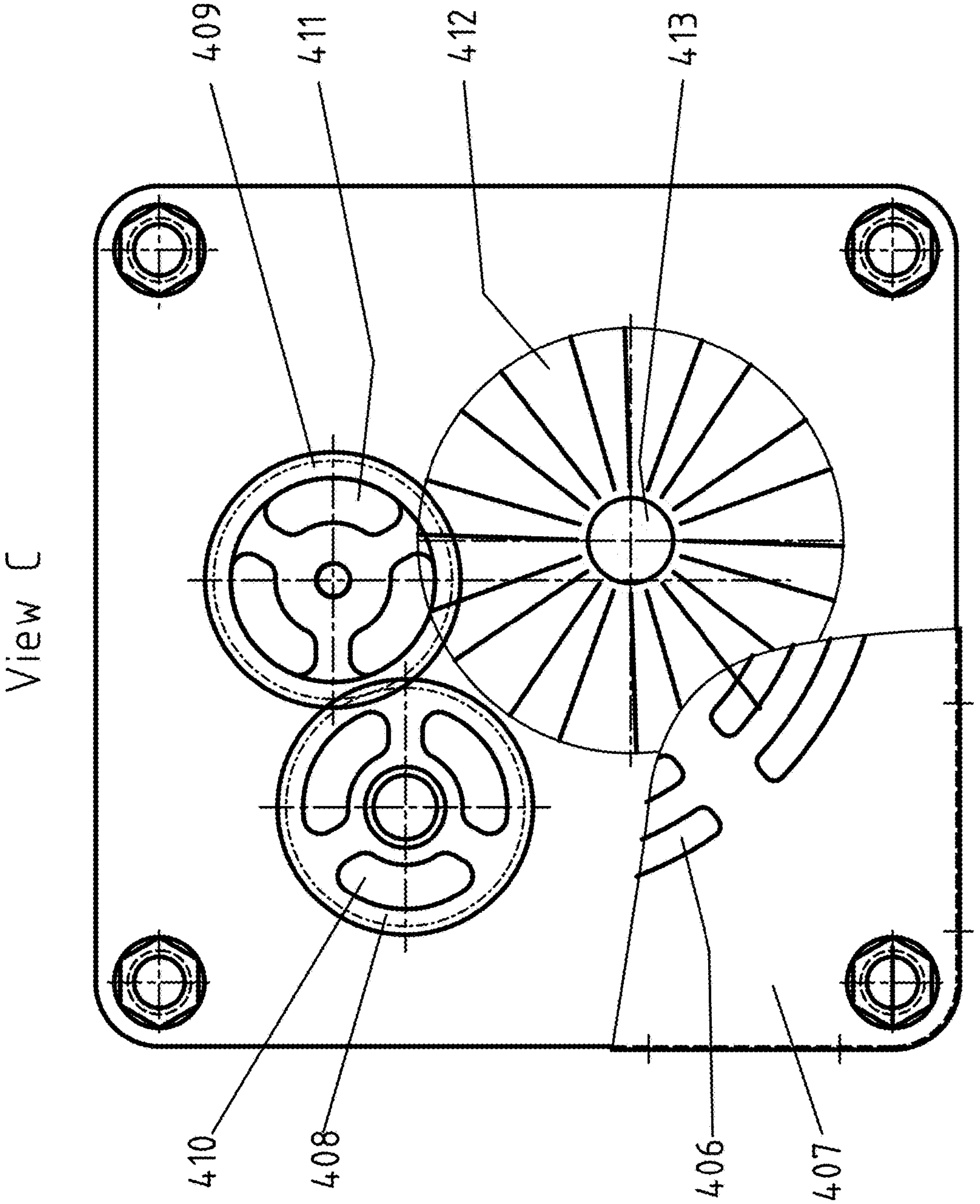
FIG. 52 is the view C of the FIG. 35.

The air is contained around the cables by the flexible accordion collars for the vertical column, for the robot upper horizontal arm and for the lower horizontal robot arm. The metallic retractable covers close the robot base and the underground room 337, which is also covered by a cover 398 (see FIG. 32). The air can circulate inside of these channels due to the windows in all robot arms and to the open space 334 between each of the single row connectors connector of the HV connector (see FIG. 47), the open space 399 between the segments of the VH connector 322 see FIG. 35. The cooling air can be present even into the EV inlet, arriving by the holes 400 drilled into the charger outlet contact assemble 282 (FIG. 37). The air is entering inside of the cooling channels of the lower horizontal arm 401 by the plurality of holes 402 of the cover 403, see FIG. 51, which is the View E shown in FIG. 32. In the vertical robot column, the air enters by the plurality of slots 404 of the cover 405, see FIG. 49 which is the Detail D12 of the FIG. 32. The air is entering inside of the cooling channels of the upper horizontal arm by the plurality of holes 406 of the cover 407, see FIG. 52, which is the View C of FIG. 35. In FIG. 52 are also shown two typical spur gears 408 and 409, used to turn the upper horizontal arm screw, having the openings 410 and 411 in order to allow the passing of the cooling air pushed by the fan 412, activated by the electric engine 413. In case that the air-cooling system is not quite efficient, (in the summertime and in warmer regions), an AC cooling system may be used, consisting in a compressor 414, a coil 415 and a fan 390 installed on the top of the vertical robot arm, (see FIG. 32). The compressor 416, the coil 417 and the fan 392 may be seen in FIG. 49, which is the detail D12 of FIG. 32.

Figure 53:
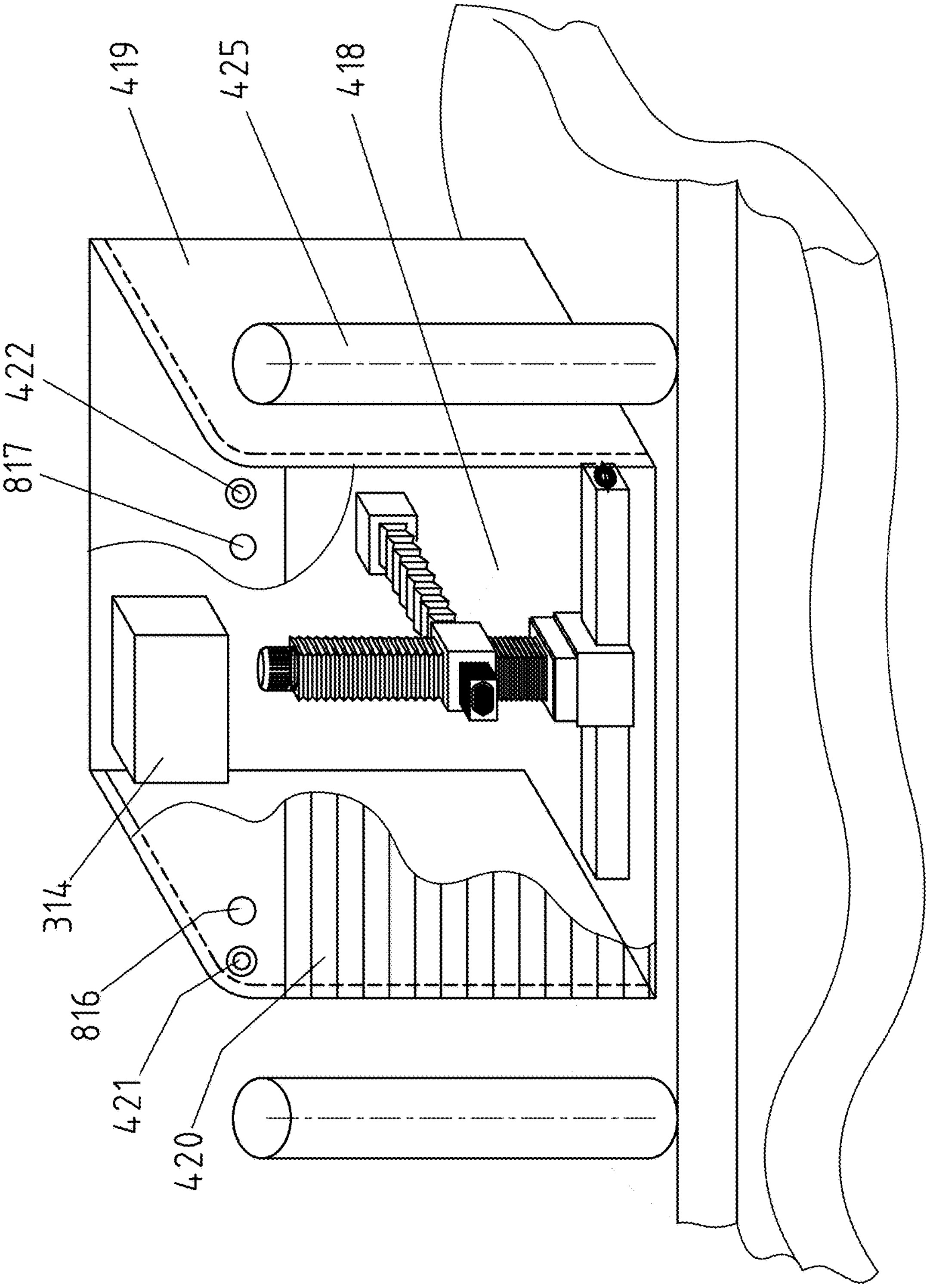
FIG. 53 is an isometric view of a linear robot with its enclosure and its safety posts.

The charger is connected to the city grid by an electric panel 338 located in the underground chamber 337 under the robot, see FIG. 32. As shown in FIG. 53, the robot 418 is protected by an enclosure 419 closed by a vertical shutter 420, located on the roadside, which stays closed all time the charger is not active and open when an electric vehicle enters the recharge station, identified by two cameras 421 and 422 mounted on the enclosure 419. The vertical shutter 420, the robot 418 and the charging process are all controlled by the controller 314 located inside of the enclosure 419, with access from the rear of the enclosure. The controller 314 is connected to the EV intelligent system and the driver telephone by internet, running a special App "Automatic EV Recharge Application" (AEVRA).

The AEVRA is an application allowing via internet the communication between the Automatic EV Recharge System (AEVRS)—including the EV computer, the cameras, the robot (including the shutter), the EV recharge electric system—the EV intelligent system, the driver telephone and the financial institutions connections. During the entire recharge time, the driver has to remain into the EV, the driver intervention being a vocal communication with the AEVRS. Therefore, when an EV approaches to the recharge station, a proximity sensor 817 located on the robot cabin notices that and gives a signal to the transmitter 816 located on the robot cabin to send a signal to the EV to open the EV inlet cover. Then, the shutter opens, and all EV recharge process is automatic, the driver is guided to place the EV in the right position and location based on the information send by the cameras mounted on the robot enclosure. Based on the EV plate number, the AEVRS recognizes the potential drivers. By asking who the actual driver behind the wheel is, the AEVRS can ask other questions to identify the driver, who verbally communicate with the system for identification.

Once the EV is stopped, the robot plugs the charger outlet into the EV inlet, activating the button control switches 432 and 435 (see FIG. 54), and the electromagnet 277 (see FIG. 36). Consecutively, on the driver screen (EV screen or Phone screen) are transmitted all information related to the recharge process (actual battery Kwh, recharge time for 80% battery recharge, cost, etc.). The driver can choose a different % or time of recharge and the system returns the new corrected information. By vocal command, the driver approves the new information, and the recharge process begins. Within max 5 minutes, the battery is recharged to 80% of its capacity, the power supply units are disconnected from the charger outlet, the robot pools out the charger outlet from the EV inlet, the driver is informed on the final status of the battery and on the cost. The driver approves vocally the payment and goes out of the recharge station. The robot retracts the arms in the waiting position and the shutter is closed.

The robot enclosure 419 is protected against any accidental hit by the posts 425, see FIG. 53.

The recharge time reduction factor depends, as mentioned before, on the number of independent modules of the EV battery. Bigger the independent modules number, bigger the recharge time reduction factor, smaller the recharge time.

Table 2 illustrates the relationship between the number of battery independent modules and the recharge time for a case considering a battery with a capacity of 60 Kwh, the power supply units connected to the three-phase city grid, having a power of 15 KW to recharge each battery independent module. With these parameters, in the actual battery design, using a battery with a single module it takes 4 hours to recharge this battery. In the new design, depending on the number of independent modules from 72 to 144, the recharge time is from 3.3 to 1.7 minutes, which is a huge difference. Here is the principle, the industry will decide what is the optimum number of independent modules per battery and they will design the batteries and the chargers consequently.

TABLE 2

| [KWh] | Amps | Volts | KW | Number of Independent Modules | Number of Phases | Recharge Time [Hrs] | Recharge Time [Min] | Status |
|---|---|---|---|---|---|---|---|---|
| 60 | 44.12 | 340 | 15 | 1 | 1 | 4 | 240 | Actual |
| 60 | 44.12 | 340 | 15 | 72 | 3 | 0.056 | 3.3 | New |
| 60 | 44.12 | 340 | 15 | 96 | 4 | 0.042 | 2.5 | New |
| 60 | 44.12 | 340 | 15 | 120 | 5 | 0.033 | 2 | New |
| 60 | 44.12 | 340 | 15 | 144 | 6 | 0.028 | 1.7 | New |

Figure 54:
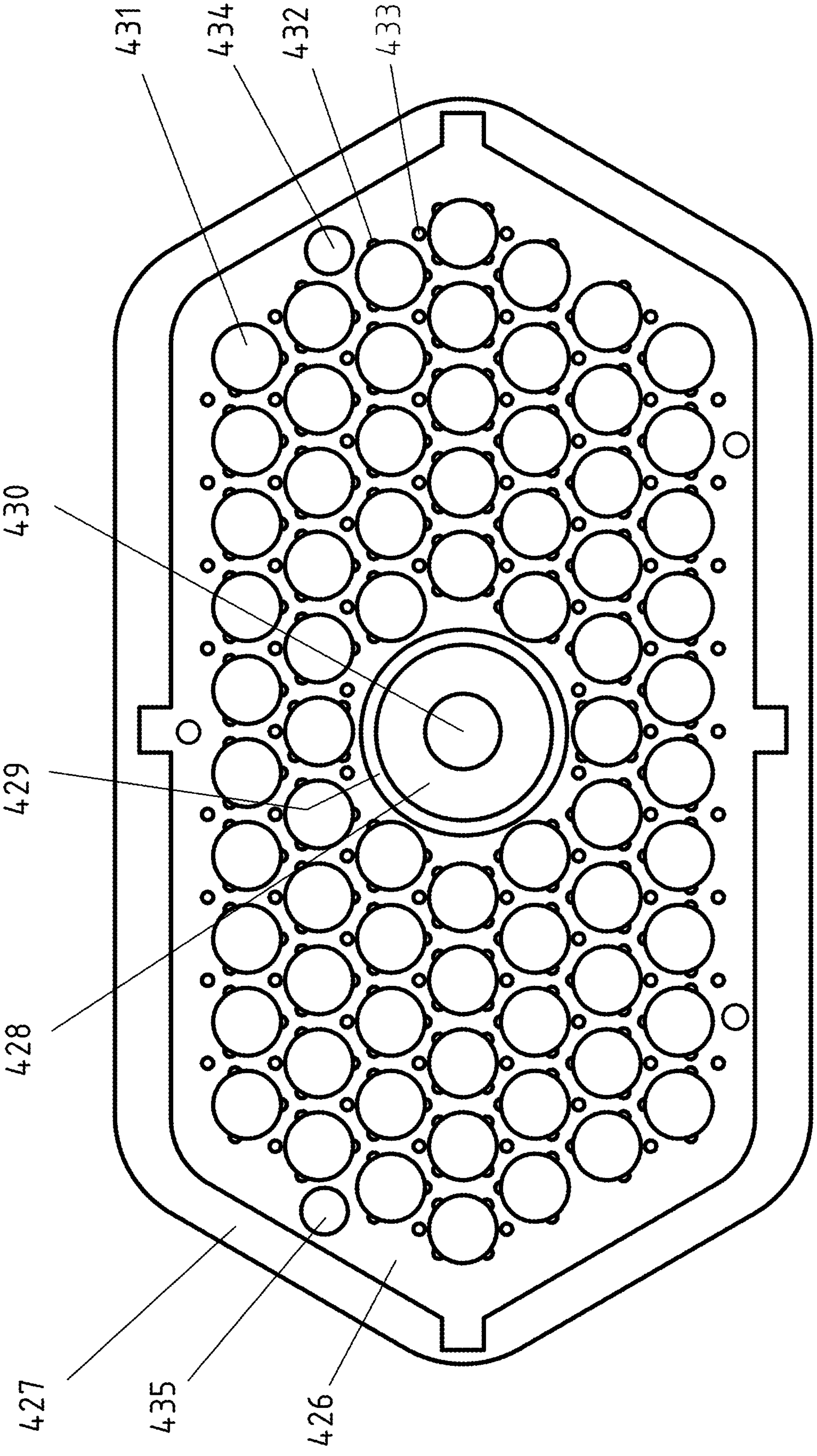
FIG. 54 shows an embodiment of an EV inlet having 72 independent modules (contacts)

In FIG. 54 is shown an embodiment of an EV inlet having 72 independent modules (contacts), so, with a recharge time reduction factor of 1/72, capable to recharge a 60 KWH battery within 3.3 minutes. It is shown the EV inlet assemble 426, into which is incorporated the iron plate 427, which clamps on the electromagnet of the charger outlet when the electromagnet is activated. On the central position is the damper 428 with its ring 429 made of a soft material, and in the centre is the electric graphite positive contact 430. The 72 electric graphite negative contacts 431 are located on 5 rows of 10 per row (50) and on 2 rows of 11 per row (22) for a total of 72 negative contacts. Around each graphite contact there are three axial semi-circular slots 432 used by the cooling system as well as the plurality of little cooling holes 433 to cool the graphite. On the lateral position of the EV inlet are located two button control switches 434 and 435.

Figure 55:
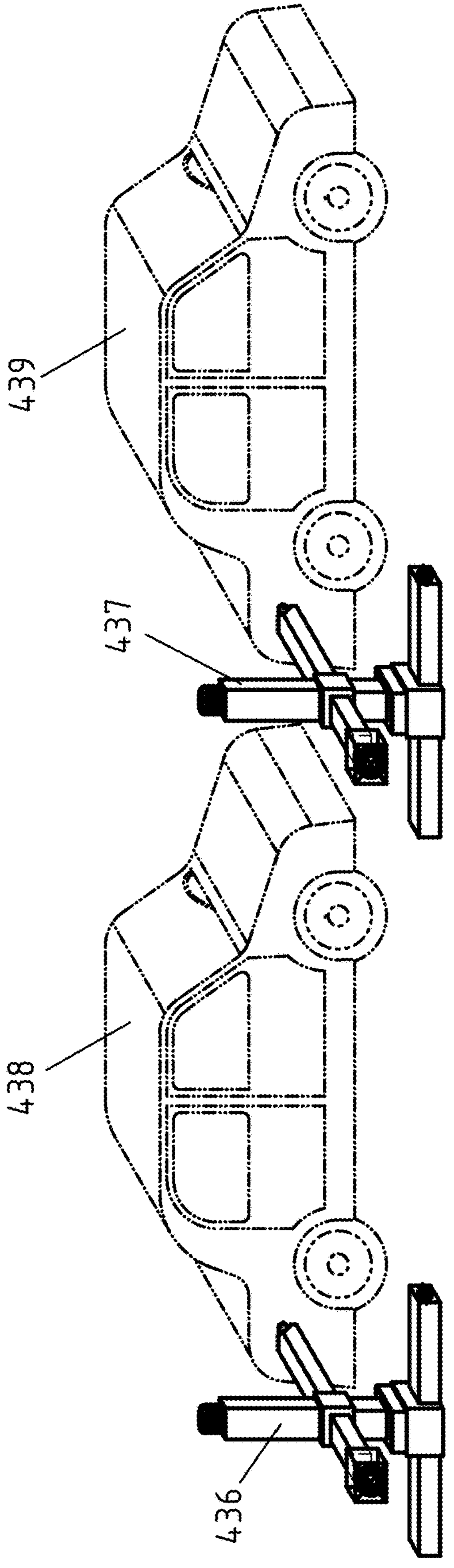
FIG. 55 is an isometric view of a recharge station having two linear robots recharging simultaneously two electric cars.
Figure 56:
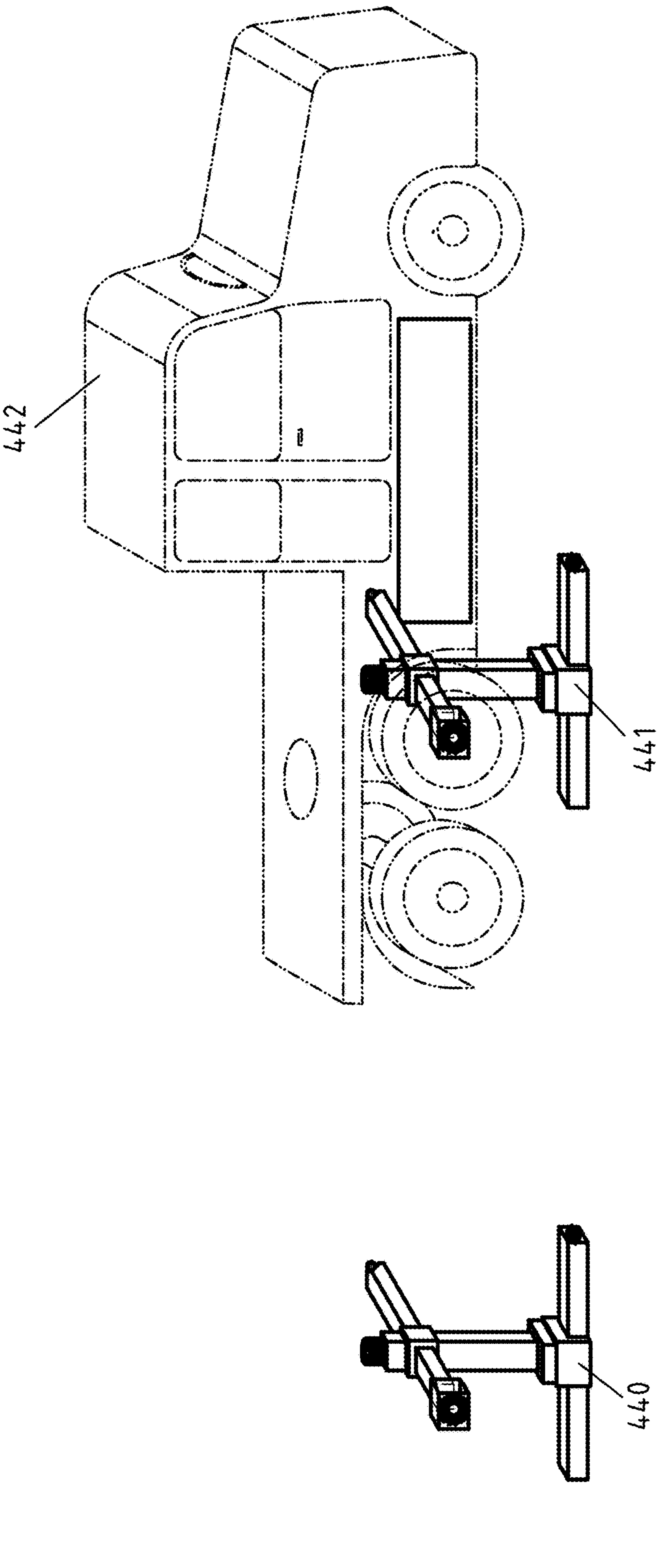
FIG. 56 is an isometric view of a recharge station having two linear robots recharging an electric truck.
Figure 57:
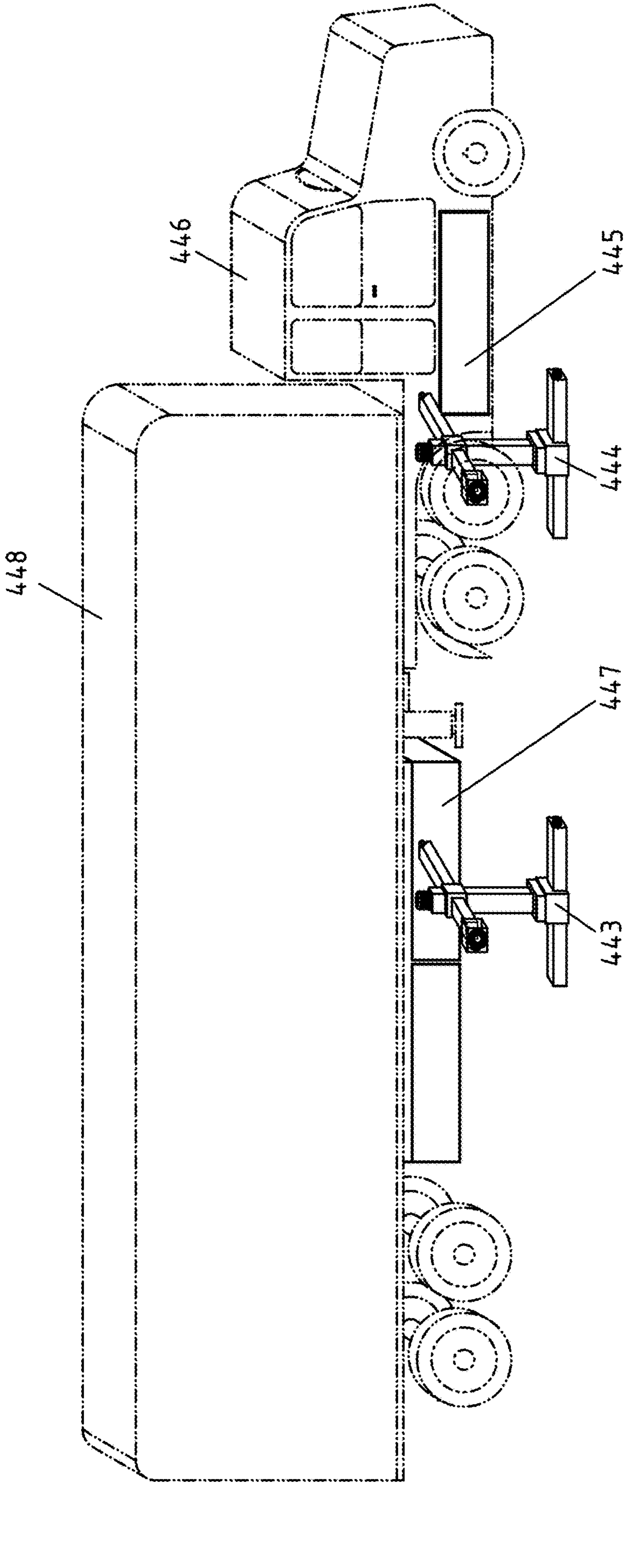
FIG. 57 is an isometric view of a recharge station having two linear robots recharging simultaneously an electric truck and an electric trailer
Figure 58:
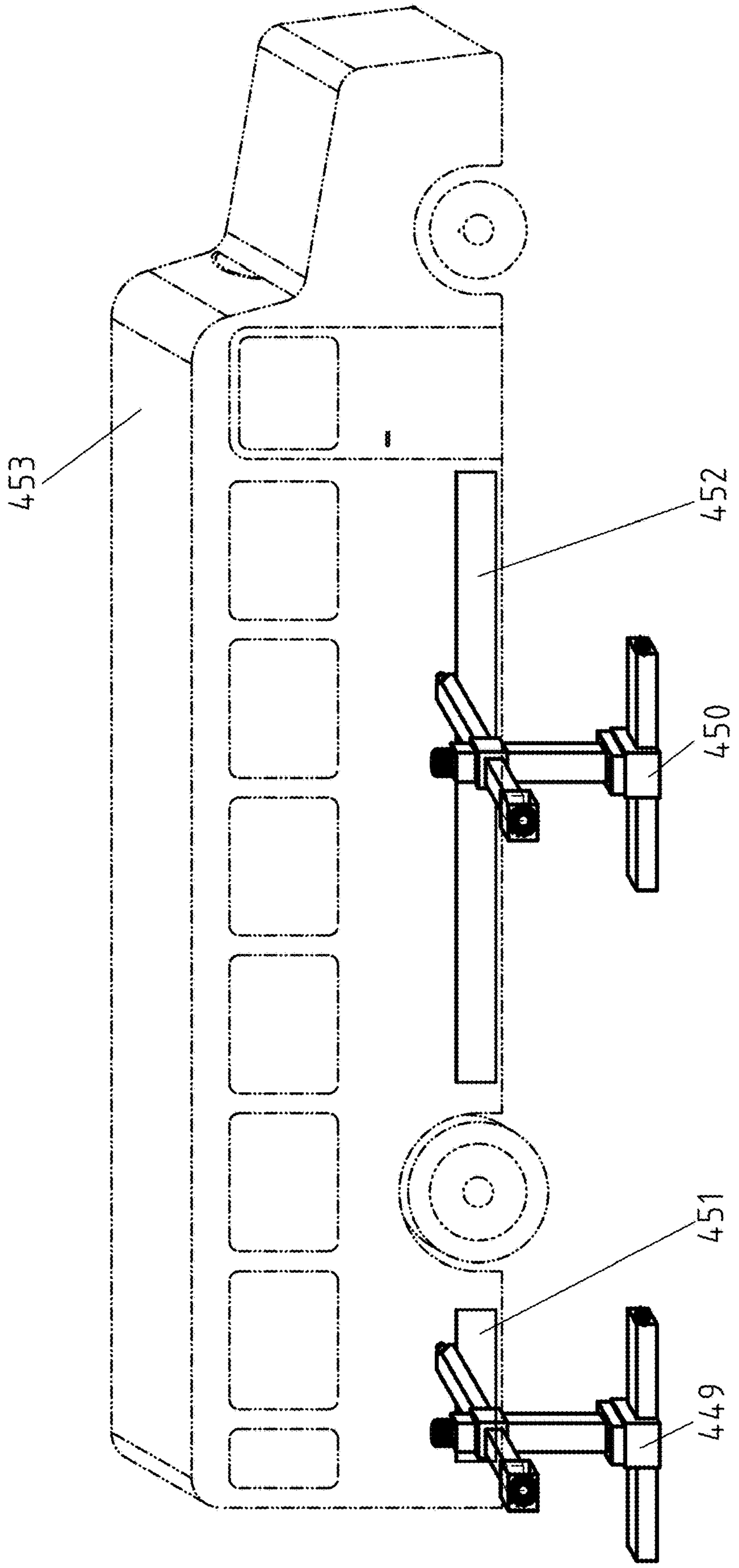
FIG. 58 is an isometric view of a recharge station having two linear robots recharging simultaneously the battery an electric school buss.
Figure 59:
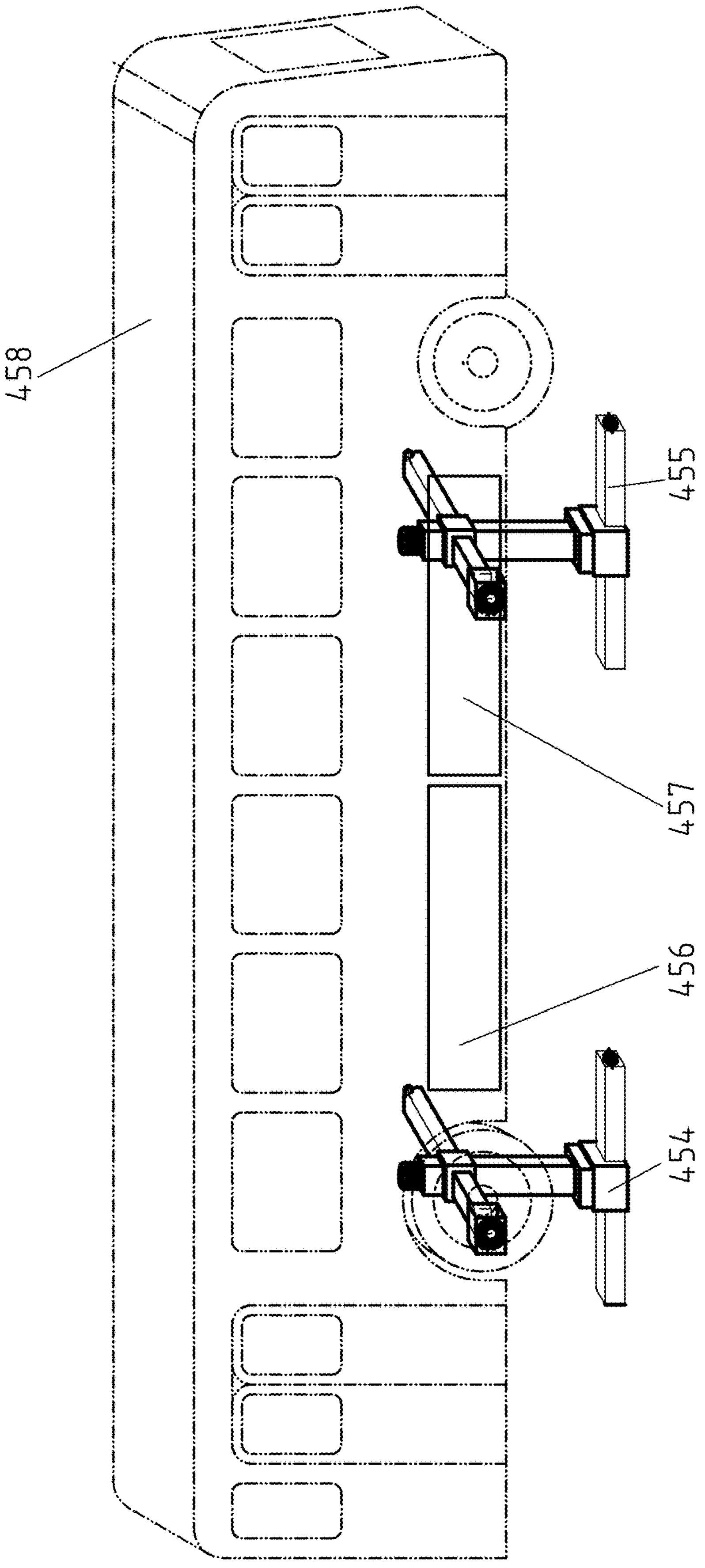
FIG. 59 is an isometric view of a recharge station having two linear robots recharging simultaneously an electric city buss.
Figure 60:
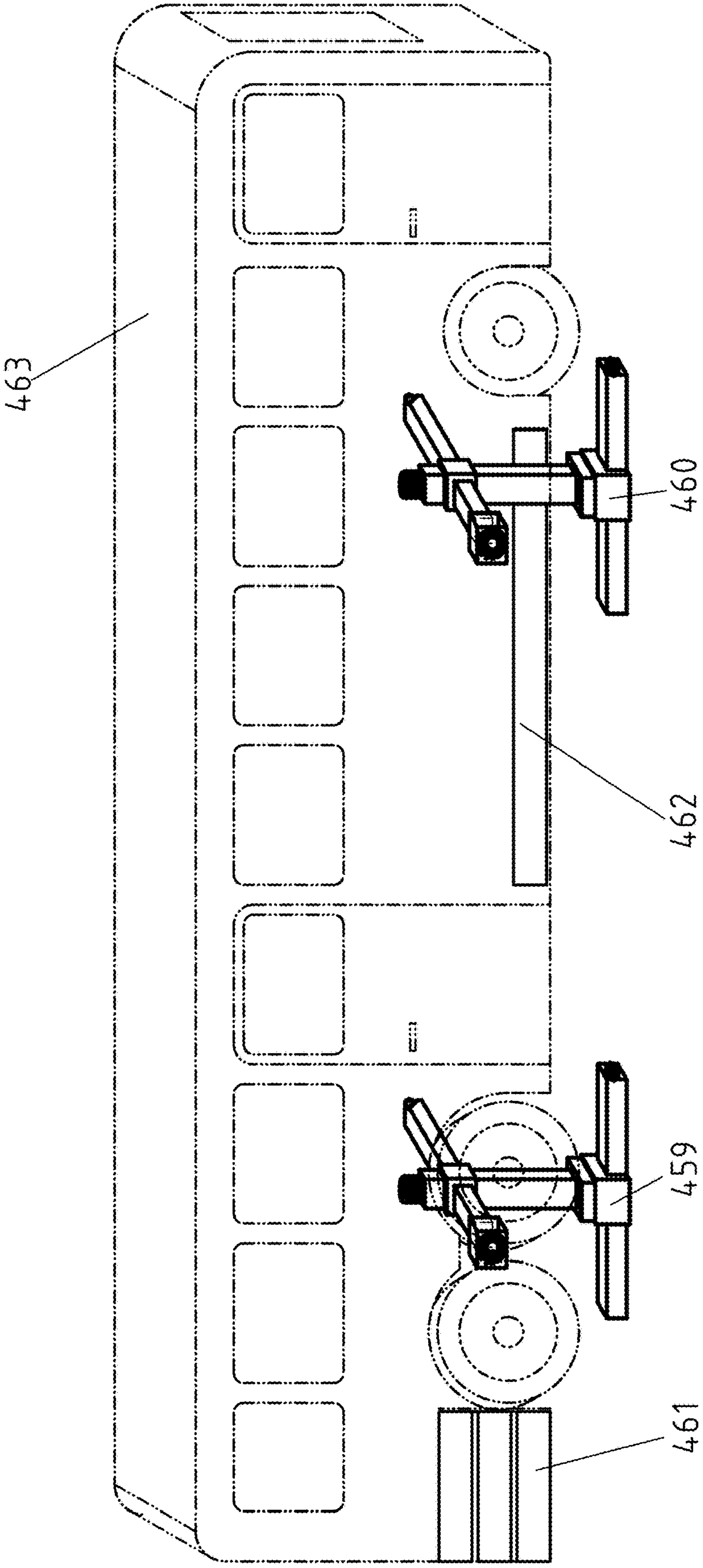
FIG. 60 is an isometric view of a recharge station having two linear robots recharging simultaneously an electric inter-city buss.

FIG. 55 is an isometric view of a recharge station having two robots 436 and 437, recharging simultaneously two electric cars 438 and 439. FIG. 56 is an isometric view of a recharge station having two robots 440 and 441, recharging an electric truck 442. FIG. 57 is an isometric view of a recharge station having two robots 443 and 444, recharging simultaneously the battery 445 of the electric truck 446 and the battery 447 of the trailer 448. The recharge time will be reduced 144 times for 72 contacts or 192 times for 96 contacts. FIG. 58 is an isometric view of a recharge station having the same two robots 449 and 450, recharging simultaneously the battery 451 and 452 of the electric school buss 453. The recharge time will be reduced 144 times for 72 contacts or 192 times for 96 contacts. FIG. 59 is an isometric view of a recharge station having the same two robots 454 and 455, recharging simultaneously the battery 456 and 457 of the electric city buss 458. The recharge time will be reduced 144 times for 72 contacts or 192 times for 96 contacts. FIG. 60 is an isometric view of a recharge station having the same two robots 459 and 460, recharging simultaneously the battery 461 and 462 of the electric inter-cities buss 463. The recharge time will be reduced 144 times for 72 contacts or 192 times for 96 contacts. To be able to do all these recharges shown in FIG. 55 to FIG. 60, it is necessary to have the two robots at the same distance in all recharge stations, and the EV inlets of the double EV inlet per vehicle positioned at the same distance, (some variations are allowed due to the possibility of the robots to move parallel with the rod border). Also, the height of the EV inlet must be in a certain interval, to be reached by the charger outlet.

Figure 61:
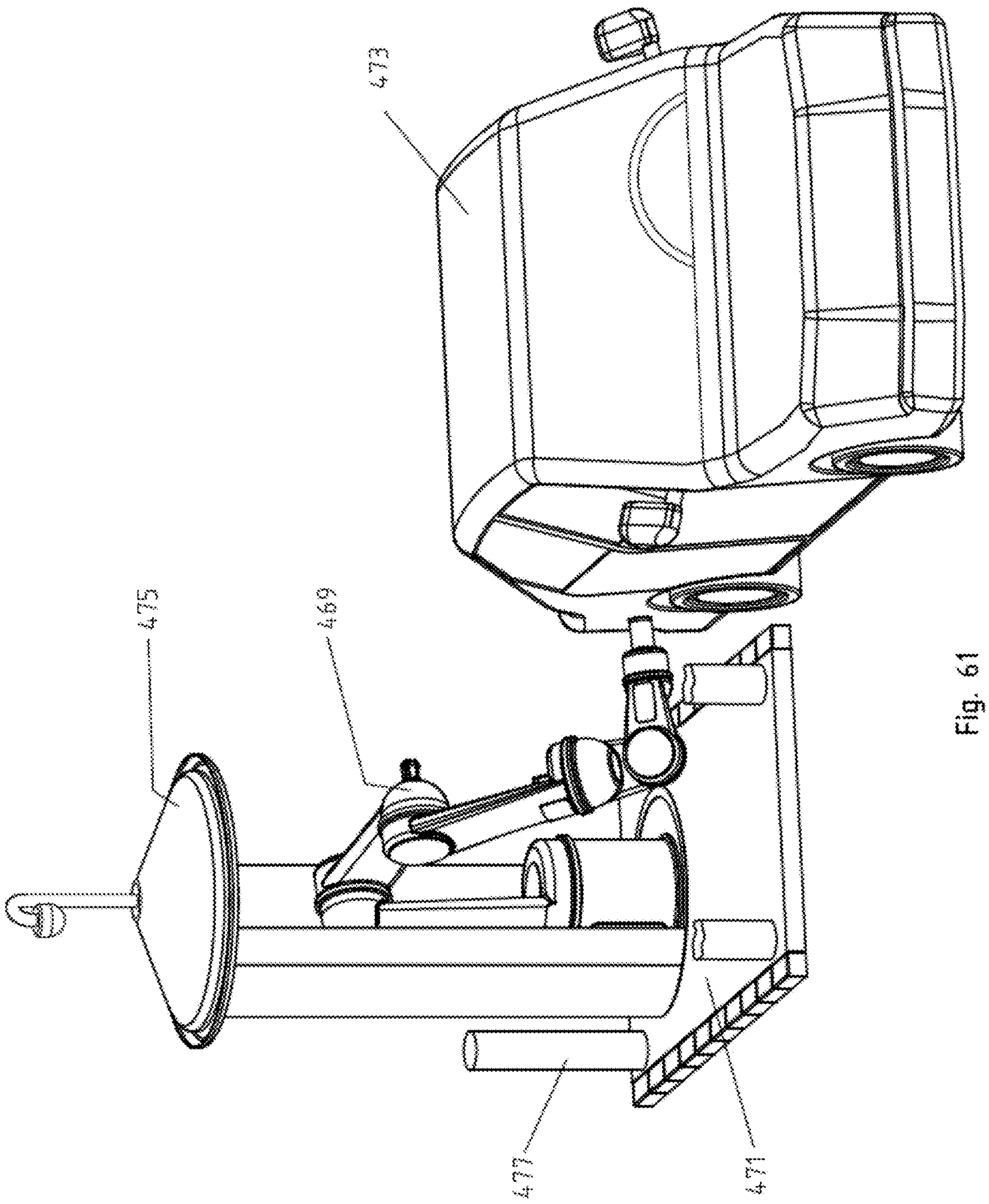
FIG. 61 is an isometric view of a recharge station having a rotary robot recharging an electric car having the EV inlet on the opposite side of the driver.
Figure 62:
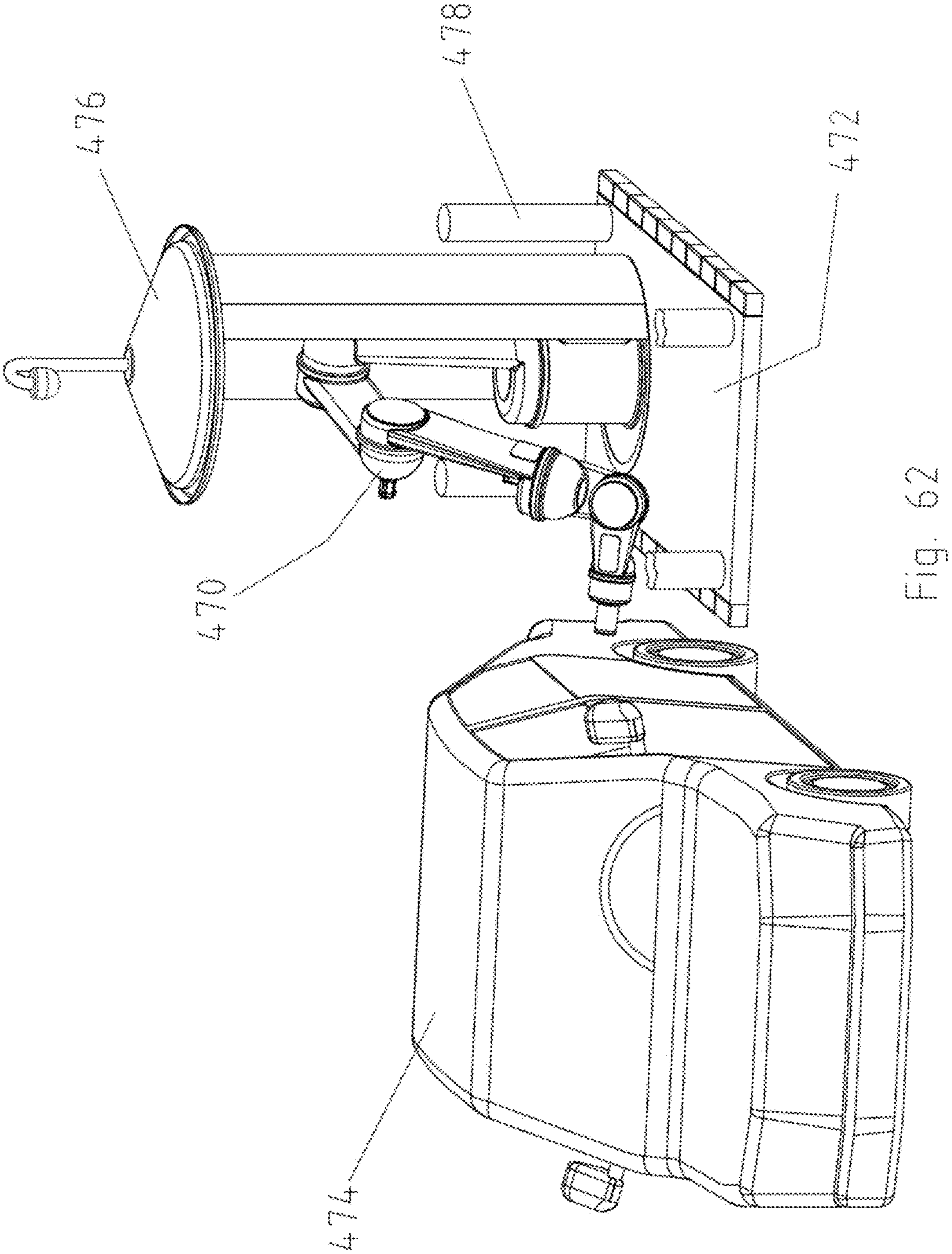
FIG. 62 is an isometric view of a recharge station having a rotary robot recharging an electric car having the EV inlet on the driver side.
Figure 63:
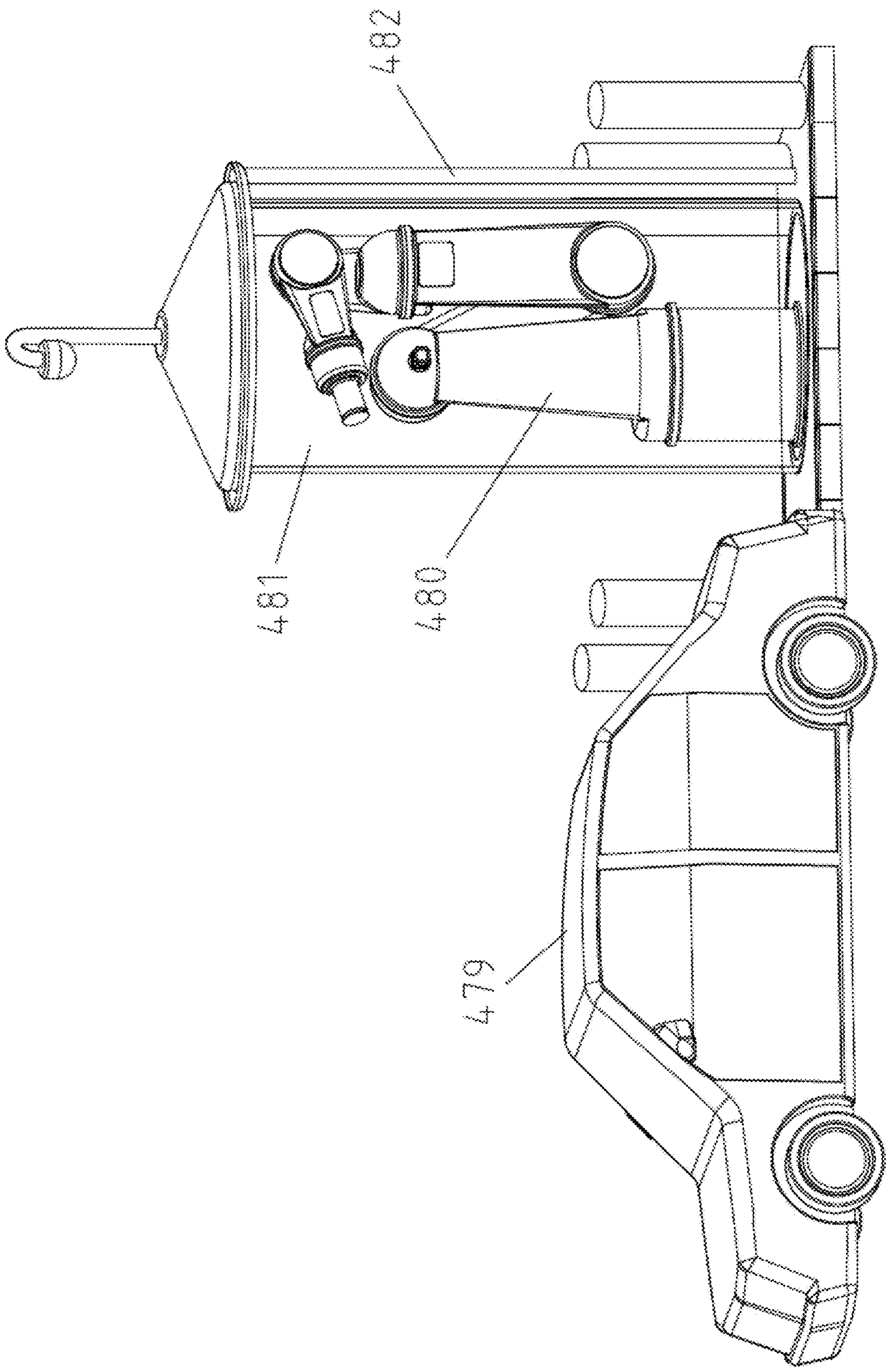
FIG. 63 is an isometric view of a recharge station having a rotary robot retracted into its cabin after recharging an electric car.
Figure 64:
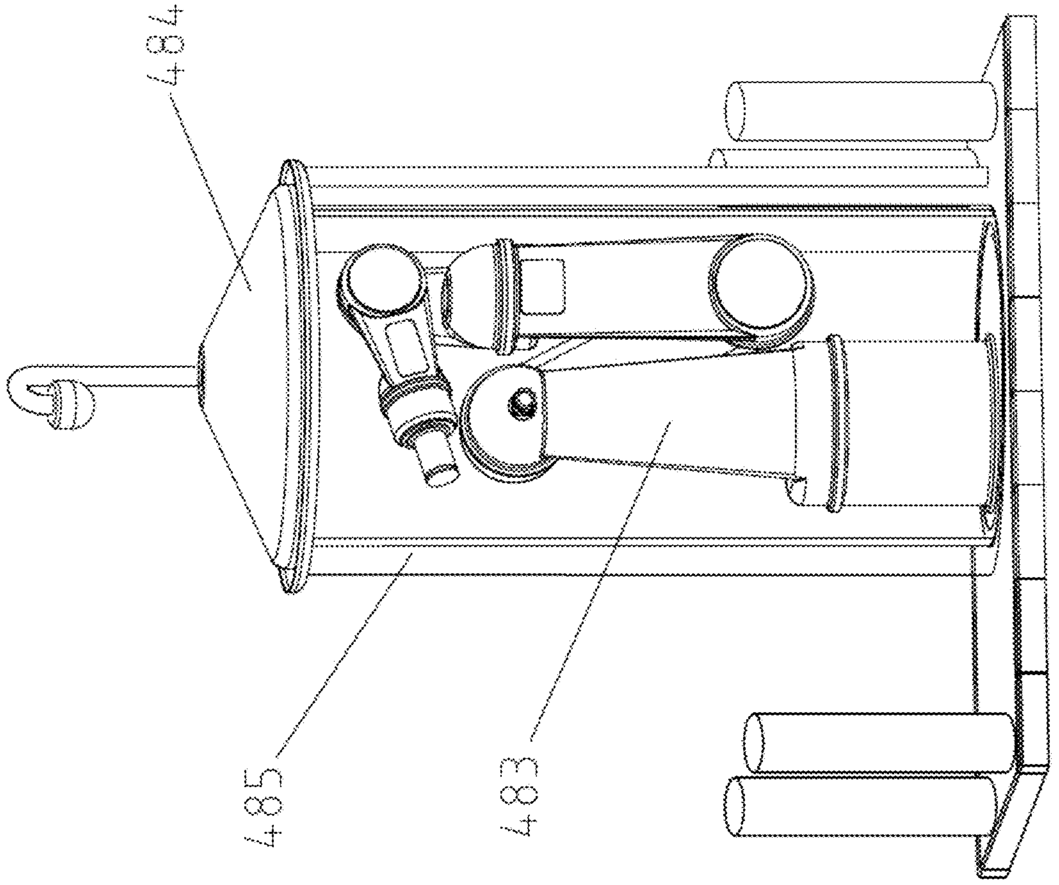
FIG. 64 is an isometric view of a recharge station having a rotary robot retracted into its cabin in a standby position.
Figure 65:
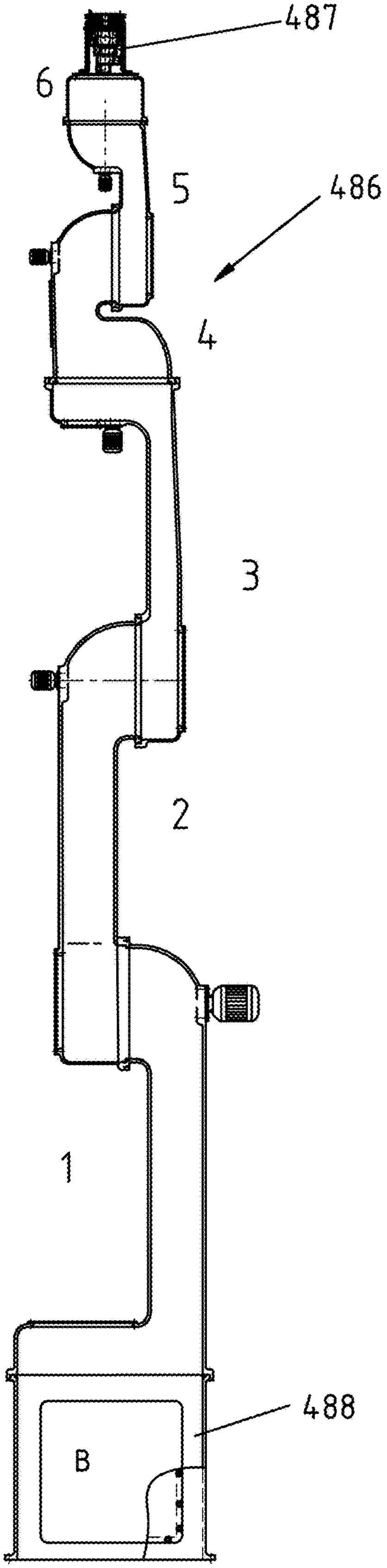
FIG. 65 shows an embodiment of a six arms rotary robot all arms in vertical position.
Figure 66:
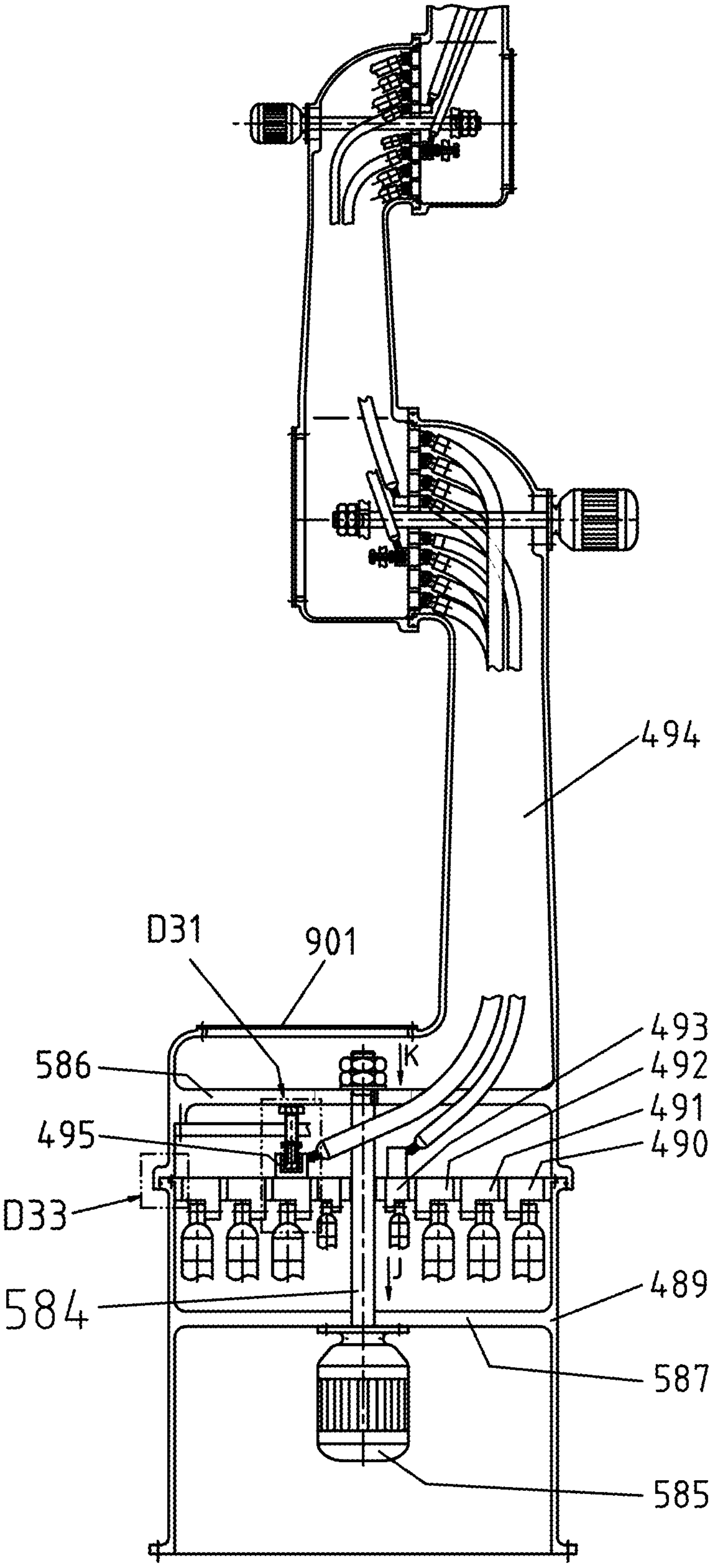
FIG. 66 shows a partial cross section of six arms rotary robot.
Figure 68:
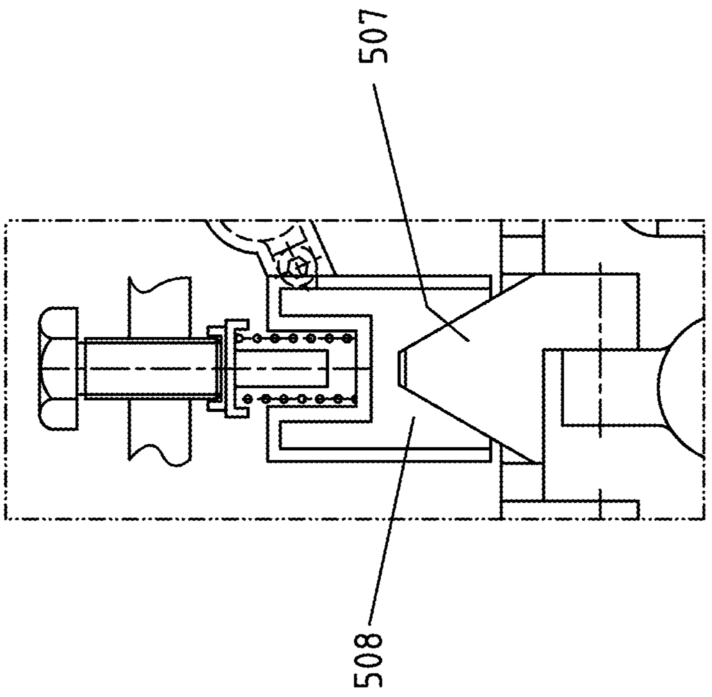
FIG. 68 shows a copper ring and a collector having male and female in “V” shape.
Figure 67:
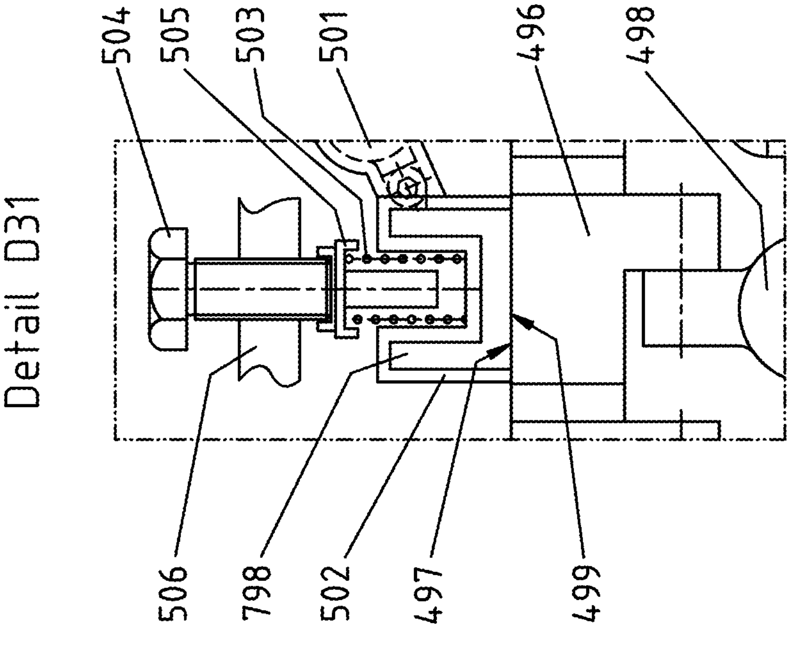
FIG. 67 is the detail D31 of the FIG. 66.
Figure 69:
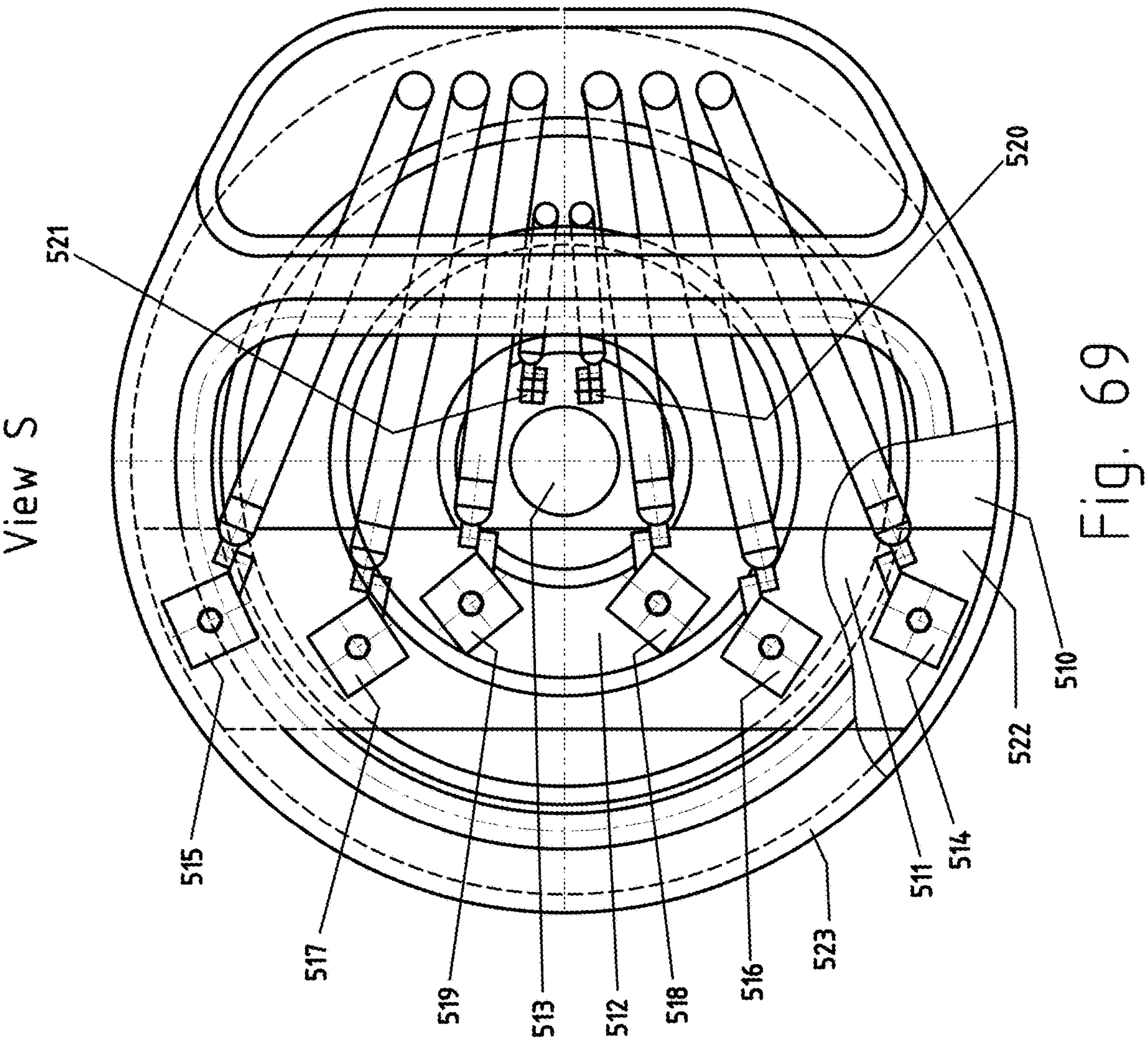
FIG. 69 is the Section S1-S1" of FIG. 66.
Figure 70:
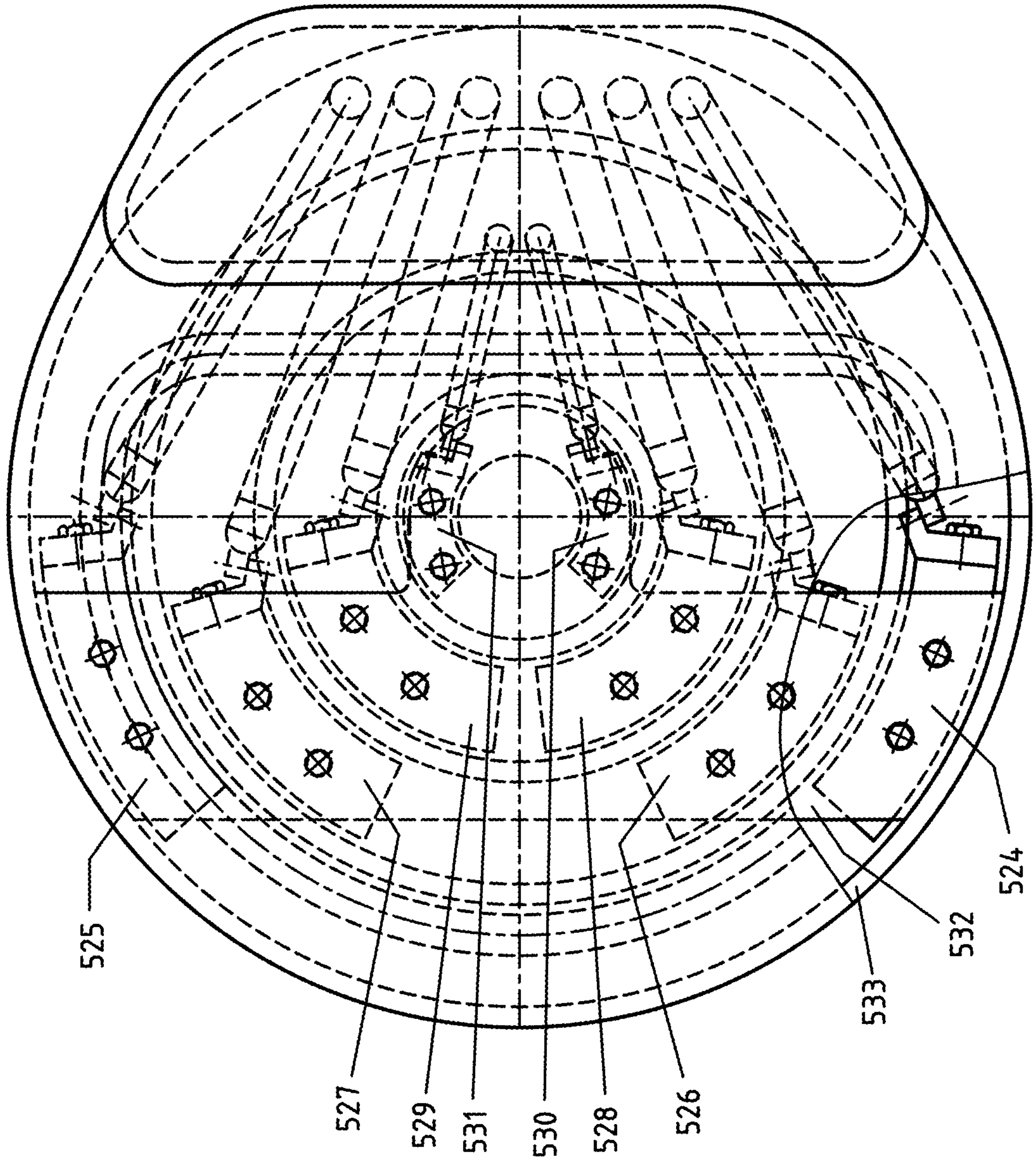
FIG. 70 is the Section S-S of FIG. 66, showing bigger collectors (one pair per ring) and their support, rigidly attached to the robot body.
Figure 71:
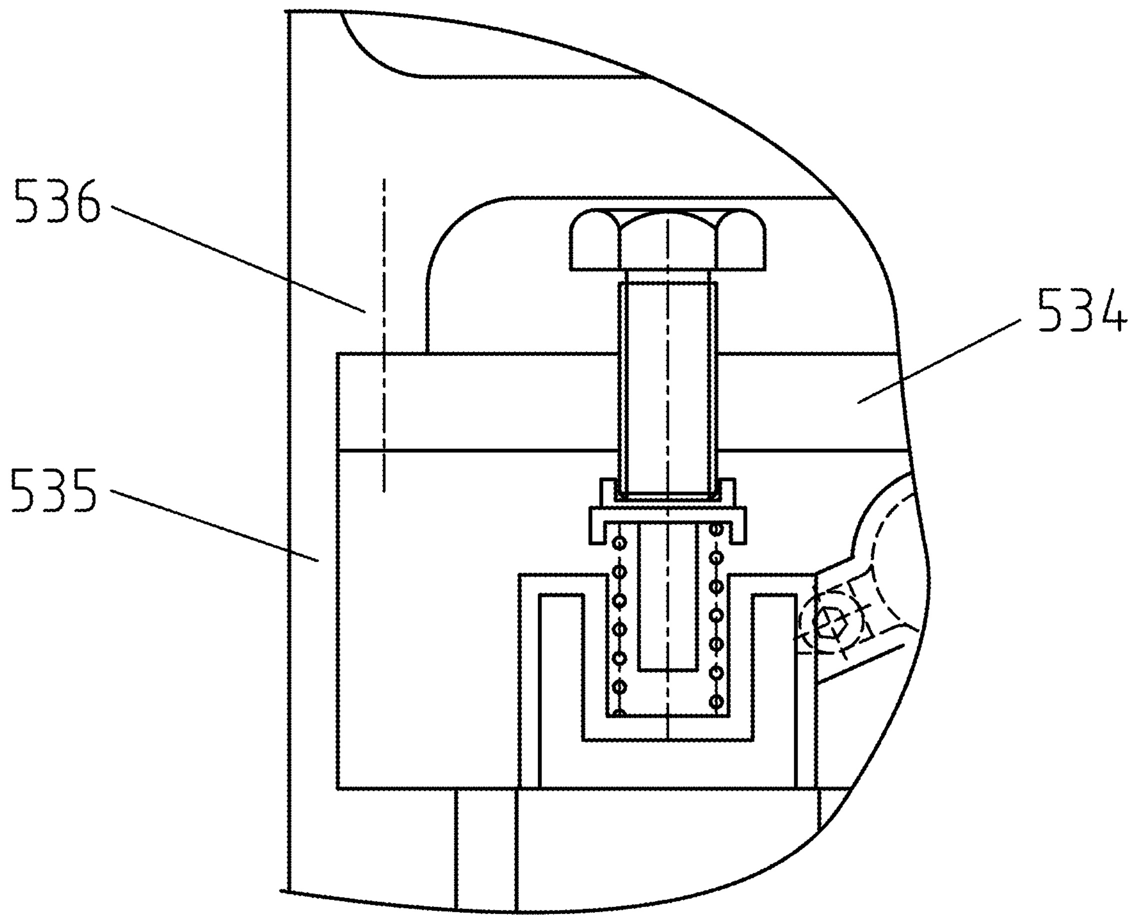
FIG. 71 is the Detail D33 of the FIG. 66, showing how the collectors support is installed rigidly on the robot body and the detail of the joint between two robot arms.
Figure 72:
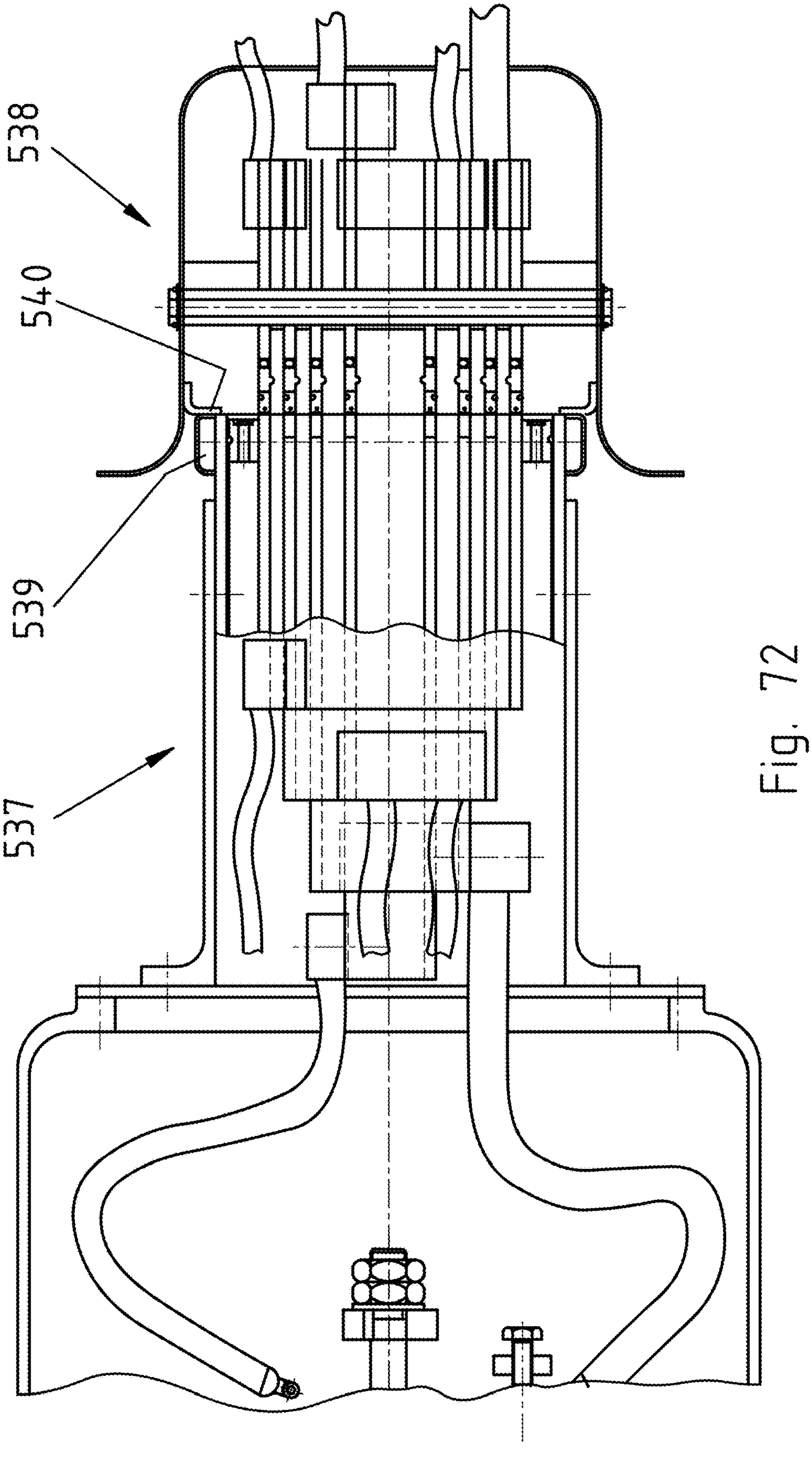
FIG. 72 shows the last arm of a rotary robot engaged into the EV inlet.
Figure 73:
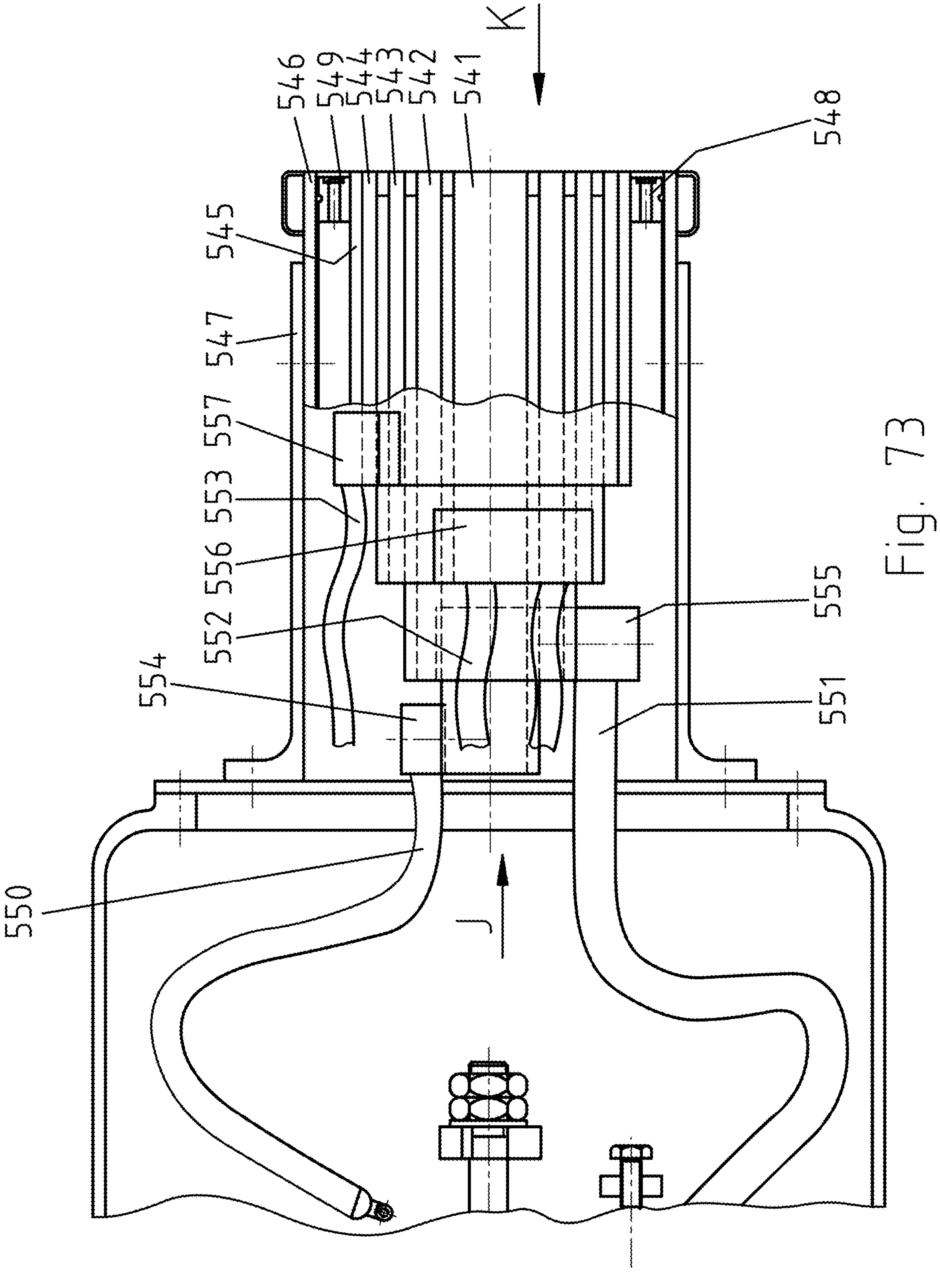
FIG. 73, shows the tubular phase-contacts of the charger outlet of a rotary robot.
Figure 74:
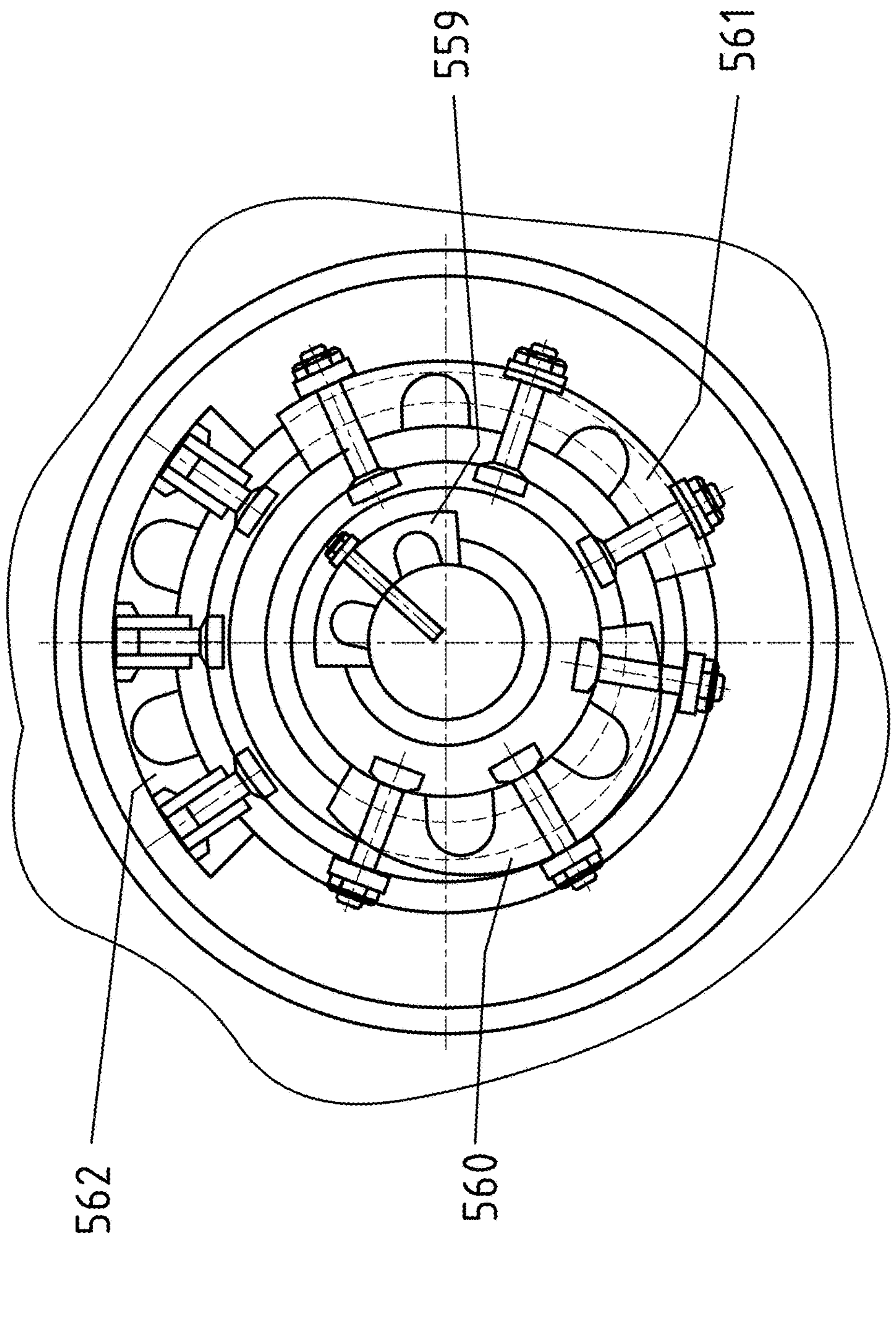
FIG. 74 is the view J of FIG. 73.
Figure 75:
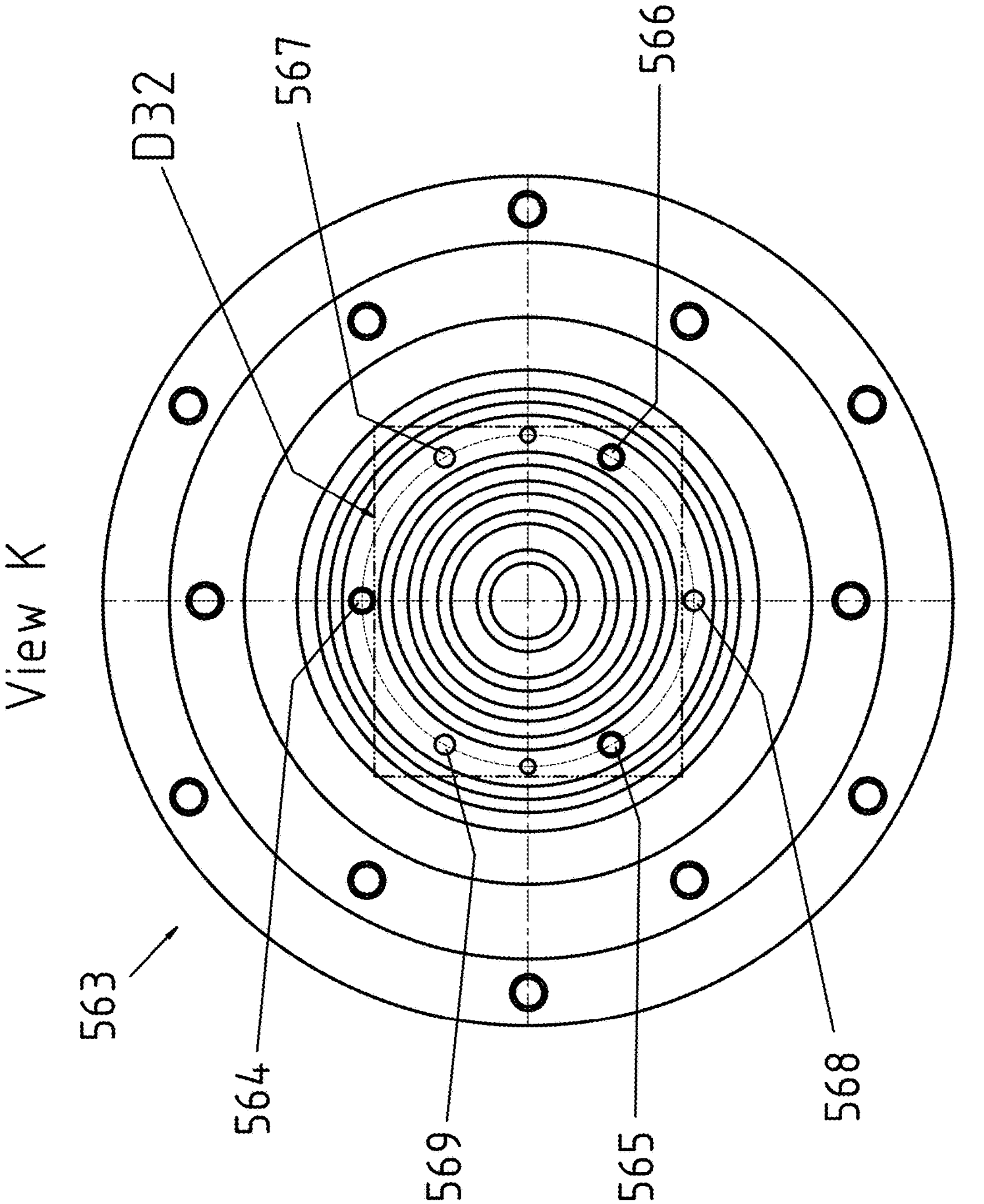
FIG. 75 is the view K of FIG. 73.
Figure 76:
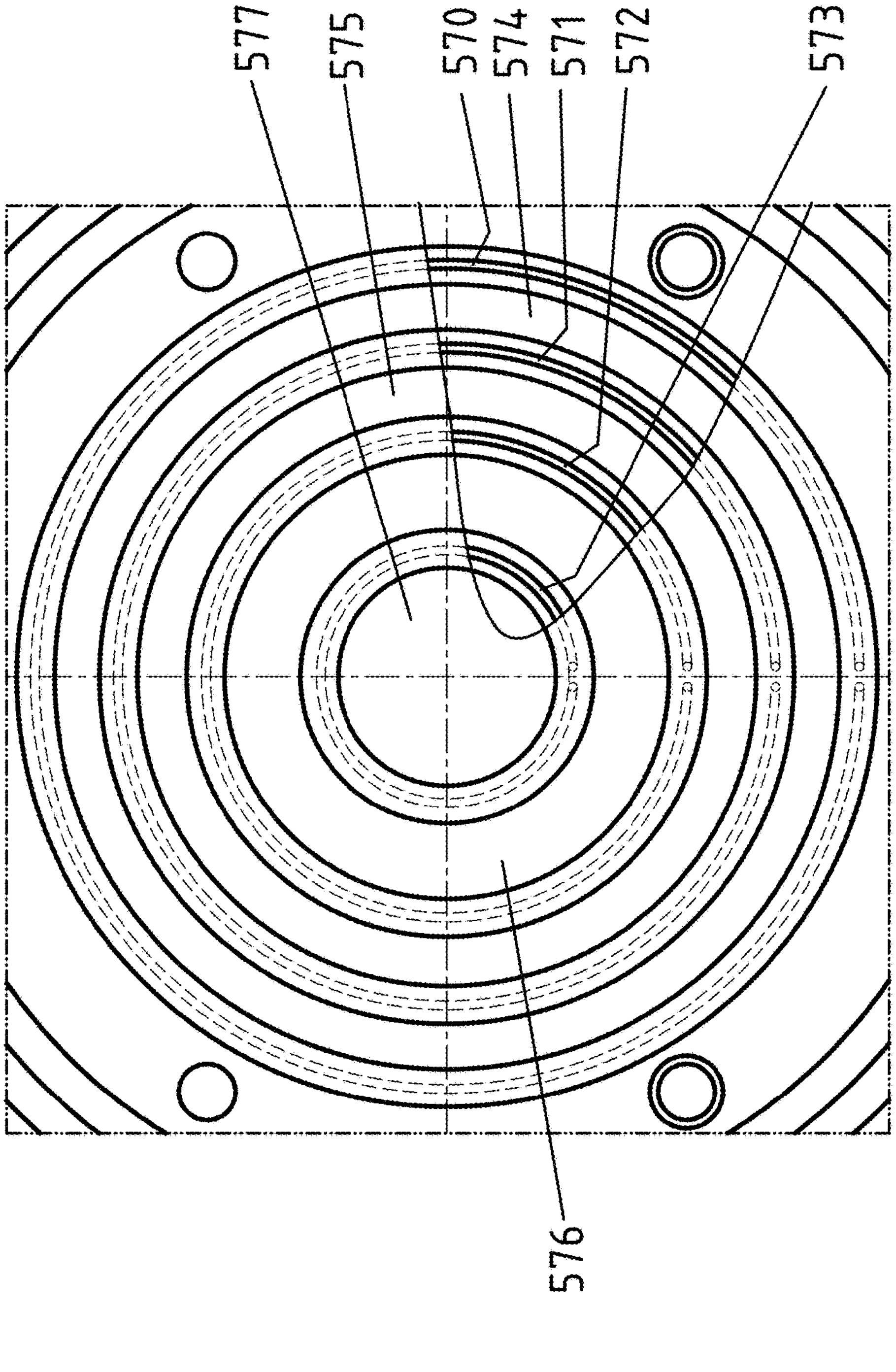
FIG. 76 is the detail D32 of the FIG. 75.
Figure 77:
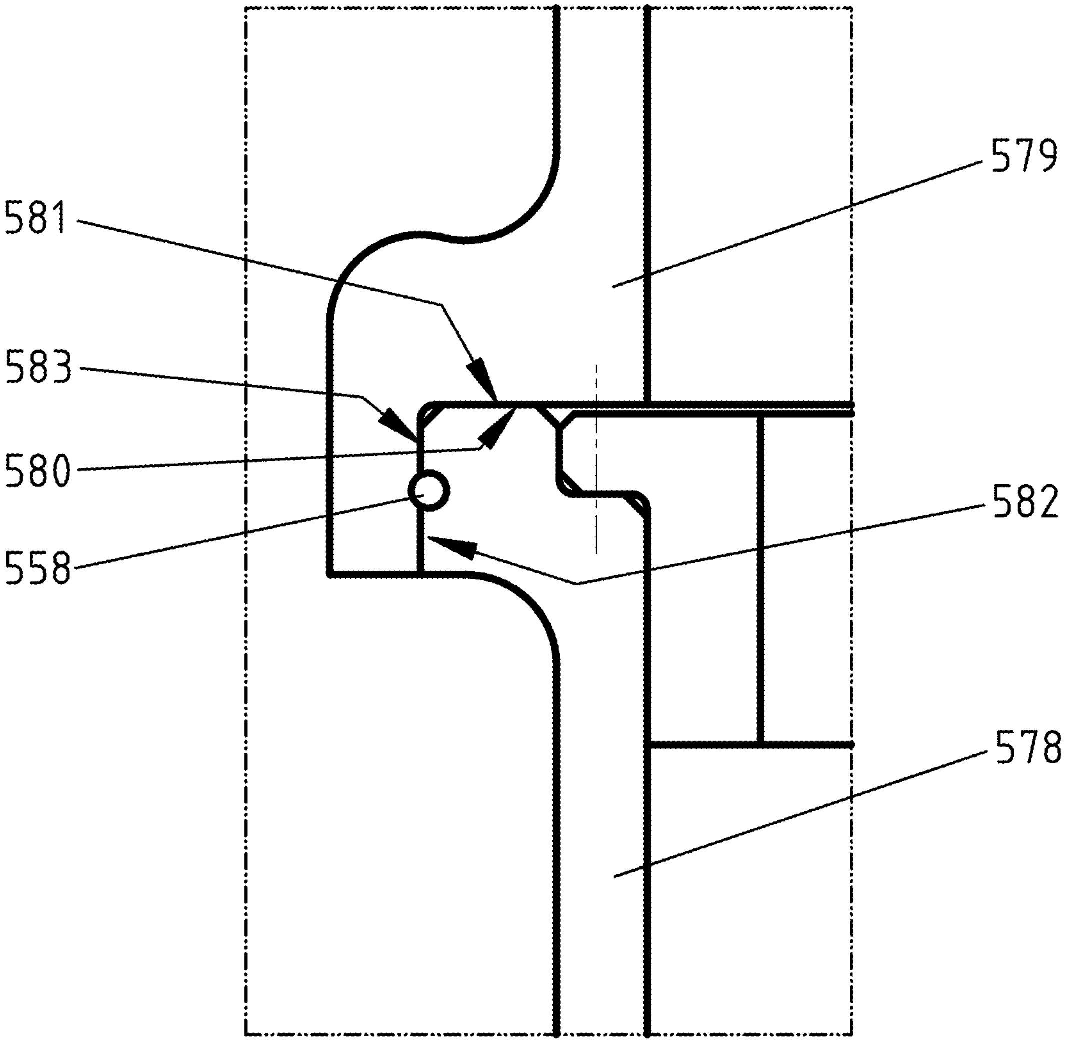
FIG. 77 is the detail D33 of the FIG. 66.
Figure 78:
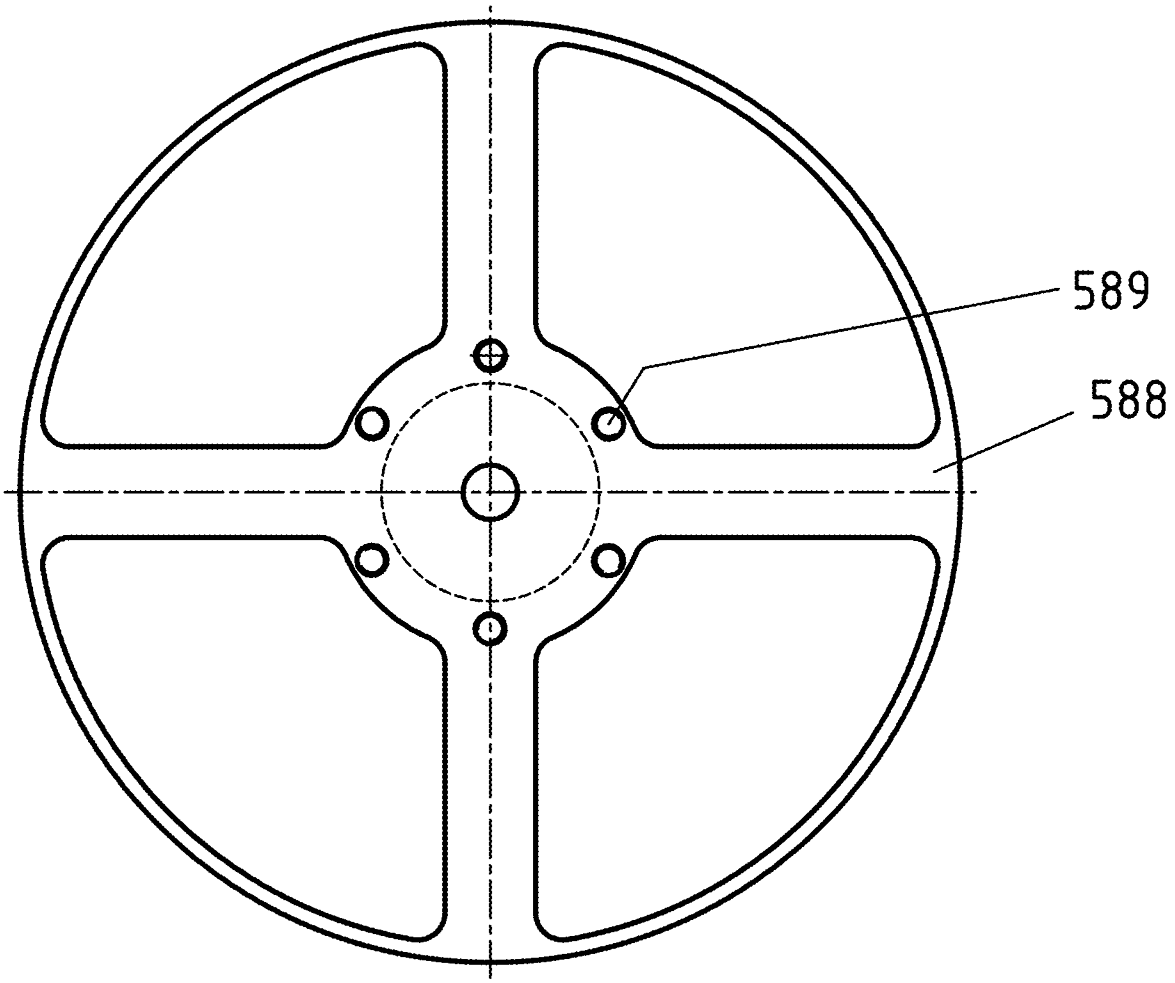
FIG. 78 shows a cross rib on which is installed a motor of a rotary robot providing the arm rotation.
Figure 79:
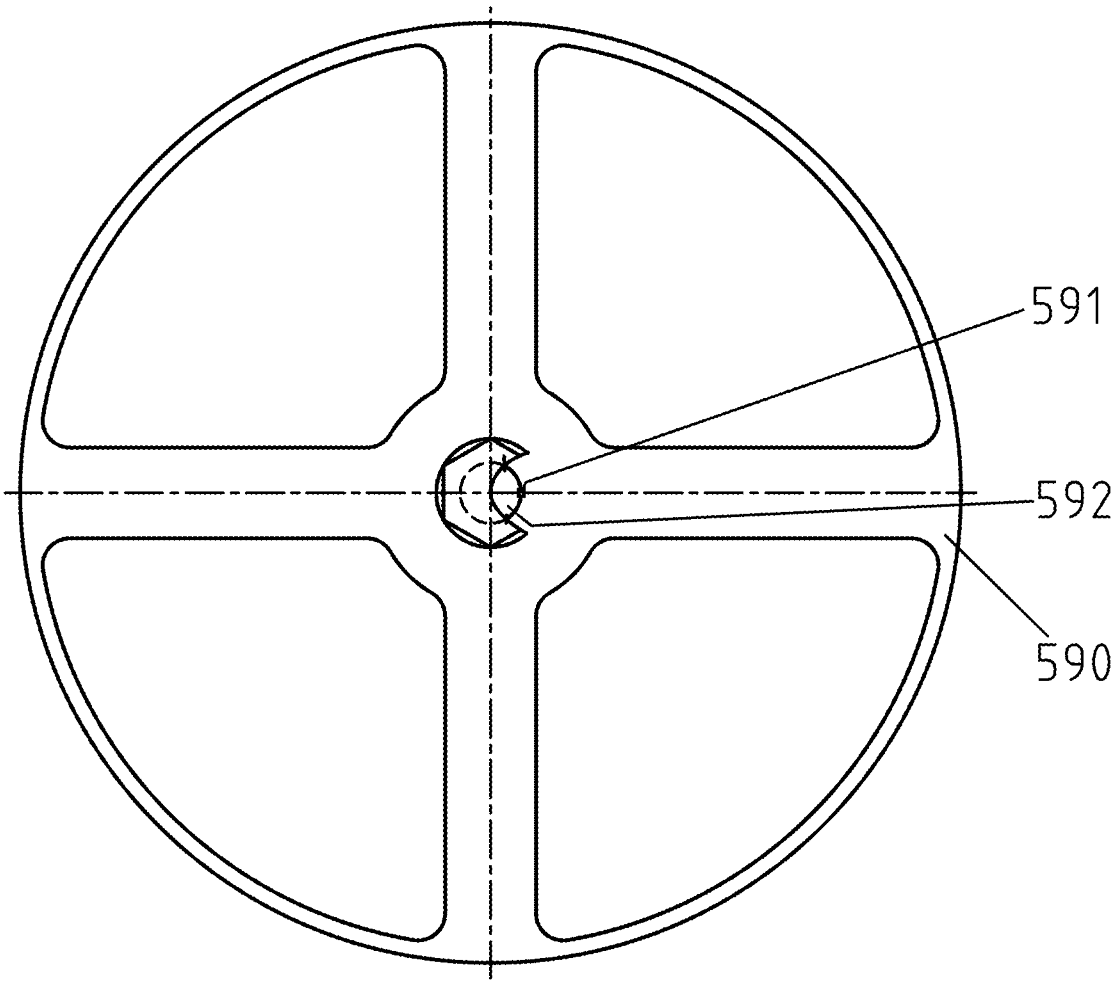
FIG. 79 shows a cross rib having a kye in a hole, where the motor shaft, coming from the motor, passes thru.
Figure 80:
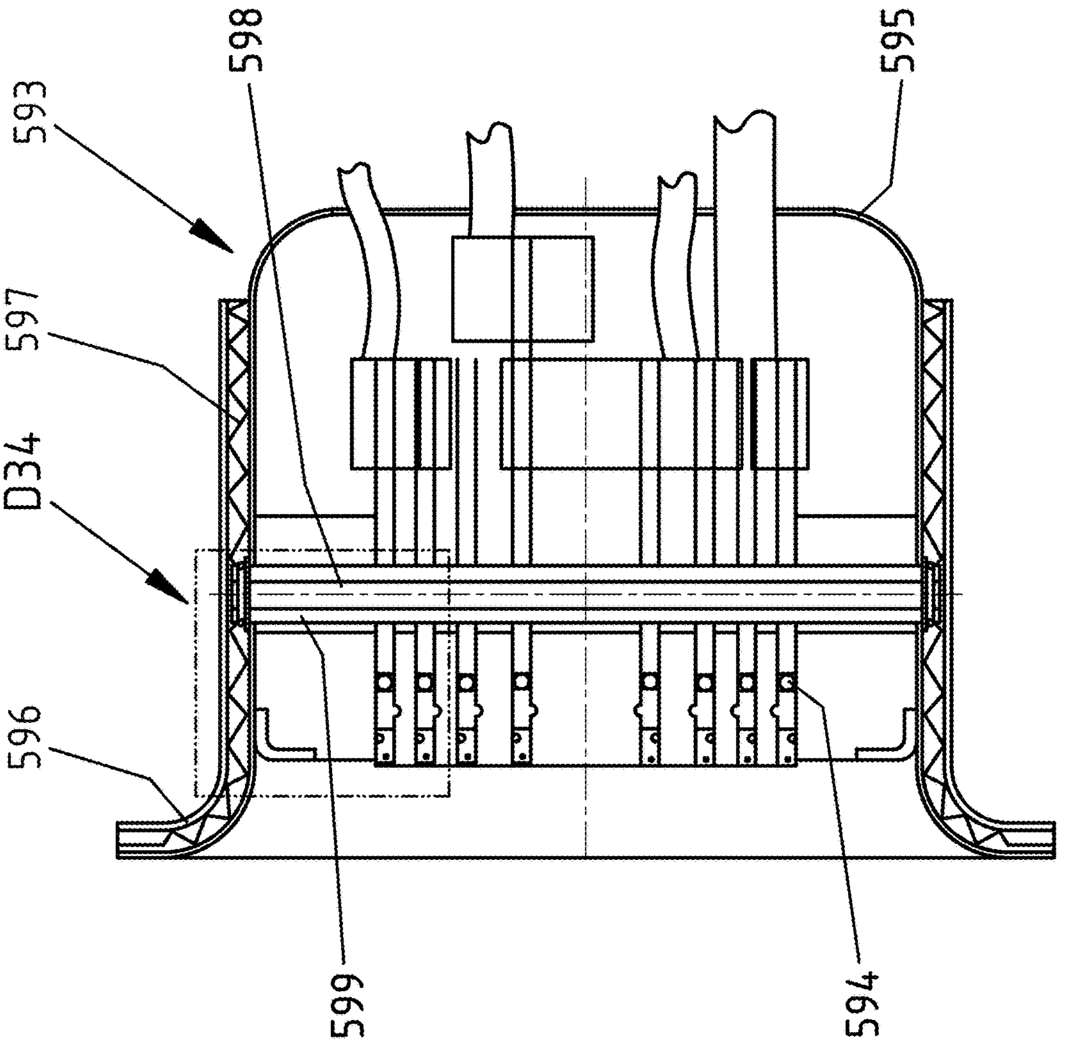
FIG. 80 presents an EV inlet with tubular moving phase-contacts.
Figure 81:
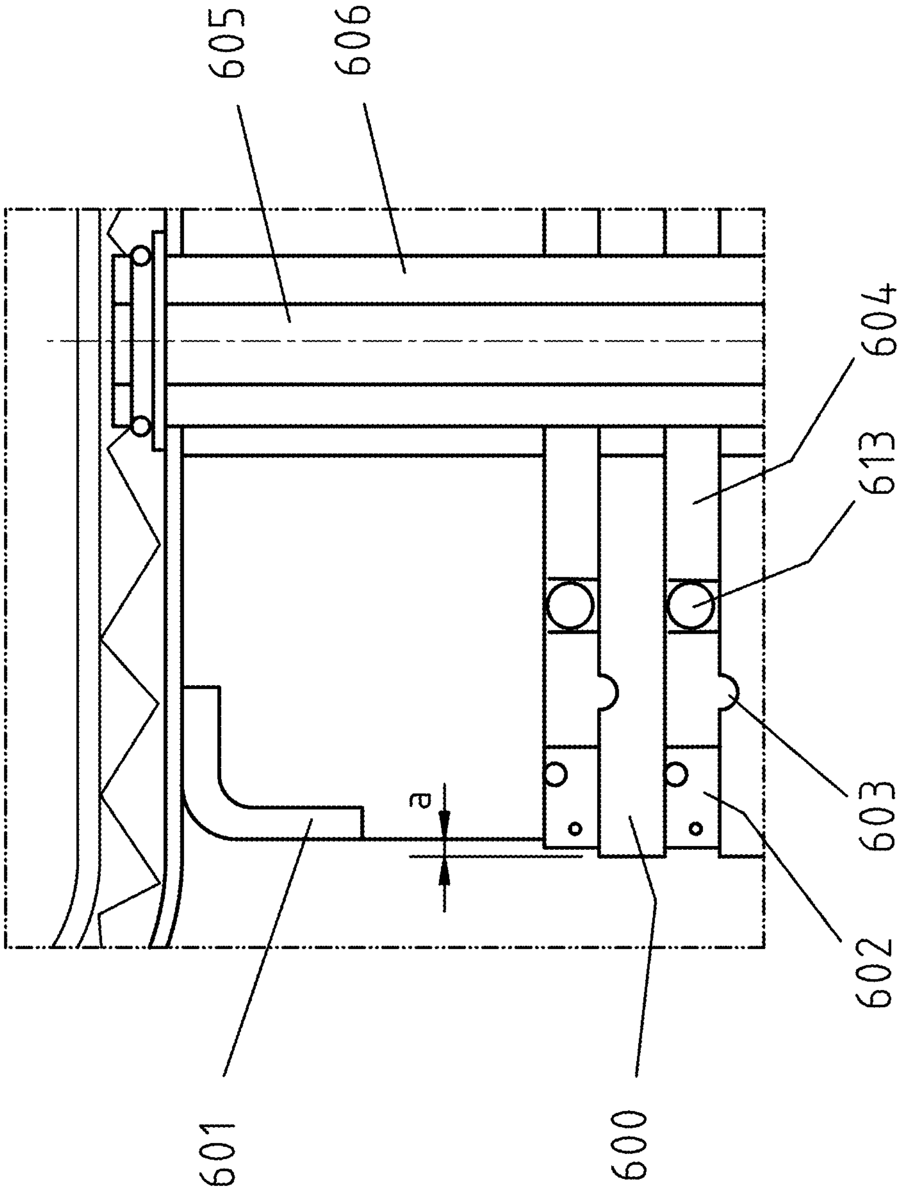
FIG. 81 is the detail D34 of the FIG. 80.
Figure 82:
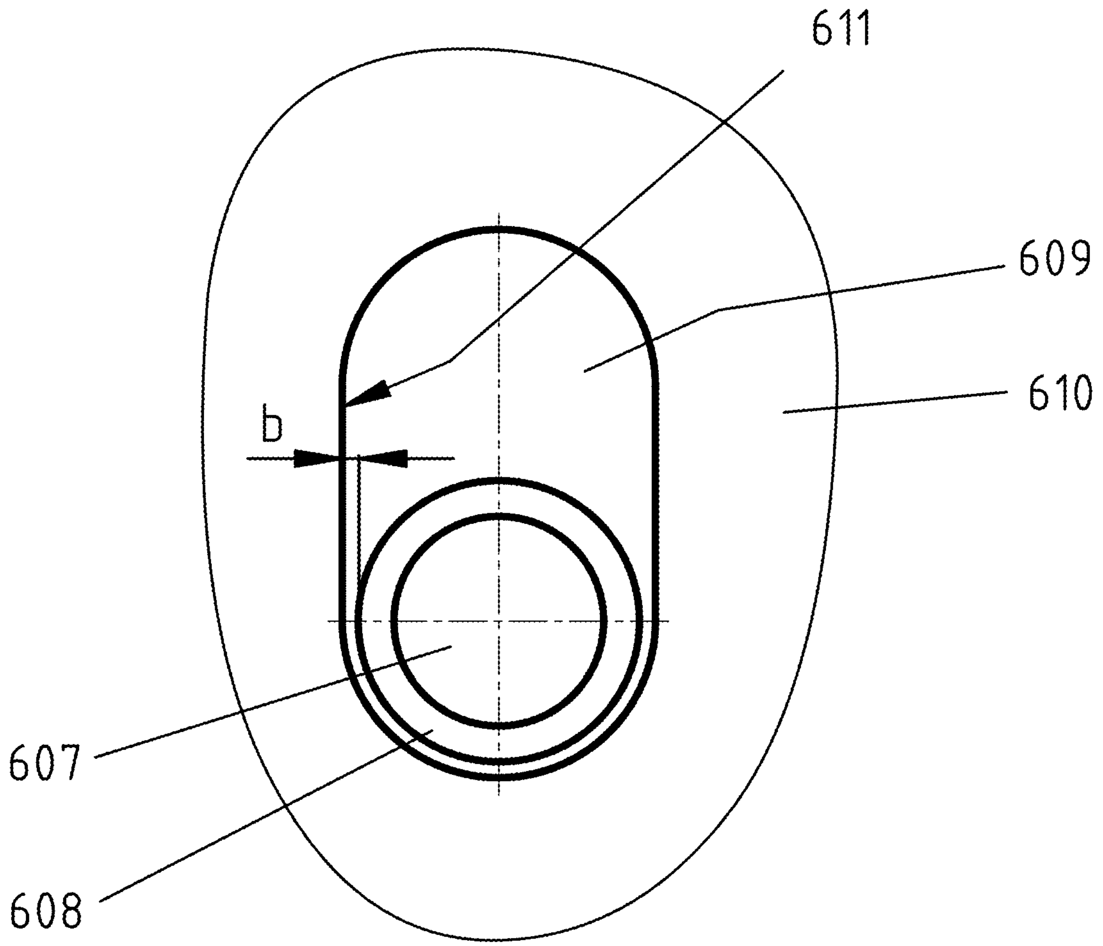
FIG. 82 is a partial detail of a tubular moving phase-contact adjustment system.

These recharge stations are automated EV battery recharge stations, designed to automatically recharge simultaneously a plurality of electric cars and a plurality of double inlet electric vehicles. This become possible when a rule is established specifying the distance between the double inlets of the electric vehicles equal to the distance between the two neighboring robots. These automated EV battery recharge stations are conceived to replace actual gas stations on the entire USA territory, occupying the same locations as the actual gas stations, excepting a transition period when both coexist in the same location, b) Automatic recharge station using a rotary robot. In FIG. 61 and FIG. 62 is presented an embodiment of an automatic recharge station having as charger the rotary robot 469 and 470 installed on the platform 471 and 472, capable to recharge the EV 473 and 474 on both sides of the vehicle-driver and opposite side. The robot is protected by the cabin 475 and 476, which is protected by the posts 477 and 478. After recharge, see FIG. 63, the EV 479 lives the recharge station and the robot 480 retracts into the cabin 481, which will be closed by a rotary door 482. In a standby position, the robot 483 remains into the cabin 484 with the door 485 closed, see FIG. 64. In FIG. 65 is presented the robot 486 having 6 axes aligned. The robot contains 6 rotary arms allowing to position the charger outlet 487, which is the extremity of the $6^{th}$ arm, in any required position in its working space. The challenges of the design of this type of robot are related to the way the electric energy is transmitted from the base 488 to the charger outlet 487, by inside of the robot body (without having any external cable) and the way the movements are realized to cover an area as large as possible, being capable to serve any vehicle, having the EV inlet on any side of the vehicle (as shown in FIG. 61 and FIG. 62). How to do this? For transmission of electric energy by phase-conductors, from one arm to another, see FIG. 66. On one of the arms 489 are used three copper rings 490, 491 and 492 for negative conductors and one central ring 493 for positive conductor, which are solid attached to this arm. On the next arm 494, a plurality of collectors 495, which exercise a good pressure on the copper rings, ensure a good electric contact for any angular relative position of the two arms, being individually attached by an elastic element to the robot body 494, via a support attached on a body shoulder. In FIG. 67, which is the detail D31 of FIG. 66, is shown the copper ring 496 having a flat surface 497, which is in contact with the flat surface 499 of the collector 798, connected to the phase-cable 501. This collector 798 is insulated on all surfaces by an insulating material 502 (excepting flat surface 499). The elastic element 503 (in this case—a coil spring) pushes the collector 798 on the copper ring 496 with a force which can be adjusted by the bolt 504 via a spring pan 505. The bolt 504 is screw into the support 506 rigidly attached to the robot arm. The pressure exerted by the bow 503, generates a friction between the two faces 497 and 499. To reduce the wear of the two components, and to ensure a very good conductivity these two faces 497 and 499 are cover by a graphite coating. The copper ring 496 is connected to the phase-cable 498. In FIG. 68 the copper ring 507 and the collector 508 are male and female in "V" shape. FIG. 69 is the "Section S1-S1" of FIG. 66, showing the copper rings 510, 511, 512 and 513 and four pairs of collectors (a pair for each ring)—(514, 515), (516, 517), (518, 519) (520, 521), and their support 522, rigidly attached to the robot body 523. Using two collectors per phase, allows thinner phase-cables to apply. In FIG. 70, (which is the Section S-S of FIG. 66), are shown bigger collectors (one pair per ring)—(524, 525), (526, 527), (528, 529) (530, 531) and their support 532, rigidly attached to the robot body 533. FIG. 71, (which is the Detail D33 of FIG. 66), shows how the collectors support 534 is installed rigidly on the robot body 535, using a shoulder 536 made into the robot body and the configuration of the joint between two robot arms). In FIG. 72 is shown the last arm of the robot 537 engaged into the EV inlet 538. At the end of the last robot arm 537 is installed an electromagnet 539, which will attach solidly the EV inlet iron plate 540 ensuring a very good electric contact on all phase-contacts of the charger outlet. In this version, see FIG. 73, the phase-contacts of the charger outlet are circular tubes 541, 542, 543 and 544, incorporated concentrically into an insulator material 545 and installed into a protective metallic tube 546, concentrically solid attached on the extremity of the metallic arm extension 547. Into the insulator material 545 are installed three cameras, three ultrasonic sensors 548 and two lights 549. The four charger outlet contacts circular tubes 541, 542, 543 and 544 are connected to the phase-cables 550, 551, 552 and 553 by the contact clamps 554, 555, 556 and 557. FIG. 74 is the view J of FIG. 73, showing the copper circular contacts with their contact clamps 559, 560, 561 and 562. FIG. 75 is the view K of FIG. 73, showing the face of the charger outlet 563 with the 3 cameras 564, 565 and 566 and the three ultrasonic sensors 567, 568 and 569. FIG. 76 is the detail D32 of FIG. 75, showing the contacts drying system having electric wire 570, 571, 572 and 573, installed into the insulation material around of each circular tubular contact 574, 575, 576 and 577. FIG. 77 is the detail D33 of the FIG. 66, showing the sliding surfaces of two arms 578 and 579, rotating relatively each other. There are two flat surfaces 580 and 581, and two cylindrical surfaces 582 and 583 involved. To minimize wear, all sliding surfaces will be covered by a graphite coating. For sealing the two arms connection an "O" ring 558 may be used. The two arms are kept together by the shaft 584 of the motor 585 (see FIG. 66) and the two cross ribs 586 and 587, part of the robot body. In FIG. 78 is shown the cross rib 588 on which is installed the motor by a plurality of bolts 589. In FIG. 79 is shown the cross rib 590 having a kye 591 in the hole 592, where the motor shaft, coming from the motor, passes thru, allowing in this way to the motor to turn one arm against another. In FIG. 80 is presented the EV inlet 538 of FIG. 72. This EV inlet 593 (FIG. 80) is an EV inlet with tubular moving phase-contacts matching with the tubular phase-contacts of the charger outlet 537 (FIG. 72). To ensure a good contact between the charger outlet and the EV inlet the tubular phase-contacts of the EV inlet can slid axially pushed by an elastic element, which in this case is a plurality of "O" rings 594, (see FIG. 80). The housing of the EV inlet 595, which is attached to the EV body 596 by an elastic element 597, which in this case is a rubber piece, moves axially when the electromagnet 539 (FIG. 72) turns ON, pooling with it the bar 598 with its insulating tube 599 (FIG. 80). Because the faces of the tubular phase-contact 600 (FIG. 81, which is the detail D34 of FIG. 80) are advanced with a variable distance "a" to the iron plate 601 on which the electromagnet will be in contact when it will be activated (the "a" may be different from one tube to another—less than 0.004-0.005 IN), the tubes will be in contact with the charger outlet before the electromagnet and the iron plate, stopping the tubular phase-contacts 600 and the portion of insulating tubes 602, which are sticked on the tubular contacts and can not slid axially because the groves 603 made on the tubular contacts. The insulating tubes 604 are sliding tubes which move together activated by the bar 605 with its insulating tube 606. In FIG. 82 are shown the bar 607 with its insulating tube 608 which are installed press fit in the sliding insulating tubes 609, but in the copper tubes 610, there is an oval slot 611, creating a gap "b" between the insulating tube 608 and the copper tubes, allowing it to slide axially into these slots. In this way, when the electromagnet is activated, the EV inlet is attracted by the iron plate 601, so the bar 605 with its insulation tube 606, see FIG. 81, push the sliding tubes 604 and compress the "O" rings 613 which push the tubular phase-contacts 600 and the portion of insulating tubes 602 to be in contact with the charger outlet contacts. Depending on the distance "a" of each tubular phase-contact, the "O" ring will be deformed more or less, and make sure all four tubular phase-contacts of the EV inlet will touch the charger outlet contacts. When the recharge is finished and the electromagnet is turned OFF, the EV inlet box will retract, the "O" rings will be liberated and they will push the sliding tubes back, but the bar and its insulated tube retains the sliding tubes, c) Automatic recharge station using a mixt robot (rotary and articulated robot).

Figure 83:
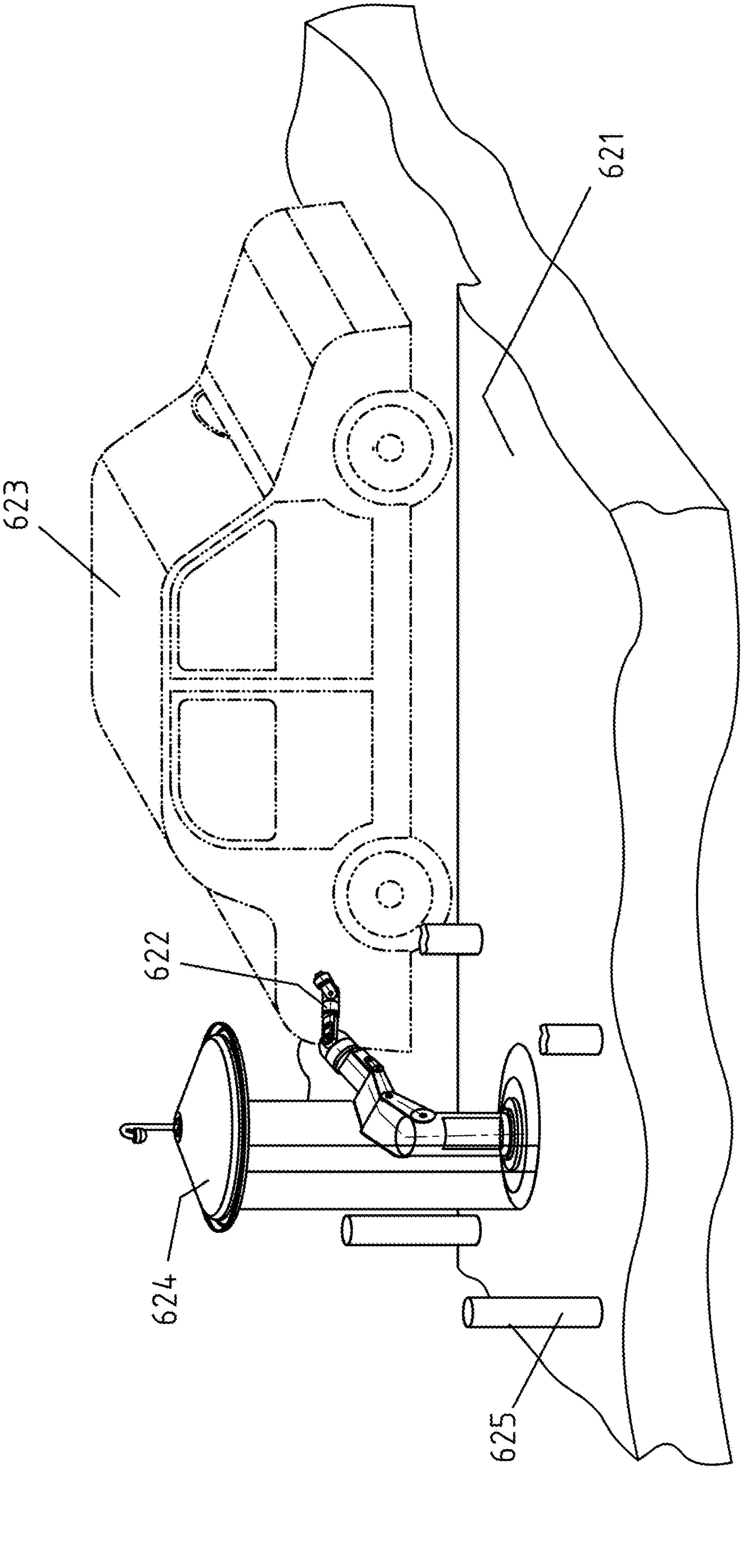
FIG. 83 is an isometric view of a recharge station having a mixt robot recharging an electric car having the EV inlet on the driver side.
Figure 84:
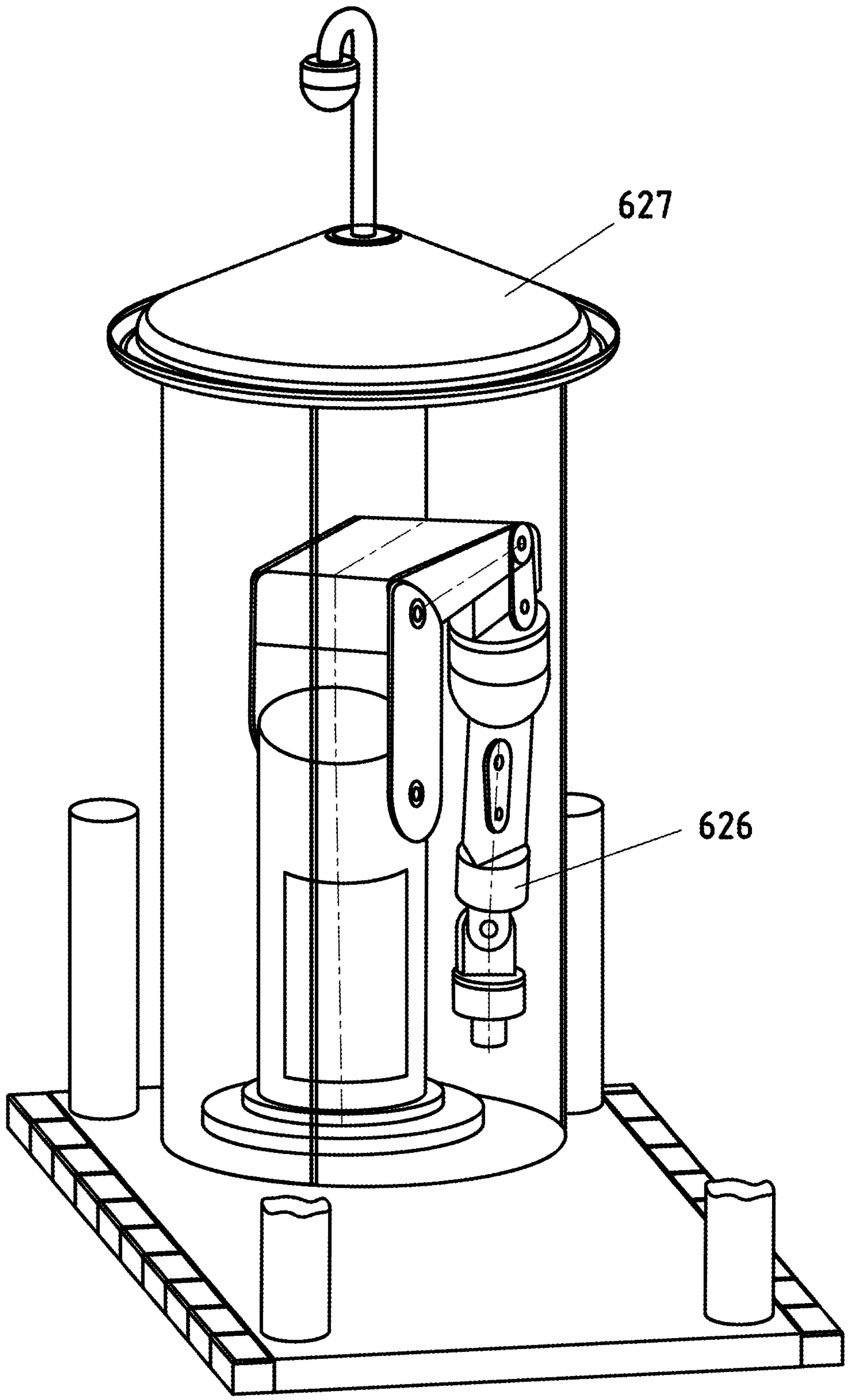
FIG. 84 is an isometric view of a recharge station having a mixt robot retracted into its cabin in a standby position.
Figure 85:
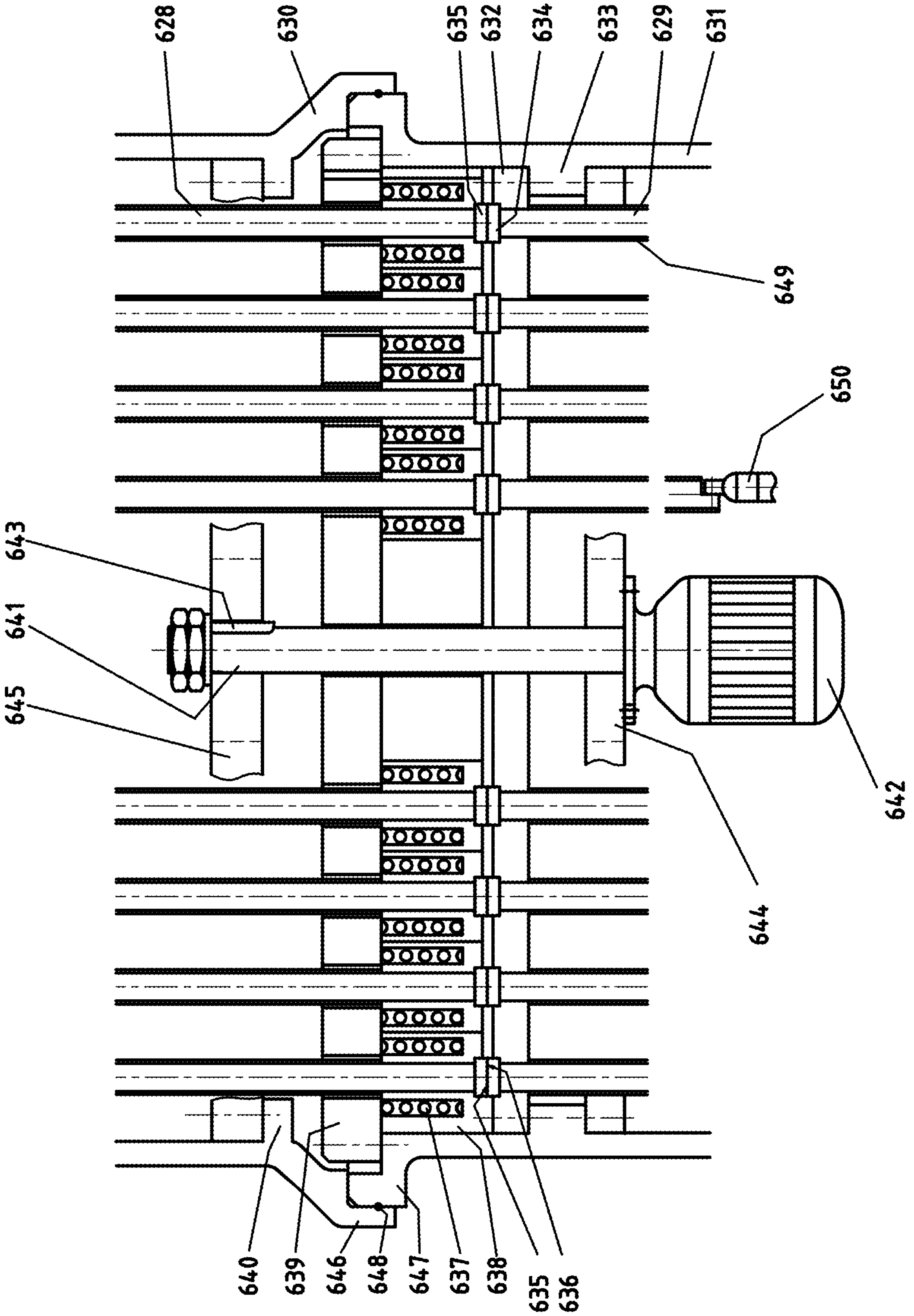
FIG. 85 is a partial cross section of a rotary join of a mixt robot.
Figure 86:
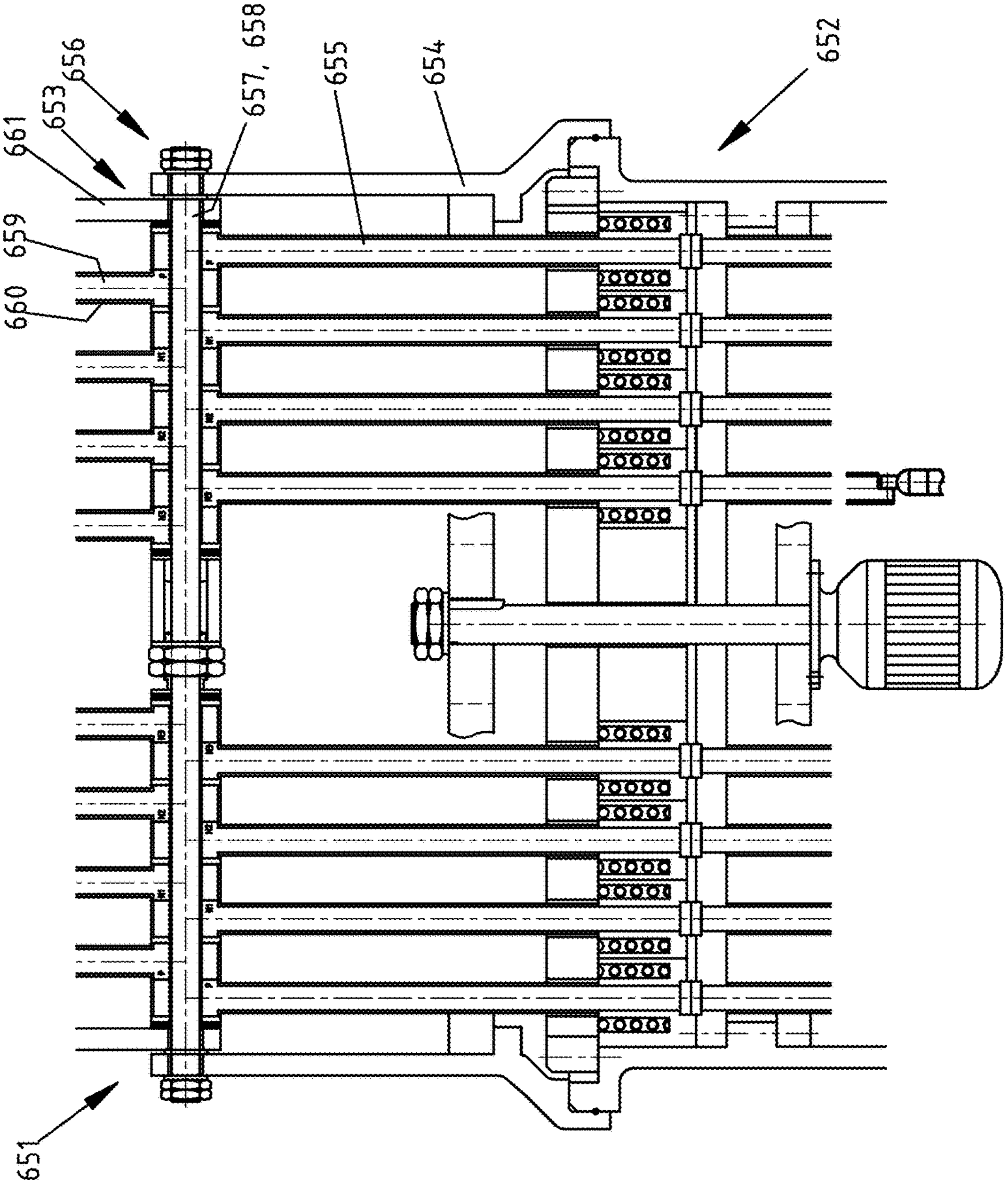
FIG. 86 is a partial cross section of a rotary join and of an articulation of a mixt robot.

En embodiment which combines two kind of rotary mechanisms is presented in FIG. 83 to FIG. 90, generating a "mixt" robot. In FIG. 83 is shown the battery recharge station 621, equipped with the mixt robot 622 recharging the car 623. The robot 622 is protected by the cabin 624 and the posts 625. When the robot 626 is not working, it is in a retracted standby position inside of the cabin 627, with the rotary doors closed, as shown in FIG. 84. Depending on the type of conductors used between two joins, there two possibilities: solid bars, or multi-wire cables. In FIG. 85 is presented a rotary robot join with solid bars conductors 628 and 629 for both arms 630 and 631. For the arm 631, the copper bar conductors 629 are stationary, being incorporated into a piece of insulating material 632, which is bolted on the shoulder 633 of the arm body 631. On the extremity of each bar conductor is welded a copper ring 634, having a flat surface 635, which is the surface of contact with the copper bar conductor 628 of next robot arm 630. The bar conductors 628 have a flat surface 636 (sector of a circular ring), which is in contact with the flat surface 635 of the bar conductor 629, being capable to transmit the electric energy to the next robot arm, in any relative positions these two are at each moment, being in fact a contact surface. To ensure a good contact, the bar conductors 628 with their contact surfaces are pushed against the contact face of the bar conductor 629 by an elastic element, which in this case is a coil spring 637, via the guide 638. The plurality of guides is installed on a pressure plate 639, which is bolted on the shoulder 640 of the arm body 630. The two arms 630 and 631 are kept in contact each other by the shaft 641 of the motor 642, which turn the two arm bodies relative to each other, using a key 643. The motor 642 is supported by the support 644 bolted on the shoulder 633 of the arm body 631, and the key 643 is installed on the support 645 bolted on the shoulder 640 of the arm body 630. The two faces in contact 635 and 636 are covered by a graphite coating, to reduce friction and to keep a good electric conductivity. The two arm bodies 630 and 631 turn concentrically due to shoulder 646 and 647 having a cylindrical portion slide fit each other. The "O" ring 648 seal the two arm bodies each other. Each bar conductor 628 and 629 is coated by an insulating material 649. The bar conductors 629 are connected to the power supply units by a cable 650. FIG. 86 illustrates the mixt arm 651 of the robot having on one extremity the rotary join 652 and on the other extremity the articulated join 653. Inside of the arm body 654, the bar connectors 655 are all linked in the articulation 656 by a bar 657, covered by an insulation tube 658. The bar connectors 655 of the arm 654 are connected with the bar connectors 659 coated by an insulating material 660 of the arm 661 into the articulation 656.

Figure 87:
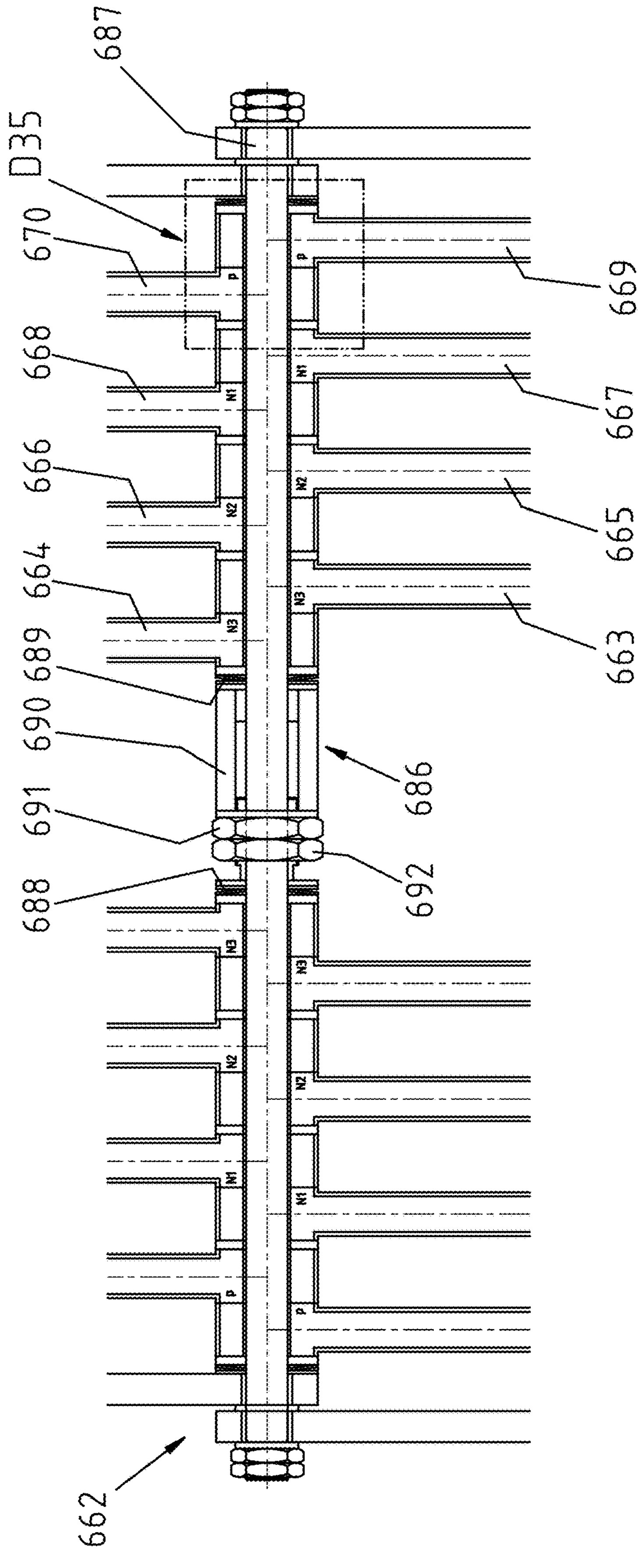
FIG. 87 is a partial cross section of an articulation of a mixt robot.
Figure 88:
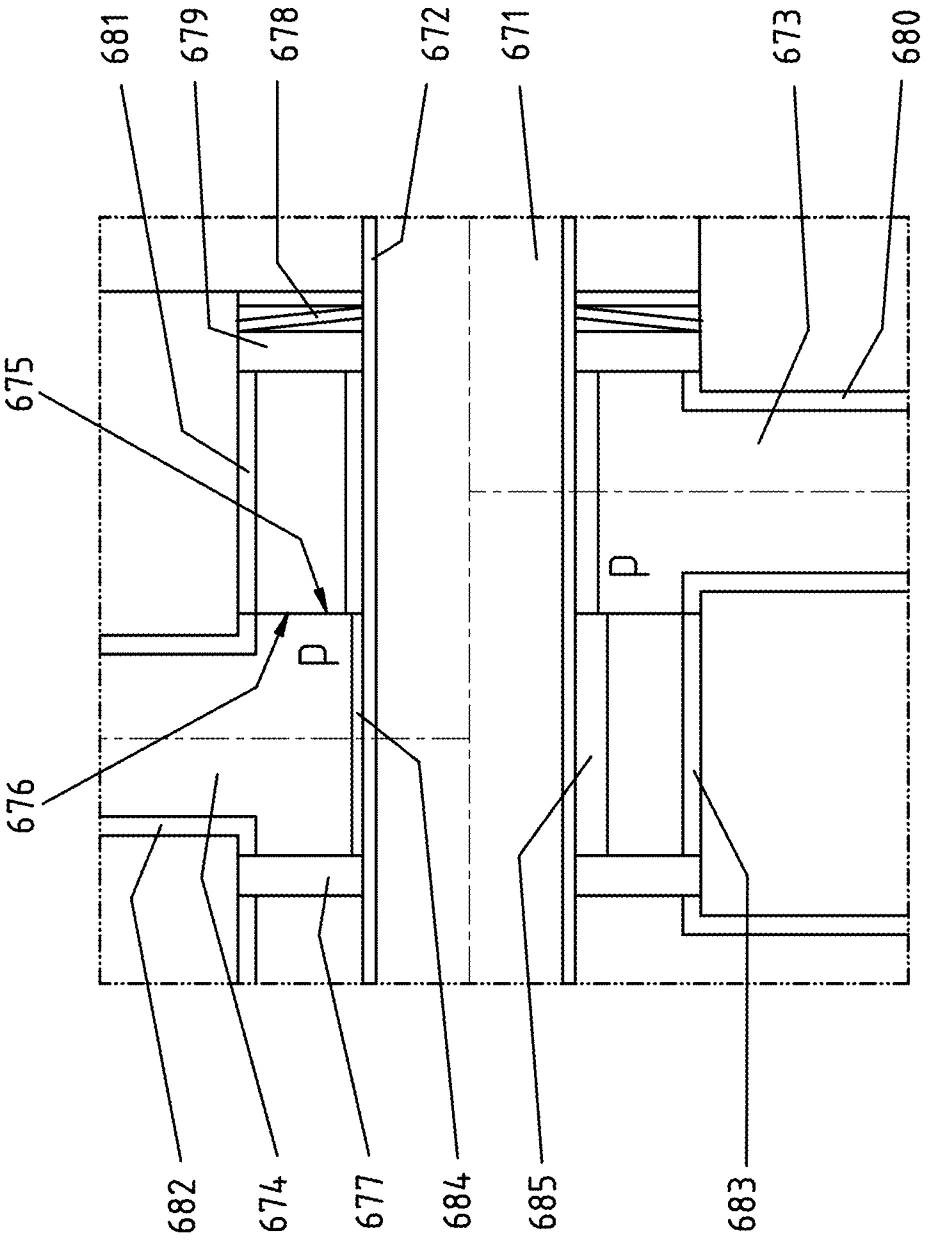
FIG. 88 is the detail D35 of the FIG. 87.
Figure 89:
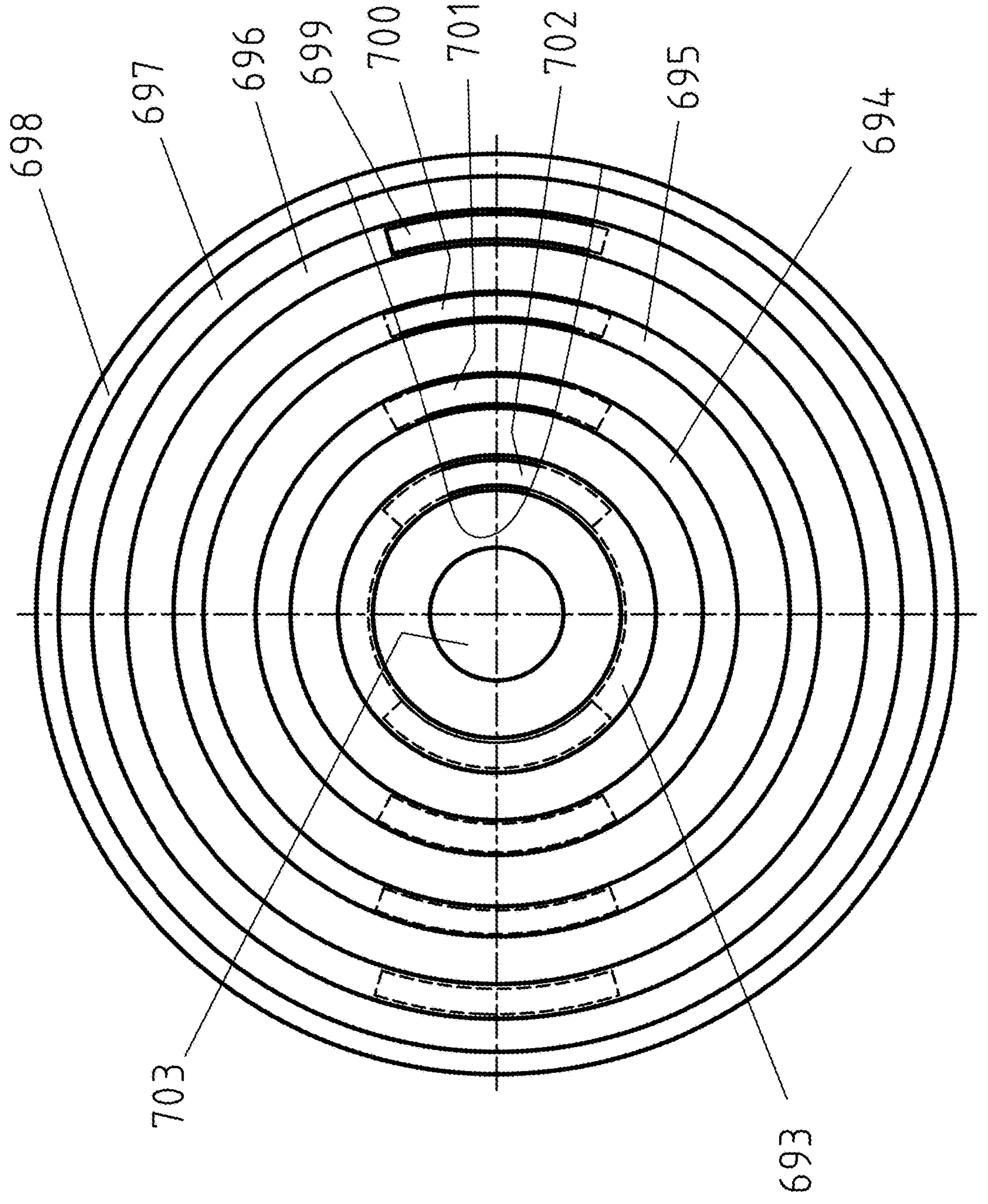
FIG. 89 shows a plurality of circular contacts insulated by the insulating material and a plurality of collectors.
Figure 90:
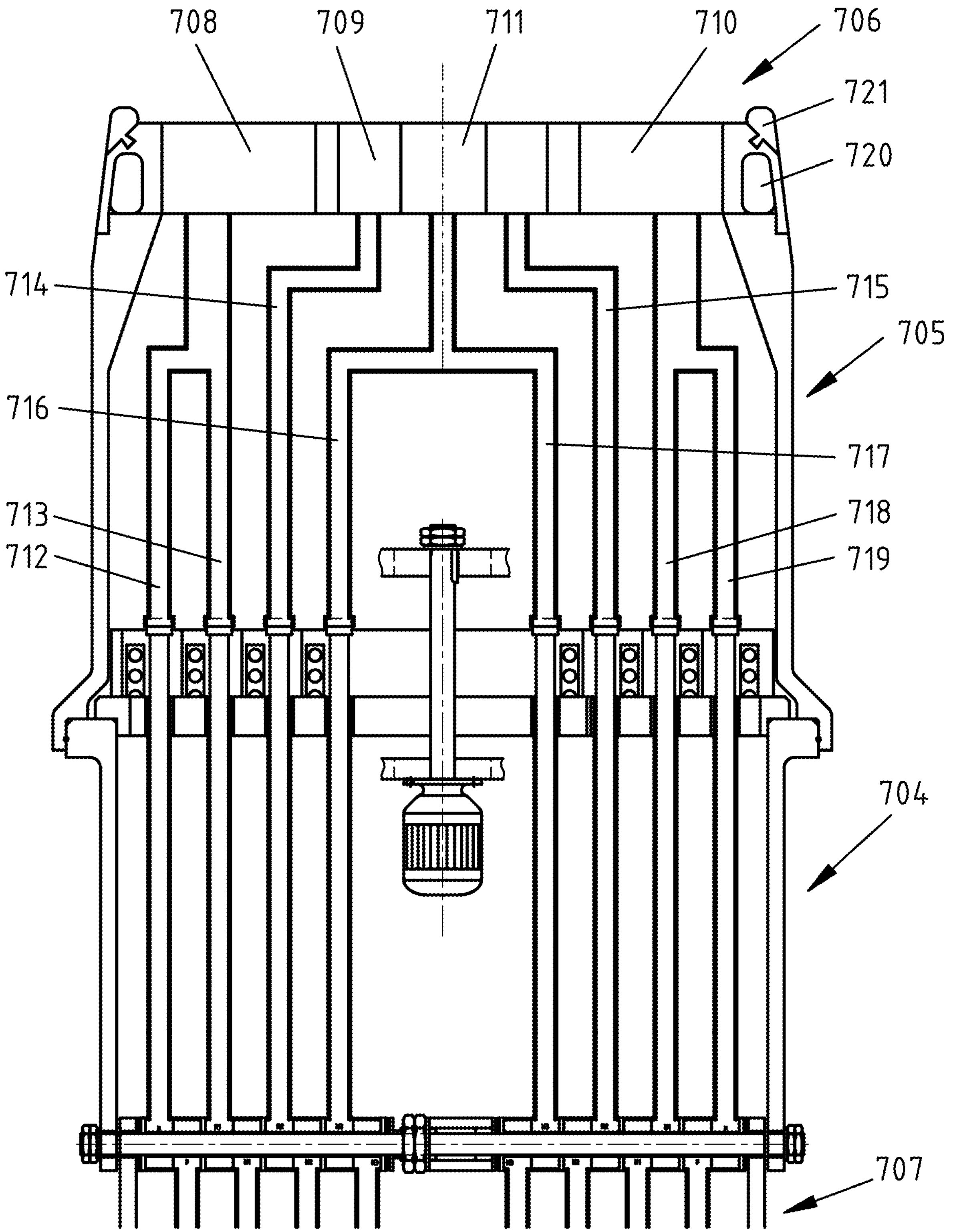
FIG. 90 shows the last two robot arms of a mixt robot, the last one including the charger outlet.
Figure 91:
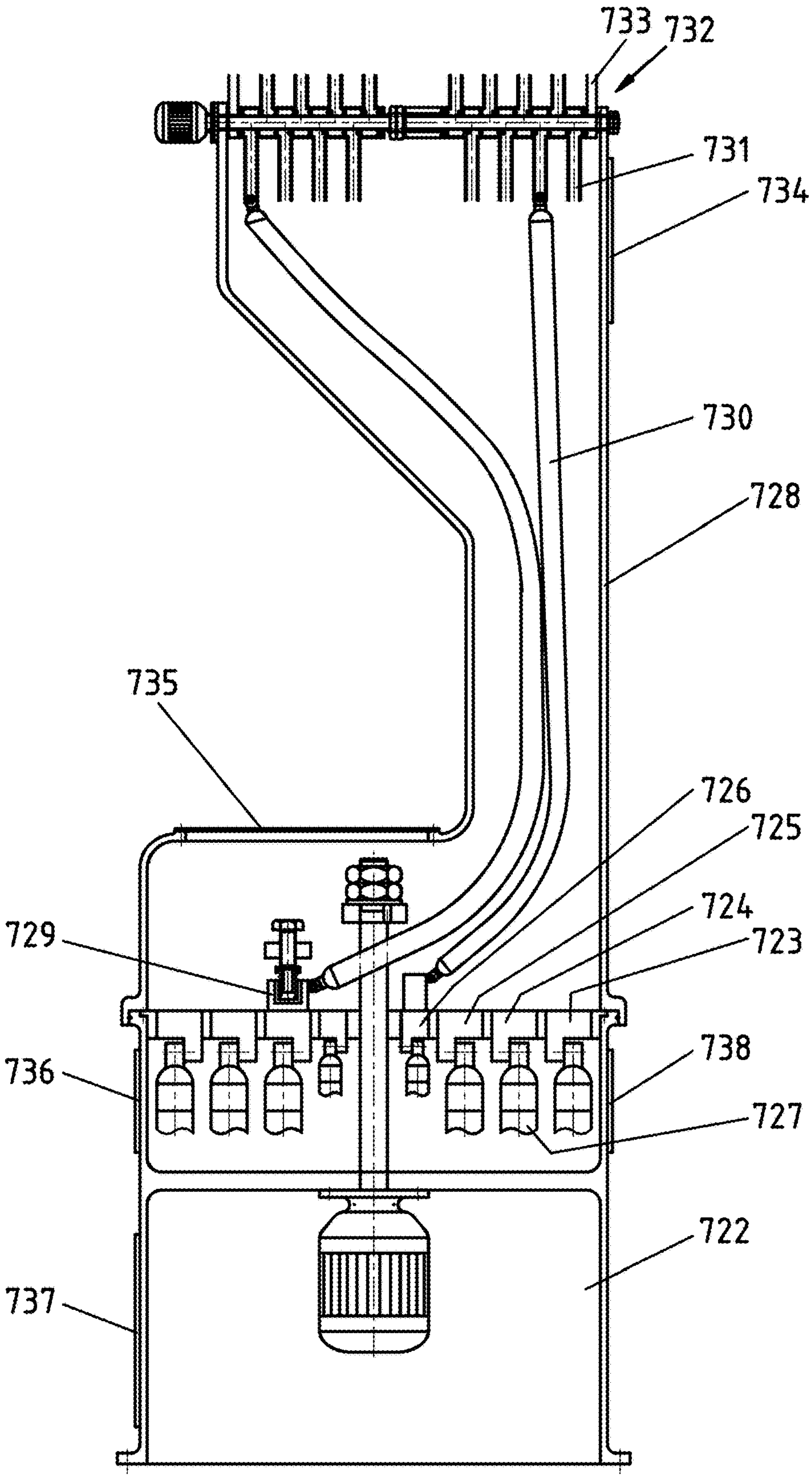
FIG. 91 is a partial cross section of a mixt robot having a rotary join and an articulation.

In FIG. 87 is shown the articulation 662. Into the articulation, can be seen two times four pairs of bar connectors, three for the negative phase contacts (663, 664), (665, 666) and (667, 668) and one pair for the positive contact (669, 670). In FIG. 88, which is the detail D35 of FIG. 87, can be seen the articulation having as axes the bar 671 with its insulating material tube 672, on which are installed the pairs of bar connectors. Between two bar connectors of the same phase 673 and 674, there is not insulation, having a metal-on-metal contact 675 and 676, allowing the electricity to be transferred from one arm to another, but between two bars of different phases there is an insulating washer 677, separating the two phases. The bar connectors of an articulation are maintained in contact each other by a plurality of disk springs 678 installed on the axial bar 671 with its insulation tube 672, via the insulation washer 679. All surfaces of the bar contacts which don't serve for contact are covered by an insulation coating 680, 681, 682 and 683. To compensate the dimensional differences between the bar connectors, there is a gap 684 and 685 between their hole and the insulating tube 672, which is different from a bar connector to another. This gap is realized making on the bar connector a larger hole than is the tube 672 diameter. To adjust the pressure on the axial contacts, an adjusting mechanism 686 (FIG. 87) may be installed on the middle of the bar 687, consisting in a plurality of disk springs 688 and 689, a spacer 690 and two nuts 691 and 692. In FIG. 89 are shown the circular contacts 693, 694, 695, 696 insulated by the insulating material 697 from the robot body 698 on which are rigidly attached. Also, can be seen the two times four collectors 699, 700, 701 and 702 of another robot arm. In central position is the shaft 703, coming from the motor used to turn these two arms each to another. In FIG. 90 are shown the last two robot arms, 704 and 705, the last one including the charger outlet 706. The arm 704 is articulated to the precedent arm 707. The charger outlet 706 has three negative phase-contacts 708, 709 and 710 and the positive contact 711 in center. To each phase contact is coming a pair of arm connectors (712, 713), (714, 715), (716, 717) and (718, 719). At the end of the charger outlet is installed the electromagnet 720 and the dumper 721 to absorb the shocks in the engaging time. In FIG. 91 is illustrated another version of a mixt robot, having the base 722 with the copper rings 723, 724 and 725 for the three negative phases and the ring 726 for positive contacts, connected to a plurality of cables 727 coming from the robot electric panel. The first arm 728, which rotates relatively to the base 722, has a plurality of electric collector 729 connected by the cables 730 to the conductors 731 which are part of the articulation 732 linking the robot arm 728 to the next arm 733. The rest of the robot arms may be any of the configurations already described here in. For all versions, on the robot body are made some openings for easy access inside of the robot body, covered by an adequate cover like 734 to 738.

3. Practical Solutions on Increasing the EV Autonomy

Another aspect of the EV batteries is related to their capacity to stock and supply the electric energy in different weather conditions. Temperature is one of the most important factors which affect the battery functionality. Cold and hot temperatures both have a negative impact on EV's driving range. Cold weather is the worst. The optimal temperature for EVs when it comes to driving range is 20°+/−5° Celsius. The temperature affects the EV's driving range (autonomy) by tow aspects:

1. The problem with the lithium EV batteries is related to the fact that the lithium is sensitive to extreme temperatures. The colder the weather, the thicker the electrolyte fluent will be in the battery, making it difficult to retain energy as well as passing it through the system.

Figure 92:
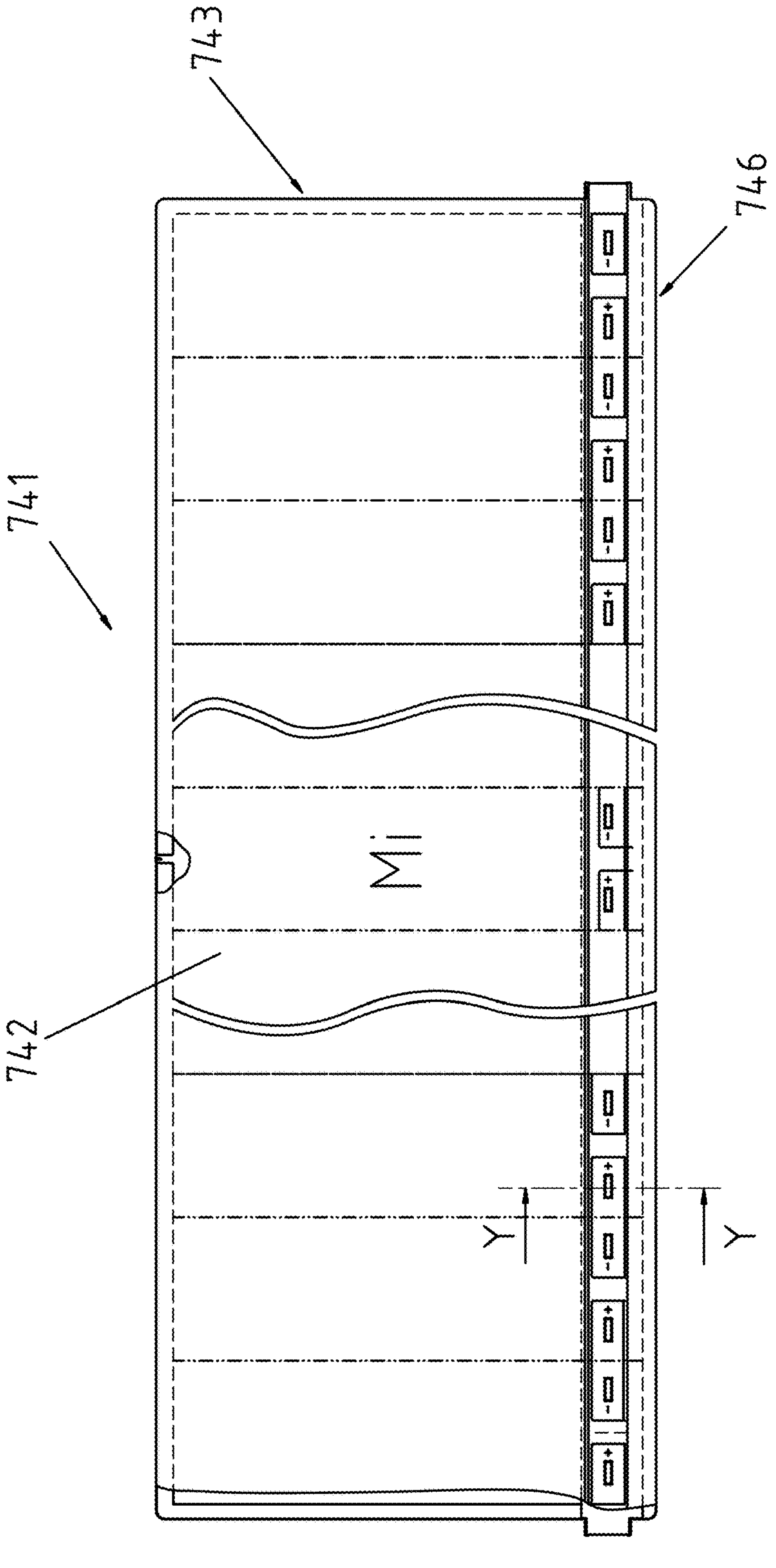
FIG. 92 shows an EV battery with a plurality of independent modules having a battery housing.
Figure 93:
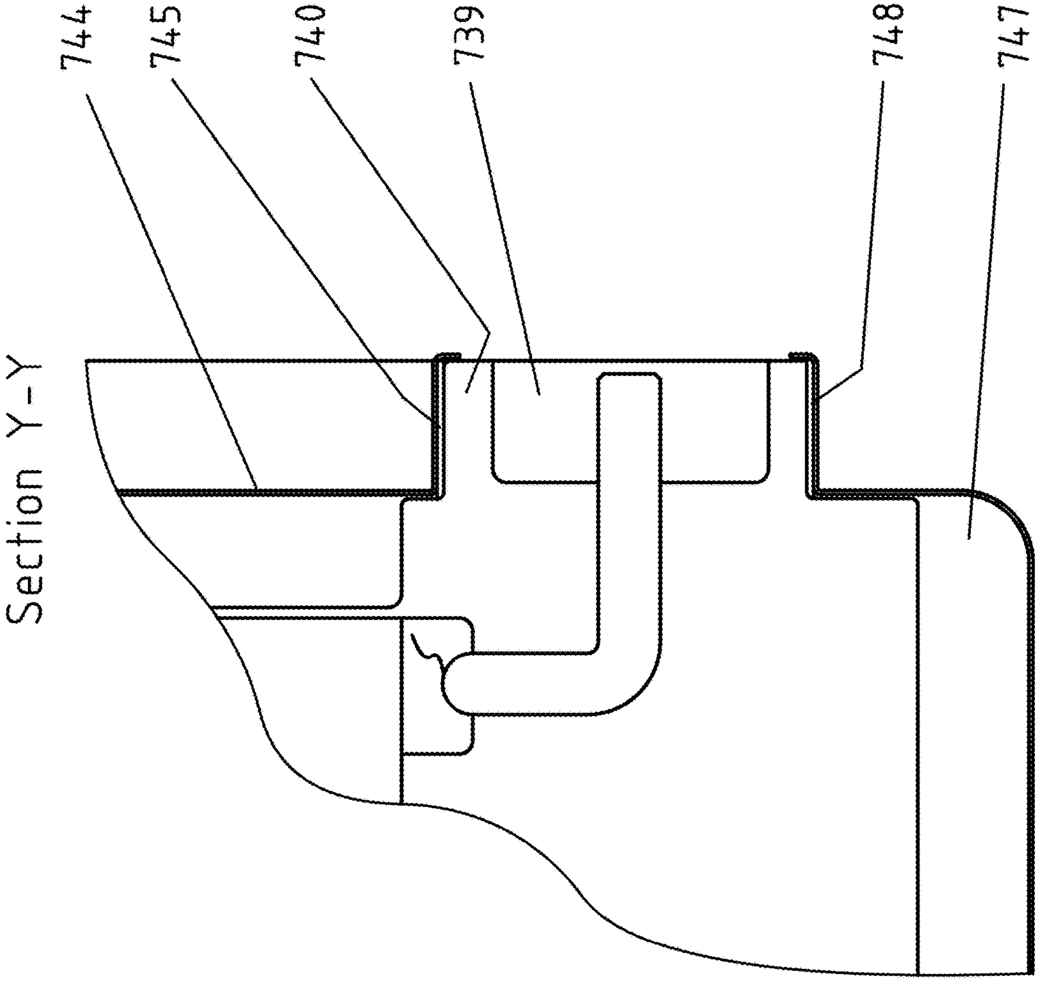
FIG. 93 is a partial cross of a niche placed on a ledge around the independent modules and the sealed battery housing.
Figure 94:
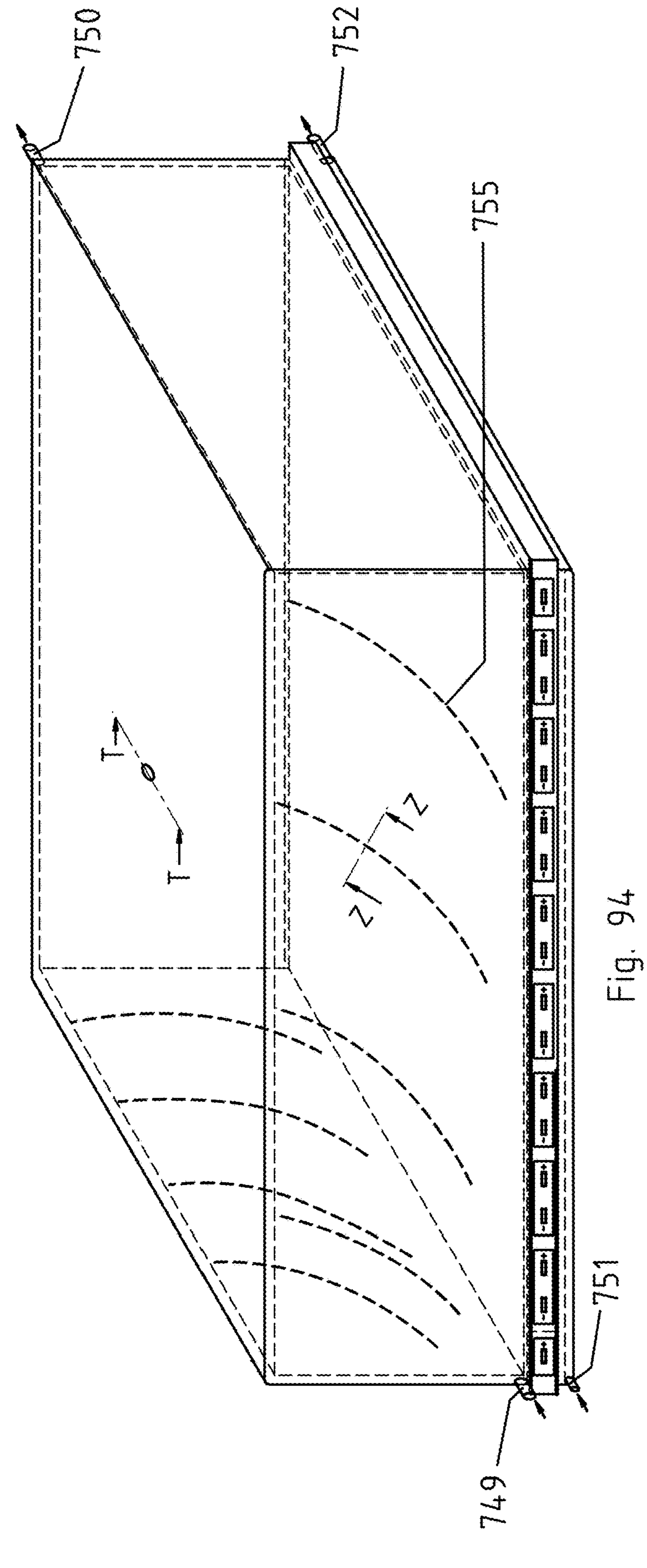
FIG. 94 is an isometric view of a EV battery with a plurality of independent modules and its battery housing.
Figure 95:
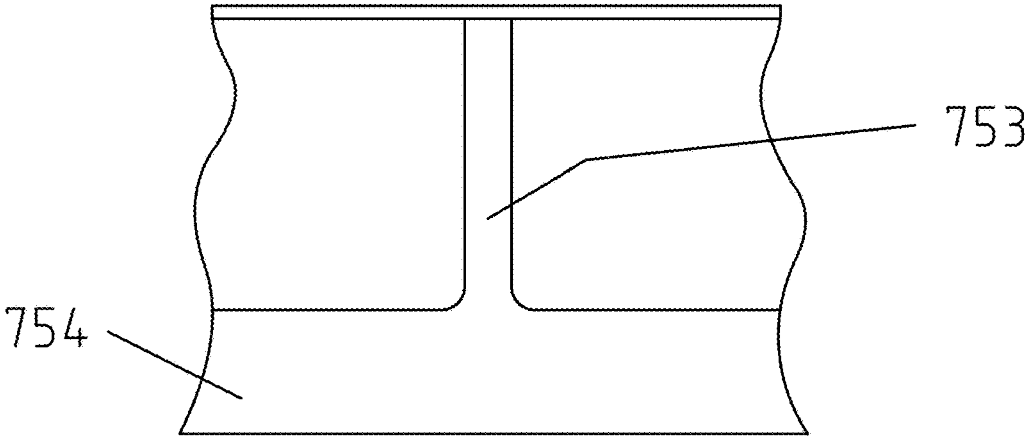
FIG. 95 is the section Z-Z of FIG. 94.
Figure 96:
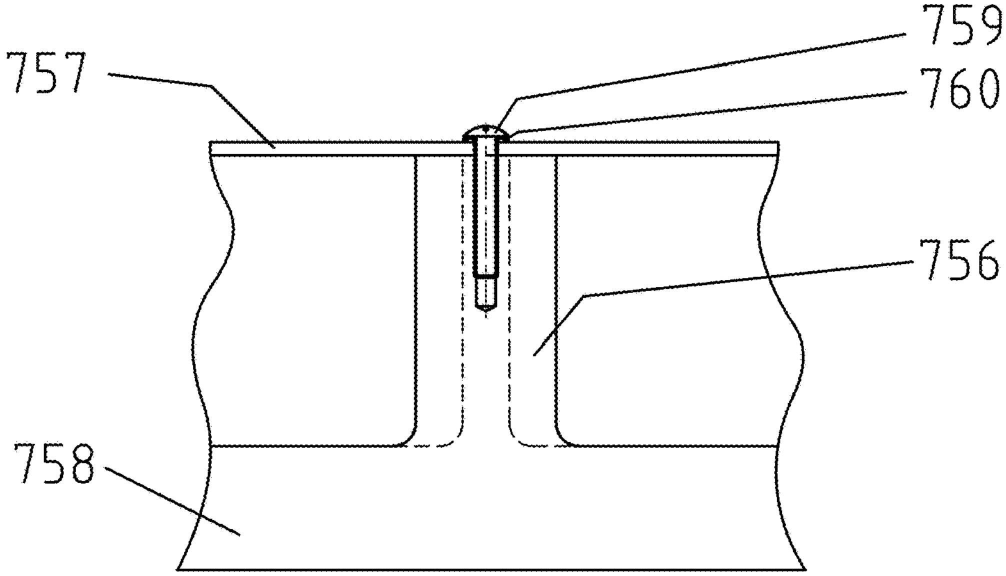
FIG. 96 is the section T-T of FIG. 94.

To control the EV battery temperature, it is required to have a battery enclosure presented in FIG. 92 to FIG. 96, adapted to the new battery design. As described in FIG. 1 and FIG. 2, the main electric vehicle battery has a plurality of independent modules each one having an independent terminal, located in a niche. As shown in FIG. 92, FIG. 93 and FIG. 94, the independent terminal niches 739 are placed on a ledge 740 around the independent modules, FIG. 93. The sealed housing 741 for the main electric vehicle battery 742 is composed by two housings. An upper housing 743 and a lower housing 746 (FIG. 92) with an upper cover 744 and an upper gasket 745 and with a lower cover 747 with a lower gasket 748, see FIG. 93. In the opposite positions for each of the housings, see FIG. 94, there are a pair of IN/OUT connectors (749, 750) and (751, 752) connecting the battery housings to the battery heating/cooling system. A plurality of ribs (fins) 753 made on the battery body 754 (FIG. 95, which is the section Z-Z of FIG. 94), direct the liquid flow to bathe (wash) the entire main electric vehicle battery external surface, see these ribs 755 in FIG. 94 too. A plurality of cover supports 756 may be used, see FIG. 96, which is the section T-T of FIG. 94, to attach the covers 757 to the battery body 758 by screws 759, using sealing washer 760. For wintertime a removable insulating enclosure may be used to protect the main electric vehicle battery.

Figure 97:
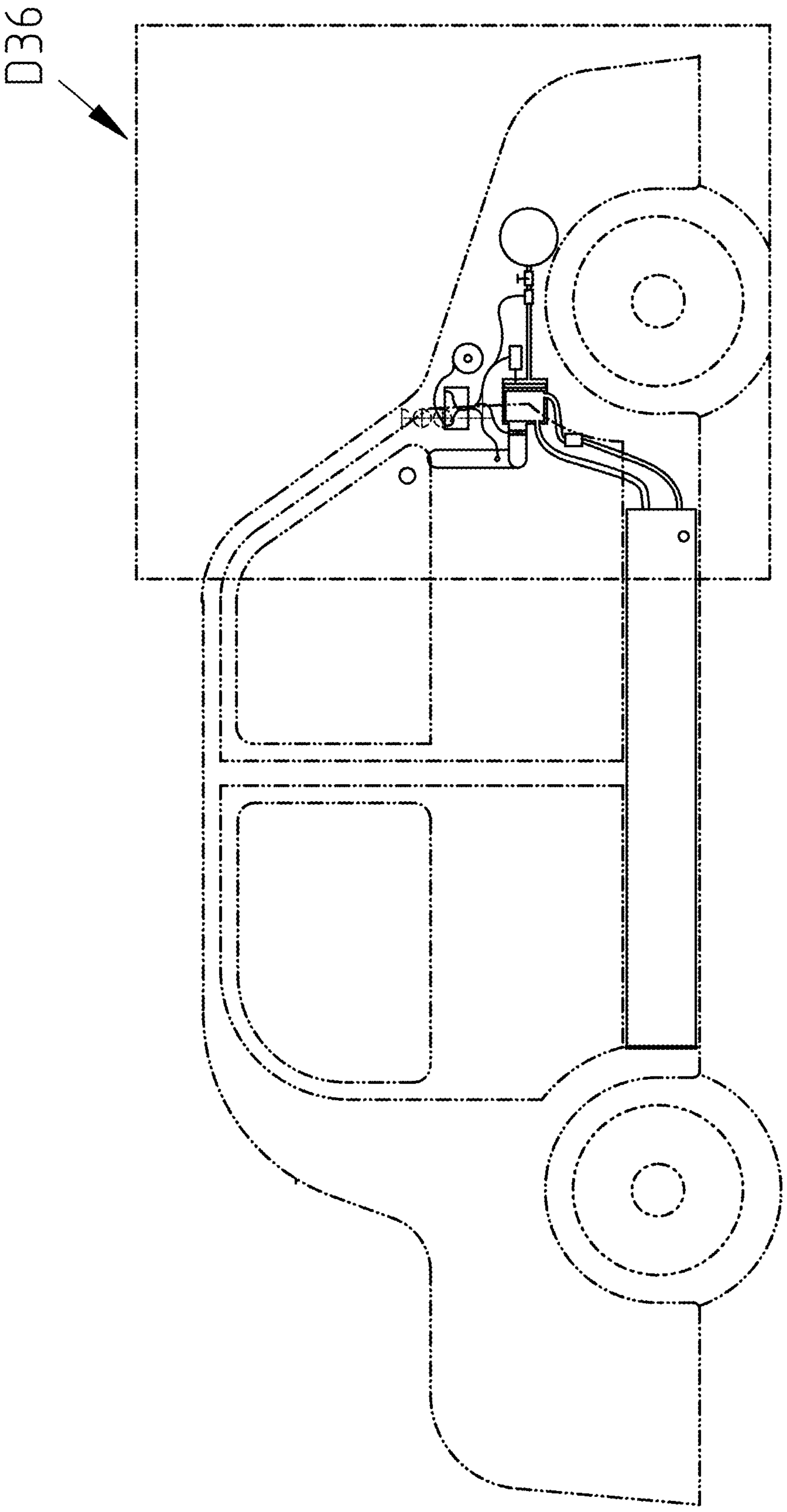
FIG. 97 shows a car with a cooling/heating system for the main EV battery.
Figure 98:
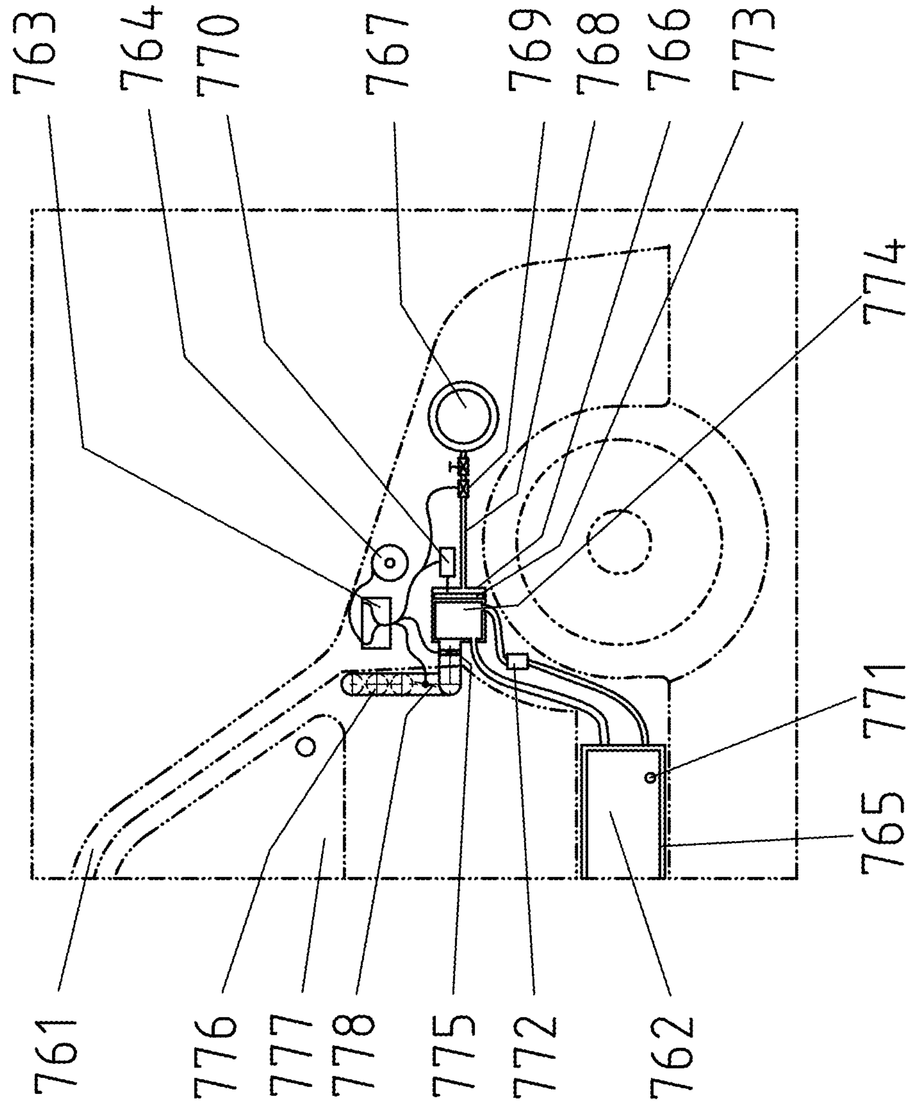
FIG. 98 is the detail D36 of the FIG. 97.
Figure 99:
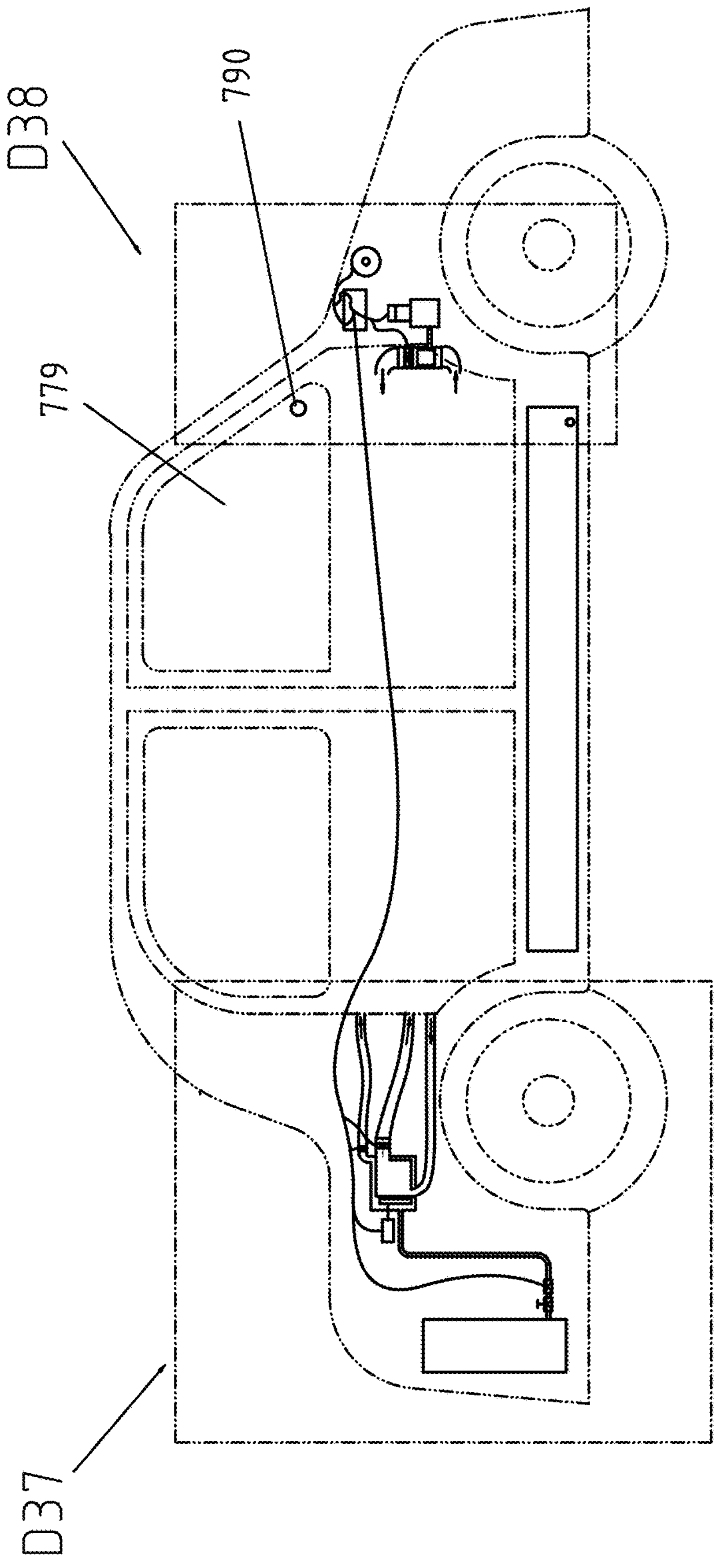
FIG. 99 shows a car with a cooling/heating system for the cabin.
Figure 100:
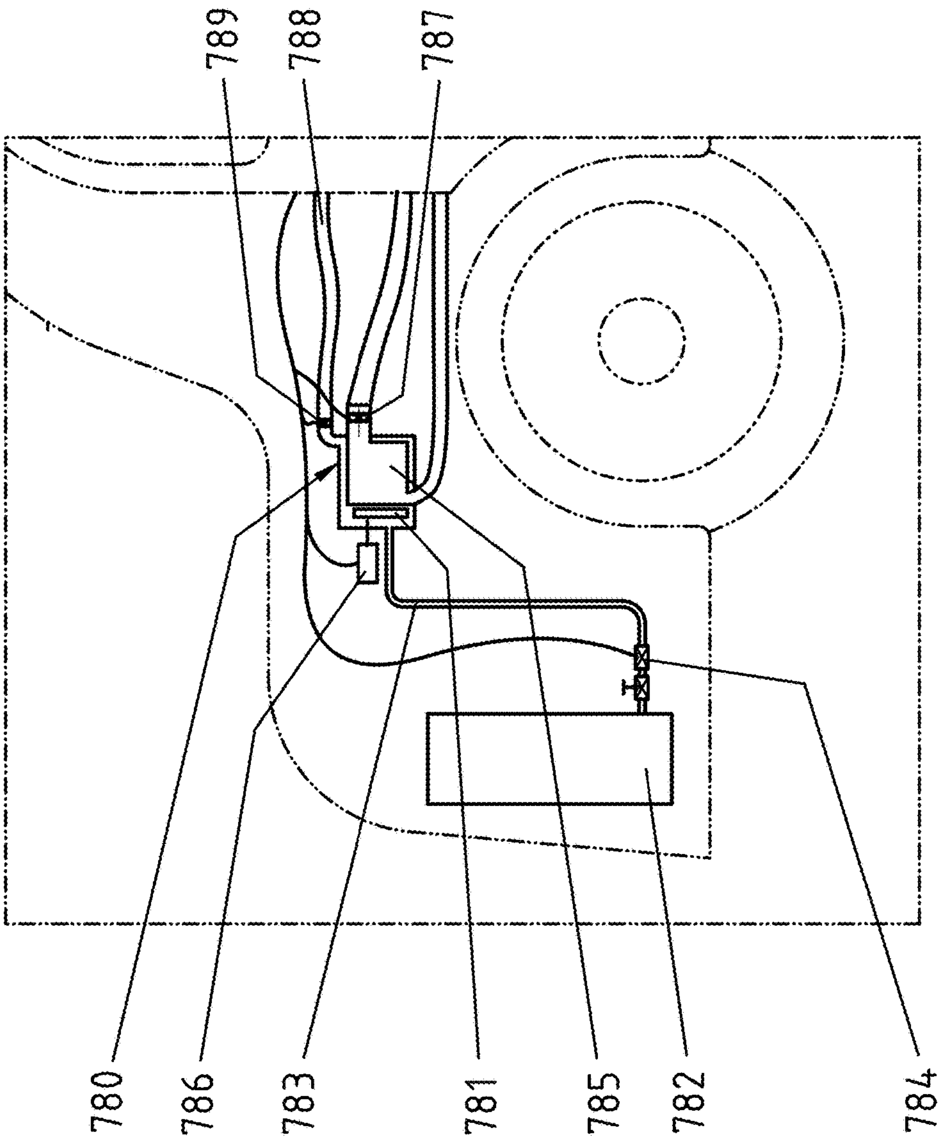
FIG. 100 is the detail D37 of the FIG. 99.
Figure 101:
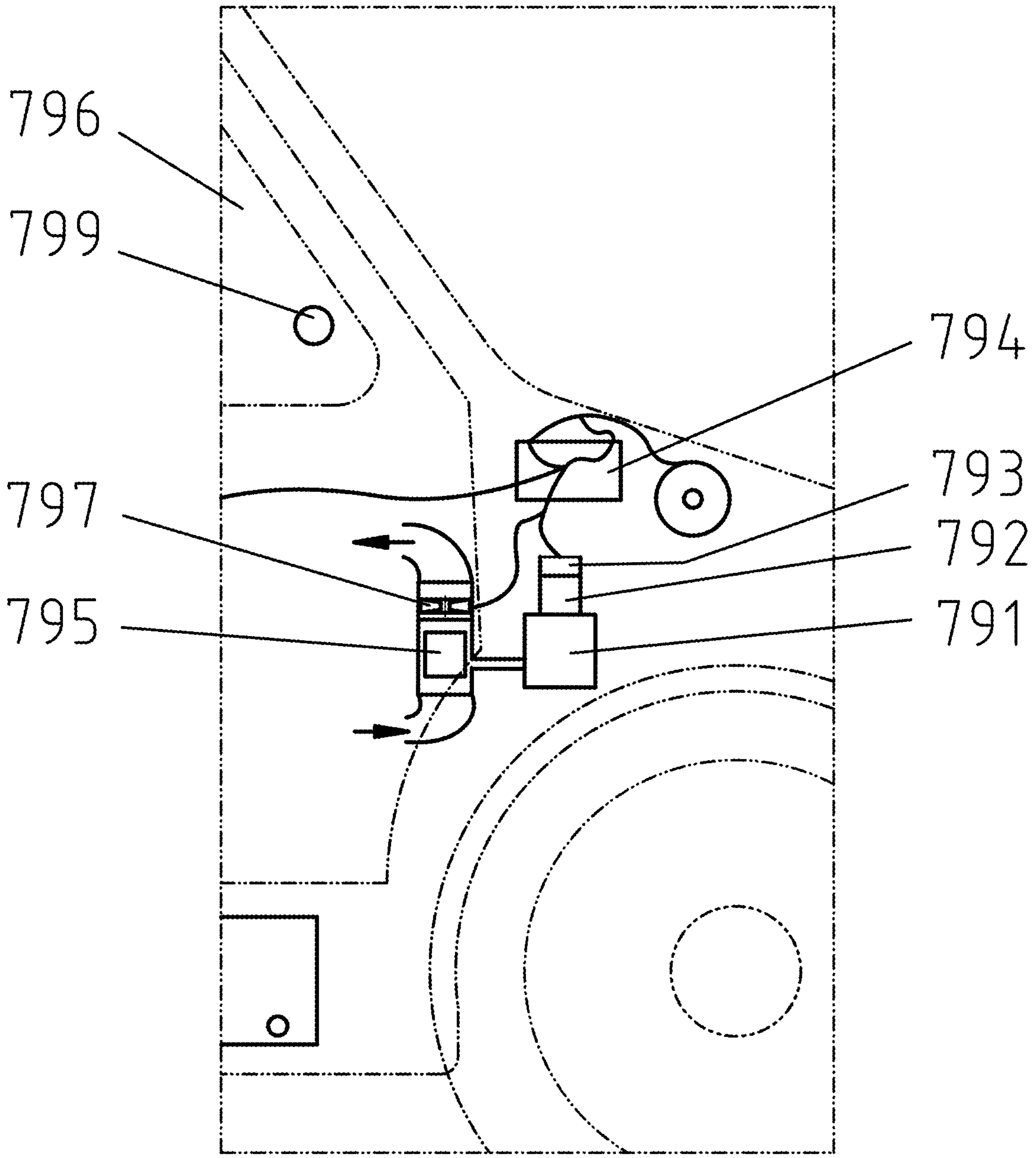
FIG. 101 is the detail D38 of the FIG. 99.

2. The battery's ability to perform in hot and cold temperatures, however, isn't the biggest sinner of them all. The biggest sinner is the car's heating system. EVs may be designed to heat or cool off the battery to help the battery to perform at its best. Because the optimal temperature for most batteries is between 15 and 25 degrees Celsius, part of the energy of the main EV battery is used to cover this need. The car's heating system is also a factor, when it comes to air conditioning. Even if the air in the car cabin is heated or cooled, the result is the same: the energy of the EV main battery is used to control air temperature in the car and not to move the car. Therefore, to achieve the best conditions for the battery performances and to provide the comfortable conditions inside of the EV cabin, without affecting the EV autonomy, the energy used in these purposes have to come from a different source, not from the EV main battery. The solution proposed by this invention is shown in FIG. 97 to FIG. 101, where is presented the heating and the cooling system of an EV without using the energy from the EV main battery. For a better efficiency, any EV has two separate heating and cooling systems: one for the battery and another one for the cabin. In FIG. 97 and in FIG. 98 which is the detail D36 of FIG. 97, is shown the cooling/heating system for the main EV battery, where the car 761 is equipped with an EV main battery 762 and with an auxiliary battery 763, connected to the alternator 764. The EV main battery 762 has a battery enclosure 765, inside of which the cooling/heating liquid may circulate. The actual batteries use a cooling liquid, which is recirculated inside of the battery enclosure 765 to cool the battery in the supply mode, (to avoid the battery over heating). In this invention, the same liquid used for cooling the battery in supply mode, is used in the cool time (wintertime) to keep the battery worm in the parking time, when the battery is not working. To heat the liquid is used a hydrogen heater 766, connected to a hydrogen tank 767 via a hydrogen tube 768 and the electric controlled hydrogen valve 769. The burner is ignited with a spark produced by an electric igniter 770 connected to the auxiliary battery 763. The hydrogen valve 769 and the electric igniter 770 are controlled by the computer of the car, installed into the cabin, based on the information collected from the thermostat 771 installed into the battery enclosure 765. The liquid is circulated into the battery enclosure by a liquid pomp 772. Inside of the hydrogen heater 766, there is a hydrogen burner 773 and a coil 774 on which is circulated the liquid to be heated. In the exhaust duct of the hydrogen heater is installed a fan 775, which creates a draft for the air entering the burner and pushes the hot air out via a coil 776 installed into the EV cabin 777. The flames intensity is controlled by an air flat 778 installed into the exhaust duct and controlled by the car computer. In this way is maximized the efficiency of the hydrogen burned and is increased passenger comfort when entering the vehicle which is no longer cold after parking time. This warm air can be used to heat also the seats during the parking, avoiding in this way the seats electric heating. Cab heating during parking time prevents the windows from freezing also. In this way the battery may be maintained at an optimum temperature in all time, using the clean fuel (hydrogen) without affecting the EV autonomy by consuming EV battery energy. In FIG. 99 are shown the heating and cooling system of the cabin 779 of the car. The cabin heating system, which is an air heating system is presented in FIG. 100, (which is the detail D37 of the FIG. 99). The heater 780 has a hydrogen burner 781 connected to a hydrogen tank 782 via a hydrogen tube 783 and the hydrogen valve 784, which heats the air coil 785. The burner is ignited with a spark produced by an electric igniter 786 connected to the auxiliary battery of the EV. The air is recirculated inside of the cabin and in the heating system by a fan 787. In the exhaust duct 788 of the hydrogen heater is installed a fan 789, which creates a draft for the air entering the burner and pushes the hot air out via a coil installed into the EV cabin. The hydrogen valve 784 and the electric igniter 786 are controlled by the computer of the car, installed into the cabin, based on the information collected from the thermostat 790 installed into cabin 779 (see FIG. 99). As shown in FIG. 101, which is the detail D38 of FIG. 99, the EV is equipped with an AC system having an AC compressor 791 activated by a hydrogen engine 792, which is controlled by a starter 793, activated by the auxiliary battery 794, without using the energy of the EV main battery. The AC coil 795 is installed inside of the cabin 796, cooling the air passing by, pushed by the fan 797. The starter 793 is controlled by the computer of the car, installed into the cabin 796, based on the information collected from the thermostat 799 installed into cabin 796. In FIG. 97 to FIG. 101 are presented the heating and the cooling system of an electric car, but similarly can be designed these systems for trucks, for any kind of busses or any type of electric vehicle.

Figure 102:
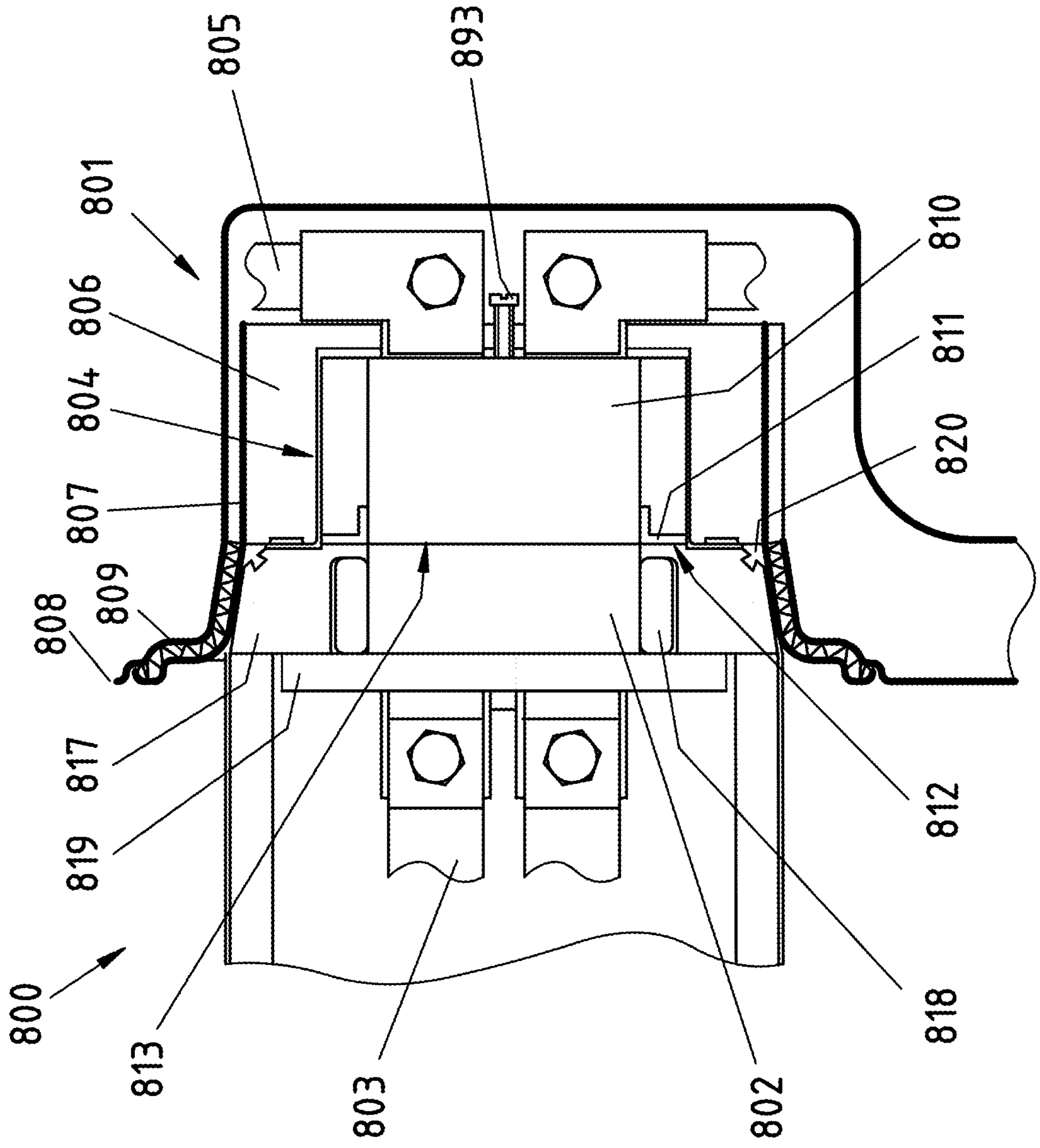
FIG. 102 shows an example of a charger outlet stationary phase-contact which is fitting with the EV inlet moving phase-contacts.
Figure 103:
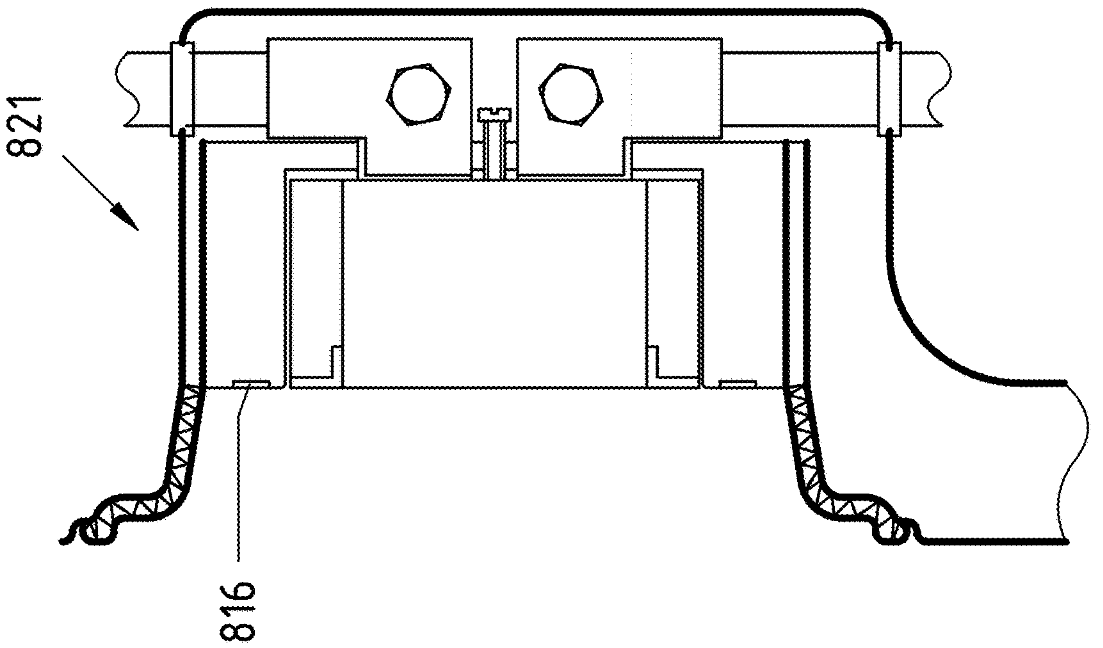
FIG. 103 shows an example of an EV inlet moving phase-contacts.
Figure 104:
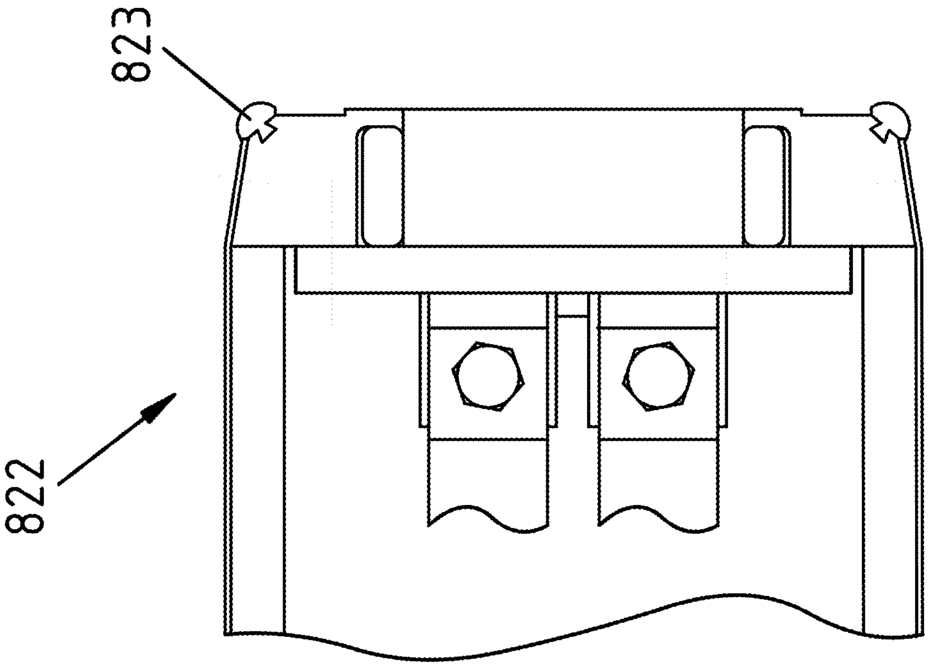
FIG. 104 shows an example of a charger outlet stationary phase-contact.
Figure 105:
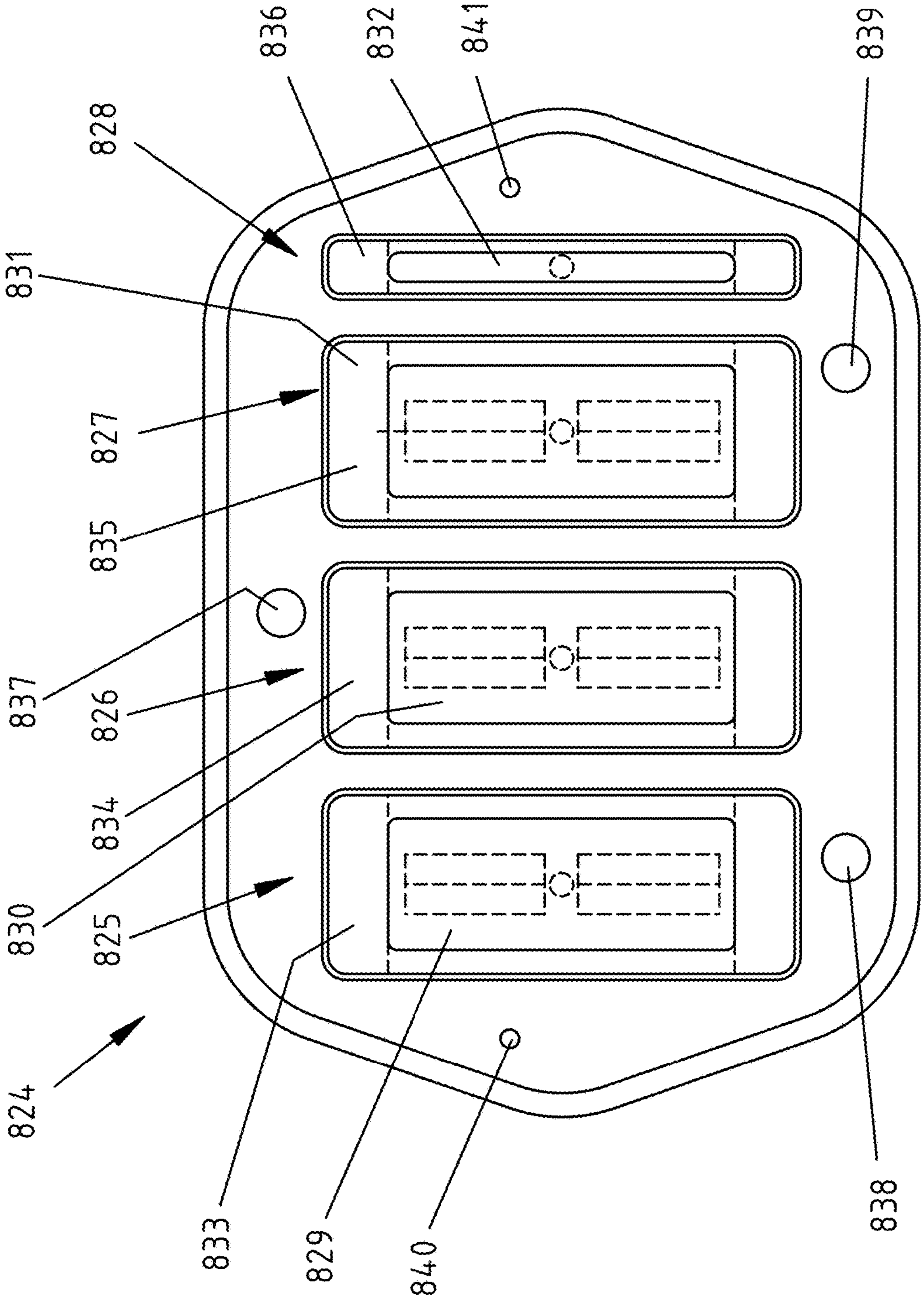
FIG. 105 is a front view of a phase-contacts of an EV inlet.
Figure 106:
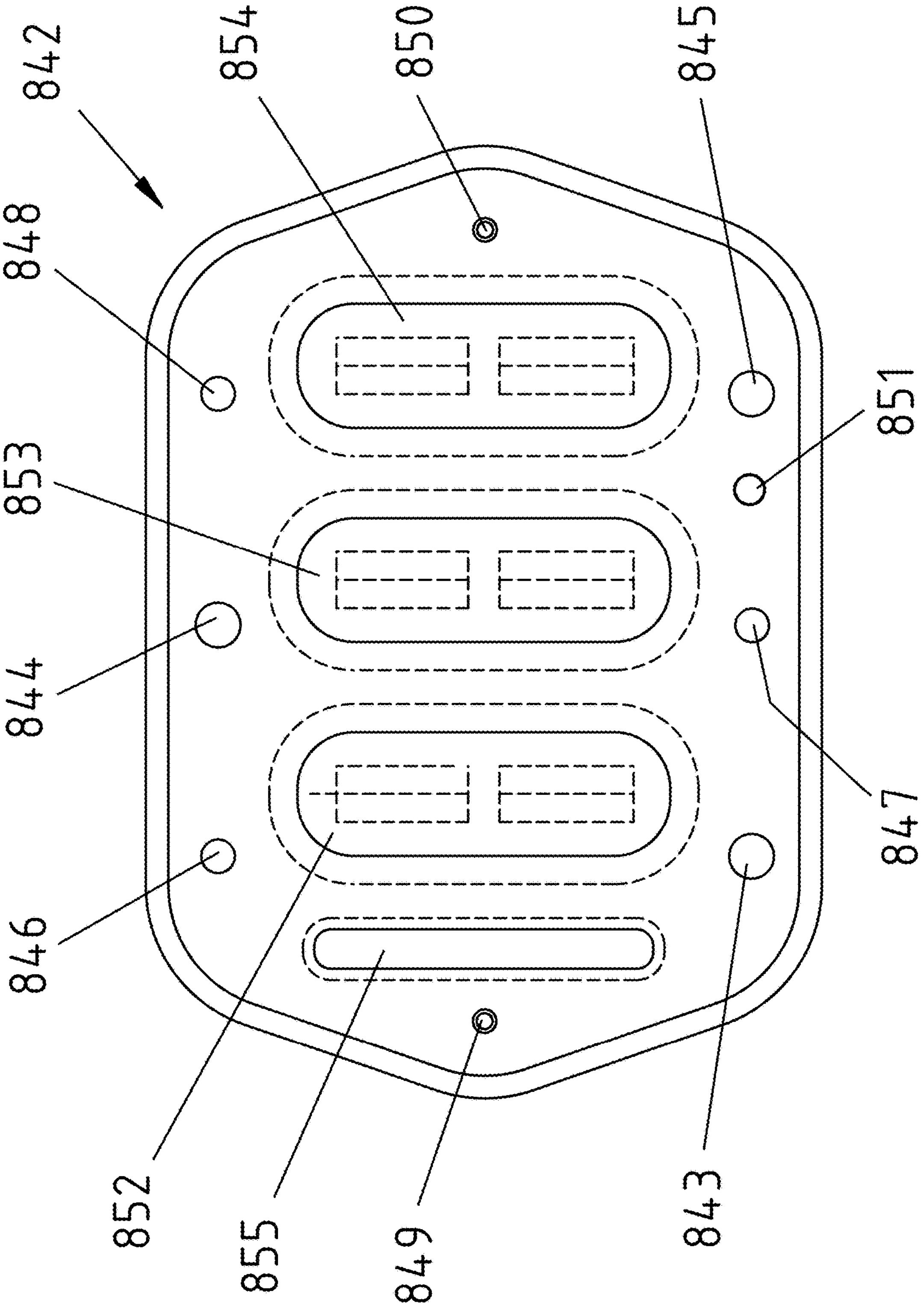
FIG. 106 is a front view of a phase-contacts of a charger outlet.

Similar with the embodiments presented in FIG. 11, FIG. 12 and FIG. 13, in FIG. 102 is shown an example of a charger outlet phase-contact 800 which is fitting with the EV inlet phase-contact 801. The stationary phase-contacts 802 of the charger outlet are connected to the phase-cables 803 and it is in contact with the moving phase-contacts 804 of the EV inlet connected with the phase-cables 805. The moving phase contacts 804 of the EV inlet are installed slid fit into a piece of insulating material 806, which filles the entire EV inlet enclosure 807, attached to the EV body 808 by an elastic element 809, which in this embodiment is an accordion style of rubber. Each phase-contact of the EV inlet 804 has a copper contact portion 810, an iron portion 811, which surrounding the copper portion and is attached to the copper portion rigidly, having a flat surface 812 at the same level with the contact face 813 of the copper portion 810 (obtained by grinding together the two pieces before installation), this subassembly being incapsulated into a piece of insulating material 814, realizing the assemble 815, which is free sliding installed into the piece of EV inlet 806, allowing to the entire assemble 815 to slid very easily into the piece 806. To adjust the position of each of the EV phase-contact inside of the piece 806, an adjusting system may be used, having for each EV phase-contact a screw 893. The charger outlet 800 has stationary copper phase-contacts 802, incapsulated into a piece of insulating material 817, each copper phase-contact being surrounded by an electromagnet 818. The phase-contacts and the electromagnets are covered by a cover 819, made by an insulating material, attached to the incapsulating insulating material 817. When the charger outlet approaches and is engaged with the EV inlet, the electromagnets 818 are powered and will attract the iron plate 811 of the EV inlet phase-contacts, which can slide into the EV inlet piece 806, realizing a strong connection between the two contacts 810 and 802. This may be the best solution of the connection between the charger outlet and the EV inlet. To attenuate the shocks during the engagement, the charger output has on the edge a ring of elastic-soft material 820 and the EV inlet is attached to the EV body by the elastic element 809. FIG. 103 shows the EV inlet 821 detached from the charger outlet and the targets 816. In FIG. 104 is the charger outlet 822 alone and is visible the dumper ring 823 on the edge. FIG. 105 is a face view of the EV inlet 824, showing the three negative phase-contacts 825, 826, 827 and the positive contact 828, with their copper portion 829, 830, 831 and 832 and with their iron portion 833, 834, 835 and 836. Can be seen also the three camera targets 837, 838 and 839, which are some black holes performed into the insulating material of the EV inlet face, as well as the two control switches 840 and 841. FIG. 106 is a face view of the charger outlet 842, showing the three cameras 843, 844 and 845, the three ultrasonic sensors 846, 847 and 848, the two lights 849 and 850 and the safety button switch 851. Also, can be seen the three negative copper phase-contacts 852, 853 and 854 and the positive copper phase-contact 855 each one surrounded by an electromagnet.

Figure 107:
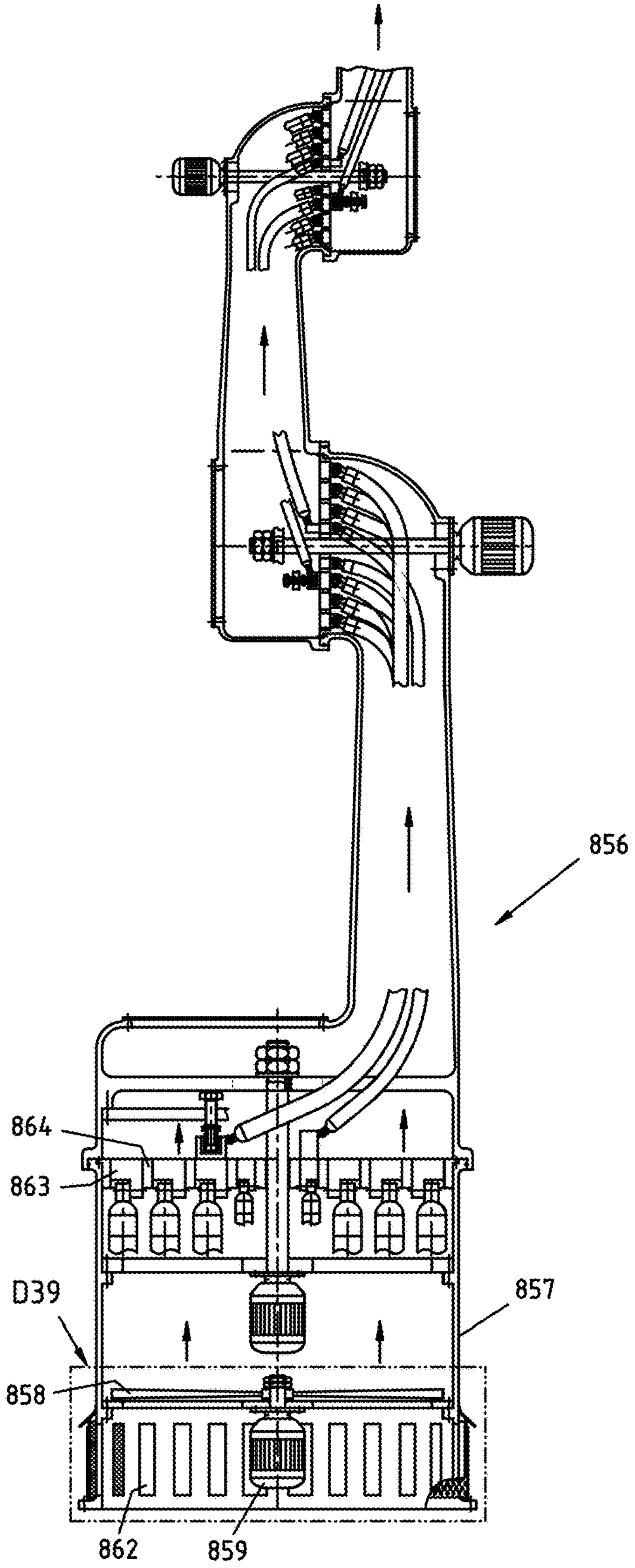
FIG. 107 is a partial cross section of a rotary robot having an air cooling system.
Figure 108:
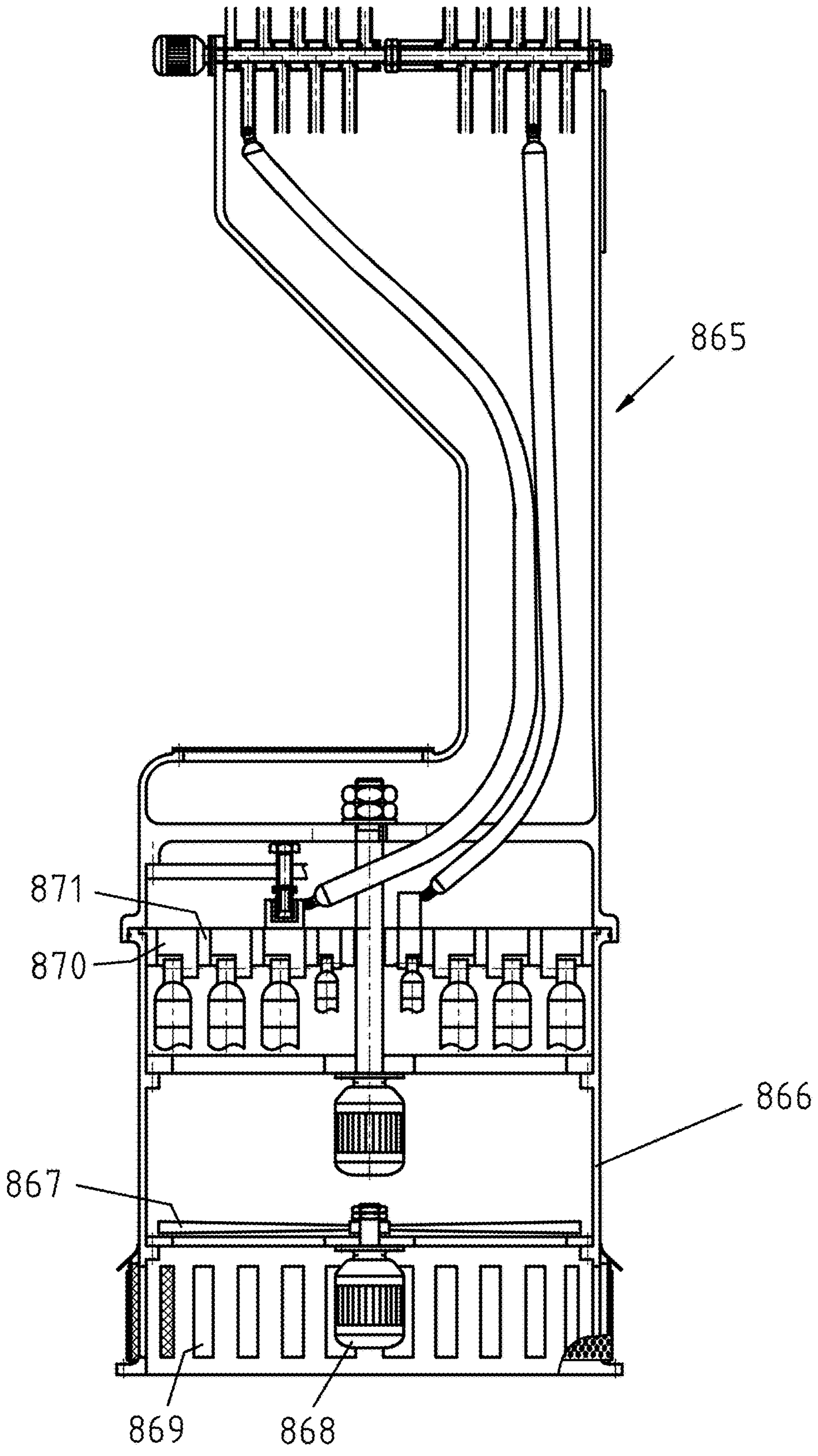
FIG. 108 is a partial cross section of a mixt robot having an air cooling system.
Figure 109:
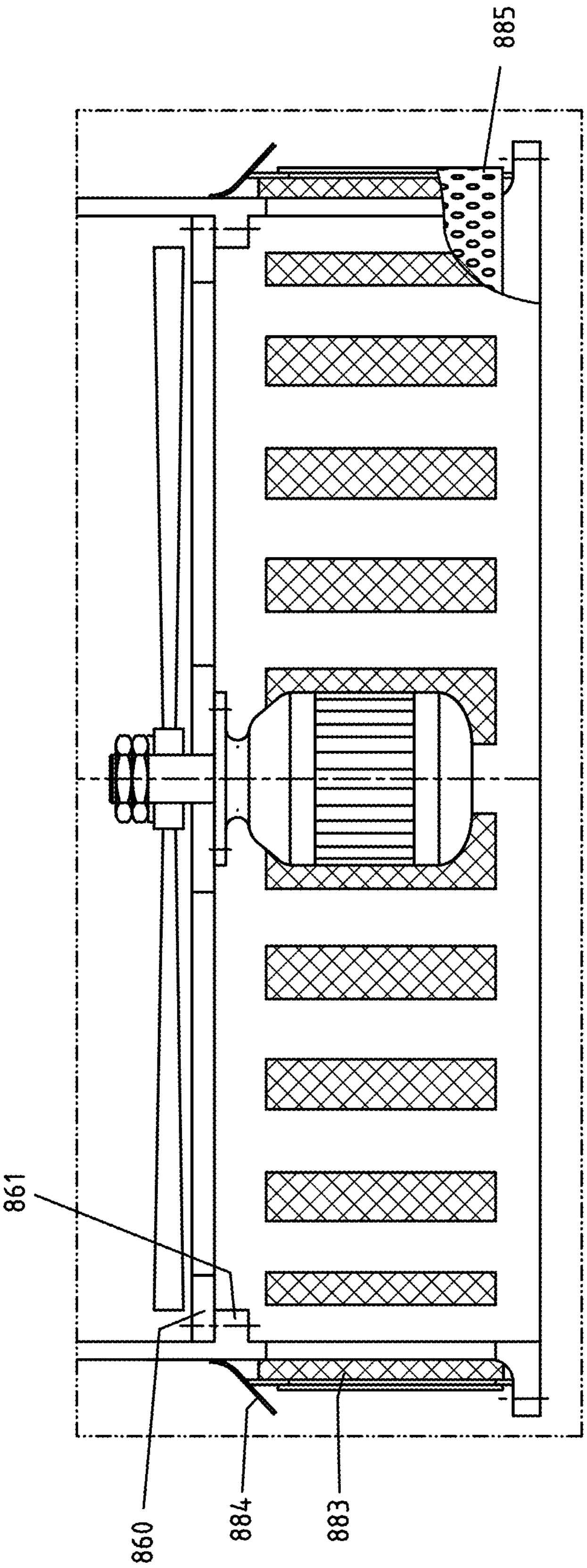
FIG. 109 is the detail D39 of the FIG. 107.
Figure 110:
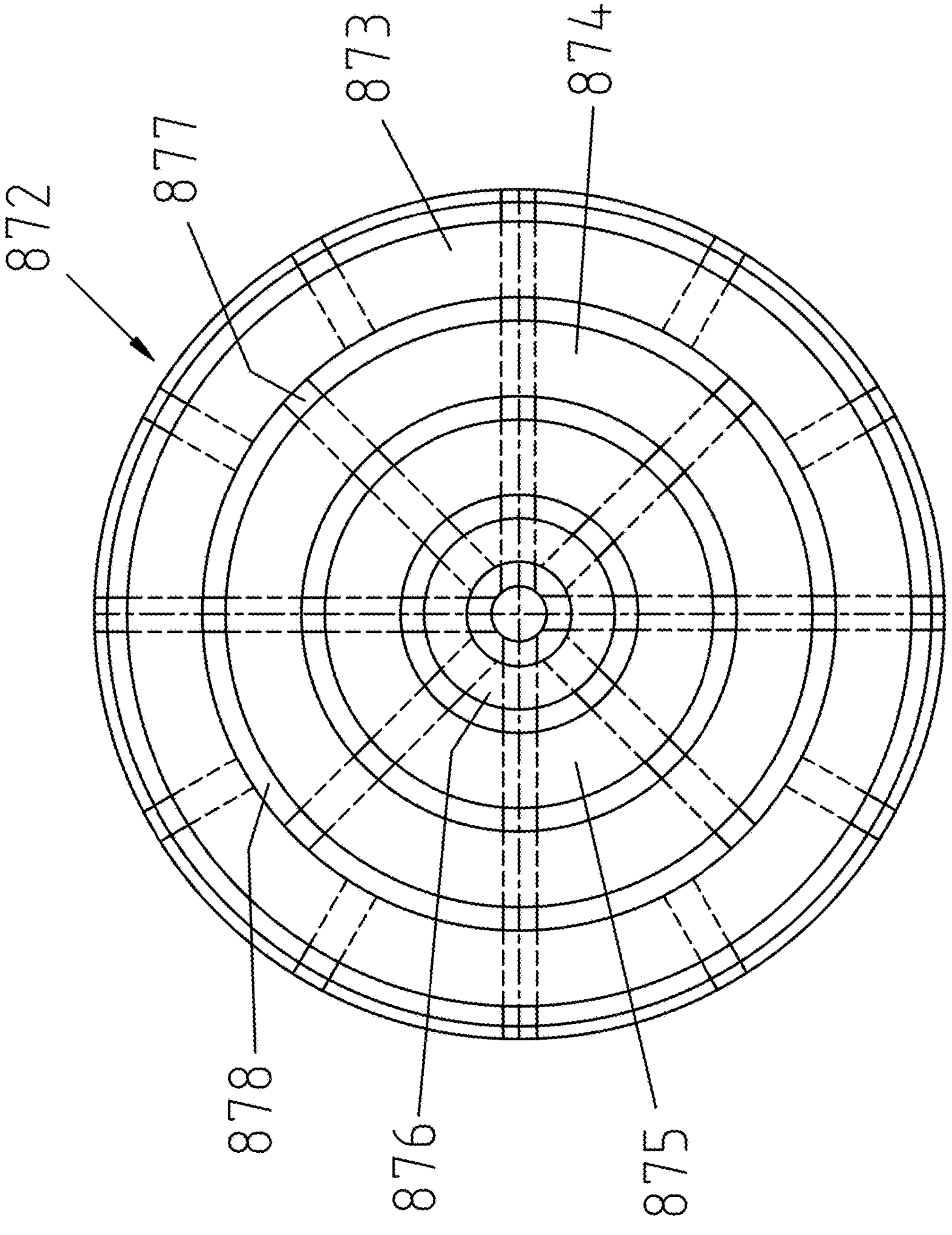
FIG. 110 shows a view of the plurality of contact rings for the air colling version.
Figure 111:
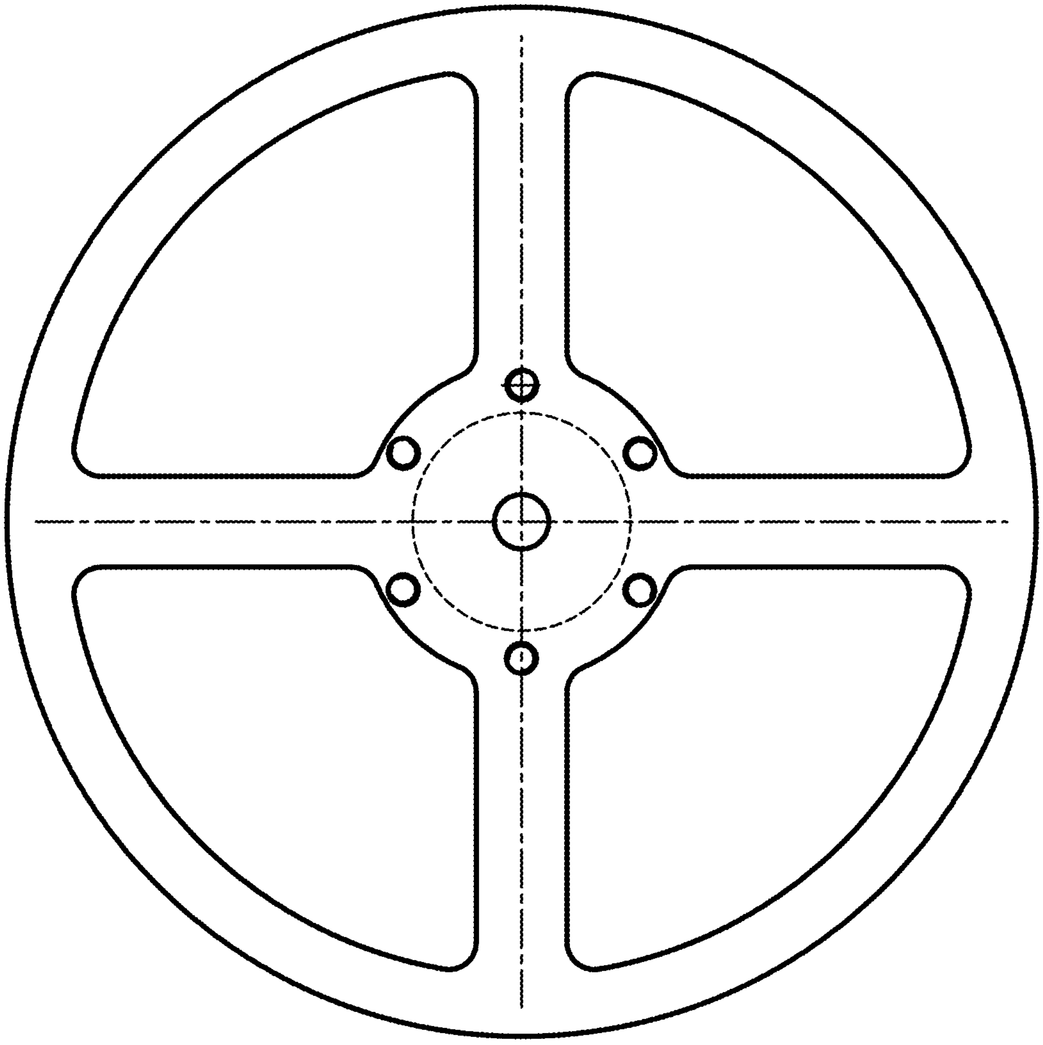
FIG. 111 shows a cross rib on which is installed a motor of a fan for the air colling version.
Figure 112:
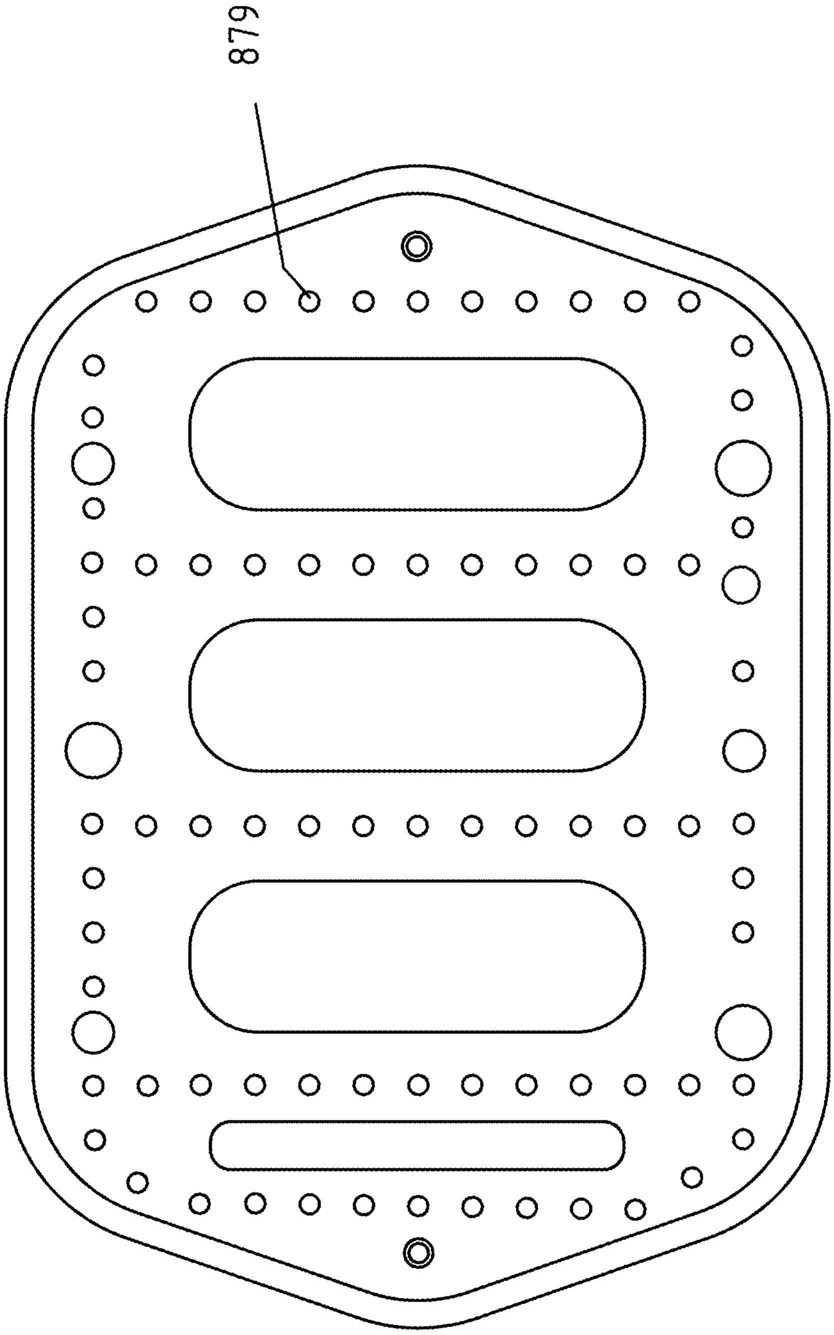
FIG. 112 is a front view of the charger outlet air cooling version.
Figure 113:
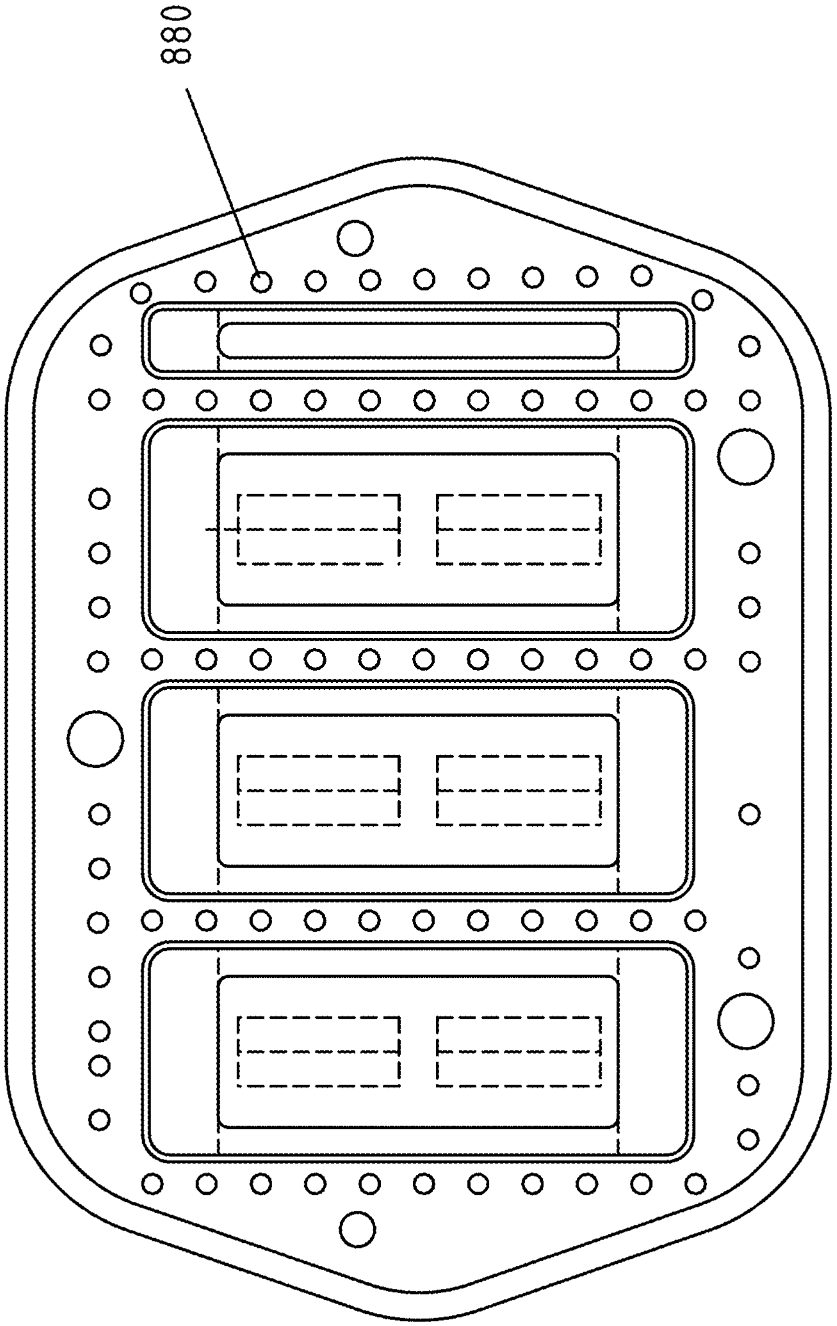
FIG. 113 is a front view of the EV inlet air cooling version.
Figure 114:
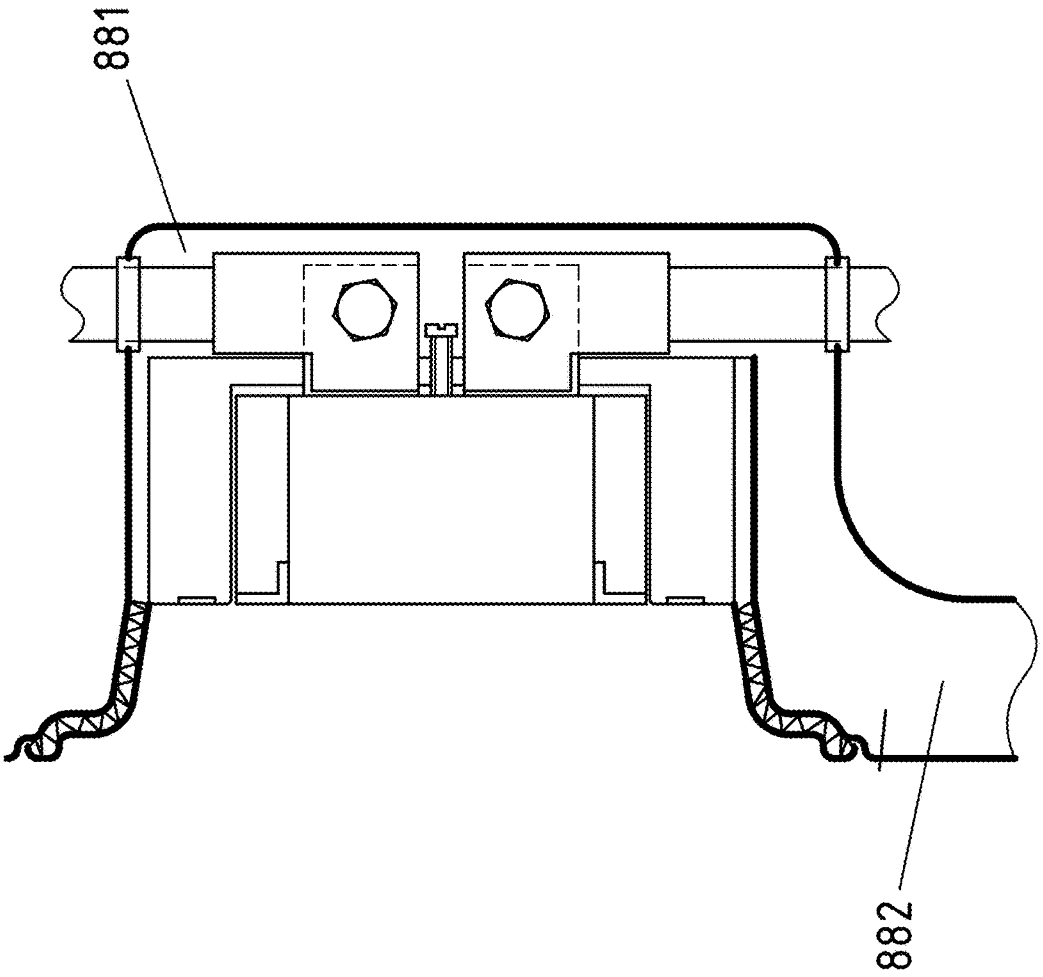
FIG. 114 is a cross section of an EV inlet air cooling version, showing the air collector and the exhaust duct.

For all rotary and mixt robot charger presented here in, an air-cooling system can be used. In FIG. 107 is shown a rotary robot charger 856 with an air-cooling system having on the robot base 857 a fan 858 activated by the motor 859. The fan assembly (fan 858 and the motor 859), are located on the lower position inside of the robot base 857, being installed on the cross ring 860, rigidly attached to the base on the shoulder 861, see FIG. 109 which is the detail D39 of FIG. 107. Under the shoulder 861 the base has a plurality of slots 862 (FIG. 107), allowing the air entry into the robot base. The fan pushes the fresh air upwards to the contact rings 863, (FIG. 107), which are incorporated into the cross ring 864, having a plurality of circular slots between the copper rings, see FIG. 110. The air flow passing between the copper rings will cool them and will go further to the next level, colling the cables and everything encountered on the way. The entire robot body is a sealed structure, therefore the air will be kept inside of the robot body up to the charger outlet, and from there, by a plurality of tiny holes between the phase-contacts it passes, cooling the phase-contacts. When the charger outlet and the EV inlet are engaged, the air flow of each tiny charger outlet hole will continue passing by the EV inlet tiny holes located in front of the charger outlet holes without any resistance, cooling the phase-contact of the EV inlet and their cables, inside of the EV inlet, where is collected by a collector and conducted to outside of the EV by a exhaust duct. In FIG. 108 is shown the air-cooling system for a mixt robot charger 865. It can be seen the robot base 866, the fan assembly with the fan 867 and its motor 868, the plurality of the base slots 869, the copper rings 870 and the cross ring 871. In FIG. 110 is shown the copper ring assembly 872 having the three negative copper rings 873, 874, 875 and the positive ring 876, incorporated into an insulating material having radially some beams 877 to keep them strong, having the opened slots 878 to let the air passing and cooling the copper rings. In FIG. 111 is shown the cross ring which supports the fan assembly, allowing the air to pass through. FIG. 112 is a face view of the charger outlet, showing the plurality of tiny cooling holes 879 surrounding the phase-contacts and cooling them during the EV battery recharge. FIG. 113 is a face view of the EV inlet, showing the plurality of tiny cooling holes 880 surrounding the phase-contacts and cooling them during the EV battery recharge. These cooling holes are aligned with the cooling holes of the charger outlet, allowing the air flow to continue and to cool the EV inlet, too. FIG. 114 shows the EV inlet air collector 881 inside of the EV, and the exhaust duct 882, conducting the air outside of the EV. The EV inlet phase-cables are sealed by a plurality of collars, avoiding the cooling air to enter the EV cabin.

Figure 115:
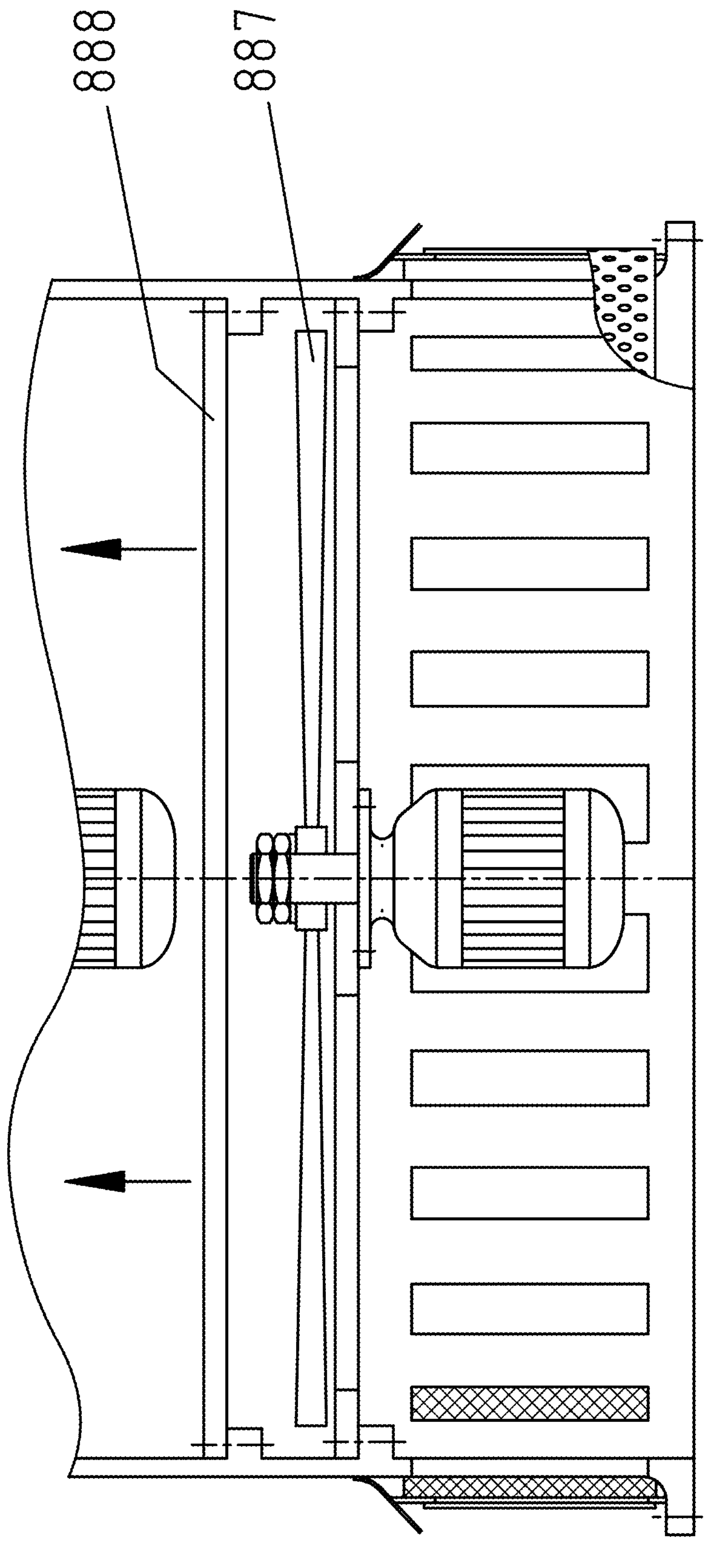
FIG. 115 is a partial cross section of a robot with AC capability.

To avoid the water to enter the robot base by the base slots 862, (FIG. 107), the filter 883 (FIG. 109) is installed outside the robot base and protected by a kind of roof 884 and the perforated cover 885 all around. In this way the air entering the robot is kept free of water, avoiding any short circuit. In the summertime, especially in the very hot days, the outside temperature is too high, and the fresh air is not capable to cool the robot contacts and cables. For these situations, an AC system may be used to cool the cooling air of the robot. Therefore, each robot is equipped with an AC unit and on top of the fan 887, sec FIG. 115, is installed an AC coil 888, cooling the air pushed by the fan 887.

Figure 116:
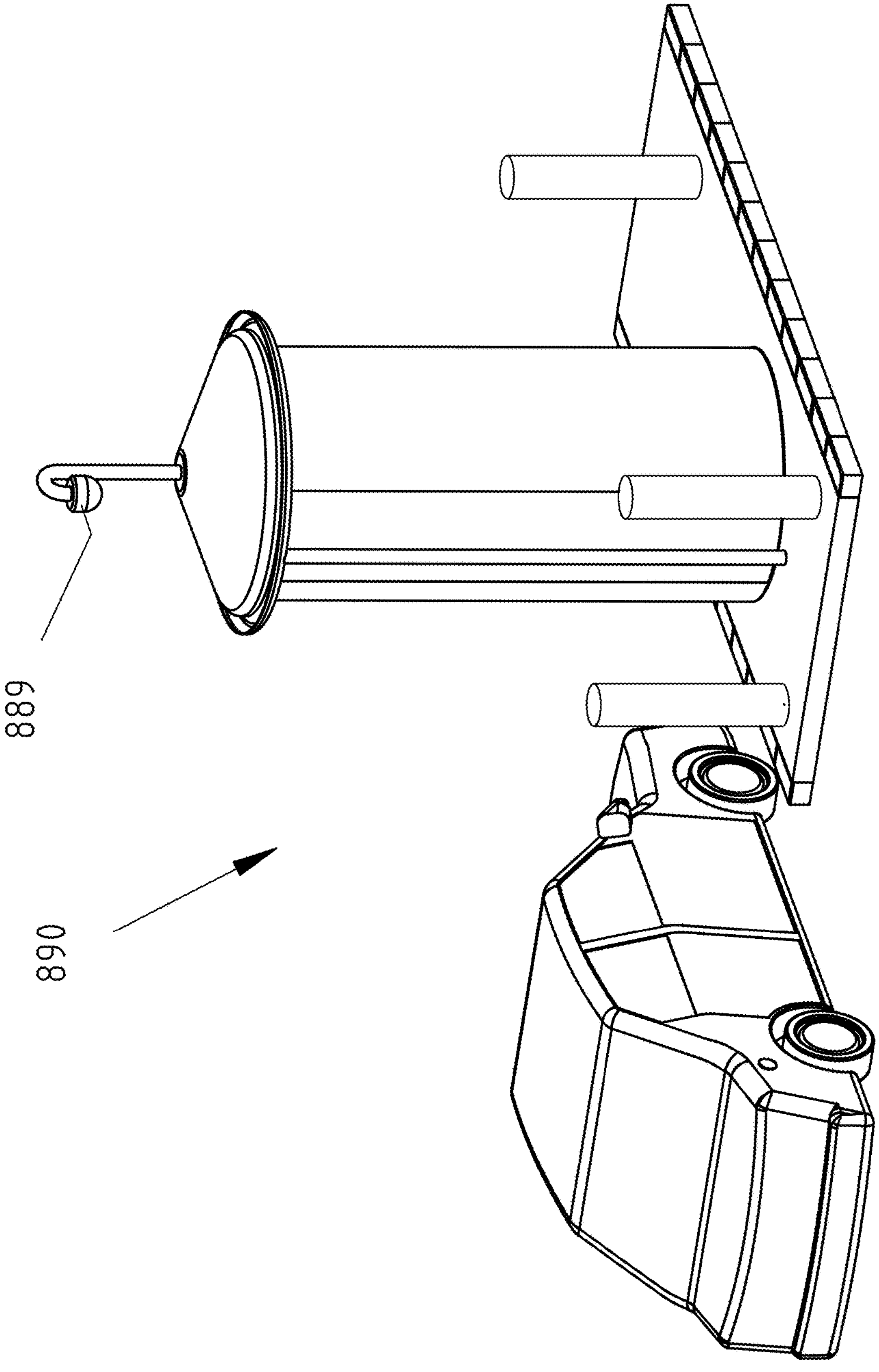
FIG. 116 is an isometric view of a recharge station equipped with a camera having rotary robot retracted into its cabin in a standby position, receiving a car for recharge.
Figure 117:
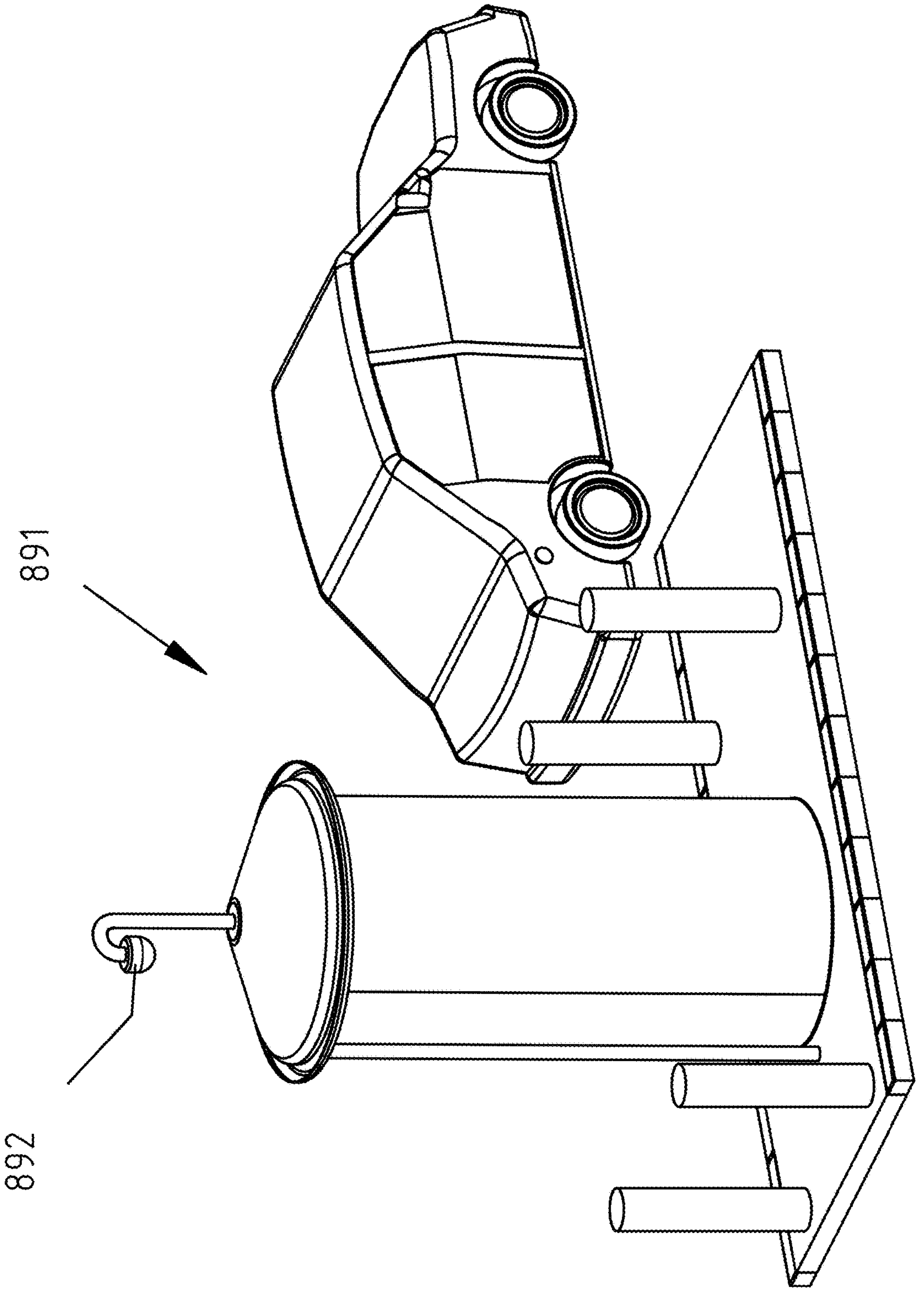
FIG. 117 is an isometric view of a recharge station equipped with a camera having rotary robot retracted into its cabin in a standby position, after recharging a car.

To keep the EV inlet contacts dry is used an automatic EV inlet sealing cover having two sections: one external cover protecting the entire EV inlet at the level of the EV body and the second one—contacts cover, which is attached to the external cover by an elastic element, which is laying on the EV inlet contacts, stopping the water to wet the contacts. The covers are opened and closed by a mechanism activated by an electromagnet installed on the EV body, which is activated by a sensor, which receives a signal from a camera 889 (see FIG. 116 FIG. 116) installed on the robot cabin, when the camera notices that an EV approaches to the automatic recharge station, giving a signal to the recharge station system to open the EV inlet cover. When the EV lives the automatic recharge station, at a distance where the camera doesn't see anymore the EV, the electromagnet is disactivated and an elastic element closes the EV inlet cover. FIG. 116 and FIG. 117 show the automatic recharge station 890 and 891 with a car approaching and another one leaving the automatic recharge station. It can be seen the cameras 889 and 892, which identify the EV and transmit a signal to the recharge station system to enter into the communication with the driver and to open and close the automatic EV cover.

The automatic EV battery recharge stations are designed to automatically recharge simultaneously a plurality of electric cars and a plurality of double inlet electric vehicles, which have two EV inlets on the same electric vehicle, when a rule is established specifying the distance between the double inlets of the electric vehicles equal to the distance between the two neighboring robots. The automatic EV battery recharge station must replace actual gas stations on the entire USA territory, occupying the same locations as the actual gas stations, excepting a transition period when both coexist in the same location as the actual gas stations.

This invention proposes practical solutions for a new generation of electric vehicles more efficient and user-friendly by the short time of battery recharge and good autonomy and a new generation of EV battery chargers, designed in a modern concept, using different kind of robots, allowing the recharge automation, involving the intelligent telephone for the communication between the driver and the recharge station or financial institutions, via wireless internet.

I claim:

1. An electric vehicle (EV) comprising:

a main EV battery including a plurality of independent modules each one including an independent module terminal, the said main EV battery configured to supply power to an electric motor, the main EV battery comprising a main battery terminal configured to be used only to supply power to the said electric motor for EV moving, the said EV configured to fast automatically recharge the main EV battery, an EV computer having memory configured to store recharge-control software, an automatic EV inlet comprising:

i. an automatic opening/closing cover mechanism, configured to automatically open and close when the EV is entering and leaving the automatic recharging station being controlled by the said computer, ii. a plurality of automatic EV inlet moving contacts configured to be attached to the EV by a plurality of elastic elements of the automatic EV inlet moving contacts, the automatic EV inlet moving contacts being protruding outside the automatic EV inlet face in free position and pushed against a plurality of fixed contacts of a charger outlet during the charger outlet and the automatic EV inlet engagement by compressing the elastic elements of the automatic EV inlet moving contacts, iii. an electromagnetic clamping mechanism configured to firmly attract an automatic electromagnetic charger outlet configured to be the last arm of a robotic charger of an automatic battery recharge station in this way ensuring strong contact between the automatic EV inlet moving contacts and the plurality of fixed contacts of the charger outlet comprising:

a plurality of iron plates located on the EV inlet face and solidly attached to the automatic EV inlet configured to be clamped by the electromagnetic charger outlet during the engagement, when a charger outlet electromagnet is ON, realizing a good electric contact between the plurality of the automatic EV inlet moving contacts and the plurality of fixed contacts of the charger outlet by compressing the elastic elements of the automatic EV inlet moving contacts, iv. a plurality of targets located on the automatic EV inlet face helping a good fit engagement between the charger outlet and the automatic EV inlet comprising:

a plurality of video targets configured to be detected by a video camera mounted on the charger outlet, a plurality of ultrasonic targets configured to be detected by an ultrasonic probe mounted on the charger outlet, v. a plurality of cooling holes, vi. an EV inlet exhaust duct configured to collect the cooling air passing through the said cooling holes conducting the cooling air outside of the EV, vii. means to elastically attach the automatic EV inlet to the EV, a charging/supplying system for fast battery recharge configured to connect the said automatic EV inlet to the independent modules of the main EV battery during the recharge and to connect all independent modules together to the main battery terminal during the supply, a liquid-based hydrogen-powered battery temperature control system configured to regulate the temperature of the main battery by controlling the liquid temperature by hydrogen burning, when the EV is in use or parked, an air-based hydrogen-powered cabin heating system configured to regulate the temperature of the cabin by controlling hydrogen burning, when the EV is in use, an auxiliary cabin heating system configured to use in the winter the exhaust gases resulting of the combustion of the hydrogen used in the said battery temperature control system, when the EV is in use or parked, a hydrogen-powered air conditioning system configured to use hydrogen as energy source for an AC compressor motor, an auxiliary battery powered by an alternator, the auxiliary battery configured to power auxiliary loads, and a plurality of electrical connectors configured to provide power and communication between the EV computer and the automatic EV inlet, the hydrogen battery temperature control system, the hydrogen EV cabin heating, and the hydrogen-powered air conditioning system.

2. The electric vehicle (EV) as described in claim 1, wherein the said main battery comprising:

a main battery box comprising:
i. a battery box comprising:
a box incorporating the plurality of independent modules,
a battery ledge,
a plurality of niches for the said independent modules terminals incorporated into the said battery ledge,
ii. a primary battery housing,
iii. a secondary battery housing, both configured to be watertight when joined together and attached on the battery ledge,
iv. a plurality of ribs made on the outside wall of the said battery box configured to direct the liquid flow to bathe the entire external surface of said box,
v. a plurality of IN/OUT connectors for liquid connecting the main battery to the battery temperature control system,
a main battery terminal configured to be used only to supply power to the electric motor, for EV moving,
a removable insulating enclosure configured to protect and isolate the battery in the winter and
a plurality of attaching means configured to solidly attach the main battery to the EV.

3. The electric vehicle (EV) as described in claim 1, wherein the said charging/supplying system comprising:
a switches and changeover switches box configured to connect to power separately each independent battery module for main battery recharge and to connect together to the battery main terminal all the independent modules for power supply, comprising:
i. a switches and changeover switches box body,
ii. a plurality of switches located inside of the switches and changeover switches box body configured to control the independent modules connected in parallel, being in ON position for recharge and in OFF position for supply,
iii. a plurality of changeover switches located inside of the switches and changeover switches box body configured to control the independent modules connected in series, being in the “b” position for recharge and in the “a” position for supply,
iv. a modules port comprising:
a) a modules port multi-connector parallel for the independent modules connected in parallel, with a plurality of terminals, each one of the modules port multi-connector parallel inlets connected to each one of the independent module terminals and a modules port outlet with a plurality of terminals each one connected to a terminal Tl of each switch,
b) a modules port multi-connector series for the independent modules connected in series, with a plurality of terminals, each one of the modules port multi-connector series inlets connected to one of the independent module terminals and a modules port outlet with a plurality of terminals each one connected to the changeover switches terminal,
v. a charge port comprising:
a) a charge port connector parallel for the independent modules connected in parallel, comprising a charge port connector parallel inlet connected to the automatic EV inlet and a charge port multi-connector parallel outlet with a plurality of terminals each one connected to the terminal Tl of each switch,
b) a charge port connector series for the independent modules connected in series, comprising a charge port connector series inlet connected to the automatic EV inlet and a charge port multi-connector series outlet with a plurality of terminals each one connected to the “b” terminal of each changeover switch,
vi. a supply port comprising:
a) a supply port multi-connector parallel for the independent modules connected in parallel, comprising a plurality of supply port multi-connector parallel inlets each one connected to the free terminal of each switch and with one common outlet supply terminal connected to the main battery terminal,
b) a supply port multi-connector series for the independent modules connected in series, comprising a plurality of supply port multi-connector series inlets each one connected to the “a” terminal of each changeover switch, and with one common outlet supply terminal connected to the main battery,
a button switch located in the EV inlet configured to activate and disactivate the switches and changeover switches when the automatic EV inlet is engaged or disengaged with the charger outlet and
a plurality of electric connectors configured to connect:
i. the EV inlet and the recharge port,
ii. each independent module to the module port,
iii. the supply port with the battery main terminal,
iv. the switches and changeover switches to the module port, to the recharge port and to the supply port inside of the switches and changeover switches box.

4. The electric vehicle (EV) as described in claim 1, wherein the automatic EV inlet comprising:
a plurality of moving contacts configured to be attached to the EV by a plurality of elastic elements, the moving contacts being protruding outside the automatic EV inlet face in free position and pushed against the charger outlet contacts during the automatic EV inlet with the charger outlet engagement by compressing the elastic elements,
an electromagnetic clamping mechanism configured to ensure strong contact between the autoatic EV inlet moving contacts and the charger outlet comprising:
i. a plurality of iron plates located on the automatic EV inlet face and solidly attached to the EV, configured to be clamped by the electromagnetic charger outlet during the automatic EV inlet with the charger outlet engagement, when a charger outlet electromagnet is ON, realizing a good electric contact between the said plurality of automatic EV inlet moving contacts and the charger outlet contacts by compressing the elastic elements,
ii. a plurality of targets located on the automatic EV inlet face, helping a good fit engagement of the automatic EV inlet with the charger outlet comprising:
a plurality of video targets configured to be detected by a video camera mounted on the charger outlet,
a plurality of ultrasonic targets configured to be detected by an ultrasonic probe mounted on the charger outlet,
a plurality of cooling holes,
an EV inlet exhaust duct configured to collect the cooling air passing by the said cooling holes and conduct this air outside of the EV, an automatic EV inlet cover, configured to automatically open and close when the EV is entering and leaving the automatic recharging station, and means to elastically attach the automatic EV inlet to the EV.

5. The electric vehicle (EV) as described in claim 4, wherein the said plurality of moving contacts are high-power moving contacts.

6. The electric vehicle (EV) as described in claim 4, wherein the said plurality of moving contacts are low-power moving contacts.

7. The electric vehicle (EV) as described in claim 1, wherein the said liquid-based hydrogen-powered battery temperature control system comprising:

a liquid used as a battery thermal agent configured to cool and to heat the main EV battery to keep the battery temperature within an optimum temperature range, liquid pomp, a liquid hydrogen heater, a hydrogen tank for temperature control system, liquid thermostat configured to be located into the primary battery housing, a plurality of liquid pipes configured to connect the battery box with the liquid pomp and with the liquid hydrogen heater, a plurality of hydrogen pipes configured to connect the liquid hydrogen heater with the hydrogen tank for temperature control system, and attaching means configured to solidly attach all components of the liquid-based hydrogen-powered battery temperature control system on the EV.

8. The electric vehicle (EV) as described in claim 7, wherein the liquid hydrogen heater configured to heat the liquid, comprising:

a liquid hydrogen burner, a computer-controlled hydrogen valve of the liquid hydrogen burner powered by the auxiliary battery configured to control the hydrogen access to the hydrogen burner, a computer-controlled hydrogen igniter of the liquid hydrogen burner powered by the auxiliary battery configured to control the flame on the liquid hydrogen burner, a computer-controlled fan of the liquid hydrogen burner powered by the auxiliary battery configured to control the burning air, a computer-controlled air flat of the liquid hydrogen burner powered by the auxiliary battery configured to control the exhaust gases, a plurality of hydrogen tubes configured to connect the hydrogen tank for temperature control system to the hydrogen valve of the liquid hydrogen burner and to the liquid hydrogen burner, and attaching means configure to solidly attach the liquid hydrogen heater components on the EV.

9. The electric vehicle (EV) as described in claim 1, wherein the said air-based hydrogen-powered cabin heating system comprising a main EV air hydrogen heating system configured to heat the cabin and the EV seats during the driving and an auxiliary EV hydrogen heating system configured to heat the cabin and the EV seats during using the exhaust gases of the liquid hydrogen burner.

10. The electric vehicle (EV) as described in claim 9, wherein the said main EV air hydrogen heating system comprising:

a hydrogen tank of the main EV air hydrogen heating system, an air hydrogen burner of the main EV air hydrogen heating system, a computer-controlled hydrogen valve of the air hydrogen heating system powered by the auxiliary battery, a cabin air coil configured to heat the cabin, a plurality of seat air coils configured to heat the seats, a computer-controlled cabin air fan of the air hydrogen heating system powered by the auxiliary battery, a plurality of cabin heating air ducts configured to recirculate the cabin air and reheating it, an exhaust duct of the air hydrogen heating system configured to conduct the exhaust gases of the air hydrogen burner via a plurality of heating ducts passing by cabin and acting as heat exchangers, a computer-controlled exhaust fan located inside of the exhaust duct of the air hydrogen heating system powered by the auxiliary battery, a computer-controlled air flat of the air hydrogen heating system located inside of the cabin air duct powered by the auxiliary battery, configured to control the cabin air flow, a computer-controlled exhaust air flat located inside of the exhaust duct of the air hydrogen heating system powered by the auxiliary battery, configured to control the exhaust gases flow produced by the air hydrogen burner, and attaching means configure to solidly attach the air hydrogen heating system components on the EV.

11. The electric vehicle (EV) as described in claim 9, wherein the said auxiliary EV hydrogen heating system configured to use the exhaust gases produced by the liquid hydrogen heater of the liquid-based hydrogen-powered battery temperature control system comprising:

an air coil configured to be installed into the EV cabin and heat by the exhaust gases produced by the liquid hydrogen heater, a plurality of seat air coils heated by exhaust gases of the liquid hydrogen burner, a computer-controlled fan located inside of the exhaust duct of the liquid hydrogen heater, powered by the auxiliary battery, and a computer-controlled air flat located inside of the exhaust duct of the liquid hydrogen heater, powered by the auxiliary battery configured to control the exhaust gases flow produced by the liquid hydrogen heater.

12. The electric vehicle (EV) as described in claim 1, wherein the said hydrogen-powered air conditioning system configured to cool the EV cabin comprising:

a compressor activated by a hydrogen motor configured to work with an AC system computer-controlled and powered by the auxiliary battery.

13. The electric vehicle (EV) as described in claim 1, wherein the said battery recharge software comprising:

a computer application configured to communicate with software configured to work for an automatic recharge station.

14. The electric vehicle (EV) as described in claim 1, wherein the said EV identification device comprising:

a chip incorporating all information related to the EV allowing the trasability of the EV and the direct connection with the bank account of the power provider.

* * * * *